(12) United States Patent
Sekiguchi et al.

(10) Patent No.: US 8,145,002 B2
(45) Date of Patent: Mar. 27, 2012

(54) IMAGE ENCODING DEVICE AND IMAGE ENCODING METHOD

(75) Inventors: Shunichi Sekiguchi, Tokyo (JP); Shuichi Yamagishi, Tokyo (JP); Yoshimi Moriya, Tokyo (JP); Yoshihisa Yamada, Tokyo (JP); Kohtaro Asai, Tokyo (JP); Tokumichi Murakami, Tokyo (JP); Yuichi Idehara, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 1053 days.

(21) Appl. No.: 11/928,486

(22) Filed: Oct. 30, 2007

(65) Prior Publication Data

US 2009/0110067 A1    Apr. 30, 2009

(30) Foreign Application Priority Data

Jun. 28, 2007 (JP) ................. 2007-170330

(51) Int. Cl.
*G06K 9/36* (2006.01)
(52) U.S. Cl. ........................... 382/238; 382/166
(58) Field of Classification Search .......... 382/232–252, 382/162–167
See application file for complete search history.

(56) References Cited

U.S. PATENT DOCUMENTS

| | | | | |
|---|---|---|---|---|
| 6,862,320 B1* | 3/2005 | Isu et al. | ................ | 375/240.27 |
| 2002/0114392 A1* | 8/2002 | Sekiguchi et al. | ........ | 375/240.15 |
| 2005/0013370 A1* | 1/2005 | Kim et al. | ................ | 375/240.16 |
| 2005/0152452 A1* | 7/2005 | Suzuki | .................... | 375/240.16 |
| 2005/0271288 A1* | 12/2005 | Suzuki et al. | ................ | 382/239 |
| 2006/0233251 A1* | 10/2006 | Kim et al. | ................ | 375/240.12 |
| 2006/0239349 A1* | 10/2006 | Shibayama | ............. | 375/240.12 |

FOREIGN PATENT DOCUMENTS

| | | |
|---|---|---|
| EP | 1 753 242 A2 | 2/2007 |
| EP | 1 909 508 A1 | 4/2008 |
| WO | WO 2007/010690 A1 | 1/2007 |

OTHER PUBLICATIONS

"Advanced video coding for generic audiovisual services", Series H: Audiovisual and Multimedia Systems: Infrastructure of audiovisual services—Coding of moving video, International Telecommunication Union (ITU), ITU-T Recommendation H.264, Mar. 2005, 341 pages.
U.S. Appl. No. 11/928,549, filed Oct. 30, 2007, Sekiguchi et al.
U.S. Appl. No. 11/928,780, filed Oct. 30, 2007, Sekiguchi et al.

* cited by examiner

*Primary Examiner* — Jingge Wu
(74) *Attorney, Agent, or Firm* — Birch, Stewart, Kolasch & Birch, LLP

(57) ABSTRACT

An encoding device includes a color component separating unit for separating an input bit stream for the respective color components, a block dividing unit for dividing an input color component signal into blocks to generate a signal of an encoding unit area, a predicted image generating unit for generating a predicted image for the signal, a determining unit for determining a prediction mode used for encoding according to a prediction efficiency of the predicted image, a prediction error encoding unit for encoding a difference between the predicted image corresponding to the prediction mode determined by the determining unit and the input color component signal, and an encoding unit for variable length-coding the prediction mode, an output from the prediction error encoding unit, and a color component identification flag indicating the color component to which the input bit stream belongs as a result of the color component separation.

2 Claims, 97 Drawing Sheets

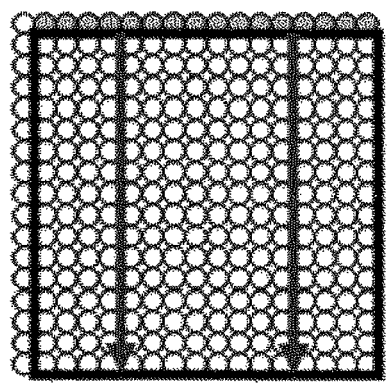
intra16x16_pred_mode = 0
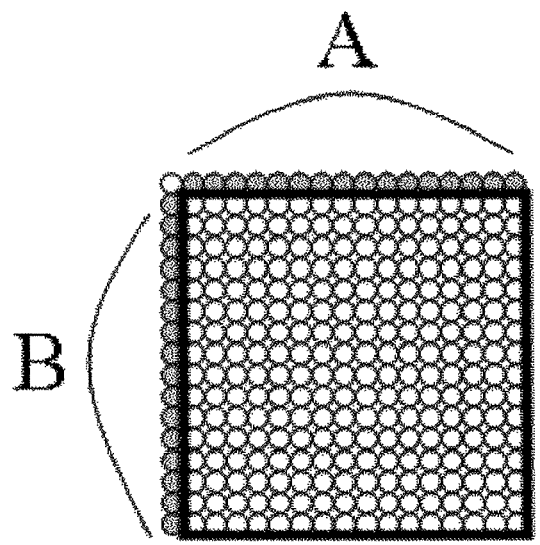
intra16x16_pred_mode = 2
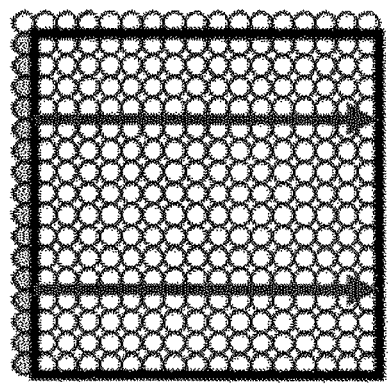
intra16x16_pred_mode = 1
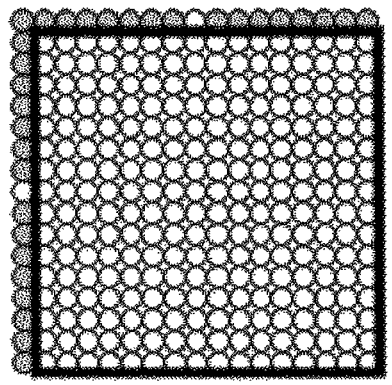
intra16x16_pred_mode = 3
Fig. 4

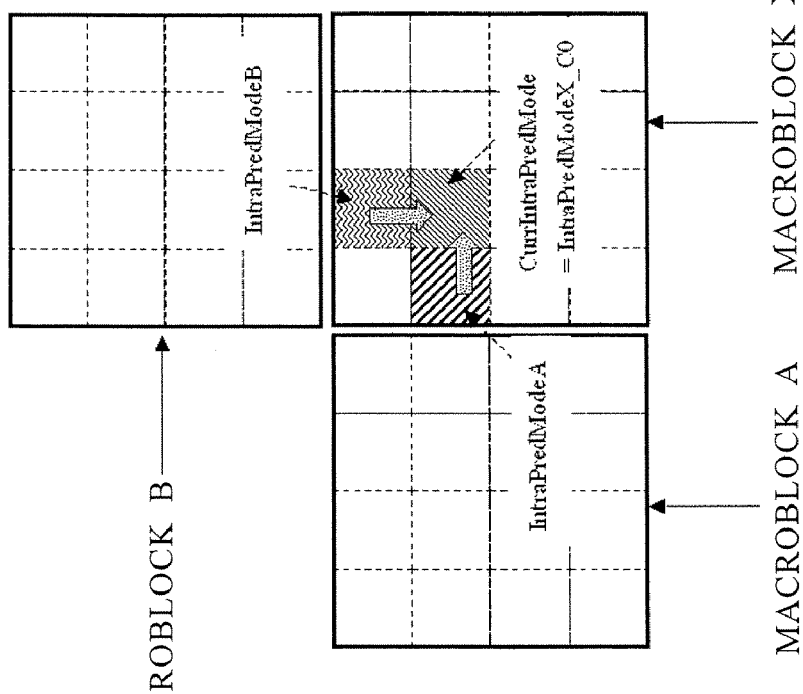
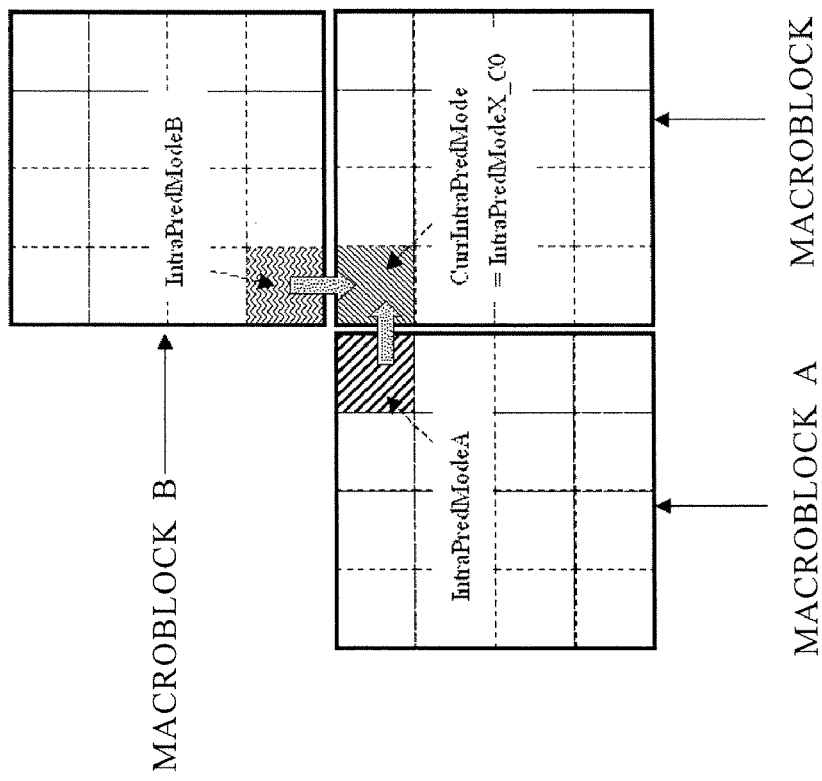
Fig. 18

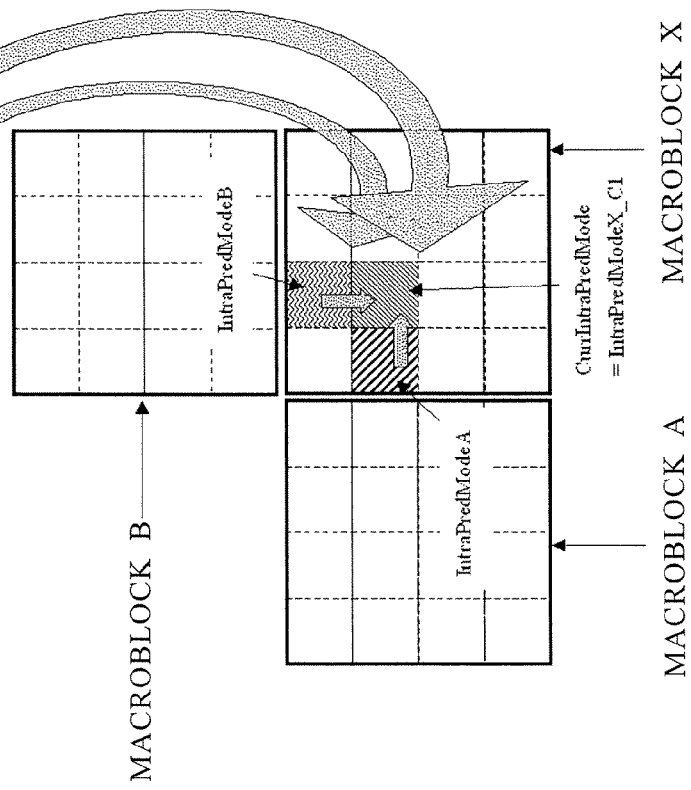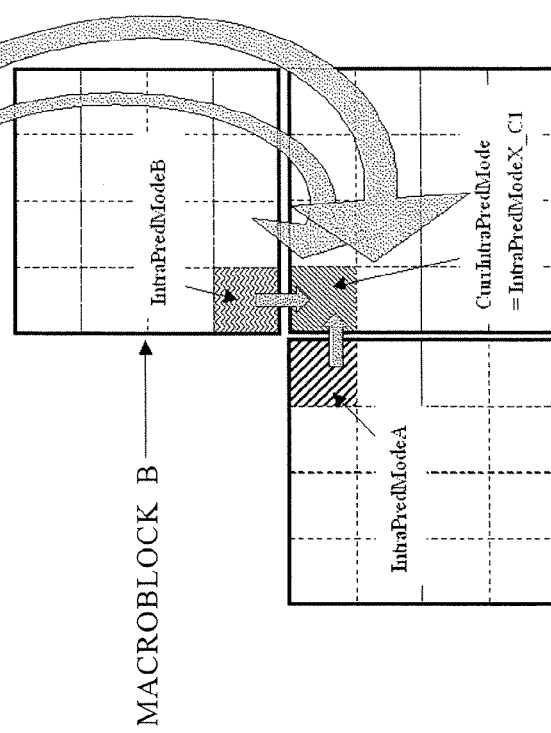
Fig. 20

| CLASS | IntraPredModeA | IntraPredModeB | predCurrIntraPredMode |
|---|---|---|---|
| 0 | 0 | 0 | 0 |
| | 0 | 1 | 0 |
| | 0 | 2 | 0 |
| | 0 | 3 | 0 |
| | 0 | 4 | 0 |
| | 0 | 5 | 0 |
| | 0 | 6 | 0 |
| | 0 | 7 | 0 |
| | 0 | 8 | 0 |
| | 1 | 0 | 0 |
| | 1 | 1 | 1 |
| | 1 | 2 | 1 |
| | 1 | 3 | 1 |
| | 1 | 4 | 1 |
| | 1 | 5 | 1 |
| | 1 | 6 | 1 |
| | 1 | 7 | 1 |
| | 1 | 8 | 1 |
| | 2 | 0 | 0 |
| | 2 | 1 | 1 |
| | 2 | 2 | 2 |
| | 2 | 3 | 2 |
| | 2 | 4 | 2 |
| | 2 | 5 | 2 |
| | 2 | 6 | 2 |
| | 2 | 7 | 2 |
| | 2 | 8 | 2 |

| CLASS | IntraPredModeA | IntraPredModeB | predCurrIntraPredMode |
|---|---|---|---|
| 1 | 3 | 0 | 0 |
| | 3 | 1 | 8 |
| | 3 | 2 | 2 |
| | 3 | 3 | 3 |
| | 3 | 4 | 2 |
| | 3 | 5 | 2 |
| | 3 | 6 | 2 |
| | 3 | 7 | 7 |
| | 3 | 8 | 8 |
| | 4 | 0 | 0 |
| | 4 | 1 | 1 |
| | 4 | 2 | 2 |
| | 4 | 3 | 2 |
| | 4 | 4 | 4 |
| | 4 | 5 | 5 |
| | 4 | 6 | 6 |
| | 4 | 7 | 2 |
| | 4 | 8 | 2 |
| | 5 | 0 | 0 |
| | 5 | 1 | 2 |
| | 5 | 2 | 2 |
| | 5 | 3 | 2 |
| | 5 | 4 | 5 |
| | 5 | 5 | 5 |
| | 5 | 6 | 5 |
| | 5 | 7 | 2 |
| | 5 | 8 | 2 |
| | 6 | 0 | 0 |
| | 6 | 1 | 6 |
| | 6 | 2 | 2 |
| | 6 | 3 | 2 |
| | 6 | 4 | 6 |
| | 6 | 5 | 6 |
| | 6 | 6 | 6 |
| | 6 | 7 | 2 |
| | 6 | 8 | 6 |
| | 7 | 0 | 7 |
| | 7 | 1 | 8 |
| | 7 | 2 | 2 |
| | 7 | 3 | 7 |
| | 7 | 4 | 2 |
| | 7 | 5 | 2 |
| | 7 | 6 | 2 |
| | 7 | 7 | 7 |
| | 7 | 8 | 8 |
| | 8 | 0 | 0 |
| | 8 | 1 | 8 |
| | 8 | 2 | 2 |
| | 8 | 3 | 8 |
| | 8 | 4 | 2 |
| | 8 | 5 | 2 |
| | 8 | 6 | 2 |
| | 8 | 7 | 8 |
| | 8 | 8 | 8 |

Fig. 26

| CurrIntraPredMode | BINARY SEQUENCE | | | | |
|---|---|---|---|---|---|
| 0 | 1 | 0 | | | |
| 1 | 0 | 0 | | | |
| 2 | 0 | 1 | 0 | | |
| 3 | 1 | 1 | 0 | | |
| 4 | 0 | 1 | 1 | 0 | |
| 5 | 1 | 1 | 1 | 0 | |
| 6 | 0 | 1 | 1 | 1 | 0 |
| 7 | 1 | 1 | 1 | 1 | |
| 8 | 0 | 1 | 1 | 1 | 1 |

Fig. 28

| CurrIntraPredMode | BINARY SEQUENCE | | | | |
|---|---|---|---|---|---|
| 2 | 0 | | | | |
| 0 | 1 | 0 | 0 | | |
| 1 | 1 | 1 | 0 | | |
| 3 | 1 | 0 | 1 | 0 | |
| 4 | 1 | 1 | 1 | 0 | |
| 5 | 1 | 0 | 1 | 1 | 0 |
| 6 | 1 | 1 | 1 | 1 | 0 |
| 7 | 1 | 0 | 1 | 1 | 1 |
| 8 | 1 | 1 | 1 | 1 | 1 |

Fig. 29

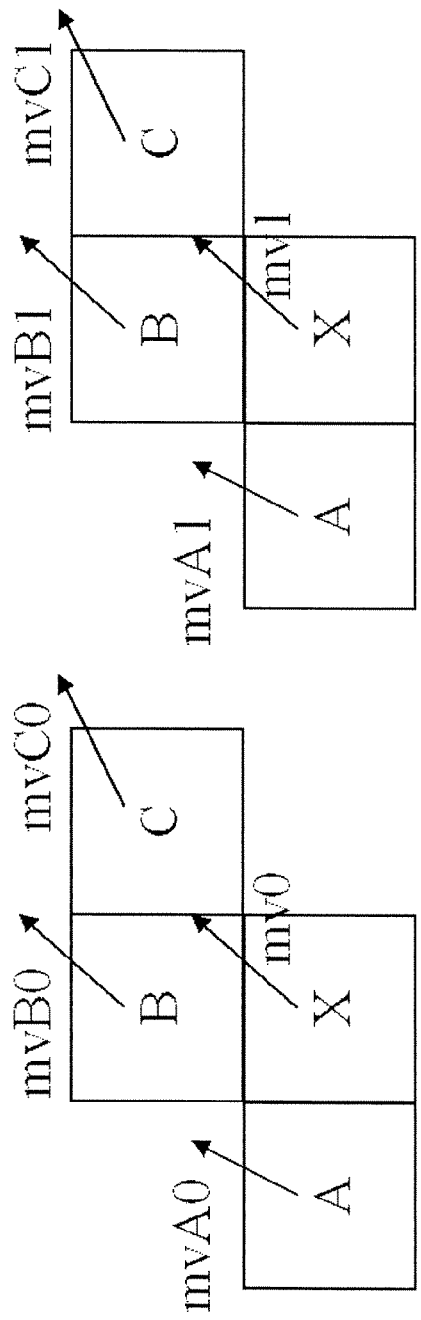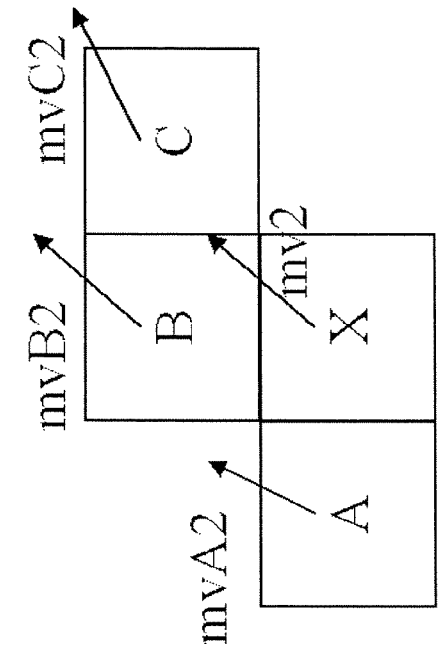
Fig. 46

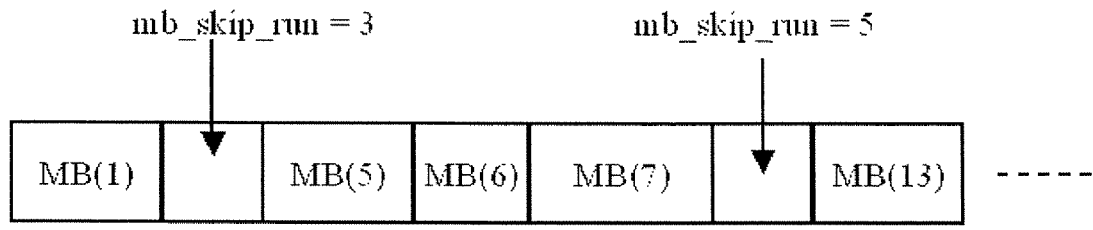
(a) USING ADAPTIVE HUFFMAN-CODING
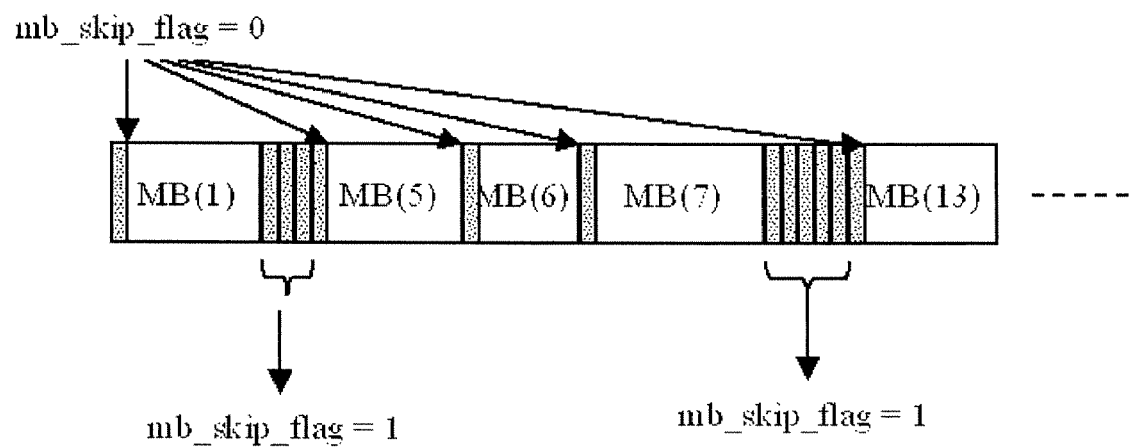
(b) USING ADAPTIVE ARITHMETIC-CODING
Fig. 48

$$e_k(C) = |mvd_k(A)| + |mvd_k(B)|$$

$$ctx\_mvd(C,k) = \begin{cases} 0, & \text{for } e_k(C) < 3; \\ 1, & \text{for } e_k(C) > 32; \\ 2, & \text{else} \end{cases}$$

| B | |
|---|---|
| A | C |

$$ctx\_IDC_C = (IDC_A ==\text{"}Independent\_Coding\_Mode\text{"}) + $$
$$(IDC_B ==\text{"}Independent\_Coding\_Mode\text{"})$$

Fig. 61

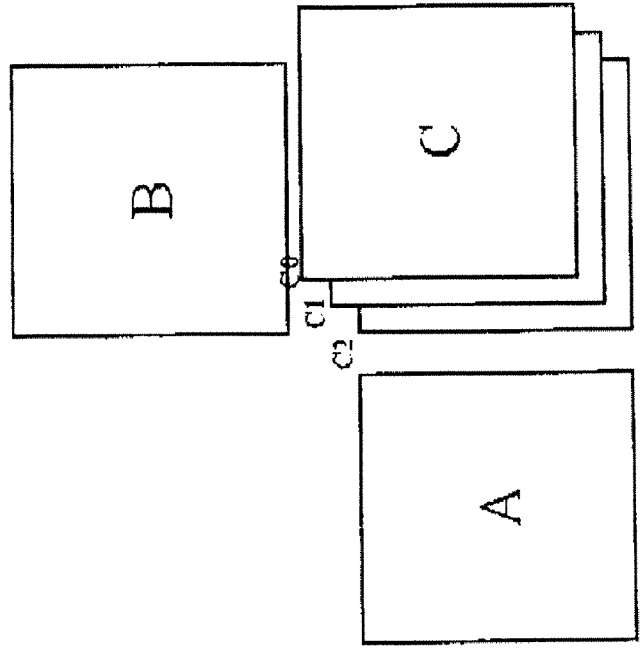
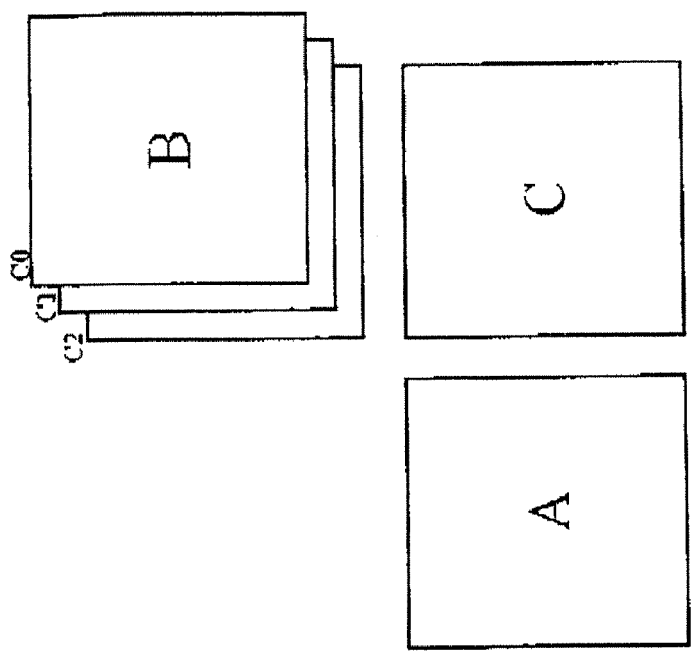
Fig. 62
(b) IN A CASE WHERE CURRENT MACROBLOCK IS ENCODED WITH DIFFERENT HEADER FOR EACH OF C0, C1, AND C2
(a) IN A CASE WHERE CURRENT MACROBLOCK IS ENCODED WITH HEADER COMMON TO C0, C1, AND C2

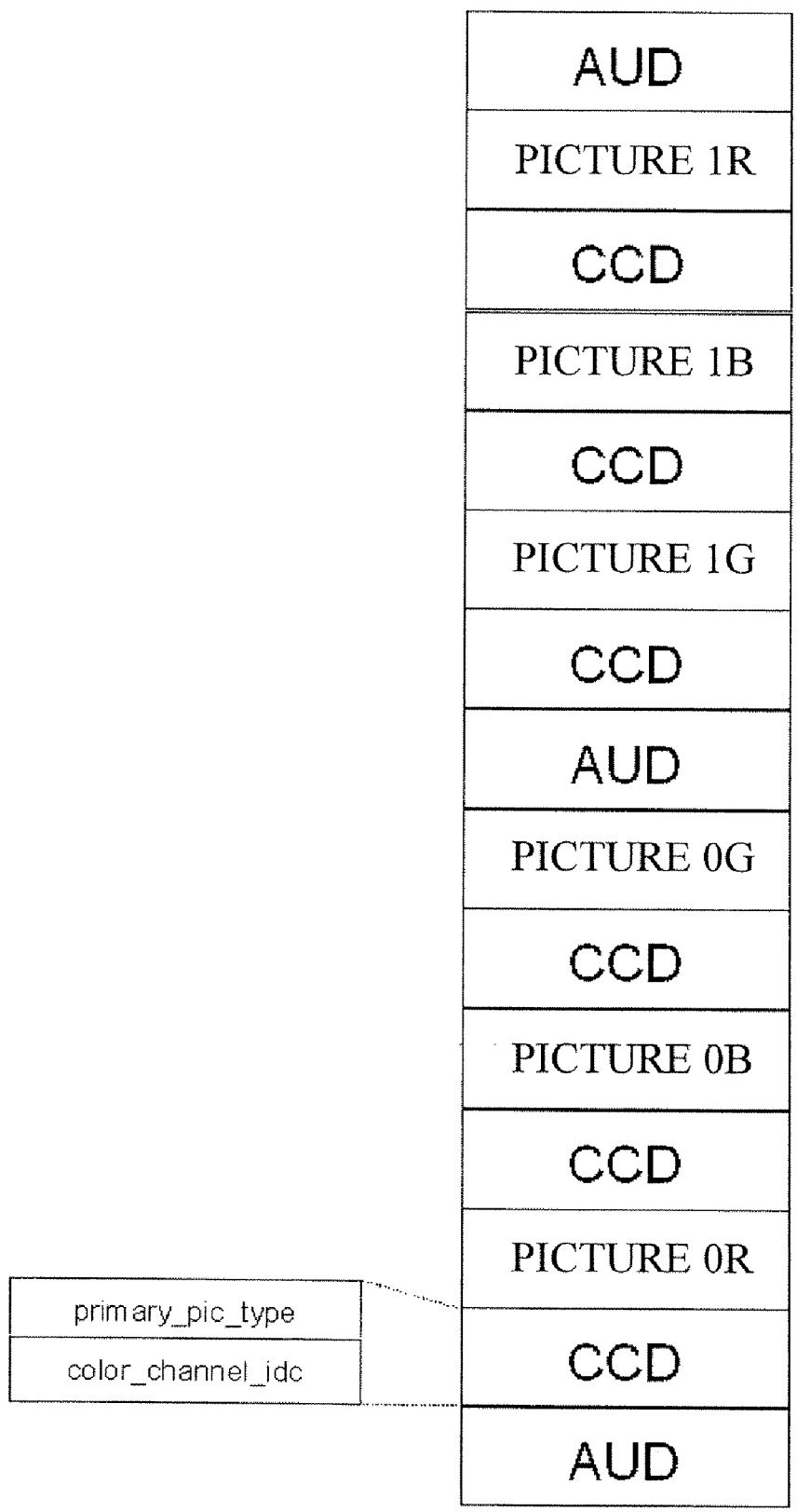
F i g.　8 4

Table 7-5 — Meaning of primary_pic_type (EXTRACTED FROM STANDARD)

| Primary_pic_type | slice_type values that may be present in the primary coded picture |
|---|---|
| 0 | I |
| 1 | I,P |
| 2 | I,P,B |
| 3 | SI |
| 4 | SI,SP |
| 5 | I,SI |
| 6 | I,SI,P,SP |
| 7 | I,SI,P,SP,B |

Fig. 85

DEFINE AS 1 PICTURE (1 COLOR COMPONENT)
= 1 ACCESS UNIT IN THIS CASE

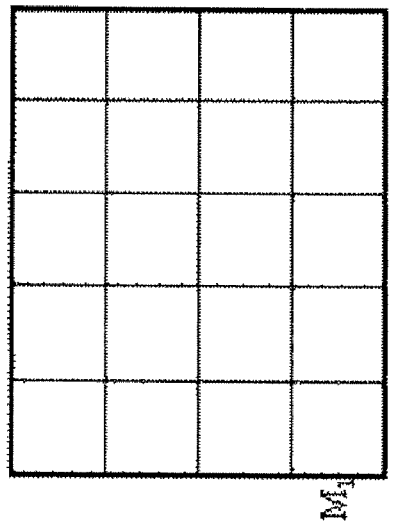
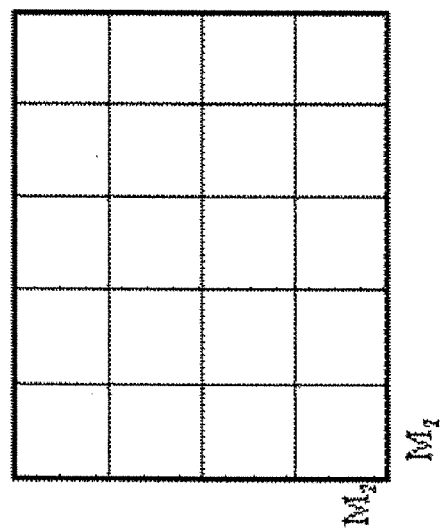
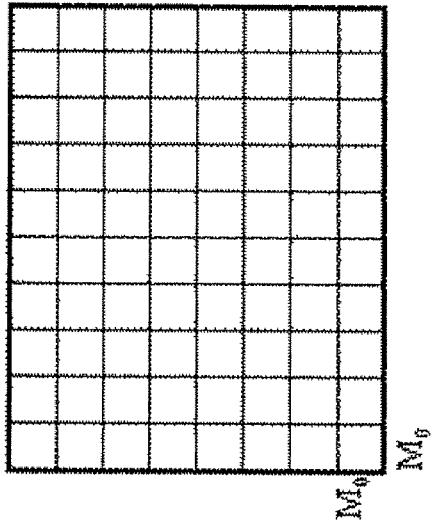
Fig. 89

METHOD OF GENERATING
HALF-PIXEL PREDICTION PIXEL

Fig. 95 METHOD OF GENERATING HALF-PIXEL PREDICTION PIXEL FOR 1/4 PIXEL MACROBLOCK, ONLY HORIZONTAL PROCESS ILLUSTRATED

IMAGE ENCODING DEVICE AND IMAGE ENCODING METHOD

BACKGROUND OF THE INVENTION

1. Field of the Invention

The present invention relates to a digital image signal encoding device, a digital image signal decoding device, a digital image signal encoding method, and a digital image signal decoding method used for an image compression encoding technology or a compressed image data transmission technology.

2. Description of the Related Art

An international standard video encoding system such as MPEG or ITU-T H. 26x has conventionally been premised on use of a standardized input signal format called a 4:2:0 format. The 4:2:0 format is a format where a color moving image signal of RGB or the like is converted into a luminance component (Y) and two chrominance components (Cb, Cr), and the number of chrominance component samples is reduced to half of luminance components both in horizontal and vertical directions. The chrominance component is inferior to the luminance component in visibility. Accordingly, the conventional international standard video encoding system such as the MPEG-4 AVC (ISO/IEC 14496-10)/ITU-T H.264 standard (hereinafter, referred to simply as AVC) (hereinafter, referred to as Non-patent Document 1) has been based on the premise that the amount of original information to be encoded is reduced by downsampling chrominance components before encoding is executed as mentioned above. On the other hand, with recent increases in resolution and gradation of a video display and for the purpose of precisely reproducing on the screen color representation at the time of creating contents of digital cinema and the like, studies have been made on a system for performing encoding by maintaining the number of samples equal to that of luminance components without downsampling chrominance components. A format where the numbers of luminance and chrominance component samples are completely equal is called a 4:4:4 format. According to Non-patent Document 1, a "high 4:4:4 profile" has been developed as an encoding method which uses the 4:4:4 format as an input. As a method suited for this object, there is employed a standard method as defined in the JPEG 2000 (ISO/IEC 15444) standard (hereinafter, referred to as Non-patent Document 2). As illustrated in FIG. 10, the conventional 4:2:0 format has been limited to Y, Cb, and Cr color space definitions because of the premise of downsampling of chrominance components. In the case of the 4:4:4 format, however, because there is no sample ratio distinction between color components, R, G, and B can be directly used in addition to Y, Cb, and Cr, and a plurality of color space definitions can be used. In a video encoding method using the 4:2:0 format, a color space is limited to a Y, Cb, and Cr color space. Therefore, the type of color space is not required to be taken into consideration during an encoding process. In the AVC high 4:4:4 profile described above, however, color space definition affects the encoding process itself. On the other hand, because the current high 4:4:4 profile considers the compatibility with the other profiles which use the 4:2:0 format defined by the Y, Cb, and Cr color space as a target to be encoded, it is not considered that the high 4:4:4 profile is designed to optimize a compression efficiency of the 4:4:4 format.

For example, in a high 4:2:0 profile encoding the 4:2:0 format of the AVC, in a macroblock area composed of luminance components of 16×16 pixels, corresponding chrominance components are 8×8 pixel blocks for both Cb and Cr. In motion compensation prediction of the high 4:2:0 profile, block size information which becomes a unit of motion compensation prediction only for the luminance components, reference image information used for prediction, and motion vector information of each block are multiplexed, and motion compensation prediction is carried out for chrominance components by the same information as that of the luminance components. The above method is premised on the color space definition that the contribution of the chrominance components is less than that of the luminance component which contributes greatly to the expression of an image structure (texture) in the 4:2:0 format. However, the current high 4:4:4 profile corresponds to the simple extension of the intra prediction mode for chrominance in the 4:2:0 format even when the block size of a chrominance signal per macroblock is expanded to 16×16 pixels. Moreover, as in the case of the 4:2:0 format, one component is regarded as the luminance component. After only information for one component is multiplexed, motion compensation prediction is performed using an inter prediction mode, reference image information, and motion vector information which are common to three components. Therefore, the prediction method is not always optimal for the 4:4:4 format in which the respective color components equally contribute to the expression of the structure of an image signal.

SUMMARY OF THE INVENTION

As described by way of the above related art, it is an object of the present invention to provide an encoding device, a decoding device, an encoding method, a decoding method, programs for executing these methods, and a recording medium recorded with these programs, that enhance optimality in a case of encoding moving image signals having no sample ratio distinction between color components such as a 4:4:4 format.

According to the present invention, there is provided an image encoding device for receiving a color moving image signal composed of a plurality of color components as an input, dividing the color moving image signal into predetermined encoding unit areas for each of the plurality of color components, and selectively applying one of intra encoding and motion compensation prediction encoding to digitally compress the color moving image signal, comprising: a color component separating unit for separating an input bit stream for each of the plurality of color components; a block dividing unit for dividing the input color component signal into predetermined blocks to generate a signal of each of the encoding unit areas; a predicted image generating unit for generating a predicted image for the signal of each of the encoding unit areas according to at least one prediction mode indicating a predicted image generating method and corresponding prediction overhead information; a determining unit for determining a prediction mode used for encoding and corresponding prediction overhead information according to a prediction efficiency of the predicted image output from the predicted image generating unit; a prediction error encoding unit for encoding a difference between the predicted image corresponding to the prediction mode determined by the determining unit and the input color component signal; and an encoding unit for variable length-coding the prediction mode, the corresponding prediction overhead information, an output from the prediction error encoding unit, and a color component identification flag indicating the color component to which the input bit stream belongs as a result of the color component separation, wherein: the determining unit selects one of use of the prediction mode used for encoding and the corresponding prediction overhead information in an area to be encoded of another color component constituting the same screen at the same image position and use of its own prediction mode and corresponding prediction overhead information for the color component to determine the prediction mode used for encoding and the corresponding prediction overhead information; and the encoding unit multiplexes a prediction information encoding indication flag indicating means used for determining the prediction mode and the corresponding prediction overhead information in the bit stream for each of the encoding unit areas.

According to the image encoding device and the image decoding device of the present invention, in a case of performing encoding that uses multiple color spaces without being limited to the fixed color spaces of Y, Cb, Cr, etc., it is possible to flexibly select intra prediction mode information and inter prediction mode information to be used for the respective color components, and to conduct an optimal encoding process even in a case where there are diverse definitions of the color spaces.

BRIEF DESCRIPTION OF THE DRAWINGS

Preferred embodiments of the present invention will be described in detail based on the following figures, wherein:

FIG. 4 are explanatory views illustrating the predicted image generating method in intra 16×16 prediction modes evaluated in the spatial prediction unit in FIG. 1;

FIG. 18 are explanatory views illustrating parameters of the intra prediction mode encoding process of a C0 component in a third embodiment;

FIG. 20 are explanatory views illustrating parameters of the intra prediction mode encoding process of a C2 component in the third embodiment;

FIG. 26 are explanatory views illustrating a prediction value setting rule shown as tables in the fifth embodiment;

FIG. 28 is an explanatory view illustrating a binary sequence structure of CurrIntraPredMode in the sixth embodiment;

FIG. 29 is an explanatory view illustrating another binary sequence structure of CurrIntraPredMode in the sixth embodiment;

FIG. 46 are explanatory views illustrating operations of the motion vector encoding unit;

FIGS. 48A and 48B are explanatory views each illustrating a state of a bit stream syntax;

FIG. 61 is an explanatory view illustrating the context model in the twelfth embodiment;

FIGS. 62A and 62B are explanatory views illustrating a difference between modes of current macroblocks in the twelfth embodiment;

FIG. 84 is an explanatory view illustrating a structure of the bit stream of the encoded data to be multiplexed in the fifteenth embodiment;

FIG. 85 is an explanatory view illustrating information of a picture encoding type when picture data in an access unit beginning with an AUD NAL unit is encoded;

FIG. 89 are explanatory views illustrating the use of a different block size for each chrominance component;

DESCRIPTION OF THE PREFERRED EMBODIMENTS

First Embodiment

In a first embodiment of the present invention, an encoding device which performs closed encoding within a frame in units of rectangular regions (macroblocks), each consisting of 16×16 pixels, obtained by equally dividing a video frame input in the 4:4:4 format, and a decoding device corresponding to the encoding device will be described. The encoding device and the decoding device according to the present invention are based on the encoding method employed in Non-patent Document 1 and imparted with characteristics specific to the present invention. Note that in all the embodiments described below, the size of the macroblock is not required to be limited to 16×16 pixels of the frame image. For example, as in the case of an interlaced signal, a 16×16 pixel block of a field image may be a macroblock when a field is used as a screen serving as a unit of encoding. Alternatively, the encoding may be performed while adaptively changing the block size of the macroblock depending on whether the macroblock is encoded as a frame image or a field image.

Figure 1:
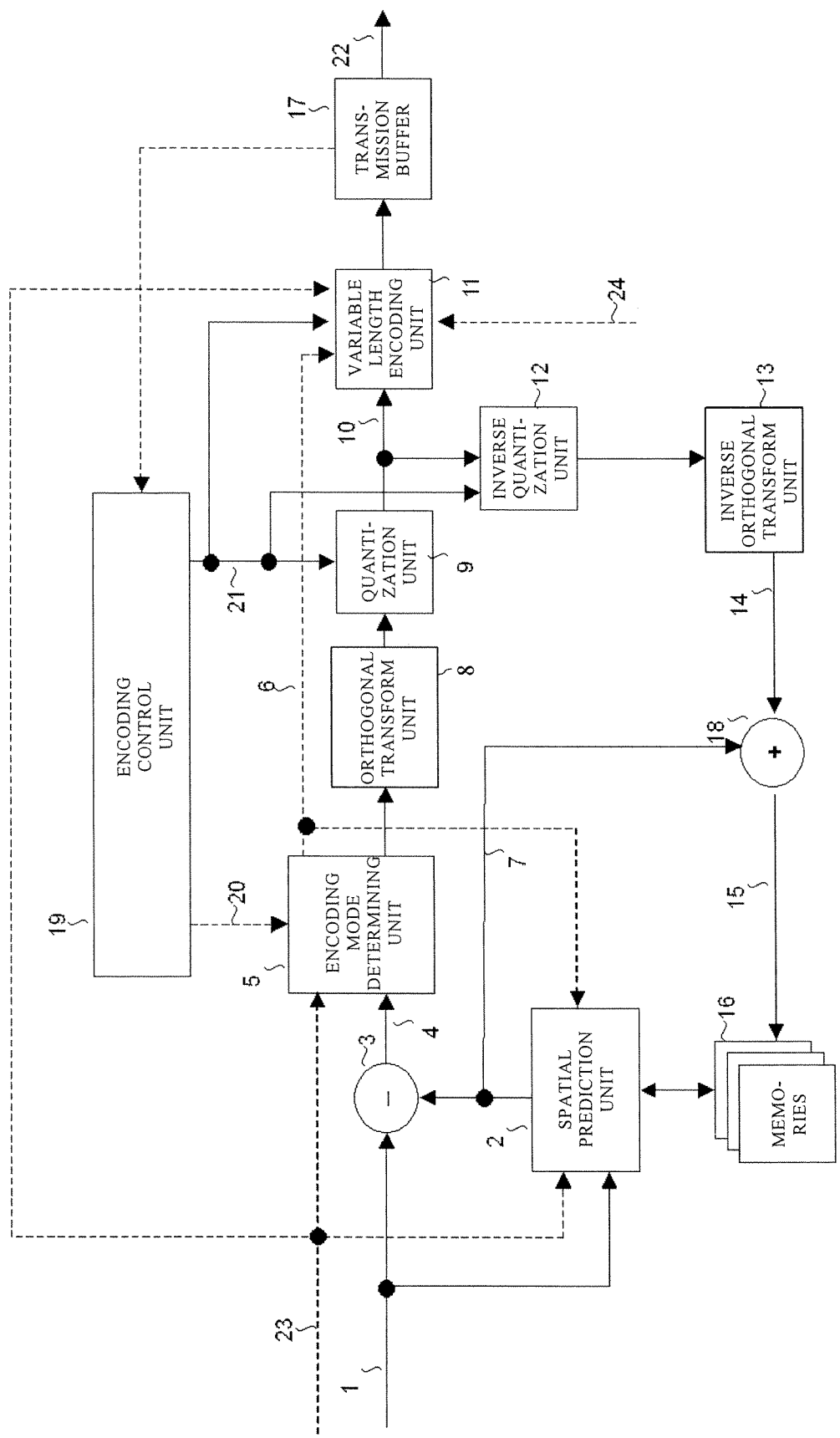
FIG. 1 is an explanatory view illustrating a configuration of a video encoding device in a first embodiment.
Figure 2:
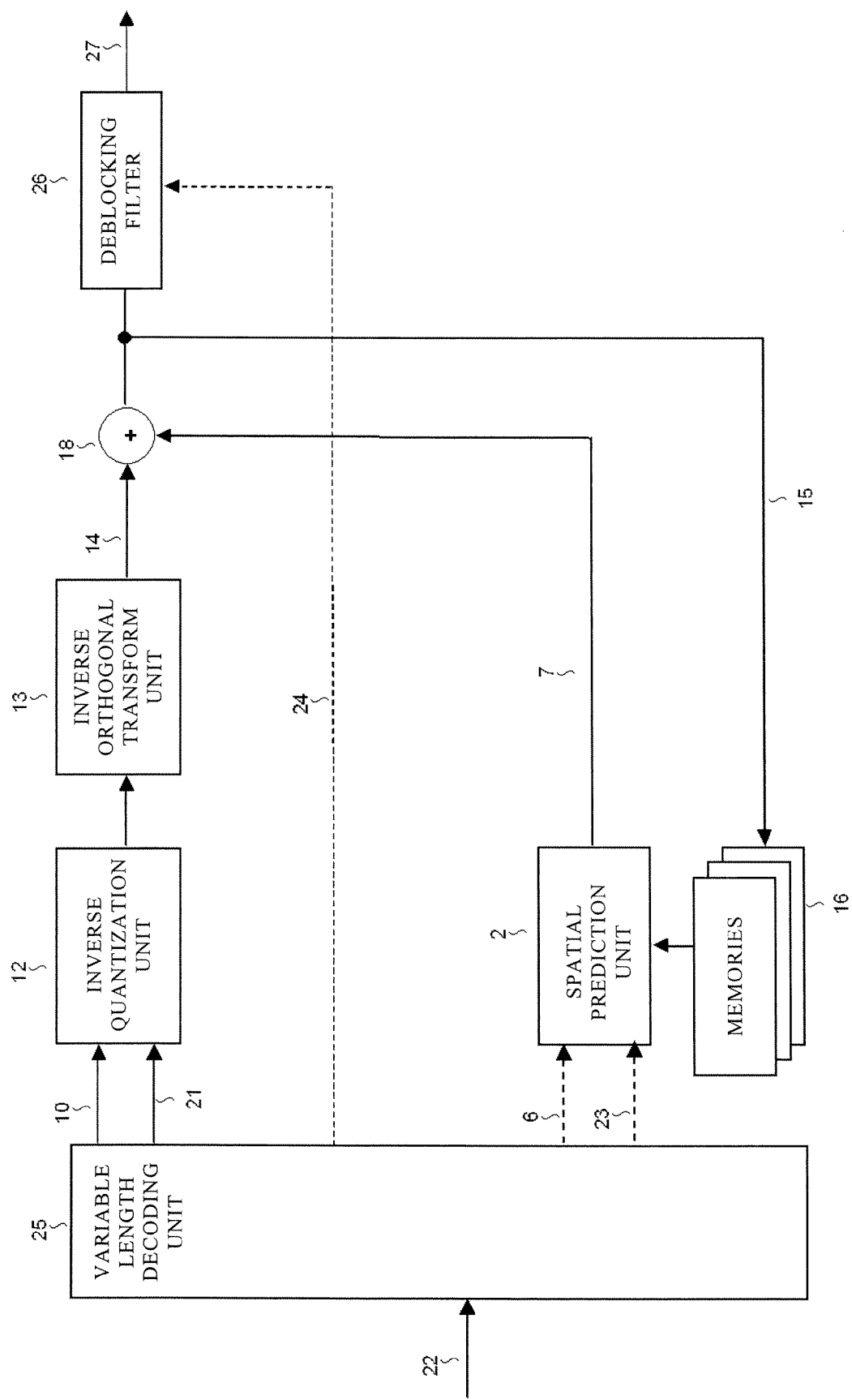
FIG. 2 is an explanatory view illustrating a configuration of a video decoding device in the first embodiment.

FIG. 1 illustrates a configuration of a video encoding device according to the first embodiment of the present invention, and FIG. 2 illustrates a configuration of a video decoding device according to the first embodiment of the present invention. In FIG. 2, the components denoted by the same reference numerals as those in the encoding device illustrated in FIG. 1 are the same components.

Hereinafter, with reference to FIGS. 1 and 2, the operations of the entire encoding device and the entire decoding device, and an intra prediction mode determining process and an intra prediction decoding process which are specific operations according to the first embodiment will be described.

1. Outline of Operation of the Encoding Device

Figure 10:
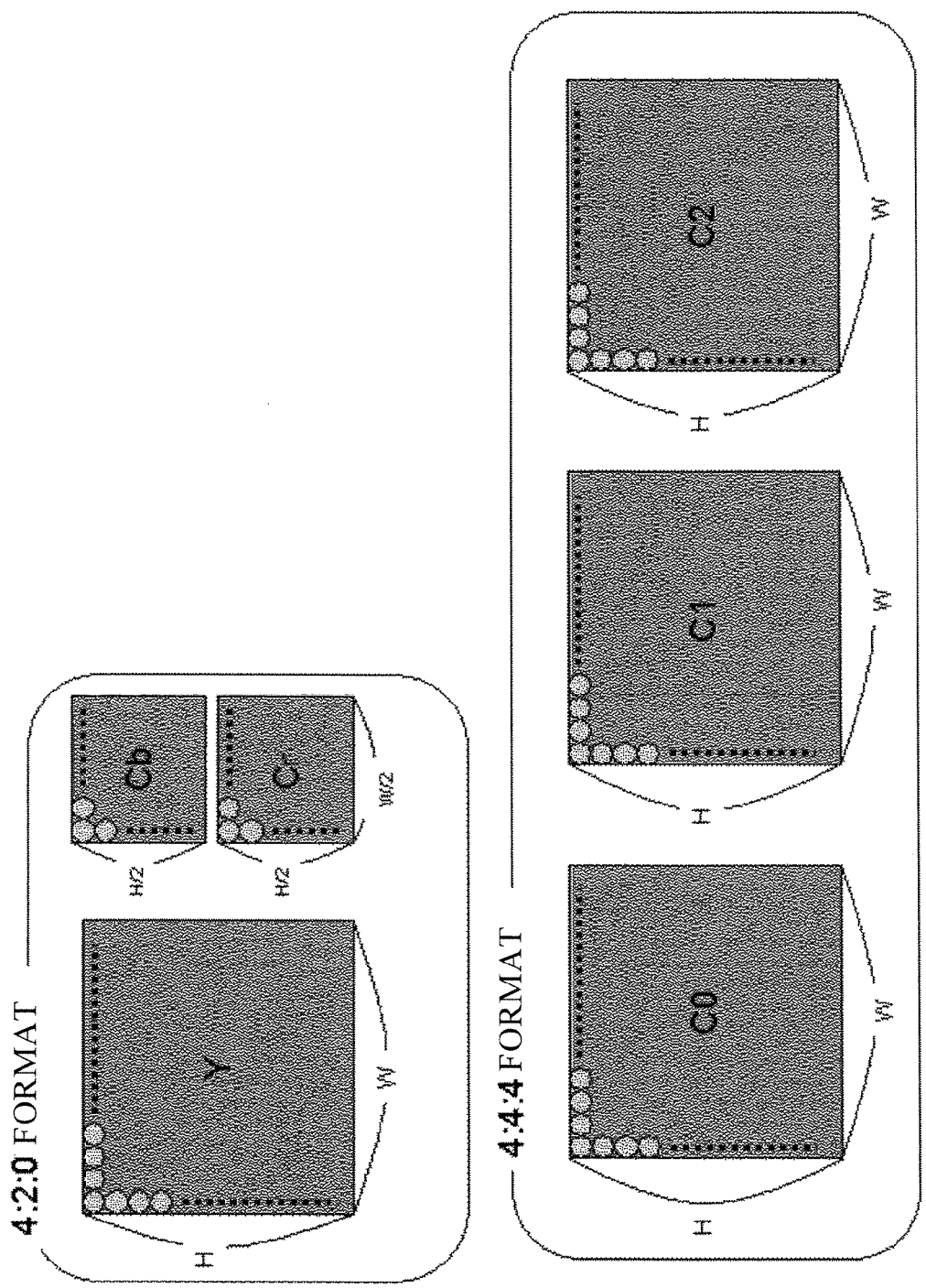
FIG. 10 are explanatory views illustrating conventional and current macroblocks.

In the encoding device illustrated in FIG. 1, as an input video signal 1, each video frame is input in the 4:4:4 format. As illustrated in FIG. 10, the video frame to be input is input to the encoding device on the macroblock basis. Each macroblock is obtained by dividing each of three color components in a block of 16×16 pixels having the same size and then aggregating the obtained blocks of the three color components.

First, in a spatial prediction unit 2, an intra prediction process is performed for each color component on the macroblock basis by using a local decoded image 15 to be stored in memories 16. Three memories are provided for three image planes corresponding to the respective color components (the number of memories is described as three in this embodiment, but the number of memories may be appropriately changed depending on the design). The intra prediction includes an intra 4×4 prediction mode and an intra 16×16 prediction mode. In the intra 4×4 prediction mode, spatial prediction is performed in units of blocks illustrated in FIG. 3, each being composed of 4 pixels×4 lines, by using the neighboring pixels of the block. In the intra 16×16 prediction mode, spatial prediction is performed on the macroblock basis illustrated in FIG. 4, each being composed of 16 pixels×16 lines, by using the neighboring pixels of the macroblock.

(a) Intra 4×4 Prediction Mode

Figure 3:
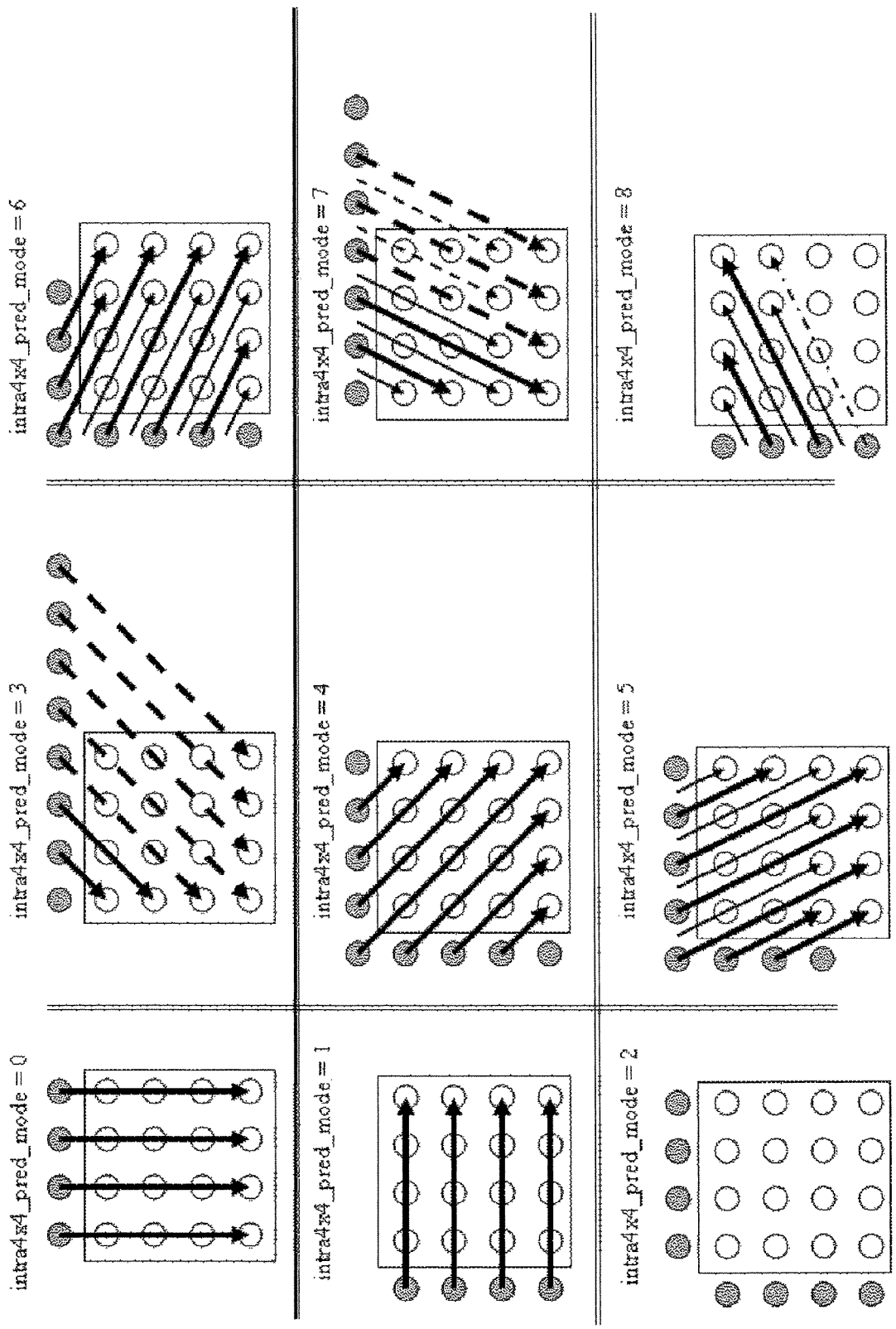
FIG. 3 are explanatory views illustrating a predicted image generating method in intra 4×4 prediction modes evaluated in a spatial prediction unit in FIG. 1.

A luminance signal 16×16 pixel block in the macroblock is divided into sixteen blocks, each being a 4×4 pixel block. Then, any of nine modes illustrated in FIG. 3 is selected for each 4×4 pixel block. Pixels in the neighboring blocks (upper left, upper, upper right, and left blocks) which have been encoded and subjected to a local decoding process to be stored in the memories 16, are used for the generation of a predicted image.

Intra4×4_pred_mode=0: Neighboring upper pixels are used as a predicted image.

Intra4×4_pred_mode=1: Neighboring left pixels are used as a predicted image.

Intra4×4_pred_mode=2: An average value of eight neighboring pixels is used as a predicted image.

Intra4×4_pred_mode=3: A weighted average of every two or three pixels is calculated from the neighboring pixels and the obtained weighted average is used as a predicted image (corresponding to a diagonal down-left edge at 45 degrees).

Intra4×4_pred_mode=4: A weighted average of every two or three pixels is calculated from the neighboring pixels and the obtained weighted average is used as a predicted image (corresponding to a diagonal down-right edge at 45 degrees).

Intra4×4_pred_mode=5: A weighted average of every two or three pixels is calculated from the neighboring pixels and the obtained weighted average is used as a predicted image (corresponding to a vertical right edge at 22.5 degrees).

Intra4×4_pred_mode=6: A weighted average of every two or three pixels is calculated from the neighboring pixels and the obtained weighted average is used as a predicted image (corresponding to a horizontal down edge at 67.5 degrees).

Intra4×4_pred_mode=7: A weighted average of every two or three pixels is calculated from the neighboring pixels and the obtained weighted average is used as a predicted image (corresponding to a vertical left edge at 22.5 degrees).

Intra4×4_pred_mode=8: A weighted average of every two or three pixels is calculated from the neighboring pixels and the obtained weighted average is used as a predicted image (corresponding to a horizontal up edge at 112.5 degrees).

When the intra 4×4 prediction mode is selected, sixteen pieces of mode information are required for each macroblock. Therefore, in order to reduce the amount of codes of the mode information itself, predictive encoding is performed based on the mode information of the neighboring blocks, taking advantage of a high correlation of the mode information between the neighboring blocks.

(b) Intra 16×16 Prediction Mode

In the intra 16×16 prediction mode, the 16×16 pixel block corresponding to the macroblock size is predicted at a time. Any of four modes illustrated in FIG. 4 is selected for each macroblock unit. As in the case of the intra 4×4 prediction mode, the pixels in the neighboring (upper left, upper, and left) macroblocks, which have already been encoded and subjected to the local decoding process to be stored in the memories 16, are used for the generation of a predicted image.

Intra 16×16_pred_mode=0: Sixteen pixels in the lowermost line of the upper macroblock are used as a predicted image.

Intra 16×16_pred_mode=1: Sixteen pixels in the rightmost line of the left macroblock are used as a predicted image.

Intra 16×16_pred_mode=2: An average value of thirty-two pixels, i.e., sixteen pixels (A of FIG. 4) in the lowermost line of the upper macroblock and sixteen pixels (B of FIG. 4) in the leftmost line in the left macroblock, is used as a predicted image.

Intra 16×16_pred_mode=3: Thirty-one pixels corresponding to a pixel at the lower right corner in the upper left macroblock, fifteen pixels in the lowermost line of the upper macroblock (except for the open pixel), and fifteen pixels in the rightmost line of the left macroblock (except for the open pixel) are used to perform a predetermined computing process (weighted addition process according to the pixels to be used and pixel positions to be predicted), thereby obtaining a predicted image.

In the video encoding device according to the first embodiment of the present invention, the intra prediction process method is switched for three color components based on an intra prediction mode-sharing identification flag 23. This will be described in detail in the section 2 below.

The spatial prediction section 2 executes the prediction process on all the modes or a subset illustrated in FIG. 3 or 4 to obtain a prediction difference signal 4 by a subtracter 3. A prediction efficiency of the prediction difference signal 4 is evaluated in an encoding mode determining unit 5. As a result, the prediction mode in which the optimal prediction efficiency is obtained for the macroblock to be predicted, from the prediction process executed in the spatial prediction unit 2, is output as an encoding mode 6. In this case, the encoding mode 6 contains determination information (corresponding to an intra-encoding mode of FIG. 6) indicating which of the intra 4×4 prediction mode and the intra 16×16 prediction mode is used and also contains each prediction mode (the intra4×4_pred_mode or the intra16×16_pred_mode described above) used for each prediction unit area for prediction. The prediction unit area corresponds to a 4×4 pixel block in the case of the intra 4×4 prediction mode, or a 16×16 pixel block in the case of the intra16×16_pred_mode. For the selection of the encoding mode 6, a weighting coefficient 20 for each of the encoding modes, which is determined based on the determination of an encoding control unit 19, may be taken into consideration. The optimal prediction difference signal 4 obtained by using the encoding mode 6 in the encoding mode determining unit 5 is output to an orthogonal transform unit 8. The orthogonal transform unit 8 transforms the input prediction difference signal 4 into an orthogonal transform coefficient, which is in turn output to a quantization unit 9. The quantization unit 9 quantizes the input prediction difference signal 4 based on a quantization parameter 21 determined by the encoding control unit 19 to output the quantized signal as a quantized transform coefficient 10 to a variable length coding unit 11. The quantized transform coefficient 10 is entropy-coded in the variable length coding unit 11 by means such as Huffman encoding or arithmetic coding. The quantized transform coefficient 10 also passes through an inverse quantization unit 12 and an inverse orthogonal transform unit 13 to be restored to a local decoded prediction difference signal 14. Then, the local decoded prediction difference signal 14 is added to a predicted image 7 generated based on the encoding mode 6 in an adder 18 to create a local decoded image 15. The local decoded image 15 is stored in the memories 16 to be used for the subsequent intra prediction process. Further, a deblocking filter control flag 24 indicating whether or not a deblocking filter is to be applied to the macroblock is also input to the variable length coding unit 11 (the deblocking filter process itself is not necessary for the encoding process because the pixel data before the application of the deblocking filter is stored in the memories 16 in the prediction process executed in the spatial prediction unit 2. In the decoding device, however, the deblocking filter is applied upon instruction of the deblocking filter control flag 24 to obtain the final decoded image).

The intra prediction mode-sharing identification flag 23, the quantized transform coefficient 10, the encoding mode 6, and the quantizing parameter 21, which are input to the variable length encoding unit 11, are arranged and shaped according to a predetermined syntax to be output to a transmission buffer 17. The transmission buffer 17 smoothes the obtained bit stream according to the band of a transmission path or the reading velocity of a recording medium to which the encoding device is connected, to output the bit stream as a video stream 22. The transmission buffer 17 outputs feedback information to the encoding control unit 19 according to a state of accumulation of the bit streams in the transmission buffer 17 to control the amount of codes generated in the encoding of subsequent video frames.

2. Intra Prediction Mode Determining Process in the Encoding Device

Figure 5:
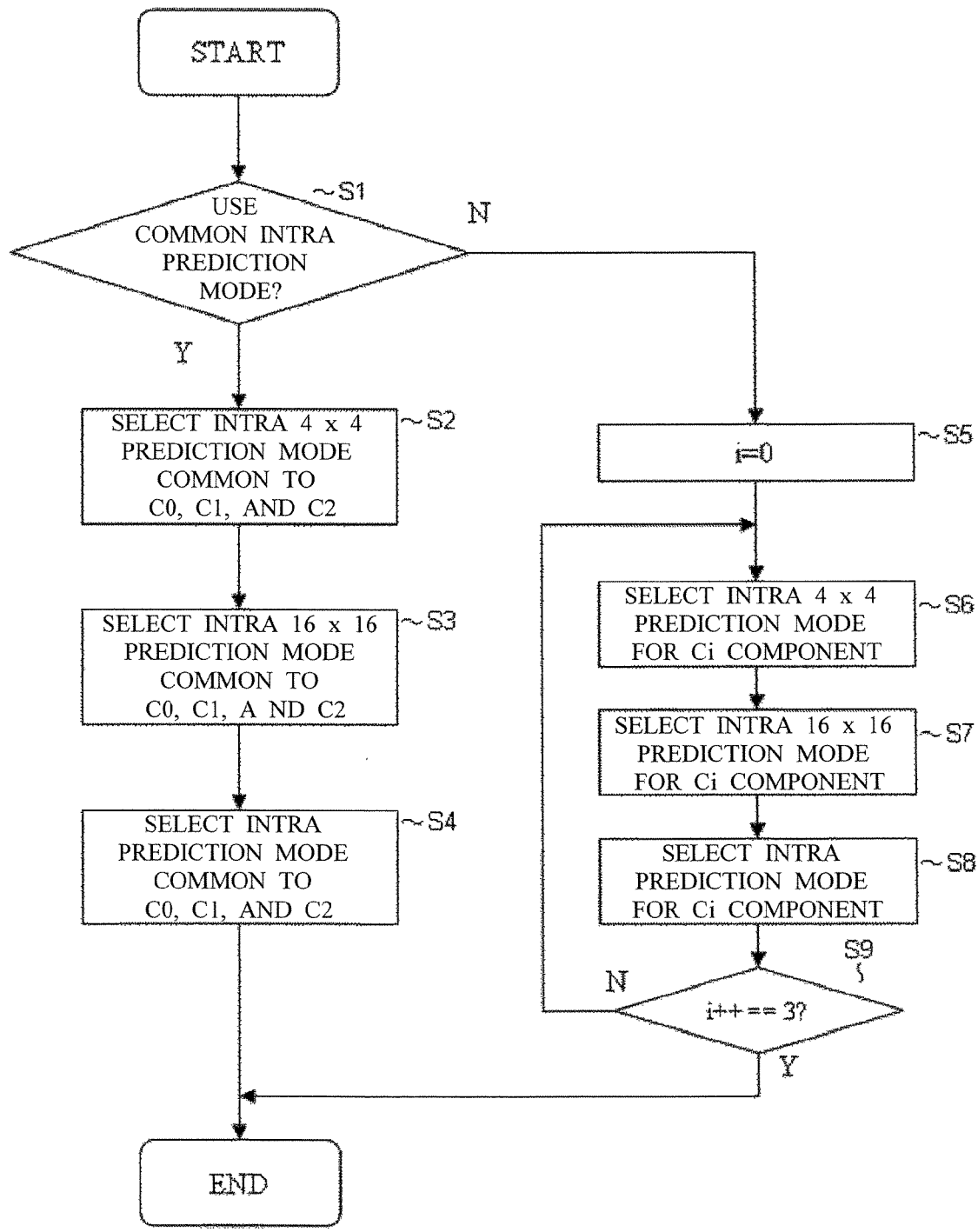
FIG. 5 is a flowchart illustrating a procedure of an intra prediction mode determining process performed in the video encoding device in FIG. 1.

The intra prediction mode which is a feature of the encoding device according to the first embodiment of the present invention will be described in detail. The process is executed on the macroblock basis, each macroblock consisting of an aggregation of the three color components described above. The process is mainly performed by the spatial prediction unit 2 and the encoding mode determining unit 5 in the encoding device illustrated in FIG. 1. FIG. 5 is a flowchart illustrating a flow of the process. Hereinafter, image data of the three color components constituting the blocks are referred to as C0, C1, and C2, respectively.

First, the encoding mode determining unit 5 receives the intra prediction mode-sharing identification flag 23 to determine, based on a value of the flag 23, whether or not the intra prediction mode common to C0, C1, and C2 is used (Step S1 of FIG. 5). If the intra prediction mode is used in common between C0, C1, and C2, the process proceeds to Step S2 and the following steps. If the intra prediction mode is not used in common, the process proceeds to Step S5 and the following steps.

When the intra prediction mode is used in common between C0, C1, and C2, the encoding mode determining unit 5 notifies the spatial prediction unit 2 of all the selectable intra 4×4 prediction modes. The spatial prediction unit 2 evaluates the prediction efficiencies of all the selectable intra 4×4 prediction modes to select the optimal intra 4×4 prediction mode common to C0, C1, and C2 (Step S2). Next, the encoding mode determining unit 5 notifies the spatial prediction unit 2 of all or a part of the selectable intra 16×16 prediction modes. The spatial prediction unit 2 evaluates the prediction efficiencies of the notified intra 16×16 prediction modes to select the optimal intra 16×16 prediction mode common to C0, C1, and C2 (Step S3). The encoding mode determining unit 5 finally selects the optimal mode in terms of the prediction efficiency from the modes obtained in Steps S2 and S3 (Step S4) to terminate the process.

When the intra prediction mode is not used in common between C0, C1, and C2 and the optimal mode is selected for each of C0, C1, and C2, the encoding mode determining unit 5 notifies the spatial prediction unit 2 of all or a part of the intra 4×4 prediction modes selectable for a Ci (i<=0<3) component. The spatial prediction unit 2 evaluates the prediction efficiencies of all the notified intra 4×4 prediction modes to select the intra 4×4 prediction mode optimal for the Ci (i<=0<3) component (Step S6). Similarly, the spatial prediction unit 2 selects the intra 16×16 prediction mode optimal for the Ci (i<=0<3) component (Step S7). Finally, in Step S8, the encoding mode determining unit 5 determines the intra prediction mode optimal for the Ci (i<=0<3) component from the selected prediction modes.

As a prediction efficiency evaluation norm of the prediction mode executed in the spatial prediction unit 2, for example, a rate-distortion cost given by:

$$Jm=Dm+\lambda Rm (\lambda: \text{positive number})$$

can be used. In this expression, Dm is an encoding distortion or a prediction error amount when an intra prediction mode m is applied. The encoding distortion is obtained by obtaining a prediction error applying the intra prediction mode m, decoding a video image from the result of transform and quantization of the prediction error, and then measuring an error with respect to a signal prior to encoding. The prediction error amount is obtained by obtaining a difference between a predicted image and a signal prior to encoding when the intra prediction mode m is used and then quantifying the difference. For example, a sum of absolute distance (SAD) is used as the prediction error amount. Rm is a generated code amount when the intra prediction mode m is used. Specifically, Jm is a value defining a tradeoff between the amount of codes and the degree of deterioration when the intra prediction mode m is used. The intra prediction mode m providing the smallest Jm provides the optimal solution.

When the encoding device executes the process of Step S2 and the following steps, one piece of intra prediction mode information is allocated to the macroblock containing three color components. On the other hand, when the encoding device executes the process of Step S5 and the following steps, intra prediction mode information is allocated to each of the color components. The intra prediction mode information allocated to the macroblock differs for each case, and therefore the intra prediction mode-sharing identification flag 23 needs to be multiplexed in the bit stream to enable the decoding device to recognize whether the encoding device has executed the process of Step S2 and the following steps or the process of Step S5 and the following steps. Data sequence of the above-mentioned bit stream is illustrated in FIG. 6.

Figure 6:
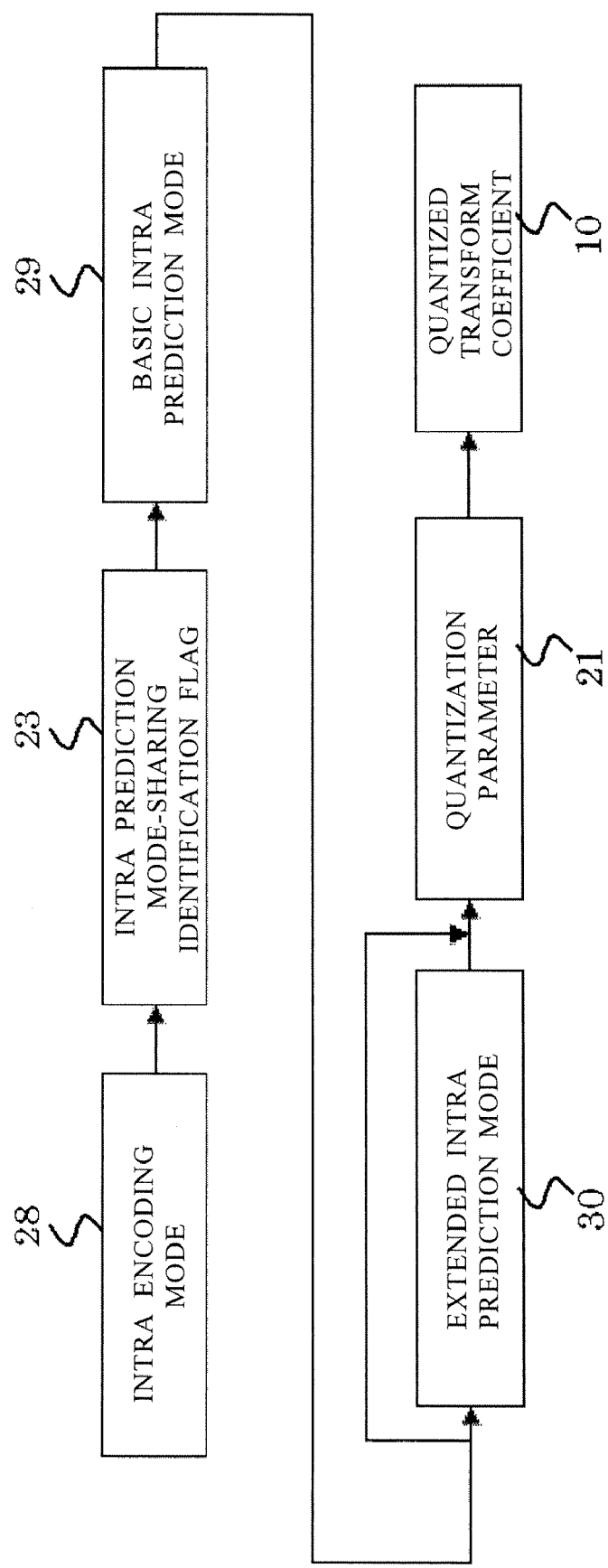
FIG. 6 is an explanatory view illustrating a data sequence of a video bit stream output from the video encoding device in the first embodiment.

FIG. 6 illustrates the data sequence of the bit stream at the macroblock level. An intra-encoding mode 28 indicates information for determining whether the prediction mode is the intra 4×4 mode or the intra 16×16 mode. A basic intra prediction mode 29 indicates common intra prediction mode information when the intra prediction mode-sharing identification flag 23 indicates that the mode is "common to C0, C1, and C2," and indicates intra prediction mode information for C0 when the intra prediction mode-sharing identification flag 23 indicates that the mode is not "common to C0, C1, and C2." An extended intra prediction mode 30 is multiplexed only when the intra prediction mode-sharing identification flag 23 indicates that the mode is not "common to C0, C1, and C2" and indicates intra prediction mode information for C1 and C2. Subsequently, the quantization parameter 21 and the quantized transform coefficient are multiplexed. The encoding mode 6 of FIG. 1 is a general term of the intra-encoding mode 28 and the intra prediction modes (basic and extended) described above (FIG. 6 does not illustrate the deblocking filter control flag 24 which is input to the variable length coding unit 11 in FIG. 1, and the illustration thereof is omitted because the deblocking filter control flag 24 is not an essential component for the description of the feature of the first embodiment).

In the 4:2:0 format which has been employed in the conventional video encoding standard, the color space definition is fixed to Y, Cb, and Cr. In the 4:4:4: format, however, a color space is not limited to that of Y, Cb, and Cr, and various color spaces can be used. By constituting the intra prediction mode information as illustrated in FIG. 6, the optimal encoding process can be performed even when the definition of the color space of the input video signal 1 varies. For example, when the color space is defined by R, G, and B, the structure of a video texture remains equally in the R, G, and B components. Therefore, the use of the common intra prediction mode information reduces the redundancy of the intra prediction mode information itself to enhance the encoding efficiency. On the other hand, when the color space is defined by Y, Cb, and Cr, the structure of the video texture is concentrated on Y. Therefore, the common intra prediction mode does not necessarily provide the optimal result. Then, by adaptively using the extended intra prediction mode 30, the optimal encoding efficiency can be obtained.

3. Outline of Operation of the Decoding Device

The decoding device illustrated in FIG. 2 receives the video stream 22 according to the data sequence illustrated in FIG. 6 output from the encoding device illustrated in FIG. 1 and performs a decoding process on the macroblock basis, each macroblock containing three color components in the same size (in the 4:4:4 format), to restore each video frame.

First, a variable length decoding unit 25 receives the stream 22 and deciphers the stream 22 according to a predetermined syntax, thereby extracting information such as the intra prediction mode-sharing identification flag 23, the quantized transform coefficient 10, the encoding mode 6, and the quantization parameter 21. The quantized transform coefficient 10 is input together with the quantization parameter 21 to the inverse quantization unit 12, where an inverse quantization process is performed. Subsequently, the output from the inverse quantization unit 12 is input to an inverse orthogonal transform unit 13 to be restored to a local decoded prediction difference signal 14. On the other hand, the encoding mode 6 and the intra prediction mode-sharing identification flag 23 are input to the spatial prediction unit 2 to obtain the predicted image 7 according to the input information. A specific procedure for obtaining the predicted image 7 will be described below. The local decoded prediction difference signal 14 and the predicted image 7 are added by the adder 18 to obtain a temporary decoded image 15 (which is exactly the same signal as the local decoded image 15 in the encoding device). The temporary decoded image 15 is written back to the memories 16 to be used for the intra prediction of the subsequent macroblocks. Three memories are provided for three image planes corresponding to the respective color components (the number of memories is described as three in this embodiment, but the number of memories can be appropriately changed according to the design). Moreover, based on an instruction of the deblocking filter control flag 24 decoded by the variable length decoding unit 25, the deblocking filter 26 is caused to act on the temporary decoded image 15 to obtain a final decoded image 27.

4. Intra Prediction Decoding Process in the Decoding Device

Figure 7:
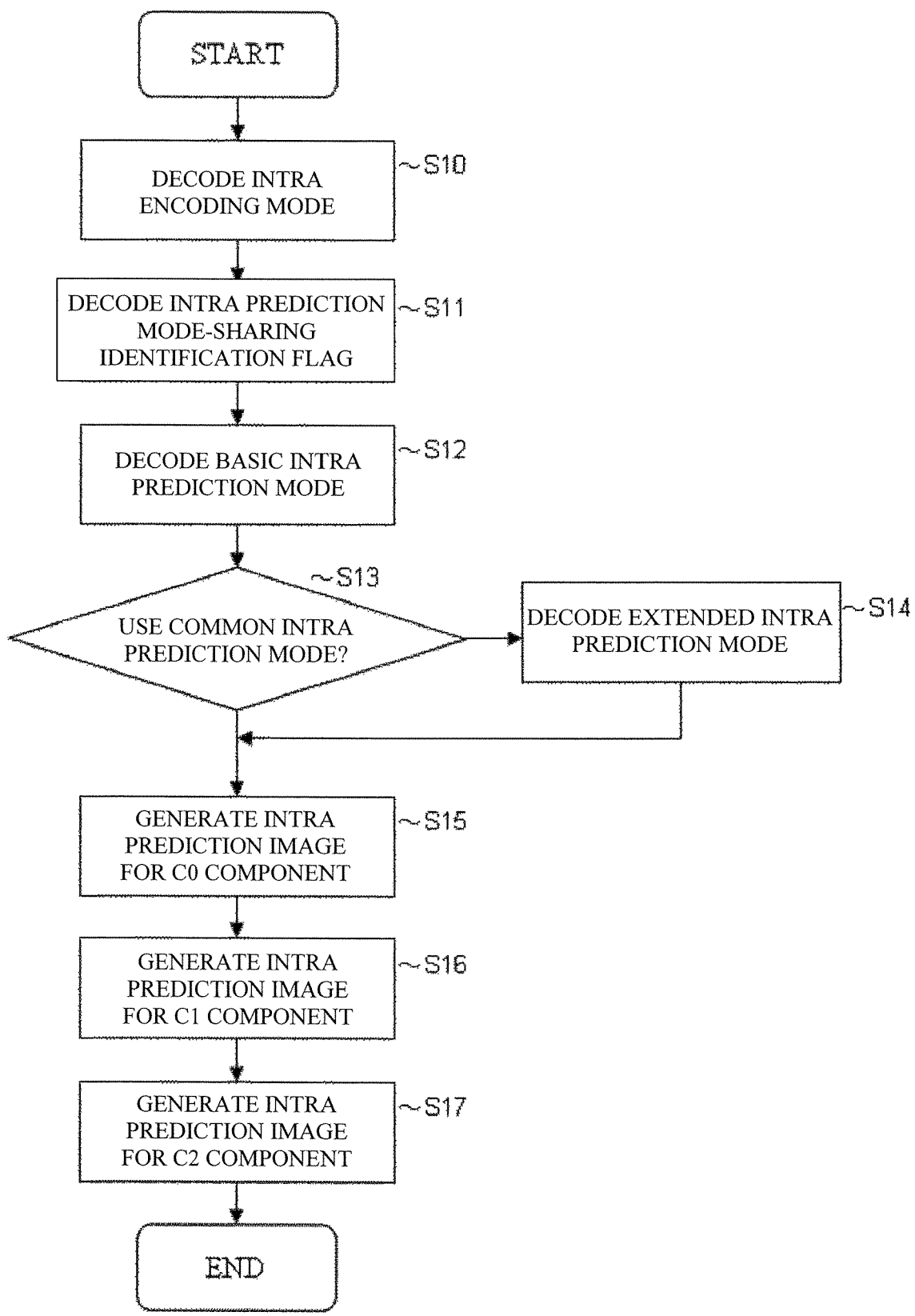
FIG. 7 is a flowchart illustrating a procedure of an intra prediction decoding process performed in the video decoding device in FIG. 2.

An intra prediction image generating process which is a feature of the decoding device according to the first embodiment of the present invention will be described in detail. The process is executed on the macroblock basis, each macroblock consisting of an aggregation of the three color components described above. The process is mainly performed by the variable length decoding unit 25 and the spatial prediction unit 2 in the decoding unit illustrated in FIG. 2. FIG. 7 is a flowchart illustrating a flow of the process.

In the flowchart illustrated in FIG. 7, Steps S10 to S14 are executed in the variable length decoding unit 25. The data sequence of the video stream 22 which is input to the variable length decoding unit 25 is according to the data sequence illustrated in FIG. 6. In Step S10, among the data illustrated in FIG. 6, the intra-encoding mode 28 is first decoded. Then, the intra prediction mode-sharing identification flag 23 is decoded (Step S11). Further, the basic intra prediction mode 29 is decoded (Step S12). In Step S13, the result of the intra prediction mode-sharing identification flag 23 is used to determine whether or not the intra prediction mode is used in common between C0, C1, and C2. When the intra prediction mode is used in common between C0, C1, and C2, the basic intra prediction mode 29 is used for all of C0, C1, and C2. When the intra prediction mode is not used in common, the basic intra prediction mode 29 is used as a mode for C0. Further, the extended intra prediction mode 30 is decoded (Step S14) to obtain mode information of C1 and C2. Through the above-mentioned process, the encoding mode 6 for each of the color components is determined. Therefore, the variable length decoding unit 25 outputs the determined encoding mode(s) 6 for the respective color components to the spatial prediction unit 2. Then, according to Steps S15 to S17, an intra prediction image for each color component is obtained. A process for obtaining the intra prediction images follows the process illustrated in FIGS. 3 and 4, and is the same as that performed in the encoding device illustrated in FIG. 1.

Figure 8:
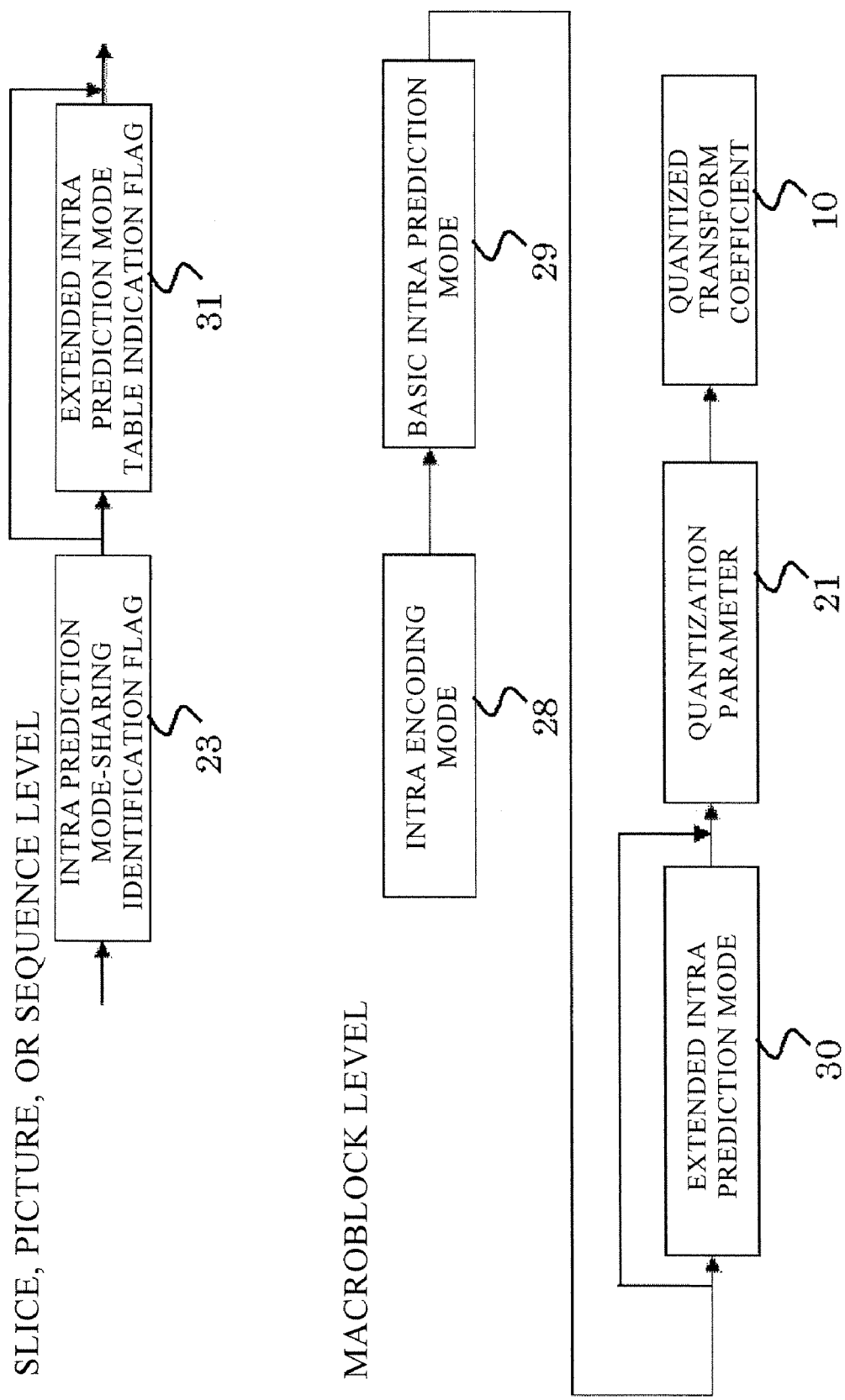
FIG. 8 is an explanatory view illustrating another data sequence of the video bit stream output from the video encoding device in the first embodiment.
Figure 9:
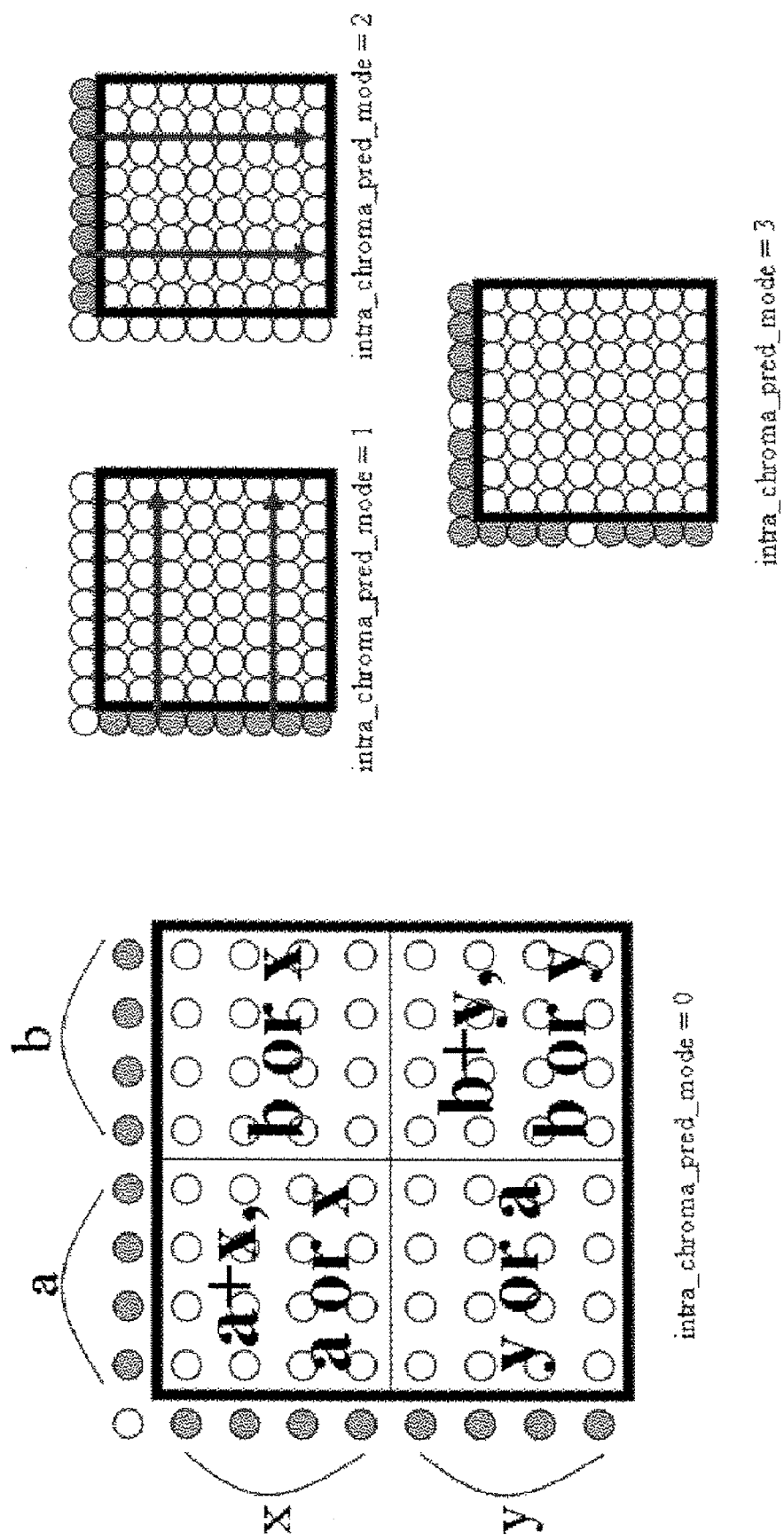
FIG. 9 are explanatory views illustrating the predicted image generating method in intra prediction modes for chrominance components in an AVC standard.

FIG. 8 illustrates a variation of the bit stream data sequence illustrated in FIG. 6. In FIG. 7, the intra prediction mode-sharing identification flag 23 is multiplexed not as a flag at the macroblock level, but as a flag positioned in an upper data layer such as a slice layer, a picture layer, and a sequence layer. Moreover, an extended intra prediction mode table indication flag 31 is provided to enable the selection of a code table which defines a code word of the extended intra prediction mode 30 from a plurality of code tables. As a result, when a satisfactory prediction efficiency is ensured by switching in the upper layer equal to or higher than the slice layer, overhead bits can be reduced without multiplexing the intra prediction mode-sharing identification flags 23 one by one at the macroblock level. For the extended intra prediction mode 30, the extended intra prediction mode table indication flag 31 is provided to enable the selection of prediction modes specified for the C1 and C2 components, which is not the same as the definition of the basic intra prediction mode 29. As a result, the encoding process adapted to the definition of the color space can be performed. For example, the encoding of the 4:2:0 format according to AVC, an intra prediction mode set different from that for the luminance (Y) is defined for the chrominance components (Cb and Cr). In the 4:2:0 format, the size of a chrominance signal in the macroblock is 8 pixels by 8 lines. Any of four modes illustrated in FIG. 9 is selected for each macroblock to perform the decoding process. The same mode is used for two chrominance signals Cb and Cr. Except for DC prediction with intra_chroma_pred_mode=0, the same prediction process as that of the intra 16×16 prediction mode illustrated in FIG. 4 is performed. In the DC prediction, however, an 8×8 block is divided into four 4×4 blocks. The positions of pixels from which an average value is obtained are changed for each block to perform the process. For the block indicated by "a+x, a or x" in FIG. 9, when both pixels a and pixels x are available, pixels a and x, that is, eight pixels in total, when only the pixels a are available, four pixels a, and when only the pixels x are available, four pixels x are used to obtain an average value to use the average value as the predicted image 7. When both the pixels a and x are unavailable, a value 128 is used as the predicted image 7. For a block indicated by "b or x," when pixels b are available, four pixels b, when only pixels x are available, four pixels x are used to obtain an average value.

In this manner, when the intra prediction mode set is required to be changed according to the property of the color component, a more suitable encoding efficiency can be obtained by the structure such as the syntax illustrated in FIG. 8.

Second Embodiment

In the second embodiment of the present invention, another encoding device which performs closed encoding within a frame in units of rectangular areas (macroblocks), each consisting of 16 by 16 pixels, obtained by equally dividing a video frame input in the 4:4:4 format, and a decoding device corresponding to the encoding device will be described. As in the first embodiment of the present invention, the encoding device and the decoding device of this embodiment are provided with characteristics specific to the present invention based on the encoding method employed in Non-patent Document 1 cited above.

Figure 11:
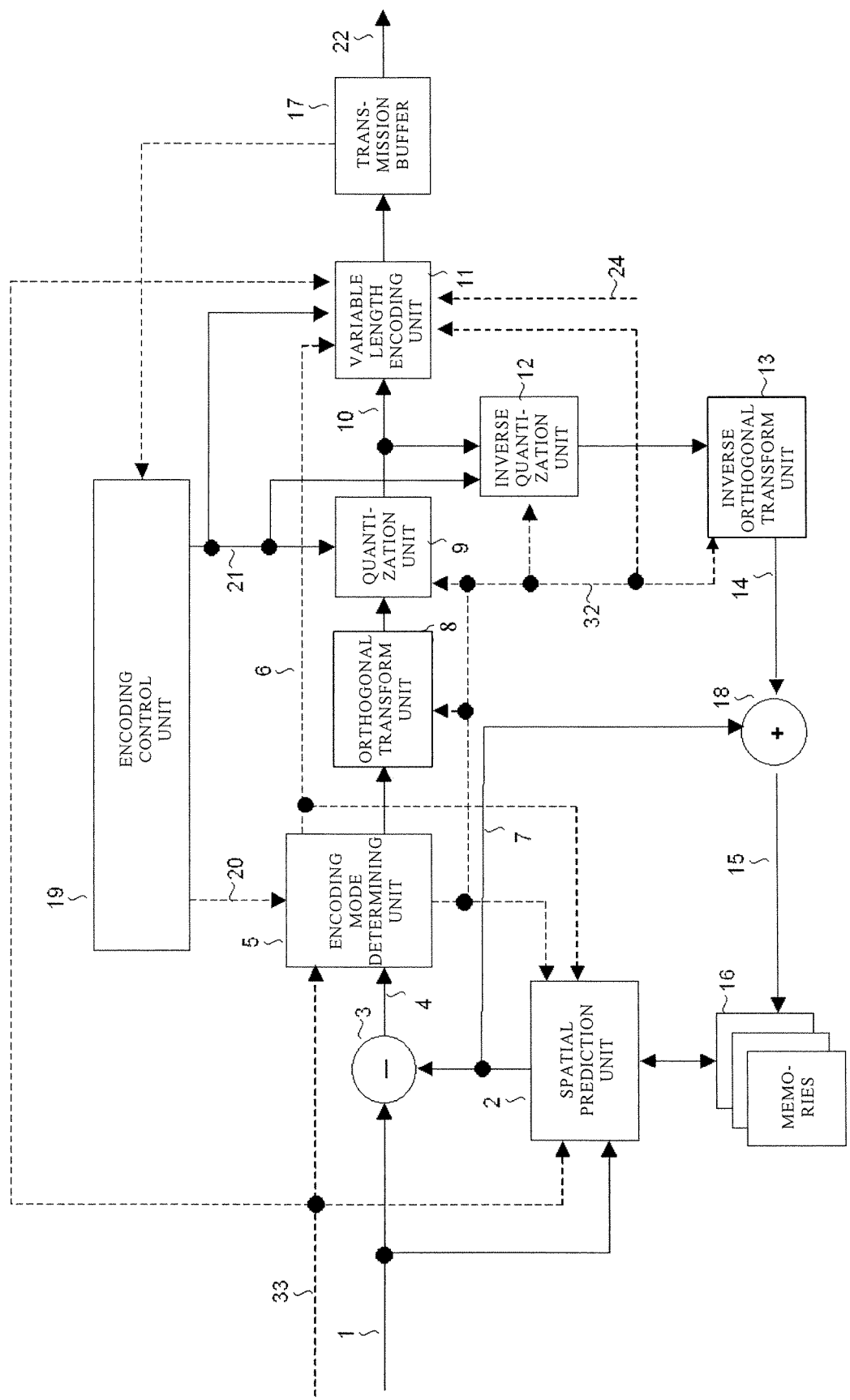
FIG. 11 is an explanatory view illustrating a configuration of the video encoding device in a second embodiment.
Figure 12:
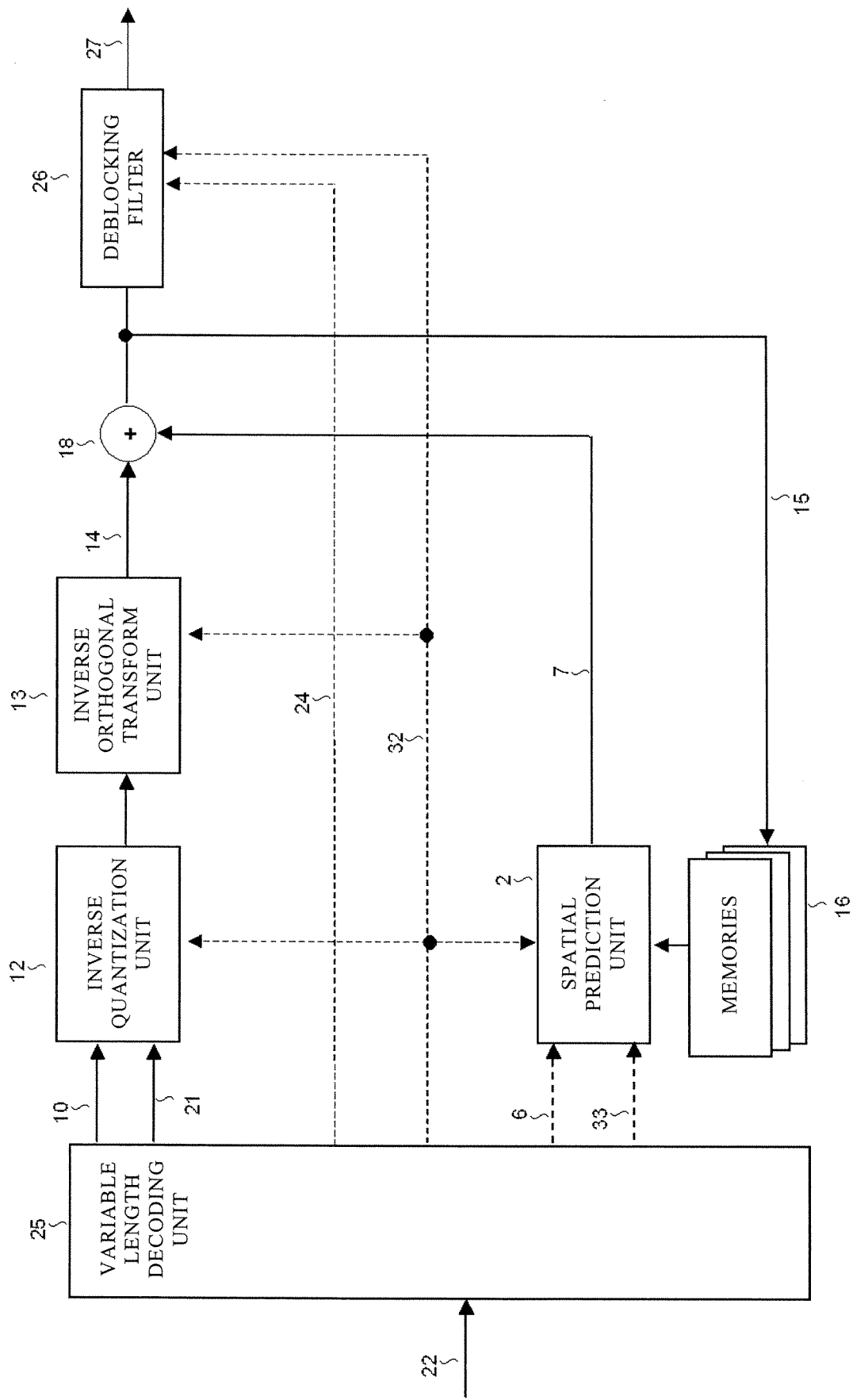
FIG. 12 is an explanatory view illustrating a configuration of a video decoding device in the second embodiment.

FIG. 11 illustrates a configuration of a video encoding device, and FIG. 12 illustrates a video decoding device according to the second embodiment of the present invention. In FIG. 11, the components denoted by the same reference numerals as those in the encoding device illustrated in FIG. 1 are the same components. In FIG. 12, the components denoted by the same reference numerals as those in the encoding device illustrated in FIG. 11 are the same components. In FIG. 11, a transformation block size identification flag 32 and an intra encoding mode-sharing identification flag 33 are provided.

Hereinafter, the operations of the entire encoding device and decoding device according to the second embodiment of the present invention, and an intra encoding/prediction mode determining process and an intra prediction decoding process which are specific operations according to this embodiment will be described with reference to FIGS. 11 and 12.

1. Outline of Operation of the Encoding Device

In the encoding device illustrated in FIG. 11, as the input video signal 1, each video frame is input to the encoding device in the 4:4:4 format. Further, as illustrated in FIG. 10, the video signal is input on the macroblock basis, each macroblock obtained by dividing three color components into the blocks of the same size and then aggregating the blocks.

In the spatial prediction unit 2, an intra prediction process is performed for each color component on the macroblock basis by using the local decoded image 15 to be stored in the memories 16. The intra prediction has the intra 4×4 prediction mode, an intra 8×8 prediction mode, and the intra 16×16 prediction mode. In the intra 4×4 prediction mode, spatial prediction is performed in units of blocks illustrated in FIG. 3, each being composed of 4 pixels×4 lines, by using the neighboring pixels of the block. In the intra 8×8 prediction mode, spatial prediction is performed in units of blocks illustrated in FIG. 13, each being composed of 8 pixels×8 lines, by using the neighboring pixels of the block. In the intra 16×16 prediction mode, spatial prediction is performed on the macroblock basis illustrated in FIG. 4, each being composed of 16 pixels×16 lines, by using the neighboring pixels of the macroblock. In the encoding device according to the second embodiment of the present invention, the prediction mode is switched between the intra 4×4 prediction mode and the intra 8×8 prediction mode according to a state of the transformation block size identification flag 32. The selection of the intra prediction mode for encoding a certain macroblock from the intra 4×4 prediction mode, the intra 8×8 prediction mode, and the intra 16×16 prediction mode can be represented by the intra encoding mode as in FIG. 6. The encoding device according to the second embodiment of the present invention is provided with two intra encoding modes: an intra N×N prediction encoding mode for the encoding using any of the intra 4×4 prediction mode and the intra 8×8 prediction mode (N is 4 or 8); and an intra 16×16 prediction encoding mode for the encoding using the intra 16×16 prediction mode. Hereinafter, the description will be given for each of the intra encoding modes.

(a) Intra N×N Prediction Encoding Mode

In the intra N×N prediction encoding mode, the intra 4×4 prediction mode and the intra 8×8 prediction mode are selectively switched for encoding. In the intra 4×4 prediction mode, a luminance signal 16×16 pixel block in the macroblock is divided into sixteen blocks, each being composed of 4×4 pixels, and the prediction mode is individually selected for each of the 4×4 pixel blocks. In the intra 8×8 prediction mode, a luminance signal 16×16 pixel block in the macroblock is divided into four blocks, each being composed of 8×8 pixels, and the prediction mode is individually selected for each of the 8×8 pixel blocks. The switching between the intra 4×4 prediction mode and the intra 8×8 prediction mode is associated with the state of the transformation block size identification flag 32. This will be described below. In the intra 4×4 prediction mode, any of nine modes illustrated in FIG. 3 is selected for each of the 4×4 pixel blocks, as described in the first embodiment of the present invention. The pixels in the neighboring blocks (upper left, upper, upper right, and left blocks), which have been encoded and subjected to the local decoding process to be stored in the memories 16, are used for generating a predicted image.

Figure 13:
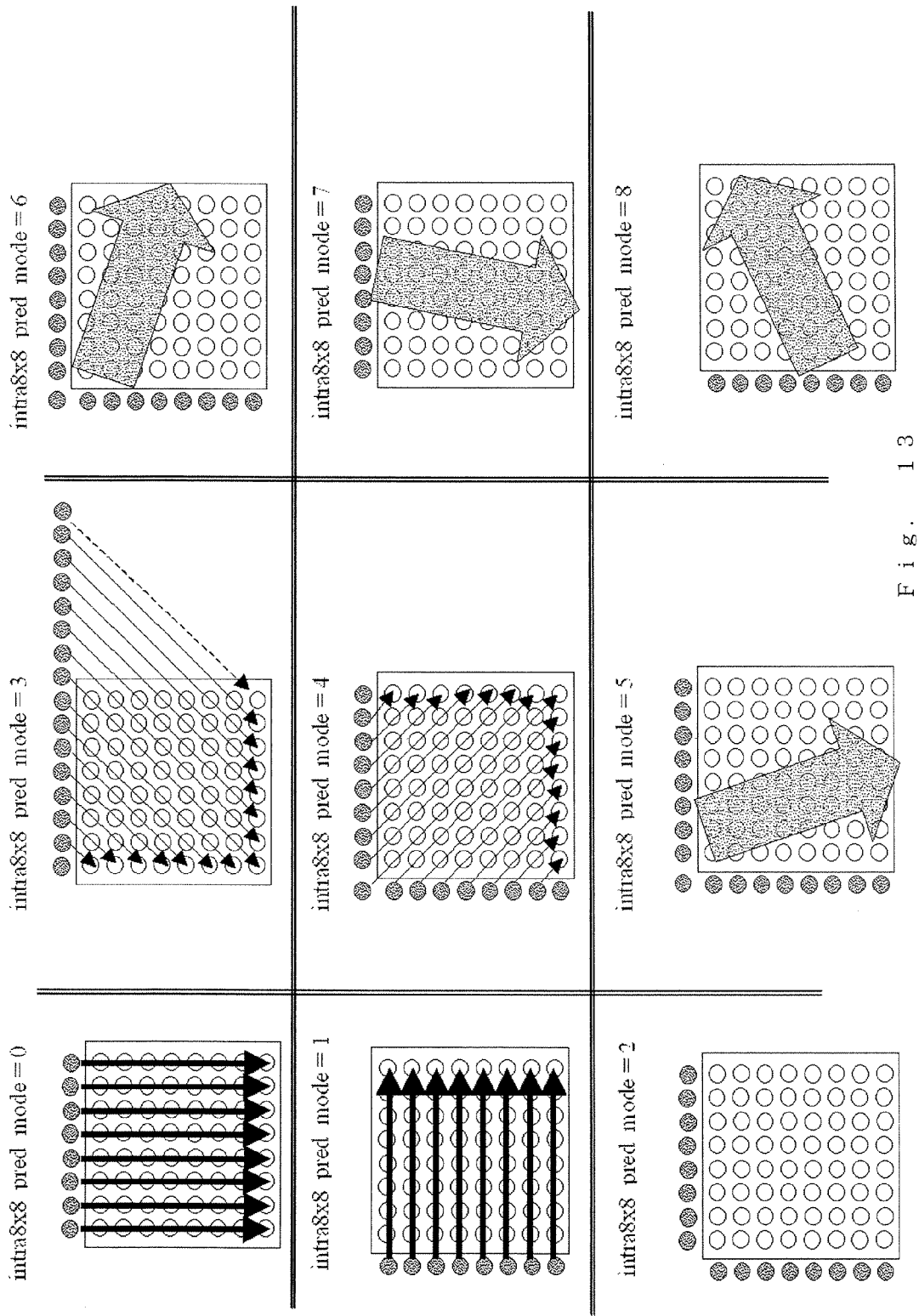
FIG. 13 are explanatory views illustrating the predicted image generating method in intra 8×8 prediction modes evaluated in the spatial prediction unit in FIG. 11.

On the other hand, in the intra 8×8 prediction mode, any of nine modes illustrated in FIG. 13 is selected for each of the 8×8 pixel blocks. As is apparent from the comparison with FIG. 3, the intra 8×8 prediction mode of FIG. 13 is a modification of the prediction method in the intra 4×4 prediction mode for the adaptation to the 8×8 pixel block.

Intra8×8_pred_mode=0: Upper neighboring pixels are used as a predicted image.

Intra8×8_pred_mode=1: Left neighboring pixels are used as a predicted image.

Intra8×8_pred_mode=2: An average value of eight neighboring pixels is used as a predicted image.

Intra8×8_pred_mode=3: A weighted average of every two or three pixels is calculated from the neighboring pixels to use the obtained weighted average as a predicted image (corresponding to a diagonal down-left edge at 45 degrees).

Intra8×8_pred_mode=4: A weighted average of every two or three pixels is calculated from the neighboring pixels to use the obtained weighted average as a predicted image (corresponding to a diagonal down-right edge at 45 degrees).

Intra8×8_pred_mode=5: A weighted average of every two or three pixels is calculated from the neighboring pixels to use the obtained weighted average as a predicted image (corresponding to a vertical right edge at 22.5 degrees).

Intra8×8_pred_mode=6: A weighted average of every two or three pixels is calculated from the neighboring pixels to use the obtained weighted average as a predicted image (corresponding to a horizontal down edge at 67.5 degrees).

Intra8×8_pred_mode=7: A weighted average of every two or three pixels is calculated from the neighboring pixels to use the obtained weighted average as a predicted image (corresponding to a vertical left edge at 22.5 degrees).

Intra8×8_pred_mode=8: A weighted average of every two or three pixels is calculated from the neighboring pixels to use the obtained weighted average as a predicted image (corresponding to a horizontal up edge at 112.5 degrees).

For the selection of the intra 4×4 prediction mode, sixteen pieces of mode information are required for each macroblock. Therefore, in order to reduce the amount of codes of the mode information itself, prediction encoding is performed based on the mode information of the neighboring blocks, taking advantage of a high correlation of the mode information between the neighboring blocks.

(b) Intra 16×16 Prediction Mode

In the intra 16×16 prediction mode, the 16×16 pixel block corresponding to the macroblock size is predicted at a time and any of four modes illustrated in FIG. 4 is selected for each macroblock. As in the case of the intra 4×4 prediction mode, the pixels in the neighboring (upper left, upper, and left) macroblocks, which have already been encoded and subjected to the local decoding process to be stored in the memories 16, are used for generating a predicted image. The types of mode are as described in the first embodiment of the present invention referring to FIG. 4. In the intra 16×16 prediction mode, the transformation block size is always 4×4. In this mode, however, two-step transform is performed. First, sixteen DCs (direct current components corresponding to average values) are collected in units of 4×4 blocks and 4×4 block transform is performed in this unit. Then, an alternate current component obtained by excluding the DC component is transformed for each of the 4×4 blocks.

The video encoding device according to the second embodiment of the present invention is characterized in that the intra prediction/transform/encoding methods are switched for three color components based on the intra encoding mode-sharing identification flag 33. This will be described in detail in the section 2 below.

The spatial prediction unit 2 evaluates the intra prediction mode for the input three color component signals, based on the indication of the intra encoding mode-sharing identification flag 33. The intra encoding mode-sharing identification flag 33 indicates whether the intra encoding mode is individually allocated to each of the input three color components or the same intra encoding mode is allocated to all the three color components, which depends on the following background.

In the 4:4:4 format, beside the Y, Cb, and Cr color space which has conventionally been used for encoding, RGB can be directly used. In the Y, Cb, and Cr color space, a component dependent on the texture structure of the video image is removed from the Cb and Cr signals. There is a high possibility that the optimal intra encoding method is different between the Y component, and the Cb and Cr components (actually, in the encoding method for encoding the 4:2:0 format in AVC/H.264 such as the high 4:2:0 profile, the design of the intra prediction mode used for the Y component differs from that used for the Cb and Cr components). On the other hand, when the encoding is performed in the RGB color space, the texture structure is not removed between the color components as executed in the case of the Y, Cb, and Cr color space. Instead, because the signal components in the same space have a high correlation, there is a possibility that the encoding efficiency can be enhanced by enabling the selection of the common intra encoding mode. This depends not only on the color space definition but also on the property of the video image even if a specific color space is used. It is desirable that the encoding method itself be adaptive to such a property of the video signal. Therefore, in this embodiment, the intra encoding mode-sharing identification flag 33 is provided to configure the encoding device to enable flexible encoding for a video image in the 4:4:4 format.

The spatial prediction unit 2 executes the prediction process for each of the color components for all the intra prediction modes illustrated in FIG. 3, 4, or 13 or a predetermined subset according to the state of the intra encoding mode-sharing identification flag 33 set as described above to obtain the prediction difference signal 4 in the subtracter 3. The prediction efficiency of the prediction difference signal 4 is evaluated in the encoding mode determining unit 5. From the prediction process executed in the spatial prediction unit 2, the intra prediction mode, in which the optimal prediction efficiency for a target macroblock can be obtained, is selected. In this case, when the intra N×N prediction is selected, the intra N×N prediction encoding mode is output as the encoding mode 6. Moreover, when the prediction mode is the intra 4×4 prediction, the transformation block size identification flag 32 is set to "transform in the 4×4 block size." On the other hand, when the prediction mode is the intra 8×8 prediction, the transformation block size identification flag 32 is set to "transform in the 8×8 block size." Various methods are conceivable as a method of determining the transformation block size identification flag 32. Since the block size is determined in a case where the transform is performed on a residue obtained by the intra N×N prediction in the encoding device according to the second embodiment of the present invention, a method of determining the optimal intra N×N prediction mode in the encoding mode determining unit 5 and then determining the block size according to the obtained N value is given as an example. For example, assuming that the transformation block size is the 8×8 pixel block size when the intra 4×4 prediction mode is used, there is a high possibility that spatial continuity of the prediction signal will be interrupted in units of 4×4 blocks in the prediction difference signal 4 obtained as the result of prediction. As a result, an unnecessary high-frequency component is generated. Therefore, the effect of signal power concentration obtained by the transform is reduced. When the transformation block size is set to the 4×4 pixel block according to the prediction mode, the above-mentioned problem does not occur.

When the intra 16×16 prediction is selected in the encoding mode determining unit 5, the intra 16×16 prediction encoding mode is output as the encoding mode 6. For the selection of the encoding mode 6, the weighting coefficient 20 for each of the encoding modes determined by the encoding control unit 19 may be taken into consideration.

The prediction difference signal 4 obtained in the encoding mode 6 is output to the orthogonal transform unit 8. The orthogonal transform unit 8 transforms the input prediction difference signal to output the result of transform as an orthogonal transform coefficient to the quantization unit 9. The quantization unit 9 quantizes the input orthogonal transform coefficient based on the quantization parameter 21 determined by the encoding control unit 19 to output the result of quantization as the quantized transform coefficient 10 to the variable length encoding unit 11.

When the transformation block size is the 4×4 block as a unit, the prediction difference signal 4 input to the orthogonal transform unit 8 is divided into 4×4 blocks to be subjected to the orthogonal transform. Then, the 4×4 blocks are quantized in the quantization unit 9. When the transformation block size is the 8×8 block as a unit, the prediction difference signal 4 input to the orthogonal transform unit 8 is divided into 8×8 blocks to be subjected to the orthogonal transform. Then, the 8×8 blocks are quantized in the quantization unit 9.

The quantized transform coefficient 10 is entropy-coded in the variable length encoding unit 11 by means such as Huffman encoding or arithmetic coding. The quantized transform coefficient 10 in the block size based on the transformation block size identification flag 32 or the like also passes through the inverse quantization unit 12 and the inverse orthogonal transform unit 13 to be restored to the local decoded prediction difference signal 14. Then, the local decoded prediction difference signal 14 is added to the predicted image 7 generated based on the encoding mode 6 in the adder 18 to generate the local decoded image 15. The local decoded image 15 is stored in the memories 16 to be used for the subsequent intra prediction process. Moreover, the deblocking filter control flag 24 indicating whether or not the deblocking filter is to be applied to the macroblock is also input to the variable length encoding unit 11 (the deblocking filter process itself is not required for the encoding process because the pixel data prior to the application of the deblocking filter is stored in the memories 16 in the prediction process executed in the spatial prediction unit 2, but in the decoding device, the deblocking filter is applied based on the indication of the deblocking filter control flag 24 to obtain the final decoded image).

The intra encoding mode-sharing identification flag 33, the quantized transform coefficient 10, the encoding mode 6, and the quantizing parameter 21, which are input to the variable length encoding unit 11, are arranged and shaped according to a predetermined syntax to be output to the transmission buffer 17. The transmission buffer 17 smoothes the bit stream according to the band of a transmission path or the reading velocity of a recording medium to which the encoding device is connected to output the bit stream as a video stream 22. The transmission buffer 17 outputs feedback information to the encoding control unit 19 according to the state of accumulation of the bit streams in the transmission buffer 17 to control the amount of codes to be generated in the encoding of subsequent video frames.

Figure 14:
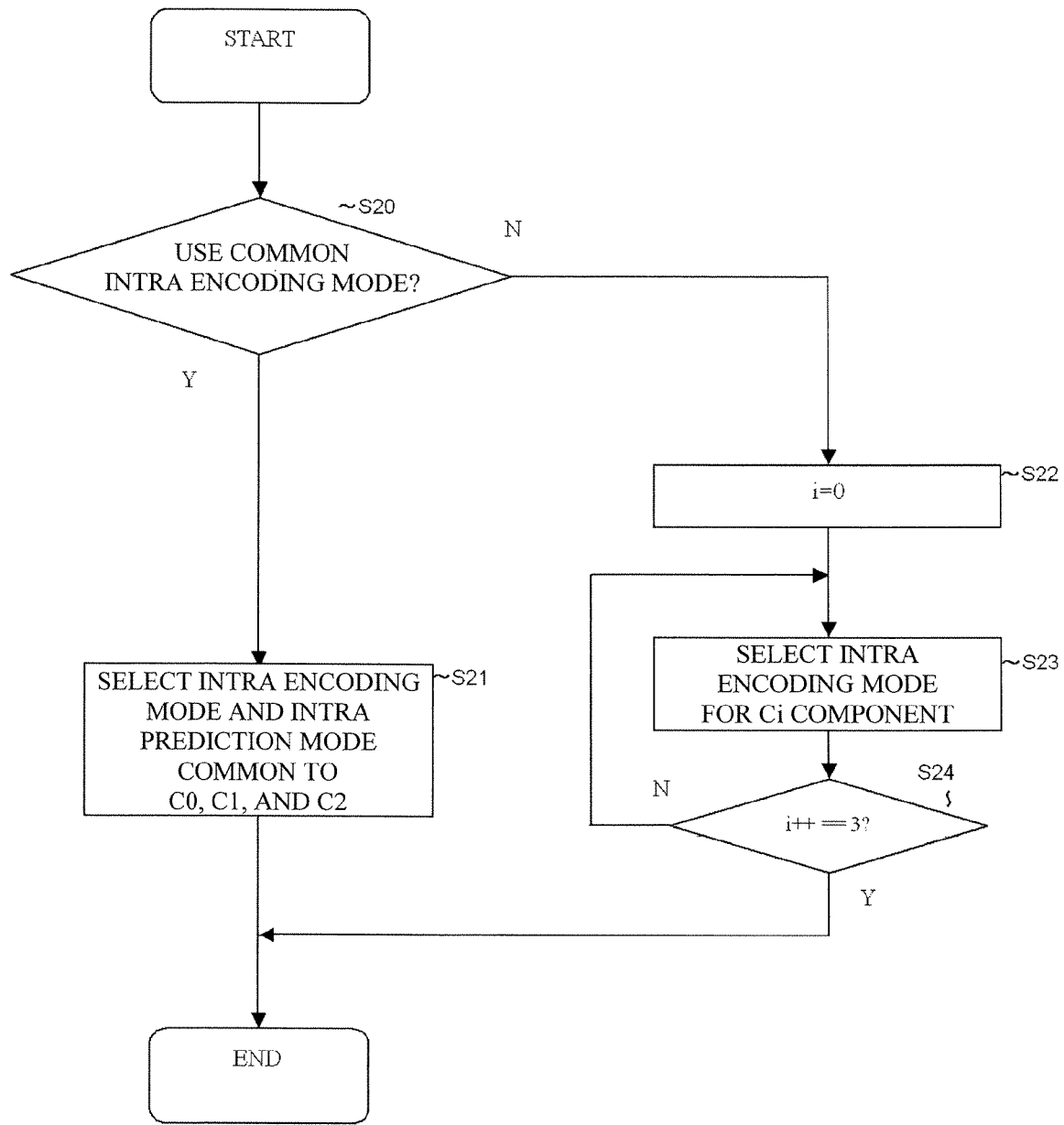
FIG. 14 is a flowchart illustrating a procedure of an intra encoding mode determining process performed in the video encoding device in FIG. 11.

2. Intra Encoding Mode/Prediction Mode Determining Process in the Encoding Device The intra encoding mode and intra prediction mode determining process which are characteristics of the encoding device according to the second embodiment of the present invention will be described in detail. The process is executed on the macroblock basis, each macroblock being obtained by aggregating the three color components described above. The process is mainly performed by the spatial prediction unit 2 and the encoding mode determining unit 5 in the encoding device illustrated in FIG. 11. FIG. 14 is a flowchart illustrating a flow of the process. Hereinafter, image data of the three color components constituting the blocks are referred to as C0, C1, and C2, respectively.

First, the encoding mode determining unit 5 receives the intra encoding mode-sharing identification flag 33 to determine, based on a value of the flag 33, whether or not the intra encoding mode common to C0, C1, and C2 is used (Step S20 of FIG. 14). If the intra encoding mode common to C0, C1, and C2 is used, the process proceeds to Step S21. Otherwise, the process proceeds to Step S22.

When the intra encoding mode common to C0, C1, and C2 is used, the encoding mode determining unit 5 notifies the spatial prediction unit 2 of all or a part of the selectable intra prediction modes (the intra N×N prediction and the intra 16×16 prediction). The spatial prediction unit 2 evaluates the prediction efficiencies of all the selectable prediction modes to select the intra encoding mode and the intra prediction mode optimal for all the components (Step S21).

On the other hand, when the optimal intra encoding mode is individually selected for each of C0, C1, and C2, the encoding mode determining unit 5 notifies the spatial prediction unit 2 of all or a part of the intra prediction modes (the intra N×N prediction and the intra 16×16 prediction) selectable for the Ci (i<=0<3) component. The spatial prediction unit 2 evaluates the prediction efficiencies of all the notified intra prediction modes to select the intra 4×4 prediction mode optimal for the Ci (i<=0<3) component (Step S23).

When the spatial prediction unit 2 selects the intra 4×4 prediction mode as a mode which provides the optimal prediction efficiency in Step S21 or S23 above, the transformation block size identification flag 32 is set to "transform in the 4×4 block size." On the other hand, when the spatial prediction unit 2 selects the intra 8×8 prediction mode as a mode which provides the optimal prediction efficiency, the transformation block size identification flag 32 is set to "transform in the 8×8 block size."

As a prediction efficiency evaluation norm of the prediction mode executed in the spatial prediction unit 2, for example, a rate-distortion cost given by:

$$Jm=Dm+\lambda Rm(\lambda: \text{positive number})$$

can be used. In this formula, Dm is an encoding distortion or a prediction error amount when an intra prediction mode m is used. The encoding distortion is obtained by obtaining a prediction error using the intra prediction mode m, decoding a video image from the result of transform and quantization of the prediction error, and then measuring an error with respect to a signal before being encoded. The prediction error amount is obtained by obtaining a difference between a predicted image and a signal before being encoded when the intra prediction mode m is used and then quantifying the obtained difference. For example, a sum of absolute distance (SAD) is used as the prediction error amount. Rm is a generated code amount when the intra prediction mode m is used. Specifically, Jm is a value defining a tradeoff between the amount of codes and the degree of deterioration when the intra prediction mode m is used. The intra prediction mode m providing the smallest Jm gives the optimal solution.

When the encoding device executes the process of Step S21, one piece of intra encoding mode information is allocated to one macroblock containing three color components. On the other hand, when the encoding device executes the process of Step S22 and the following steps, one piece of intra encoding mode information is allocated to each of the color components (in total, three pieces of the intra encoding mode information). The intra prediction mode information allocated to the macroblock differs for each case, and thus the intra encoding mode-sharing identification flag 33 needs to be multiplexed in the bit stream to enable the decoding device to recognize whether the encoding device has executed the process of Step S21 or the process of S22 and the following steps. A data sequence of such a bit stream is illustrated in FIG. 15.

Figure 15:
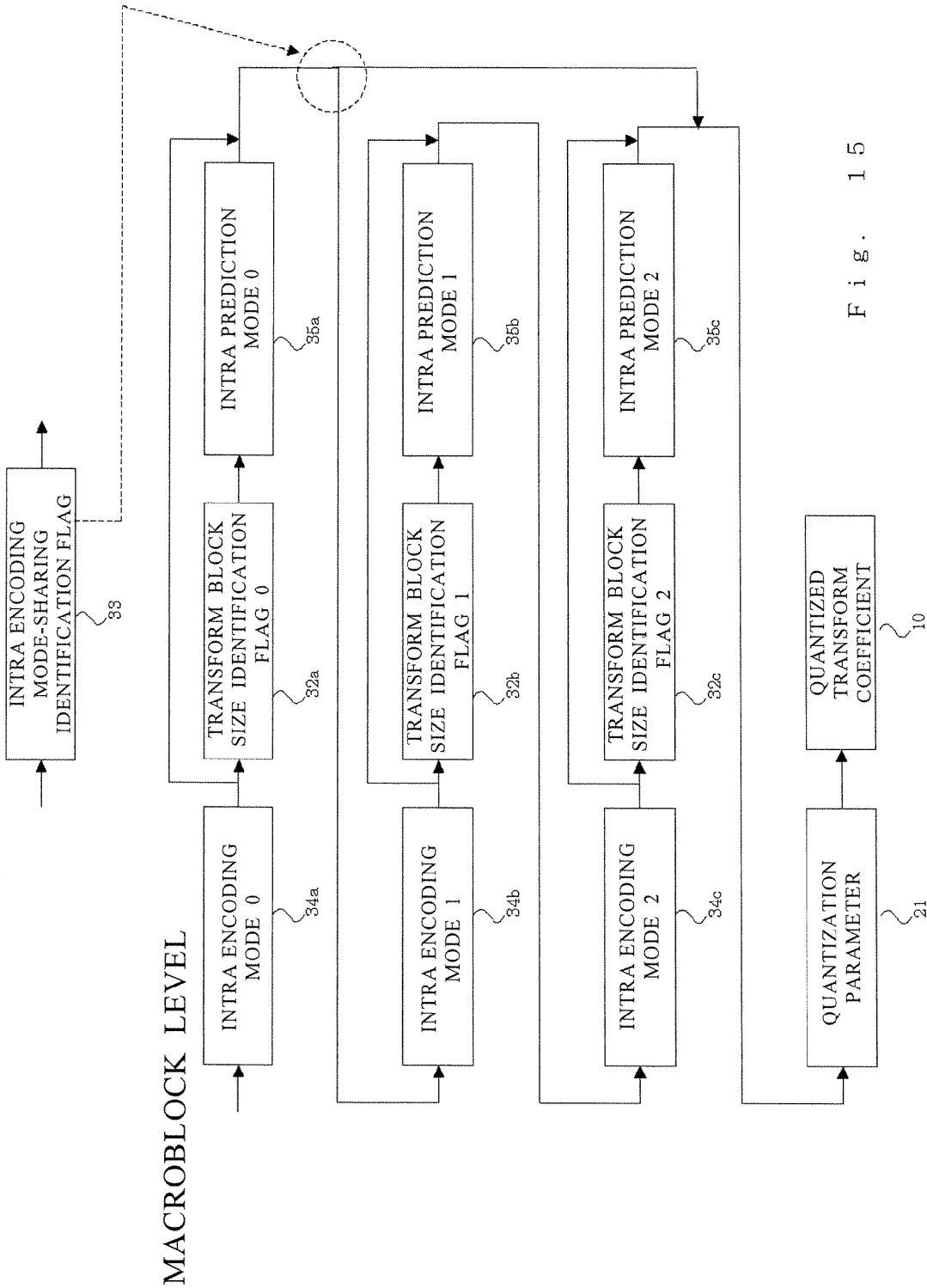
FIG. 15 is an explanatory view illustrating a data sequence of the video bit stream output from the video encoding device in the second embodiment.

In FIG. 15, intra encoding modes 0 (34a), 1(34b), and 2(34c), which are multiplexed in the bit stream at the macroblock level, are the encoding modes 6 for the C0, C1, and C2 components, respectively. When the intra encoding mode is the intra N×N prediction encoding mode, information of the transformation block size identification flag 32 and the intra prediction mode is multiplexed in the bit stream. On the other hand, when the intra encoding mode is the intra 16×16 prediction encoding mode, information of the intra prediction mode is encoded as a part of the intra encoding mode information, and the information of the transformation block size identification flag 32 and the intra prediction mode is not multiplexed in the bit stream. When the intra encoding mode-sharing identification flag 33 indicates that the intra encoding mode is "common to C0, C1, and C2," the intra encoding modes 1 (34b) and 2(34c), transformation block size identification flags 1(32b) and 2(32c), and intra prediction modes 1 (35b) and 2(35c) are not multiplexed in the bit stream (dotted circle of FIG. 15 indicates a branch point of the process). In this case, the intra encoding mode 0 (34a), the transformation block size identification flag 0 (32a), and the intra prediction mode 0 (35a) serve as encoding information common to all the color components. FIG. 15 shows an example where the intra encoding mode-sharing identification flag 33 is multiplexed as bit stream data at the higher-order level than the macroblock level, such as a slice, a picture, or a sequence. In particular, when the intra encoding mode-sharing identification flag 33 is used as in the example described in the second embodiment of the present invention, the color space does not change throughout the sequence in many cases. Therefore, the object can be achieved by multiplexing the intra encoding mode-sharing identification flag 33 at the sequence level.

Figure 16:
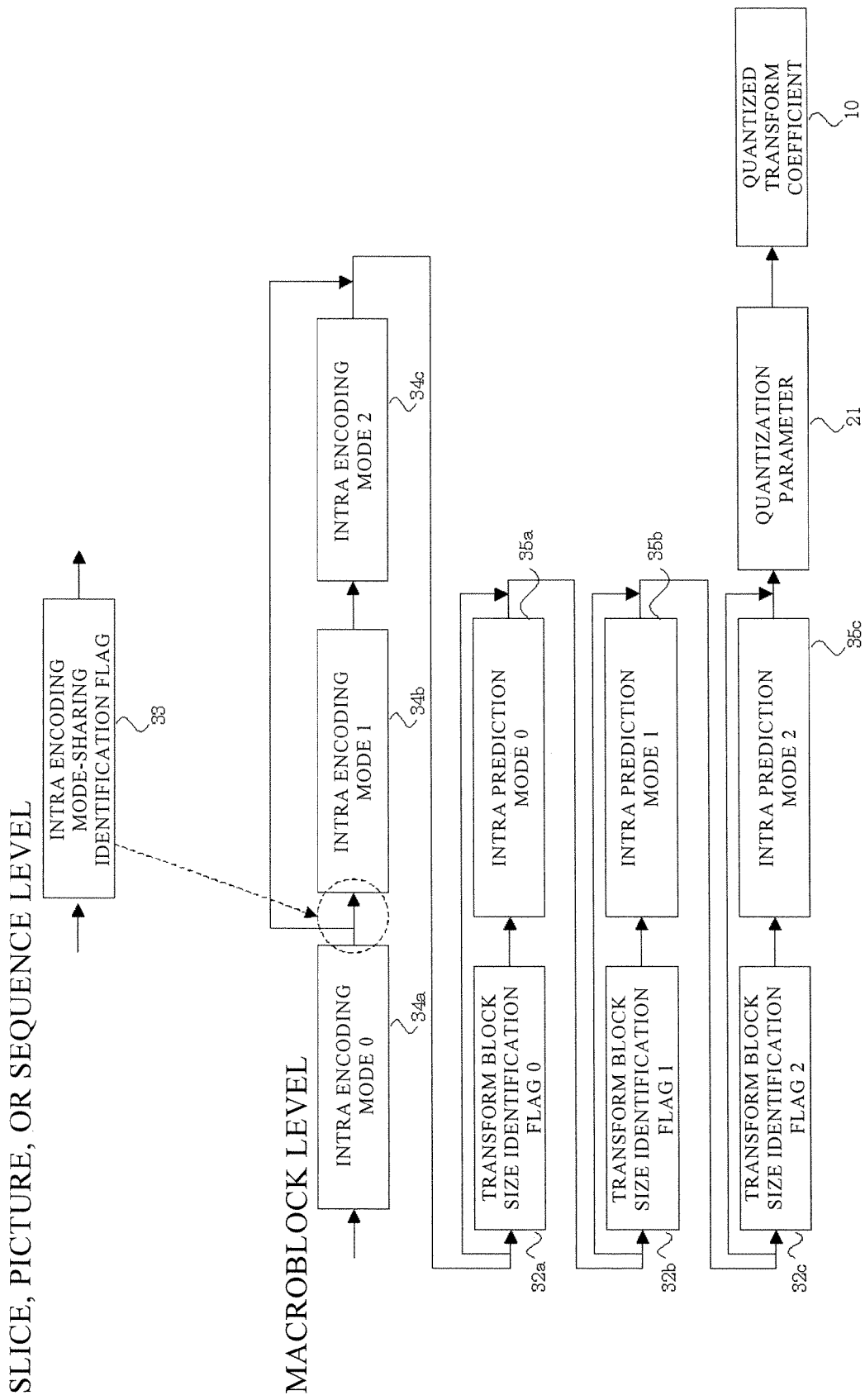
FIG. 16 is an explanatory view illustrating another data sequence of the video bit stream output from the video encoding device in the second embodiment.

In the second embodiment of the present invention, the intra encoding mode-sharing identification flag 33 is used to indicate "whether or not the intra encoding mode is common to all the components." Alternatively, the intra encoding mode-sharing identification flag 33 may be used to indicate "whether or not the intra encoding mode is common to specific two components such as C1 and C2" according to the color space definition of the input video signal 1 (in the case of the Y-Cb-Cr color space, there is a high possibility that the intra encoding mode can be made common to Cb and Cr). Further, the range of sharing of the intra encoding mode-sharing identification flag 33 may be limited only to the intra encoding modes to enable the individual selection of the transformation block size or the N×N prediction mode for each of the color components when the intra N×N prediction mode is used (FIG. 16). With a syntax structure as illustrated in FIG. 16, the encoding mode information can be made common to the color components while the prediction method can be changed for each of the color components for a video image of a complicated pattern which requires the N×N prediction. As a result, the prediction efficiency can be enhanced.

Note that the information of the intra encoding mode-sharing identification flag 33 is not required to be carried on the video bit stream to be transmitted as long as the information is already known to both the encoding device and the decoding device by some means. In this case, for example, the encoding device may fix the intra encoding mode-sharing identification flag 33 to any value for encoding or may transmit the intra encoding mode-sharing identification flag 33 independently of the video bit stream.

3. Outline of Operation of the Decoding Device

The decoding device illustrated in FIG. 12 receives the video stream according to the data sequence illustrated in FIG. 15 output from the encoding device illustrated in FIG. 11 and performs a decoding process on the macroblock basis, each macroblock containing three color components in the same size (the 4:4:4 format), to restore each video frame.

First, the variable length decoding unit 25 receives the stream 22 as an input to decode the stream 22 according to a predetermined syntax, thereby extracting information such as the intra encoding mode-sharing identification flag 33, the quantized transform coefficient 10, the encoding mode 6, and the quantization parameter 21. The quantized transform coefficient 10 is input together with the quantization parameter 21 to the inverse quantization unit 12, where the inverse quantization process is performed. Subsequently, the output from the inverse quantization unit 12 is input to the inverse orthogonal transform unit 13 to be restored to the local decoded prediction difference signal 14. On the other hand, the encoding mode 6 and the intra encoding mode-sharing identification flag 33 are input to the spatial prediction unit 2 to obtain the predicted image 7 according to the input information. A specific procedure for obtaining the predicted image 7 will be described below. The local decoded prediction difference signal 14 and the predicted image 7 are added by the adder 18 to obtain the temporary decoded image 15 (which is exactly the same signal as the local decoded image 15 in the encoding device). The temporary decoded image 15 is written back to the memories 16 to be used for the intra prediction of the subsequent macroblocks. Three memories are provided for the respective color components. Moreover, based on the indication of the deblocking filter control flag 24 decoded by the variable length decoding unit 25, the deblocking filter 26 is caused to act on the temporary decoded image 15 to obtain the final decoded image 27.

4. Intra Prediction Decoding Process in the Decoding Device

Figure 17:
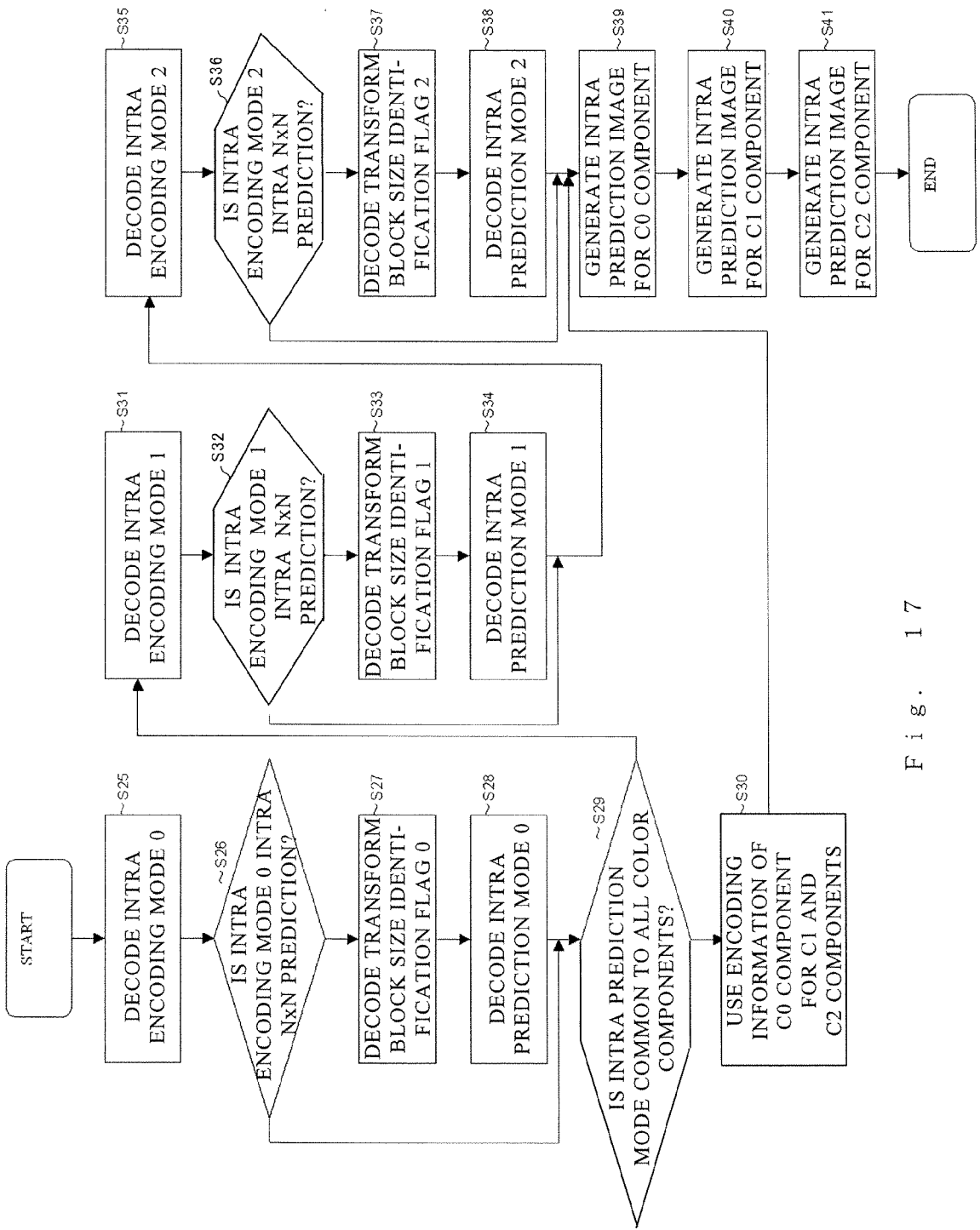
FIG. 17 is a flowchart illustrating a procedure of the intra prediction decoding process performed in the video decoding device in FIG. 12.

An intra prediction image generation process which is a characteristic of the decoding device according to the second embodiment of the present invention will be described in detail. The process is executed on the macroblock basis, each macroblock being obtained by aggregating the three color components described above. The process is mainly performed by the variable length decoding unit 25 and the spatial prediction unit 2 in the decoding device illustrated in FIG. 12. FIG. 17 is a flowchart illustrating a flow of the process.

In the flowchart illustrated in FIG. 7, Steps S25 to S38 are executed in the variable length decoding unit 25. A data sequence of the video stream 22 which is input to the variable length decoding unit 25 is according to the data sequence illustrated in FIG. 15. In Step S25, among the data illustrated in FIG. 15, the intra encoding mode 0 (34a) (corresponding to the C0 component) is first decoded. As a result, when the intra encoding mode 0 (34a) is the "intra N×N prediction," the transformation block size identification flag 0 (32a) and the intra prediction mode 0 (35a) are decoded (Steps S26 and S27). Subsequently, when it is determined based on the state of the intra encoding mode-sharing identification flag 33 that the intra encoding/prediction mode information is common to all the color components, the intra encoding mode 0 (34a), the transformation block size identification flag 0 (32a), and the intra prediction mode 0 (35a) are set as encoding information used for the C1 and C2 components (Steps S29 and S30). FIG. 17 illustrates a process on the macroblock basis. It is assumed that the intra encoding mode-sharing identification flag 33 used for the determination in Step S29 has been read from the video stream 22 by the variable length decoding unit 25 at the layer level higher than the slice level prior to START in the process in FIG. 17.

When it is determined in Step S29 of FIG. 17 that the intra encoding/prediction mode information is not common to all the color components, the intra encoding/prediction mode information for the C1 and C2 components is decoded in the subsequent process in Steps S31 to S38. Through the process described above, the encoding mode 6 for each of the color components is determined and is output to the spatial prediction unit 2. Then, according to Steps S39 to S41, the intra prediction image of each color component is obtained. The process for obtaining the intra prediction image follows the procedure illustrated in FIGS. 3, 4, and 13, and is the same as the process executed in the encoding device of FIG. 11.

Note that, as described above, the decoding device is not required to analyze the value of the information of the intra encoding mode-sharing identification flag 33 from the video bit stream but may, for example, decode the value of the information of the intra encoding mode-sharing identification flag 33 with a prefixed value as long as the information is known in advance to both the encoding device and the decoding device by some means. Alternatively, the information of the intra encoding mode-sharing identification flag 33 may be transmitted independently of the video bit stream.

In the 4:2:0 format employed in the conventional video encoding standard, the color space definition is fixed to Y, Cb, and Cr. In the 4:4:4 format, however, the color space is not limited to Y, Cb, and Cr, and various color spaces can be used. By constituting the encoding information of the intra macroblock as in FIG. 15 or 16, an optimal encoding process can be performed according to the color space definition of the input video signal 1 or the property of the video signal. At the same time, the bit stream obtained as the result of the above-mentioned encoding process is uniquely interpreted to perform a video decoding/reproducing process.

Third Embodiment

The third embodiment of the present invention describes another example of the configurations of the encoding device illustrated in FIG. 11 and the decoding device illustrated in FIG. 12. As in the first embodiment of the present invention, the encoding device and the decoding device of the third embodiment are based on the encoding method employed in the MPEG-4 AVC (ISO/IEC 14496-10)/ITU-T H.264 standard corresponding to Non-patent Document 1 and provided with characteristics specific to the present invention. The video encoding device of the third embodiment differs from that illustrated in FIG. 11 of the second embodiment only in the variable length encoding unit 11. The video decoding device of the third embodiment differs from the decoding device illustrated in FIG. 12 of the second embodiment only in the variable length decoding unit 25. The remaining operation is the same as that in the second embodiment, and only differences between the embodiments will be described below.

1. Encoding Procedure of the Intra Prediction Mode Information in the Encoding Device In the variable length encoding unit 11 of the encoding device of the second embodiment of the present invention, the data sequence in the bit stream has been described for the information of the intra N×N prediction mode. However, an encoding procedure of the intra N×N prediction mode has not particularly been described. In the third embodiment of the present invention, a specific method of the encoding procedure will be described. The third embodiment is particularly characteristic in that the case where the values of the intra N×N prediction modes have a high correlation between the color components is taken into consideration to perform entropy-coding using the correlation in value between the color components for the intra N×N prediction mode obtained for each of the color components.

Figure 19:
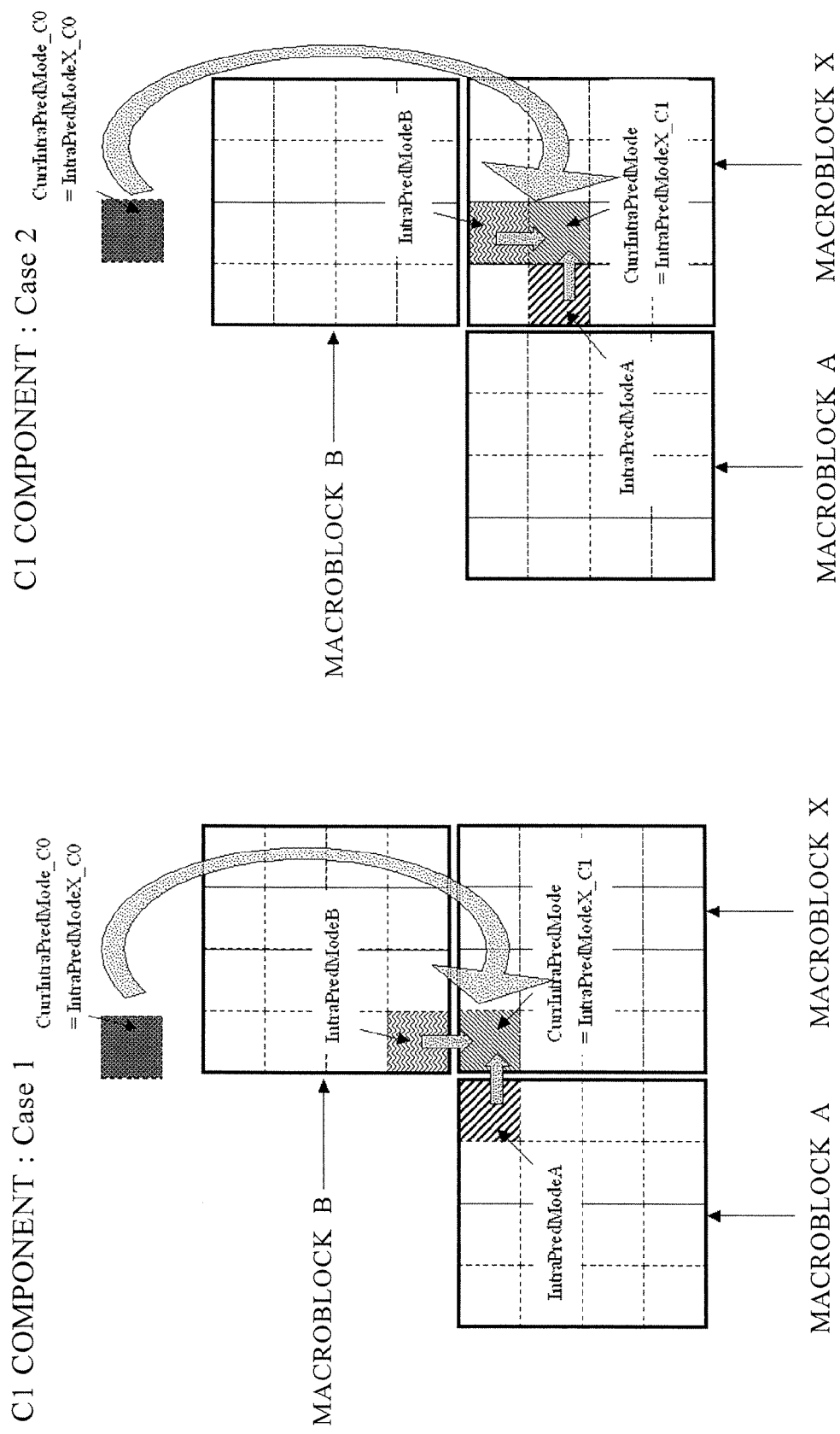
FIG. 19 are explanatory views illustrating parameters of the intra prediction mode encoding process of a C1 component in the third embodiment.

The following description is premised on the bit stream sequence in the form illustrated in FIG. 16. For the simplification of the description, a value of the intra encoding mode-sharing identification flag 33 is set to "use a common intra encoding mode for C0, C1, and C2," and the intra encoding mode is set to the intra N×N prediction mode, and the transformation block sizes 0 to 2 are set to the 4×4 block. In this case, the intra prediction modes 0 to 2 (35a to 35c) are all the intra 4×4 prediction mode. In FIGS. 18 to 20, a current macroblock to be encoded is denoted by X. A macroblock on the left of the macroblock X is denoted by A, whereas a macroblock above the macroblock X is denoted by B.

Figure 21:
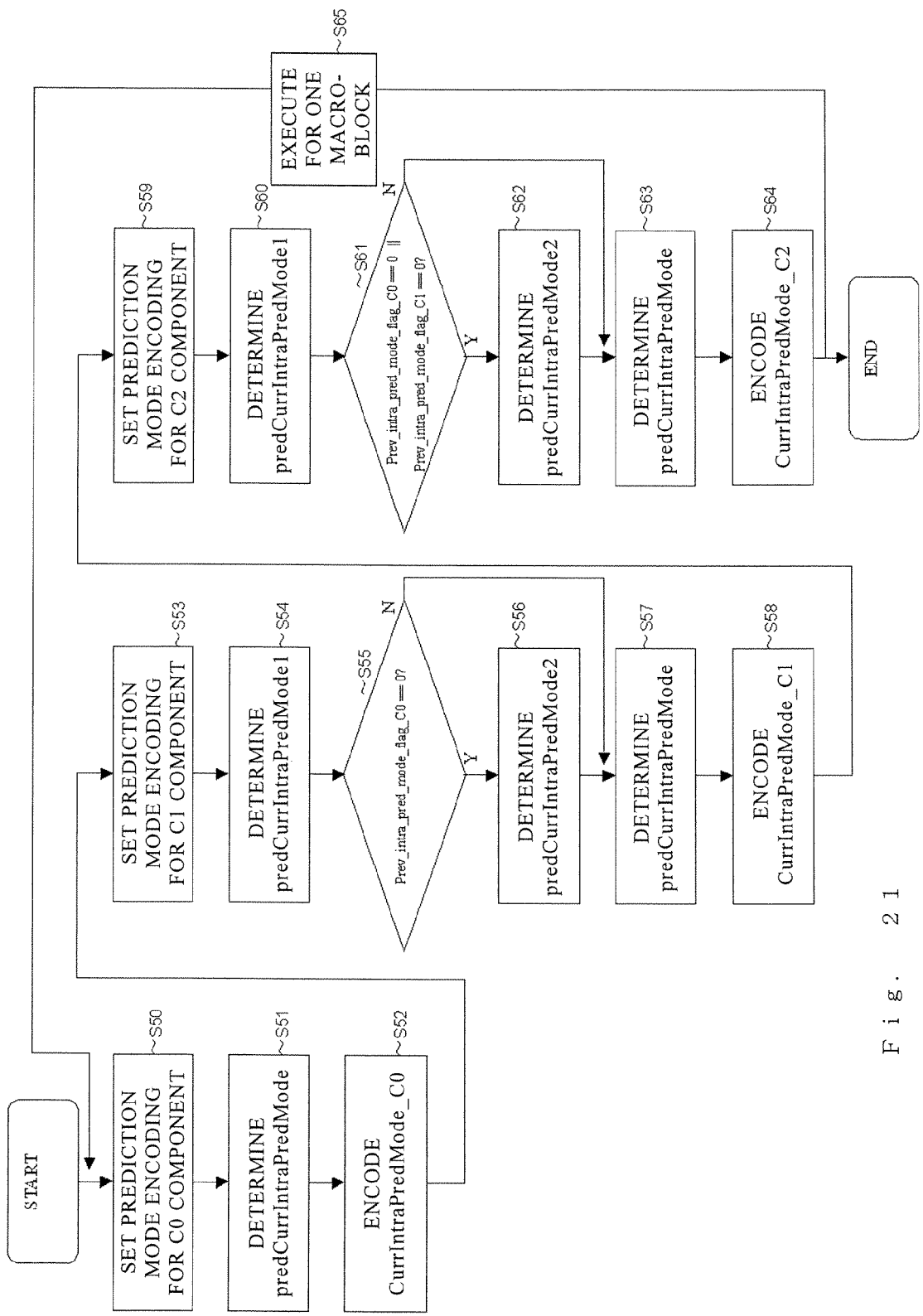
FIG. 21 is a flowchart illustrating a flow of an intra prediction mode encoding process in the third embodiment.
Figure 22:
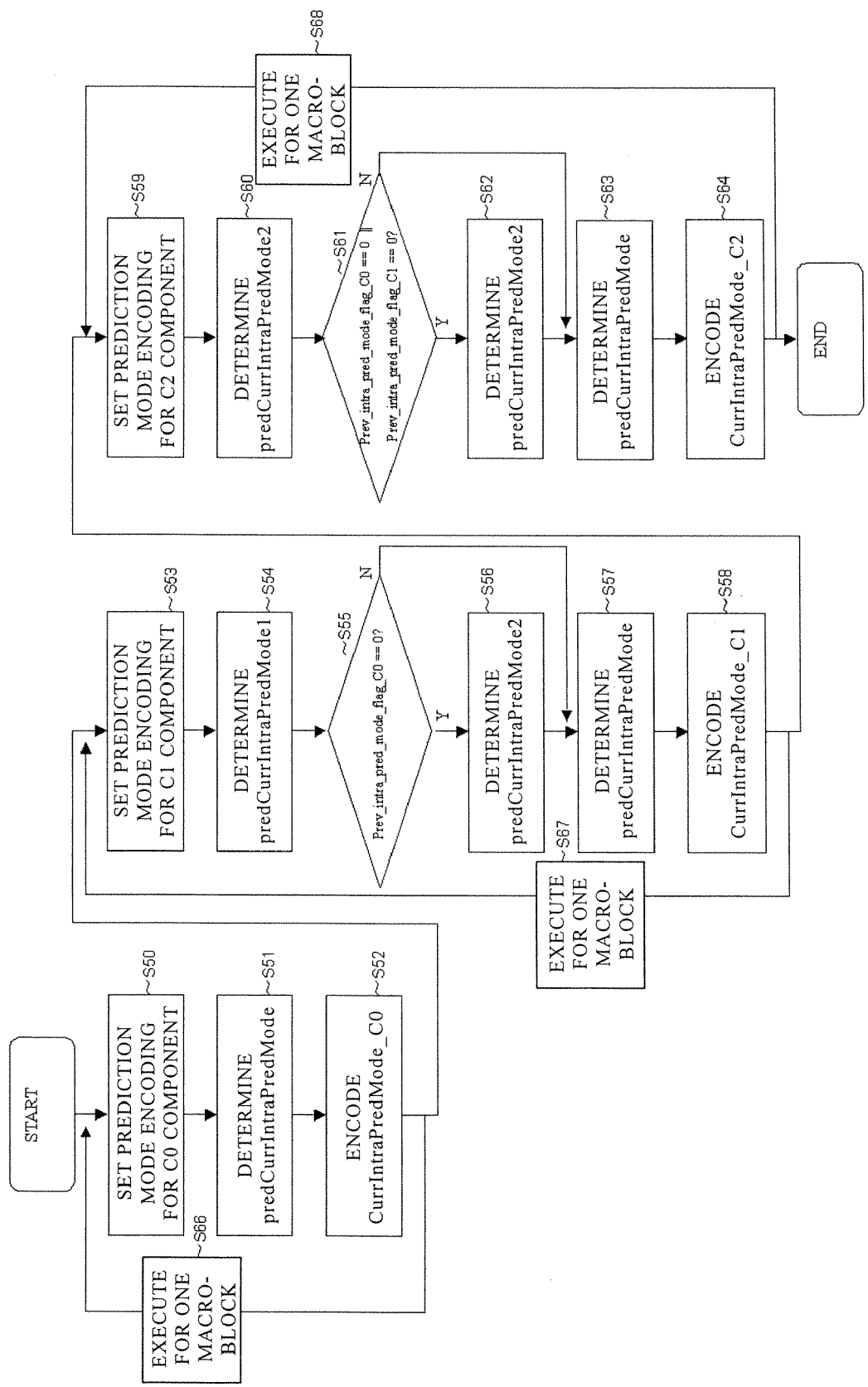
FIG. 22 is a flowchart illustrating another flow of the intra prediction mode encoding process in the third embodiment.

As the drawings for illustrating the respective encoding procedures of the color components C0, C1, and C2, FIGS. 18 to 20 are employed. FIGS. 21 and 22 are flowcharts of the encoding procedures.

FIG. 18 illustrate states of the C0 component in the macroblock X. In this drawing, a 4×4 block to be encoded is referred to as block X, and a block on the left of and a block above the block X are respectively referred to as block A and block B. There are two cases according to the position of the 4×4 block to be encoded in the macroblock X. Case 1 shows that the 4×4 blocks on the left of and above the 4×4 block to be encoded are present outside the current macroblock X, that is, are contained in the macroblock A or B. Case 2 shows that the 4×4 blocks on the left of and above the 4×4 block to be encoded are present in the current macroblock X, that is, are contained in the macroblock X. In any of the cases, one intra 4×4 prediction mode is allocated to each of the 4×4 blocks in the macroblock X, and is referred to as CurrIntraPredMode. The intra 4×4 prediction mode of the block A is referred to as IntraPredModeA, whereas the intra 4×4 prediction mode of the block B is referred to as IntraPredModeB. Both IntraPredModeA and IntraPredModeB are information which have already been encoded at the time when the block X is encoded. For encoding the intra 4×4 prediction mode of a certain block X, the parameters described above are first allocated (Step S50 of FIG. 21).

Next, a prediction value, predCurrIntraPredMode, for CurrIntraPredMode of the block X is determined by the following Formula (Step S51).

predCurrIntraPredMode=Min(IntraPredModeA,IntraPredModeB)

Next, CurrIntraPredMode of the C0 component is encoded. In this case, when CurrIntraPredMode=predCurrIntraPredMode is established, a one-bit flag (prev_intra_pred_mode_flag) indicating that the value is the same as the prediction value is encoded. If CurrIntraPredMode!=predCurrIntraPredMode is established, CurrIntraPredMode is encoded as it is when CurrIntraPredMode is smaller than predCurrIntraPredMode as a result of the comparison between CurrIntraPredMode and predCurrIntraPredMode. When CurrIntraPredMode is larger than predCurrIntraPredMode, CurrIntraPredMode-1 is encoded (Step S52).

```
if(CurrIntraPredMode == predCurrIntraPredMode)
{
    prev_intra_pred_mode_flag = 1;
}
else
{
    prev_intra_pred_mode_flag = 0;
    if( CurrIntraPredMode < predCurrIntraPredMode)
        rem_intra_pred_mode = CurrIntraPredMode;
    else
        rem_intra_pred_mode = CurrIntraPredMode – 1;
}
Encode prev_intra_pred_mode_flag;
If(prev_intra_pred_mode_flag == 0)
    Encode rem_intra_pred_mode;
```

Next, the encoding procedure of the C1 component will be described referring to FIG. 19. First, as in the case of the encoding procedure of the C0 component, the encoding parameters of the neighboring blocks such as IntraPredModeA and IntraPredModeB are set according to the position of the block X (Step S53).

Next, a prediction value candidate 1 predCurrIntraPredMode1 for CurrIntraPredMode of the block X is defined by the following Formula (Step S54).

predCurrIntraPredMode1=Min(IntraPredModeA,IntraPredModeB)

If prev_intra pred_mode_flag=1 is established for the C0 component, this predCurrIntraPredMode1 is employed as predCurrIntraPredMode for the block X of the C1 component. The reason is as follows. The employment of prev_intra_pred_mode_flag=1 for the same block position of the C0 component means a high correlation between the prediction modes in the neighboring image areas in the C0 component. In a case of an RGB signal in which the correlation in texture structure between the C0 component and the C1 component is not completely removed, for example, there is a possibility of a high correlation between the neighboring image areas in the C1 component as in the case of the C0 component. Therefore, it is determined that a prediction value of the C1 component does not depend on the intra 4×4 prediction mode of the C0 component.

On the other hand, when prev_intra_pred_mode_flag=0, that is, rem_intra_pred_mode is encoded in the C0 component (Step S55), CurrIntraPredMode of the C0 component is determined as a prediction value candidate 2 (Step S56). Specifically, predCurrIntraPredMode2=CurrIntraPredMode_C0 is established. The background of the determination of the prediction value candidate is as follows. The encoding of rem_intra_pred_mode for the C0 component means that a correlation in intra prediction between the neighboring image areas is low in the C0 component. In this case, it is expected that a correlation between the neighboring image areas is also low in the C1 component. Therefore, there is a possibility that the intra prediction mode of the block at the same position in a different color component provides a more accurate prediction value.

As the prediction value of CurrIntraPredMode of the block X of the C1 component, any one of predCurrIntraPredMode1 and predCurrIntraPredMode 2 is ultimately determined (Step S57). The determination of the value is additionally encoded as a one-bit flag (pred_flag). However, pred_flag is encoded only when CurrIntraPredMode is identical with the prediction value. When CurrIntraPredMode is not identical with the prediction value (rem_intra pred_mode is encoded), predCurrIntraPredMode1 is used as the prediction value.

The procedure described above is as follows:

```
if( prev_intra_pred_mode_flag_C0 == 1 )
{
    predCurrIntraPredMode = Min( IntraPredModeA, IntraPredModeB );
}
else
{
    predCurrIntraPredMode1 = Min( IntraPredModeA, IntraPredModeB );
    predCurrIntraPredMode2 = CurrIntraPredMode_C0;
    if( CurrIntraPredMode == predCurrIntraPredMode1 )
    {
        prev_intra_pred_mode_flag = 1;
        pred_flag = 0; // the prediction value candidate 1 is used
    }
    else if(CurrIntraPredMode == predCurrIntraPredMode2 )
    {
        prev_intra_pred_mode_flag = 1;
        pred_flag = 1; // the prediction value candidate 1 is used
    }
    else
    {
        prev_intra_pred_mode_flag = 0;
        if( CurrIntraPredMode < predCurrIntraPredMode1 )
            rem_intra_pred_mode = CurrIntraPredMode;
        else
            rem_intra_pred_mode = CurrIntraPredMode – 1;
    }
}
```

-continued

```
}
Encode prev_intra_pred_mode_flag ;
if(prev_intra_pred_mode_flag == 1)
    Encode pred_flag;
else // If(prev_intra_pred_mode_flag == 0)
Encode rem_intra_pred_mode ;
```

As a result, prev_intra_pred_mode_flag, pred_flag, and rem_intra pred_mode are encoded as encoded data (Step S58).

Next, the encoding procedure of the C2 component will be described referring to FIG. 20. First, as in the case of the C0 and C1 components, the encoding parameters of the neighboring blocks such as IntraPredModeA and IntraPredModeB are set according to the position of the block X (Step S59).

Next, the prediction value candidate 1, predCurrIntraPredMode1 for CurrIntraPredMode of the block X is defined by the following Formula (Step S60).

predCurrIntraPredMode1=Min(IntraPredMode*A*,IntraPredMode*B*)

If prev_intra_pred_mode_flag=1 is established for both the C0 and C1 components, this predCurrIntraPredMode1 is used as it is as predCurrIntraPredMode for the block X of the C2 component. The reason is as follows. The use of prev_intra_pred_mode_flag=1 for the blocks at the same position in the C0 and C1 components means a high correlation between the prediction modes in the neighboring image areas in the C0 and C1 components. In the case of, for example, the RGB signal in which the correlation in the texture structure between the C0 and C1 components, and the C2 component is not completely removed, there is a possibility of a high correlation between the neighboring image areas in the C2 component as in the cases of the C0 and C1 components. Therefore, it is determined that the prediction value of the C2 component does not depend on the intra 4×4 prediction mode of the C0 and C1 components.

On the other hand, when prev_intra_pred_mode_flag=0, that is, rem_intra_pred_mode is encoded in the C0 component or C1 (Step S61), CurrIntraPredMode of the C0 component or C1 is determined as the prediction value candidate 2 (Step S62). Specifically, the procedure is as follows:

```
If( prev_intra_pred_mode_flag_C0 == 0 &&
pred_intra_pred_mode_flag_C1 == 1 )
predCurrIntraPredMode2 = CurrIntraPredMode_C0;
else    if(prev_intra_pred_mode_flag_C0    ==    1    &&
pred_intra_pred_mode_flag_C1  ==  0
)predCurrIntraPredMode2   = CurrIntraPredMode_C1;
else
predCurrIntraPredMode2 = CurrIntraPredMode_C1;
```

The background of the determination of the prediction value candidate is as follows. The encoding of rem_intra_pred_mode for the C0 component or C1 means that a correlation in the intra prediction between the neighboring image areas is low in the C0 component or C1. In this case, it is expected that a correlation between the neighboring image areas is also low even in the C2 component. Therefore, there is a possibility that the intra prediction mode of the block at the same position in a different color component may provide a more accurate prediction value. Moreover, according to this view, when rem_intra_pred_mode is encoded for both the C0 and C1 components, any of the current intra prediction modes of the C0 and C1 components can be a prediction value candidate. In this case, the current intra prediction mode of the C1 component is used as the prediction value. The reason is as follows. When a YUV color space is input, there is a high possibility that C0 is treated as a luminance whereas C1 and C2 are treated as chrominances. In this case, the prediction mode of C1 rather than that of C0 is considered to be closer to the prediction mode of C2. When the RGB color space is input, it is generally considered that the selection from C0 and C1 does not constitute such an important factor, and therefore, it is appropriate to use the intra prediction mode of the C1 component as the prediction value (the intra prediction mode of the C2 component may also be used as the prediction value depending on the design).

As the prediction value for CurrIntraPredMode of the block X of the C2 component, any one of predCurrIntraPredMode1 and predCurrIntraPredMode2 is ultimately determined (Step S63). The determination of the value is additionally encoded as the one-bit flag (pred_flag).

The above-mentioned procedure is described as the following Formula.

The procedure described above is as follows:

```
If( prev_intra_pred_mode_flag_C0 == 1 &&
prev_intra_pred_mode_flag == 1 )
{
    predCurrIntraPredMode = Min( IntraPredModeA, IntraPredModeB );
}
else
{
    predCurrIntraPredMode1 = Min( IntraPredModeA,
        IntraPredModeB );
If( prev_intra_pred_mode_flag_C0 == 0 &&
pred_intra_pred_mode_flag_C1 == 1 )
predCurrIntraPredMode2 = CurrIntraPredMode_C0;
else    if(prev_intra_pred_mode_flag_C0    ==    1    &&
pred_intra_pred_mode_flag_C1  ==  0
)predCurrIntraPredMode2   = CurrIntraPredMode_C1;
else
predCurrIntraPredMode2 = CurrIntraPredMode_C1;
    if( CurrIntraPredMode   == predCurrIntraPredMode1 )
    {
        prev_intra_pred_mode_flag = 1;
        pred_flag = 0;   // the prediction value cabdidate 1 is used
    }
    else if(CurrIntraPredMode   == predCurrIntraPredMode2 )
{
        prev_intra_pred_mode_flag = 1;
        pred_flag = 1;   // the prediction value cabdidate 2 is used
    }
    else
{
 prev_intra_pred_mode_flag = 0;
        if( CurrIntraPredMode < predCurrIntraPredMode1 )
            rem_intra_pred_mode = CurrIntraPredMode;
        else
            rem_intra_pred_mode = CurrIntraPredMode − 1;
}
}
Encode prev_intra_pred_mode_flag ;
if(prev_intra_pred_mode_flag == 1)
    Encode pred_flag;
else // If(prev_intra_pred_mode_flag == 0)
    Encode rem_intra_pred_mode ;
```

As a result, prev_intra_pred_mode_flag, pred_flag, and rem_intra_pred_mode are encoded as encoded data (Step S64).

The above-mentioned encoding procedure can be similarly defined for the intra 8×8 prediction mode. By encoding the intra N×N prediction mode in the procedure as described above, the correlation between the prediction mode selected for one color component and that selected for another color component can be used to reduce the amount of codes of the prediction mode itself, thereby improving the encoding efficiency.

The only difference between FIGS. 21 and 22 lies in that the process of encoding the intra prediction mode per macroblock is separately performed for each color component or collectively performed for the color components. In the case of FIG. 21, each color component is encoded for each 4×4 block. Sixteen patterns of the encoded 4×4 block are arranged as a bit stream (Step S65). In the case of FIG. 22, sixteen 4×4 blocks of each color component are encoded at a time. The encoded 4×4 blocks are arranged as a bit stream for each color component (Steps S66, S67 and S68).

Note that in the above-mentioned procedure, pred_flag is determined as valid information only when prev_intra_pred_mode_flag is 1. However, pred_flag can be determined as effective information even when prev_intra_pred_mode_flag is 0. Specifically, for example, taking the C1 component as an example, the encoding may also be performed in the following procedure.

```
If( prev_intra_pred_mode_flag_C0 == 1 )
{
    predCurrIntraPredMode = Min( IntraPredModeA, IntraPredModeB );
if( CurrIntraPredMode    == predCurrIntraPredMode )
        {
            prev_intra_pred_mode_flag = 1;
        }
        Else{
          if( CurrIntraPredMode < predCurrIntraPredMode )
             rem_intra_pred_mode = CurrIntraPredMode;
          else
             rem_intra_pred_mode = CurrIntraPredMode − 1;
        }
}
else
{
    predCurrIntraPredMode1 = Min( IntraPredModeA,
    IntraPredModeB );
    predCurrIntraPredMode2 = CurrIntraPredMode_C0;
if( CurrIntraPredMode    == predCurrIntraPredMode1 )
{
       prev_intra_pred_mode_flag = 1;
       pred_flag = 0;   // the prediction value cabdidate 1 is used
}
else if(CurrIntraPredMode   == predCurrIntraPredMode2 )
{
       prev_intra_pred_mode_flag = 1;
       pred_flag = 1;   // the prediction value cabdidate 2 is used
}
else
{
prev_intra_pred_mode_flag = 0;
if( | CurrIntraPredMode − predCurrIntraPredMode1 | <
        | CurrIntraPredMode    predCurrIntraPredMode2 | )
       {
       pred_flag = 0;
       predCurrIntraPredMode = predCurrIntraPredMode1;
}
Else
{
       pred_flag = 1;
       predCurrIntraPredMode = predCurrIntraPredMode2;
}
    if( CurrIntraPredMode < predCurrIntraPredMode )
       rem_intra_pred_mode = CurrIntraPredMode;
    else
       rem_intra_pred_mode = CurrIntraPredMode − 1;
    }
}
Encode prev_intra_pred_mode_flag ;
If(prev_intra_pred_mode_flag_C0 == 0)
Encode pred_flag;
If(prev_intra_pred_mode_flag == 0)
    Encode rem_intra_pred_mode ;
```

According to this method, pred_flag is encoded each time when rem_intra_pred_mode is encoded in the intra prediction mode of the same position block of the C0 component. Even in a case of prev_intra_pred_mode_flag=0, a more accurate prediction value can be used. As a result, the encoding efficiency is expected to be improved. As a further variation, pred_flag may be encoded without depending on whether or not rem_intra_pred_mode is encoded in the intra prediction mode of the same position block of the C0 component. In this case, the intra prediction mode of the C0 component is always used as the prediction value candidate.

Specifically, in this case, Formula is established as follows.

```
    predCurrIntraPredMode1 = Min( IntraPredModeA, IntraPredModeB );
    predCurrIntraPredMode2 = CurrIntraPredMode_C0;
if( CurrIntraPredMode    == predCurrIntraPredMode1 )
{
       prev_intra_pred_mode_flag = 1;
       pred_flag = 0;   // the prediction value candidate 1 is used
}
else if(CurrIntraPredMode   == predCurrIntraPredMode2 )
{
       prev_intra_pred_mode_flag = 1;
       pred_flag = 1;   // the prediction value candidate 2 is used
}
else
{
prev_intra_pred_mode_flag = 0;
if( | CurrIntraPredMode − predCurrIntraPredMode1 | <
        | CurrIntraPredMode    predCurrIntraPredMode2 | )
{
       pred_flag = 0;
       predCurrIntraPredMode = predCurrIntraPredMode1;
}
Else
{
       pred_flag = 1;
       predCurrIntraPredMode = predCurrIntraPredMode2;
}
    if( CurrIntraPredMode < predCurrIntraPredMode )
       rem_intra_pred_mode = CurrIntraPredMode;
    else
       rem_intra_pred_mode = CurrIntraPredMode − 1;
}
Encode prev_intra_pred_mode_flag ;
Encode pred_flag;
If(prev_intra_pred_mode_flag == 0)
    Encode rem_intra_pred_mode ;
```

Alternatively, pred_flag may be set for each macroblock or sequence instead of for each 4×4 block. When pred_flag is set for each macroblock, the use of the prediction value candidate 1 or the prediction value candidate 2 is common to all the 4×4 blocks in the macroblock. Therefore, overhead information transmitted as pred_flag can be further reduced. Moreover, pred_flag may be set for each sequence in order to determine the use of the prediction value candidate 1 or 2 according to the definition of the input color space. In this case, since pred_flag is no longer required to be transmitted for each macroblock, the overhead information can be further reduced.

2. Decoding Procedure of the Intra Prediction Mode Information in the Decoding Device For the variable length decoding unit 25 in the decoding device in the second embodiment of the present invention, the data sequence in the bit stream is illustrated for the information of the intra N×N prediction mode. However, a decoding procedure of the information is not particularly described. In the third embodiment of the present invention, a specific method of the decoding procedure will be described. The third embodiment of the present invention is particularly characteristic in the decoding of the bit stream which is entropy-coded using the correlation in value between the color components, for the intra N×N prediction mode obtained for each of the color components, taking a case where the values of the intra N×N prediction modes have a high correlation between the color components into consideration.

Figure 23:
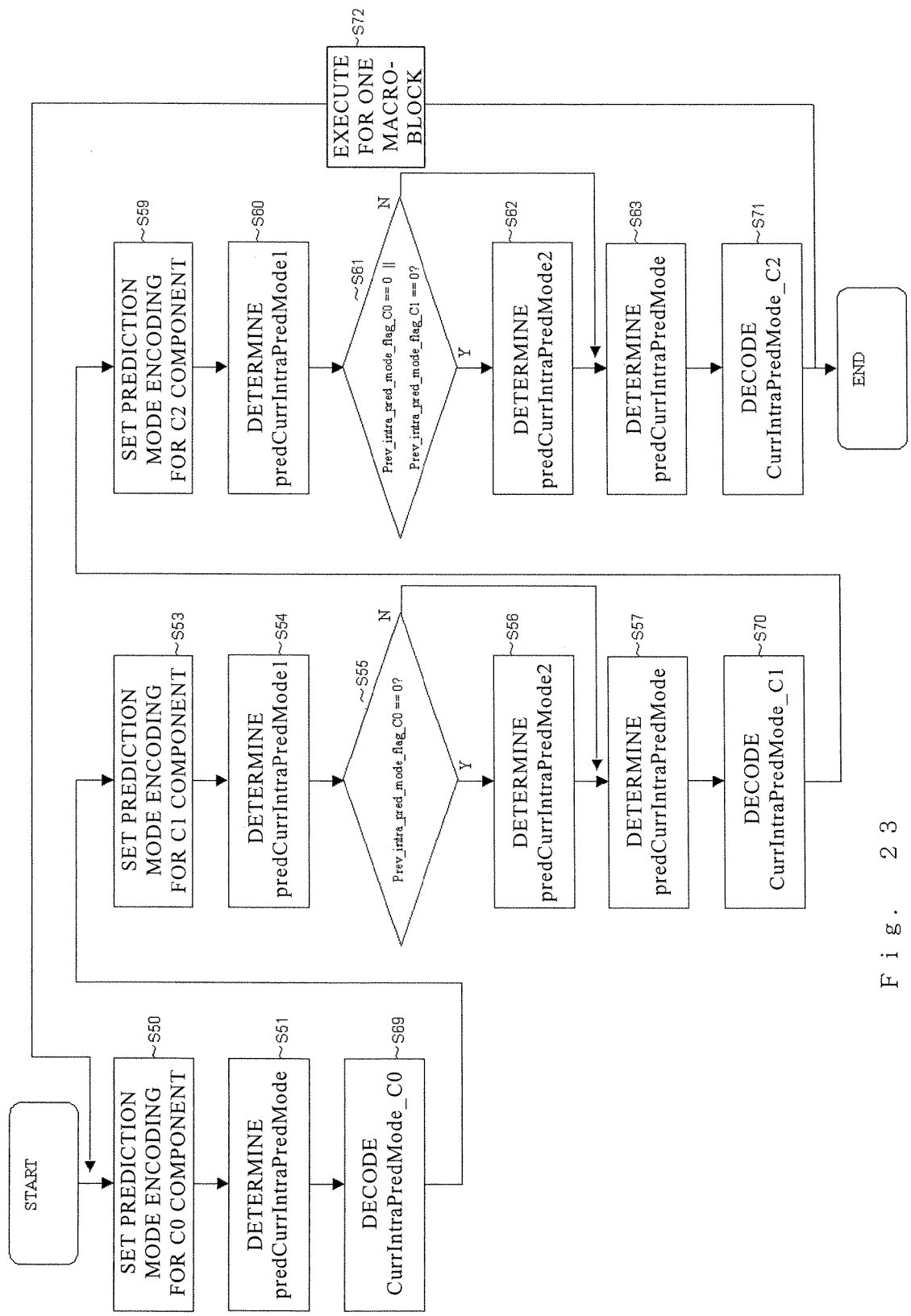
FIG. 23 is a flowchart illustrating a flow of an intra prediction mode decoding process in the third embodiment.

The following description is premised on the bit stream sequence in the form illustrated in FIG. 16. In order to limit the description to that for the decoding procedure in the intra prediction mode, a value of the intra encoding mode-sharing identification flag 33 is set to "use a common intra encoding mode for C0, C1, and C2." In addition, the intra encoding mode is set to the intra N×N prediction mode, and the 4×4 block size is designated as the transformation block sizes 0 to 2. In this case, the intra prediction modes 0 to 2 (35a to 35c) are all the intra 4×4 prediction mode. As in the case of the encoding device, FIGS. 18 to 20 are referred to for the description of the decoding device. In the decoding device, a current macroblock to be decoded is denoted by X. A macroblock on the left of the macroblock X is denoted by A, whereas a macroblock above the macroblock X is denoted by B. FIG. 23 is a flowchart of the decoding procedure. In each of the steps in FIG. 23 denoted by the same reference numerals as those in FIGS. 21 and 22, the same process as that in the encoding device is performed.

FIG. 18 illustrate states of the C0 component in the macroblock X. There are two cases according to the position of the 4×4 block to be decoded in the macroblock X. Case 1 corresponds to a case where the 4×4 blocks on the left of and above the 4×4 block to be decoded are present outside the current macroblock X, that is, contained in the macroblock A or B. Case 2 corresponds to the other case where the 4×4 blocks on the left of and above the 4×4 block to be decoded are present in the current macroblock X, that is, contained in the macroblock X. The 4×4 block to be decoded is referred to as block X, and the 4×4 blocks on the left of and above the block X are respectively referred to as block A and block B. In any of the cases, one intra 4×4 prediction mode is allocated to each of the 4×4 blocks X in the macroblock X, and is referred to as CurrIntraPredMode. The intra 4×4 prediction mode of the block A is referred to as IntraPredModeA, whereas the intra 4×4 prediction mode of the block B is referred to as IntraPredModeB. Both IntraPredModeA and IntraPredModeB are information which have already been decoded at the time when the block X is decoded. For decoding the intra 4×4 prediction mode of a certain block X, the parameters described above are first allocated (Step S50).

Next, a prediction value, predCurrIntraPredMode, for CurrIntraPredMode of the block X is determined by the following Formula (Step S51).

predCurrIntraPredMode=Min(IntraPredModeA,IntraPredModeB)

Next, the one-bit flag (prev_intra_pred_mode_flag) indicating whether or not CurrIntraPredMode=predCurrIntraPredMode is established is decoded. The establishment of the relation: prev_intra_pred_mode_flag=1 means that CurrIntraPredMode=predCurrIntraPredMode is established. Otherwise (prev_intra_pred_mode_flag=0), information of rem_intra_pred_mode is decoded from the bit stream. When rem_intra_pred_mode is smaller than predCurrIntraPredMode as the result of comparison between the two values, CurrIntraPredMode rem_intra pred_mode is set. Otherwise, CurrIntraPredMode=rem_intra_pred_mode+1 is set (Step S65).

The above-mentioned procedure is summarized as follows.

```
predCurrIntraPredMode = Min( IntraPredModeA, IntraPredModeB );
Decode prev_intra_pred_mode_flag;
if(prev_intra_pred_mode_flag == 1)
{
    CurrIntraPredMode == predCurrIntraPredMode;
}
else
{
    Decode rem_intra_pred_mode;
    if(rem_intra_pred_mode < predCurrIntraPredMode )
        CurrIntraPredMode = rem_intra_pred_mode;
    else
        CurrIntraPredMode = rem_intra_pred_mode + 1;
}
```

Next, the decoding procedure of the C1 component will be described referring to FIG. 19. First, as in the case of the C0 component, the encoding parameters of the neighboring blocks such as IntraPredModeA and IntraPredModeB are set according to the position of the block X (Step S53).

Next, the prediction value candidate 1, predCurrIntraPredMode1, for the CurrIntraPredMode of the block X is defined by the following Formula (Step S54).

predCurrIntraPredMode1=Min(IntraPredModeA,IntraPredModeB)

If prev_intra_pred_mode_flag=1 is established for the C0 component, this predCurrIntraPredMode1 is used as predCurrIntraPredMode of the block X of the C1 component. The reason is the same as that described for the encoding device.

On the other hand, when prev_intra_pred_mode_flag=0, that is, rem_intra_pred_mode is decoded for the C0 component (Step S55), CurrIntraPredMode for the C0 component is determined as the prediction value candidate 2 (Step S56). Specifically, predCurrIntraPredMode2=CurrIntraPredMode_C0 is established. The reason for setting CurrIntraPredMode as the predictive value candidate is also the same as that described for the encoding device.

As the prediction value of CurrIntraPredMode of the block X of the C1 component, any one of predCurrIntraPredMode1 and predCurrIntraPredMode 2 is ultimately determined (Step S57). The selection of the value is determined by decoding the one-bit flag (pred_flag). However, pred_flag is decoded only when CurrIntraPredMode is identical with the prediction value. When CurrIntraPredMode is not identical with the prediction value (rem_intra_pred_mode is decoded), predCurrIntraPredMode1 is used as the prediction value.

After the prediction values 1 and 2, prev_intra pred_mode_flag, pred_flag, and rem_intra pred_mode are given, CurrIntraPredMode is decoded in the following procedure (Step S66).

```
if( prev_intra_pred_mode_flag_C0 == 1 )
{
    pred_flag = 0;   // At this time, pred_flag is not included in a
    bit stream
    predCurrIntraPredMode = Min( IntraPredModeA, IntraPredModeB );
    Decode prev_intra_pred_mode_flag;
    if(prev_intra_pred_mode_flag == 1)
    {
        CurrIntraPredMode == predCurrIntraPredMode;
    }
else
    {
```

```
        Decode rem_intra_pred_mode;
        if(rem_intra_pred_mode < predCurrIntraPredMode )
            CurrIntraPredMode = rem_intra_pred_mode;
        else
            CurrIntraPredMode = rem_intra_pred_mode + 1;
        }
    }
    else
    {
        predCurrIntraPredMode1 = Min( IntraPredModeA,
        IntraPredModeB );
        predCurrIntraPredMode2 = CurrIntraPredMode_C0;
        Decode prev_intra_pred_mode_flag;
        if(prev_intra_pred_mode_flag == 1)
        {
            Decode pred_flag;
If( pred_flag == 0 )
            predCurrIntraPredMode = predCurrIntraPredMode1;
            Else
                predCurrIntraPredMode = predCurrIntraPredMode2;
            CurrIntraPredMode == predCurrIntraPredMode;
        }
    else
        {
            predCurrIntraPredMode = predCurrIntraPredMode1;
            Decode rem_intra_pred_mode;
            if(rem_intra_pred_mode < predCurrIntraPredMode )
                CurrIntraPredMode = rem_intra_pred_mode;
            else
                CurrIntraPredMode = rem_intra_pred_mode + 1;
        }
}
```

Next, the decoding procedure of the C2 component will be described referring to FIG. 20. First, as in the cases of the C0 and C1 components, the encoding parameters of the neighboring blocks such as IntraPredModeA and IntraPredModeB are set according to the position of the block X (Step S59).

Next, the prediction value candidate 1, predCurrIntraPredMode1, for CurrIntraPredMode of the block X is defined by the following Formula (Step S60).

$$predCurrIntraPredMode1 = Min(IntraPredModeA, IntraPredModeB)$$

If prev_intra_pred_mode_flag=1 is established for both the C0 and C1 components, this predCurrIntraPredMode1 is used as predCurrIntraPredMode of the block X of the C2 component. The reason is the same as that described for the encoding device.

On the other hand, when prev_intra_pred_mode_flag=0, that is, rem_intra_pred_mode is decoded for the C0 component or C1 (Step S61), CurrIntraPredMode for the C0 component or C1 is determined as the prediction value candidate 2 (Step S62).

Specifically, the procedure is as follows:
If(prev_intra_pred_mode_flag_C0==0 && pred_intra_pred_mode_flag_C1==1)
predCurrIntraPredMode2=CurrIntraPredMode_C0;
else if(prev_intra_pred_mode flag=C0==1 && pred_intra_pred_mode_flag_C1==0)
predCurrIntraPredMode2=CurrIntraPredMode_C1; else
predCurrIntraPredMode2=CurrIntraPredMode_C1;
The background of the determination of the prediction value candidate 2 is also the same as that described for the encoding device.

As the prediction value of CurrIntraPredMode of the block X of the C2 component, any one of predCurrIntraPredMode1 and predCurrIntraPredMode 2 is ultimately determined (Step S63). The value is determined by decoding the one-bit flag (pred_flag). However, pred_flag is decoded only when CurrIntraPredMode is identical with the prediction value. Otherwise (when rem_intra_pred_mode is decoded), predCurrIntraPredMode1 is used as the prediction value.

After the prediction value candidates 1 and 2, prev_intra_pred_mode_flag, pred_flag, and rem_intra_pred_mode are given, CurrIntraPredMode is decoded in the following procedure (Step S71).

```
if(prev_intra_pred_mode_flag_C0 == 1 &&
prev_intra_pred_mode_flag_C1 == 1 )
{
    pred_flag = 0;   // At this time, pred_flag is not included in a
    bit stream
    predCurrIntraPredMode = Min( IntraPredModeA, IntraPredModeB );
    Decode prev_intra_pred_mode_flag;
    if(prev_intra_pred_mode_flag == 1)
    {
        CurrIntraPredMode == predCurrIntraPredMode;
    }
    else
    {
        Decode rem_intra_pred_mode;
        if(rem_intra_pred_mode < predCurrIntraPredMode )
            CurrIntraPredMode = rem_intra_pred_mode;
        else
            CurrIntraPredMode = rem_intra_pred_mode + 1;
    }
}
else
{
    predCurrIntraPredMode1 = Min( IntraPredModeA,
        IntraPredModeB );
If( prev_intra_pred_mode_flag_C0 == 0 &&
pred_intra_pred_mode_flag_C1 == 1 )
predCurrIntraPredMode2 = CurrIntraPredMode_C0;
else      if(prev_intra_pred_mode_flag_C0    ==    1   &&
pred_intra_pred_mode_flag_C1  == 0
)predCurrIntraPredMode2  = CurrIntraPredMode_C1;
else
predCurrIntraPredMode2 = CurrIntraPredMode_C1;
    Decode prev_intra_pred_mode_flag;
    if(prev_intra_pred_mode_flag == 1)
    {
        Decode pred_flag;
If( pred_flag == 0 )
            predCurrIntraPredMode = predCurrIntraPredMode1;
        Else
            predCurrIntraPredMode = predCurrIntraPredMode2;
        CurrIntraPredMode == predCurrIntraPredMode;
    }
    else
    {
        predCurrIntraPredMode = predCurrIntraPredMode1;
        Decode rem_intra_pred_mode;
        if(rem_intra_pred_mode < predCurrIntraPredMode )
            CurrIntraPredMode = rem_intra_pred_mode;
        else
            CurrIntraPredMode = rem_intra_pred_mode + 1;
    }
}
```

The decoding procedure described above can be similarly defined for the intra 8×8 prediction mode. By decoding the intra N×N prediction mode in the procedure as described above, the correlation between the prediction mode selected for one color component and that selected for another color component can be used to reduce the amount of codes of the prediction mode itself, thereby decoding the bit stream with the improved encoding efficiency.

Note that pred_flag is information which is decoded only when prev_intra_pred_mode_flag is 1 in the above-mentioned procedure, but pred_flag may be decoded as information to be included even in a case where prev_intra_pred_mode_flag is 0.

Specifically, for example, taking the C1 component as an example, the decoding may also be performed in the following procedure.

```
if( prev_intra_pred_mode_flag_C0 == 1 )
{
    predCurrIntraPredMode = Min( IntraPredModeA, IntraPredModeB );
    Decode prev_intra_pred_mode_flag;
    if(prev_intra_pred_mode_flag == 1)
    {
        CurrIntraPredMode == predCurrIntraPredMode;
    }
    else
    {
        Decode rem_intra_pred_mode;
        if(rem_intra_pred_mode < predCurrIntraPredMode )
            CurrIntraPredMode = rem_intra_pred_mode;
        else
            CurrIntraPredMode = rem_intra_pred_mode + 1;
    }
}
else
{
    predCurrIntraPredMode1 = Min( IntraPredModeA,
    IntraPredModeB );
    predCurrIntraPredMode2 = CurrIntraPredMode_C0;
    Decode prev_intra_pred_mode_flag;
    Decode pred_flag;
If( pred_flag == 0 )
        predCurrIntraPredMode = predCurrIntraPredMode1;
    Else
        predCurrIntraPredMode = predCurrIntraPredMode2;
        if(prev_intra_pred_mode_flag == 1)
        {
            CurrIntraPredMode == predCurrIntraPredMode;
        }
    else
    {
        Decode rem_intra_pred_mode;
        if(rem_intra_pred_mode < predCurrIntraPredMode )
            CurrIntraPredMode = rem_intra_pred_mode;
        else
            CurrIntraPredMode = rem_intra_pred_mode + 1;
    }
}
```

The effects of the method are as described for the corresponding encoding procedure performed in the encoding device. As a further variation, pred_flag may be decoded without depending on whether or not rem_intra pred_mode is decoded in the intra prediction mode of the same position block of the C0 component. In this case, the intra prediction mode for the C0 component is always used as the prediction value candidate.

Specifically, the procedure is as follows:

```
        predCurrIntraPredMode1 = Min( IntraPredModeA,
        IntraPredModeB );
        predCurrIntraPredMode2 = CurrIntraPredMode_C0;
        Decode prev_intra_pred_mode_flag;
        Decode pred_flag;
    If( pred_flag == 0 )
            predCurrIntraPredMode = predCurrIntraPredMode1;
        Else
            predCurrIntraPredMode = predCurrIntraPredMode2;
            if(prev_intra_pred_mode_flag == 1)
            {
                CurrIntraPredMode == predCurrIntraPredMode;
            }
        else
        {
            Decode rem_intra_pred_mode;
            if(rem_intra_pred_mode < predCurrIntraPredMode )
                CurrIntraPredMode = rem_intra_pred_mode;
            else
                CurrIntraPredMode = rem_intra_pred_mode + 1;
        }
```

Note that, as described for the encoding device, pred_flag may be set for each macroblock or sequence instead of for each 4×4 block, included in the bit stream. When pred_flag is set for each macroblock, the use of the prediction value candidate 1 or the prediction value candidate 2 is common to all the 4×4 blocks in the macroblock. Therefore, overhead information of pred_flag to be decoded is further reduced. Moreover, pred_flag can be set for each sequence in order to determine the use of the prediction value candidate 1 or 2 according to the definition of the input color space. In this case, since pred_flag is no longer required to be transmitted for each macroblock, the overhead information can be further reduced.

Fourth Embodiment

Figure 24:
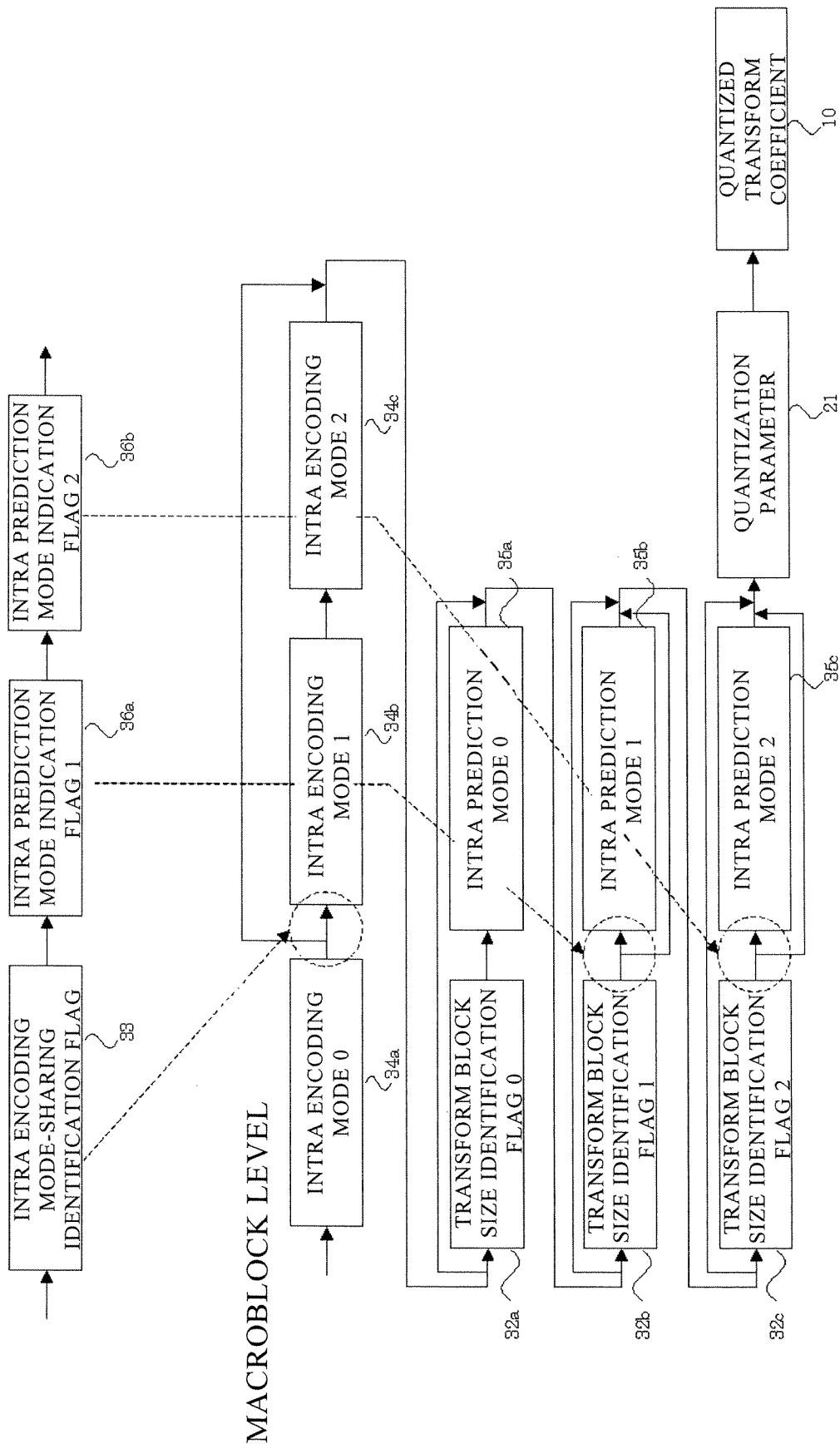
FIG. 24 is an explanatory view illustrating another data sequence of the video bit stream output from the video encoding device in the fourth embodiment.

The bit stream in the form illustrated in FIG. 16 has been described in the second embodiment of the present invention. The second embodiment of the invention describes that, when the intra encoding mode indicates "intra N×N prediction," the respective intra prediction modes of the color components C0, C1, and C2 are recognized as the intra 4×4 prediction mode or the intra 8×8 prediction mode according to the values of the transformation block size identification flags 0 to 2 (32a to 32c). In the fourth embodiment of the present invention, the bit stream sequence is changed to transmit intra prediction mode indication flags 1 and 2 (36a and 36b) at the sequence level for the C1 and C2 components, as illustrated in FIG. 24. The intra prediction mode indication flag is valid when the intra N×N prediction mode is selected as the intra encoding mode and the transformation block size identification flag indicates the 4×4 block transform, specifically, in the intra 4×4 prediction mode. According to the value of the intra prediction mode indication flag, switching can be performed between the following two states.

State 1: for the C1 or C2 component, the intra 4×4 prediction mode to be used is individually selected from the nine modes illustrated in FIG. 3 for encoding.

State 2: for the C1 or C2 component, the intra 4×4 prediction mode to be used is limited to the DC prediction, specifically, intra4×4_pred_mode=2 of FIG. 3 not to encode the intra prediction mode information.

For example, when the encoding is performed in the color space as defined by Y, Cb, and Cr, the 4×4 block corresponds to an extremely small image area in a case of a high-resolution video image such as that for an HDTV or at a higher resolution level. In this case, the encoding is sometimes more efficiently performed by fixing the prediction mode information itself to one without transmitting the prediction mode information corresponding to the overhead information than by providing the nine prediction mode options, in particular, for the component which does not maintain the texture structure of the image such as the components Cb and Cr. Such a bit stream sequence enables the optimal encoding according to the properties of an input color space or the characteristics of a video image.

The decoding device which receives the bit stream in the form illustrated in FIG. 24 is configured to decode the intra prediction mode indication flag (36a or 36b) in the variable length decoding unit 25 and then to identify whether the bit stream has been encoded in the state 1 or 2 depending on a value of the flag. Depending on the identified state, for the C1 or C2 component, it is determined whether the intra 4×4 prediction mode is decoded from the bit stream for the use, or the DC prediction, that is, intra4×4_pred_mode=2 of FIG. 3 is fixedly used.

Moreover, in the fourth embodiment of the present invention, the intra prediction mode to be used is limited to: intra4×4_pred_mode=2 for the C1 or C2 component in the state 2.

However, as long as the number of prediction mode information is fixed to one, the intra prediction may be fixed to another prediction mode in the state 2. Moreover, the state 2 may be defined to use the intra 4×4 prediction mode of the C0 component for the C1 or C2 component. Since the intra 4×4 prediction mode is not required to be encoded for the C1 or C2 component even in this case, overhead bits can be reduced.

Fifth Embodiment

The fifth embodiment of the present invention describes another example of the configurations of the encoding device illustrated in FIG. 11 and the decoding device illustrated in FIG. 12. As in the cases of the other embodiments described above, the encoding device and the decoding device in the fifth embodiment of the invention are provided with characteristics specific to the present invention based on the encoding method employed in the MPEG-4 AVC (ISO/IEC 14496-10)/ITU-T H.264 standard corresponding to Non-patent Document 1 cited above. The video encoding device in the fifth embodiment of the invention differs from the encoding device of FIG. 11 described in the second and third embodiments of the invention only in the operation of the variable length encoding unit 11. The video decoding device in the fifth embodiment of the invention differs from the decoding device of FIG. 12 described in the second and third embodiments of the invention only in the operation of the variable length decoding unit 25. The remaining operation is the same as that in the second and third embodiments of the invention, and only differences with the above-mentioned embodiments will be described below.

Figure 25:
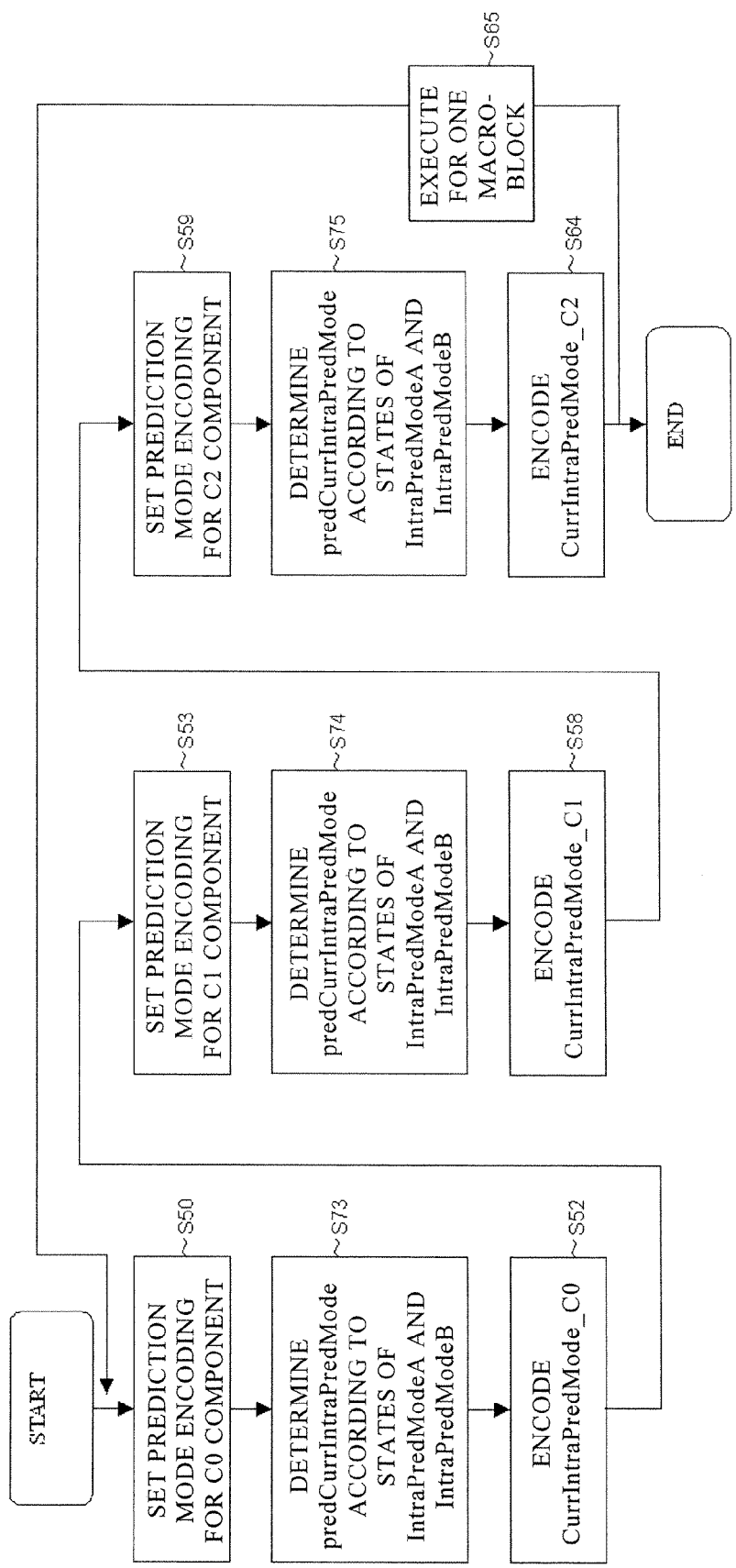
FIG. 25 is a flowchart illustrating another flow of the intra prediction mode encoding process in a fifth embodiment.

1. Encoding Procedure of the Intra Prediction Mode Information in the Encoding Device In the encoding device in the third embodiment of the present invention, the specific encoding method of the intra N×N prediction mode in the variable length encoding unit 11 has been described for the bit stream in the form illustrated in FIG. 16. In the fifth embodiment of the present invention, another specific method of the encoding procedure will be described. The fifth embodiment of the invention is characterized in that the following adaptive prediction method is provided. This method focuses attention on a value of the intra N×N prediction mode, which reflects the texture structure as an image pattern, to perform an adaptive prediction for the neighboring pixel areas of the same color component. The following description is premised on the bit stream sequence in the form illustrated in FIG. 16. In the fifth embodiment of the invention, the intra N×N prediction mode information of each of the color components C0, C1, and C2 is independently encoded, and the encoding method for the C0 color component is similarly applied to the color C1 and C2 components. Therefore, for the simplification of the description, only the encoding method for the C0 color component will be described. The value of the intra encoding mode-sharing identification flag 33 is set to "use a common intra encoding mode for C0, C1, and C2," and the intra encoding mode is the intra N×N prediction mode and the transformation block size identification flags 0 to 2 (32a to 32c) are the 4×4 block. In this case, all the intra-prediction modes 0 to 2 (35a to 35c) are the intra 4×4 prediction mode. As the drawings for illustrating the encoding procedure of the intra N×N prediction mode information of the C0 component, FIG. 18 are used. In FIG. 18, a current macroblock to be encoded is denoted by X. A macroblock on the left of the macroblock X is denoted by A, whereas a macroblock above the macroblock X is denoted by B. FIG. 25 is a flowchart of the encoding procedure.

In the third embodiment of the present invention, the smaller value of IntraPredModeA and IntraPredModeB is uniquely allocated as the prediction value, predCurrIntraPredMode, for the intra 4×4 prediction mode, CurrIntraPredMode, which is allocated to each 4×4 block X in FIG. 18. This method is employed in the current AVC/H.264 standard. According to this method, as the value of the intra N×N prediction mode increases, the prediction image generating method is operated in a complicated mode with pixel interpolation in consideration of the directionality of the image pattern. This complication results from the fact that a small value is allocated to the mode which is highly compatible with a general image pattern. When a bit rate is low, the mode selection is more greatly affected by an increment of the amount of codes of the prediction mode than by an incremental distortion. Therefore, this method is still advantageous in view of the overall encoding efficiency. However, when the bit rate is relatively high, the mode selection is more greatly affected by the incremental distortion than by the increment of the amount of codes of the prediction mode. Therefore, it does not necessarily mean that the smaller value of IntraPredModeA and IntraPredModeB is always optimal. Based on the observation as described above, in the fifth embodiment of the present invention, the setting of the prediction value is adapted according to the states of IntraPredModeA and IntraPredModeB as described below to improve the accuracy of the prediction value. In this procedure, predCurrIntraPredMode is determined based on the states of IntraPredModeA and IntraPredModeB as a value providing the best estimation of CurrIntraPredMode in terms of the image pattern (Steps S73, S74, and S75).

(1) When both IntraPredModeA and IntraPredModeB fall within the range of 0 to 2, MIN(IntraPredModeA, IntraPredModeB) is determined as predCurrIntraPredMode.

(2) When any one of IntraPredModeA and IntraPredModeB is 3 or larger and the prediction directions of IntraPredModeA and IntraPredModeB are completely different from each other (e.g., IntraPredModeA is 3 and IntraPredModeB is 4), the DC prediction (intra4×4_pred_mode=2) is determined as predCurrIntraPredMode.

(3) When any one of IntraPredModeA and IntraPredModeB is 3 or larger and the prediction directions of IntraPredModeA and IntraPredModeB are the same (e.g., IntraPredModeA is 3 and IntraPredModeB is 7 (any one of the prediction directions is a prediction from the upper right)), a pixel interpolating prediction mode (7 in the above-mentioned example) is determined as predCurrIntraPredMode.

As in the third embodiment of the present invention, a preparatory process for encoding IntraPredModeA and IntraPredModeB is performed in advance (Steps S50, S53, and S59). As a result, predCurrIntraPredMode is uniquely derived from the values of IntraPredModeA and IntraPredModeB. FIG. 26 illustrate tables showing a prediction value setting rule. In FIG. 26, a hatched area corresponds to the case which does not follow the conventional rule of MIN(IntraPredModeA, IntraPredModeB). In this case, a more accurate prediction value is determined based on the continuity of the image patterns. The table for Class 0 is used in the procedure (1) described above, whereas the table for Class 1 is used in the procedures (2) and (3).

As the result of the above process, after the determination of predCurrIntraPredMode, the remaining encoding procedure for the C0 color component described in the third embodiment of the invention is executed to complete the encoding (Steps S52, S58, and S64).

Specifically, the encoding procedure is as follows:

```
if(CurrIntraPredMode == predCurrIntraPredMode)
{
    prev_intra_pred_mode_flag = 1;
}
else
{
    prev_intra_pred_mode_flag = 0;
    if( CurrIntraPredMode < predCurrIntraPredMode)
        rem_intra_pred_mode = CurrIntraPredMode;
    else
        rem_intra_pred_mode = CurrIntraPredMode − 1;
}
Encode prev_intra_pred_mode_flag;
If(prev_intra_pred_mode_flag == 0)
    Encode rem_intra_pred_mode;
```

The above-mentioned encoding procedure can be similarly defined for the intra 8×8 prediction mode. By encoding the intra N×N prediction mode in such a procedure, the correlation between the prediction modes in the neighboring pixel areas of the same color component can be more efficiently used to reduce the amount of codes of the prediction mode itself, thereby improving the encoding efficiency.

2. Decoding Procedure of the Intra Prediction Mode Information in the Decoding Device In the decoding device in the third embodiment of the present invention, one of the specific decoding procedures of the information of the intra N×N prediction mode in the variable length decoding unit 25 has been described for the bit stream in the form illustrated in FIG. 16. In the fifth embodiment of the invention, another specific method of the decoding procedure will be described. The fifth embodiment of the invention is particularly characteristic in the following decoding procedure. The decoding procedure focuses attention on the value of the intra N×N prediction mode, which reflects the structure of the texture as the image pattern, to decode the bit stream which is encoded by the adaptive prediction in the neighboring pixel areas of the same color component.

The following description is premised on the bit stream sequence in the form illustrated in FIG. 16. For the simplification of the description, the value of the intra encoding mode-sharing identification flag 33 in the bit stream is set to "use a common intra encoding mode for C0, C1, and C2." In addition, the intra N×N prediction mode is designated as the intra encoding mode, and the 4×4 block size is designated as the transformation block size identification flags 0 to 2 (32a to 32c). In this case, all the intra-prediction modes 0 to 2 (35a to 35c) are the intra 4×4 prediction mode. As in the encoding device, in the decoding device, only the C0 component will be described based on the relation illustrated in FIG. 18 (the C1 and C2 components are decoded in the same procedure, independently of the C0 component). In the decoding device, a current macroblock to be decoded is denoted by X. A macroblock on the left of the macroblock X is denoted by A, whereas a macroblock above the macroblock X is denoted by B.

In the third embodiment of the present invention, as described for the encoding device, the smaller value of IntraPredModeA and IntraPredModeB is uniquely allocated as the prediction value, predCurrIntraPredMode, for the intra 4×4 prediction mode, CurrIntraPredMode, which is allocated to each 4×4 block X in FIG. 18. On the other hand, in the decoding device according to the fifth embodiment of the invention, predCurrIntraPredMode is determined by using the tables illustrated in FIG. 26 in exactly the same procedure as the encoding procedure. Since IntraPredModeA and IntraPredModeB have already been decoded and therefore are known, it is possible to perform exactly the same process as that of the encoding procedure.

The subsequent procedure is equivalent to the decoding procedure of the C0 component described in the third embodiment of the present invention. The procedure is summarized as follows.

```
Decode prev_intra_pred_mode_flag;
if(prev_intra_pred_mode_flag == 1)
{
    CurrIntraPredMode == predCurrIntraPredMode;
}
else
{
    Decode rem_intra_pred_mode;
    if(rem_intra_pred_mode < predCurrIntraPredMode )
        CurrIntraPredMode = rem_intra_pred_mode;
    else
        CurrIntraPredMode = rem_intra_pred_mode + 1;
}
```

The above-mentioned decoding procedure can be similarly defined for the intra 8×8 prediction mode. By decoding the intra N×N prediction mode in the procedure as described above, the correlation between the prediction modes in the neighboring pixel areas of the same color component can be more efficiently used to decode the encoded bit stream with the reduced amount of codes of the prediction mode itself.

The tables in FIG. 26 are used in a fixed manner to determine predCurrIntraPredMode for performing the encoding and the decoding in the above-mentioned example, whereas the encoding and the decoding may be performed by using values of the tables in FIG. 26 as initial values to sequentially update the intra prediction mode, which is most likely to occur for the states of IntraPredModeA and IntraPredModeB, as predCurrIntraPredMode. For example, for the combination of "Class=0, IntraPredModeA=0, IntraPredModeB=0, and predCurrIntraPredMode=0" in FIG. 26, predCurrIntraPredMode is always set to 0 when IntraPredModeA=0 and IntraPredModeB=0 in the above-mentioned embodiment. However, since the video signal itself is a non-stationary signal, there is no guarantee that this combination is the best for all the contents of the video image. At worst, there is even a possibility that appropriate predCurrIntraPredMode is not found as the prediction value in almost all the cases throughout the entire video image. Therefore, for example, the frequency of occurrences of CurrIntraPredMode in a case of IntraPredModeA=0 and IntraPredModeB=0 is counted. Each time the encoding or the decoding of CurrIntraPredMode is terminated, predCurrIntraPredMode is updated with the prediction mode which the most frequently occurs for the states of IntraPredModeA and IntraPredModeB. With such a configuration, the prediction value used for encoding and decoding CurrIntraPredMode can be set to the optimal value in view of the contents of a video image.

Sixth Embodiment

The sixth embodiment of the present invention describes another example of the configurations of the encoding device illustrated in FIG. 11 and the decoding device illustrated in FIG. 12. As in the other embodiments described above, the encoding device and the decoding device in the sixth embodiment of the invention are provided with characteristics specific to the present invention based on the encoding method employed in Non-patent Document 1 cited above. The video encoding device in the sixth embodiment of the invention differs from the encoding device illustrated in FIG. 11 in the second, third, and fifth embodiments of the invention only in the operation of the variable length encoding unit 11. The video decoding device in the sixth embodiment of the invention differs from the decoding device illustrated in FIG. 12 in the second, third, and fifth embodiments of the invention only in the operation of the variable length decoding unit 25. The remaining operation is the same as that in the second, third, and fifth embodiments of the invention, and only differences with the above-mentioned embodiments will be described below.

Figure 27:
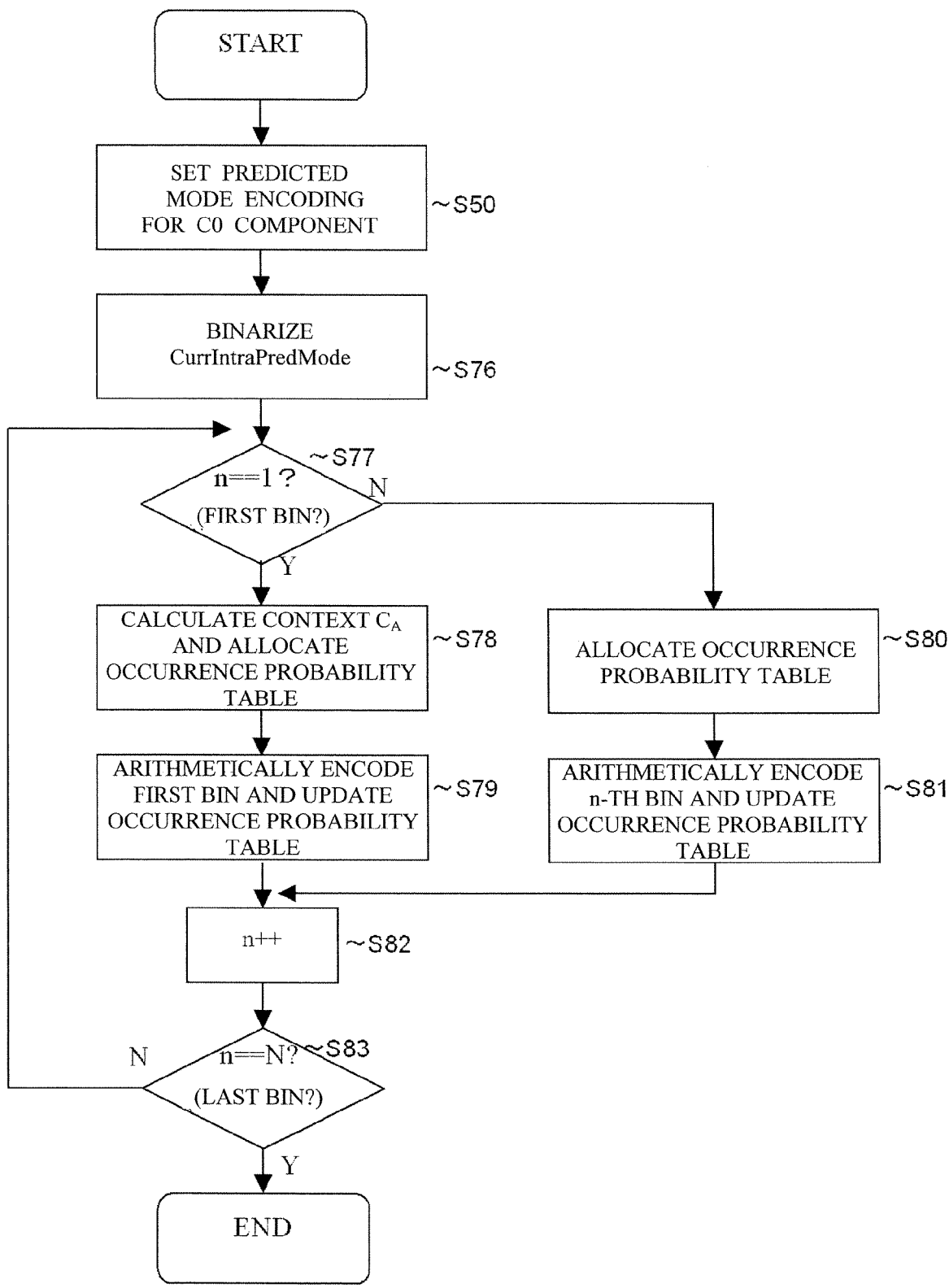
FIG. 27 is a flowchart illustrating an encoding procedure in a sixth embodiment.

1. Encoding Procedure of the Intra Prediction Mode Information in the Encoding Device In the encoding device in the third or fifth embodiment of the present invention, the specific encoding method of the intra N×N prediction mode information has been described for the bit stream in the form illustrated in FIG. 16. In the sixth embodiment, another specific method of the encoding procedure will be described. This sixth embodiment is particularly characteristic in that the following adaptive arithmetic coding method is provided. This method focuses attention on the value of the intra N×N prediction mode which reflects the texture structure as an image pattern to perform adaptive arithmetic coding for the neighboring pixel areas of the same color component. The following description is premised on the bit stream sequence in the form illustrated in FIG. 16. In the sixth embodiment, the intra N×N prediction mode information of each of the color components C0, C1, and C2 is independently encoded, and the encoding method for the C0 color component is applied similarly to the C1 and C2 color components. Therefore, for the simplification of the description, only the encoding method for the C0 color component will be herein described. The value of the intra encoding mode-sharing identification flag 33 is set to "use a common intra encoding mode for C0, C1, and C2," and the intra encoding mode is set to the intra N×N prediction mode, and the transformation block size identification flags 0 to 2 (32a to 32c) indicate the 4×4 block. In this case, the intra-prediction modes to 2 (35a to 35c) are all the intra 4×4 prediction mode. As the drawings for illustrating the encoding procedure of the intra N×N prediction mode information of the C0 component, FIG. 18 are used. In FIG. 18, a current macroblock to be encoded is denoted by X. A macroblock on the left of the macroblock X is denoted by A, whereas a macroblock above the macroblock X is denoted by B. FIG. 27 is a flowchart of the encoding procedure.

In the third and fifth embodiments of the present invention, the smaller value of IntraPredModeA and IntraPredModeB is uniquely allocated as the prediction value, predCurrIntraPredMode, for the intra 4×4 prediction mode, CurrIntraPredMode, which is allocated to each 4×4 block X of FIG. 18. According to this method, when the prediction value and CurrIntraPredMode are equal to each other, prev_intra_pred_mode_flag is set to 1 and the encoding of the intra 4×4 prediction mode for the block X is terminated. On the other hand, when the prediction value and CurrIntraPredMode are different from each other, rem_intra_pred_mode is encoded to be transmitted. In the sixth embodiment, the states of IntraPredModeA and IntraPredModeB are used to directly arithmetically encode CurrIntraPredMode. For the direct arithmetic coding, an encoding procedure according to context-based adaptive binary arithmetic coding, which is employed in AVC/H.264 standard, is used.

First, CurrIntraPredMode to be encoded is binarized according to a form illustrated in FIG. 28 (Step S76). A first bin in a binary sequence serves as a code for determining whether CurrIntraPredMode indicates a vertical prediction or a horizontal prediction (see FIG. 3). The DC prediction (intra4×4_pred_mode=2) is classified as the horizontal prediction in this example, but the DC prediction may also be classified as the vertical prediction. A second bin provides a Terminate bit for the prediction mode value which is considered to most frequently appear in each of the vertical prediction and the horizontal prediction. Third and subsequent bins are set to successively terminate the remaining prediction mode values in the order of higher appearance frequencies (it is desirable that the second and subsequent bins in the binary sequence in FIG. 28 be set according to a symbol occurrence probability in the actual image data encoding process).

The arithmetic coding is performed while a (0,1) occurrence probability table to be used is sequentially selected for each of the bins in the binary sequence. For encoding the first bin, a context used for the arithmetic coding is defined as follows (Step S78).

Context $A(C_A)$: a flag, intra_pred_direction_flag, which is a binary representation indicating whether the intra prediction mode is the vertical prediction or the horizontal prediction, is defined for IntraPredModeA and IntraPredModeB, and the following four states are used as context values.

$$C_A(\text{intra\_pred\_direction\_flag for IntraPredMode}A == 1) + (\text{intra\_pred\_direction\_flag for IntraPredMode}B == 1)$$

where intra_pred_direction_flag is classified as the vertical prediction (=0) when, for example, intra4×4_pred_mode is 0, 3, 5, or 7 in FIG. 3, and is classified as the horizontal prediction (=1) when intra4×4_pred_mode is 1, 2, 4, 6, or 8. For each of the four states of $C_A$, a conditional probability of CurrIntraPredMode on the premise of the states of IntraPredModeA and IntraPredModeB is obtained in advance. Then, a (0,1) initial occurrence probability table defined based on the obtained conditional probability is allocated to each of the four states. By configuring the context in this manner, a better estimation of the conditional occurrence probability of the first bin is obtained to enhance the efficiency of arithmetic coding. The occurrence probability table for the first bin is selected based on the value of $C_A$ to execute the arithmetic coding. Then, the occurrence probability table is updated with the encoded value (Step S79).

To the second and subsequent bins, the (0, 1) initial occurrence probability table determined based on the occurrence probability of each prediction mode value is allocated in advance (Step S80). Subsequently, as for the first bin, the binary arithmetic coding and the occurrence probability table update are performed (Step S81).

The above-mentioned encoding procedure can be defined in the same manner for the intra 8×8 prediction mode. By encoding the intra N×N prediction mode in the procedure as described above, the adaptive arithmetic coding can be used for encoding the prediction mode information by taking advantage of the correlation between the prediction modes in the neighboring pixel areas of the same color component, thereby improving the encoding efficiency.

2. Decoding Procedure of the Intra Prediction Mode Information in the Decoding Device In the decoding device in the third and fifth embodiments of the present invention, one of the specific decoding procedures of the information of the intra N×N prediction mode in the variable length decoding unit 25 has been described for the bit stream in the form illustrated in FIG. 16. In the sixth embodiment of the invention, another specific method of the decoding procedure will be described. The sixth embodiment of the invention is particularly characteristic in the following decoding procedure. The decoding procedure focuses attention on the value of the intra N×N prediction mode which reflects the structure of the texture as the image pattern to decode the bit stream which is encoded by adaptive arithmetic coding in the neighboring pixel areas of the same color component.

The following description is premised on the bit stream sequence in the form illustrated in FIG. 16. For the simplification of the description, the value of the intra encoding mode-sharing identification flag 33 in the bit stream is set to "use a common intra encoding mode for C0, C1, and C2." In addition, the intra N×N prediction mode is designated as the intra encoding mode, and the 4×4 block size is indicated by the transformation block size identification flags 0 to 2 (32a to 32c). In this case, the intra-prediction modes 0 to 2 (35a to 35c) are all the intra 4×4 prediction mode. As in the case of the encoding device, in the decoding device, the decoding procedure will be described only for the C0 component based on the relation illustrated in FIG. 18 (the C1 and C2 components are decoded in the same procedure, independently of the C0 component). In the decoding device, a current macroblock to be decoded is denoted by X. A macroblock on the left of the macroblock X is denoted by A, whereas a macroblock above the macroblock X is denoted by B.

In the third and fifth embodiments of the present invention, as described for the encoding device, the smaller value of IntraPredModeA and IntraPredModeB is uniquely allocated as the prediction value, predCurrIntraPredMode, for the intra 4×4 prediction mode, CurrIntraPredMode, which is allocated to each 4×4 block X in FIG. 18. Then, prev_intra_pred_mode_flag is decoded. When the value of the decoded prev_intra_pred_mode_flag is 1, predCurrIntraPredMode is used as CurrIntraPredMode. On the other hand, when prev_intra_pred_mode_flag is 0, rem_intra_pred_mode is decoded to restore the intra 4×4 prediction mode of the block X. On the other hand, in the sixth embodiment of the present invention, the states of IntraPredModeA and IntraPredModeB are used to directly arithmetically decode CurrIntraPredMode. For direct arithmetic decoding, a decoding procedure according to context-based adaptive binary arithmetic decoding, which is employed in the AVC/H.264 standard, is used.

It is assumed that CurrIntraPredMode to be decoded is encoded as a binary sequence according to the form illustrated in FIG. 28. The binary sequence is successively subjected to binary arithmetic decoding from its left end. As described in the encoding procedure in the sixth embodiment of the present invention, the first bin in the binary sequence is a code for classifying CurrIntraPredMode as the vertical prediction or the horizontal prediction (see FIG. 3). The second and subsequent bins have code structures to successively terminate the prediction mode values in the order of a higher appearance frequency. The reason for such a code structure is as described in the encoding procedure.

In the decoding process, for decoding the first bin, the same $C_A$ as that of the context used in the encoding procedure is determined. The occurrence probability table for the first bin is selected based on the value of $C_A$ to execute the arithmetic decoding, thereby restoring the first bin. Moreover, the occurrence probability table is updated with the decoded value.

To the second and subsequent bins, the (0, 1) initial occurrence probability table determined based on the occurrence probability of each prediction mode value is allocated in advance. Subsequently, as for the first bin, the binary arithmetic decoding and the occurrence probability table update are performed. Since the binary sequence in FIG. 28 is configured to enable each of the prediction mode values to be uniquely specified, CurrIntraPredMode is sequentially decoded after a predetermined number of bins are restored.

The above-mentioned decoding procedure can be similarly defined for the intra 8×8 prediction mode. By decoding the intra N×N prediction mode in the procedure as described above, the encoded bit stream can be decoded with the amount of codes of the prediction mode itself being reduced by the arithmetic coding, taking advantage of the correlation between the prediction modes in the neighboring pixel areas of the same color component.

In the above-mentioned example, other variations of the table illustrated in FIG. 28 are conceivable. For example, a method of configuring a binary sequence as illustrated in FIG. 29 is possible. According to this method, the following context B is used for the first bin.

Context $B(C_B)$: a flag, intra_dc_pred_flag, which is a binary representation indicating whether the intra prediction mode is the DC prediction or not, is defined for IntraPredModeA and IntraPredModeB, and the following four states are used as context values.

$$C_B = (\text{intra\_dc\_pred\_flag for IntraPredMode}A == 1) + (\text{intra\_dc\_pred\_flag for IntraPredMode}B == 1)$$

where intra_dc_pred_flag is set to 1 when intra4×4_red_mode is 2 in FIG. 3, and is set to 0 when intra4×4_red_mode is any other value. For each of the four states of $C_B$, a conditional probability of CurrIntraPredMode on the premise of the states of IntraPredModeA and IntraPredModeB is obtained in advance. Then, the (0,1) initial occurrence probability table for the first bin defined based on the obtained conditional probability is allocated to each of the four states. In FIG. 29, when CurrIntraPredMode is the DC prediction, the first bin is designed to have a value 0. When CurrIntraPredMode is not the DC prediction, the first bin is designed to have a value 1. For the second bin, the above-mentioned context $A(C_A)$ is used. By configuring the context in this manner, a better estimation of the conditional occurrence probability for any one of the first bin and the second bin can be obtained to enhance the efficiency of arithmetic coding.

Seventh Embodiment

In the seventh embodiment of the present invention, an encoding device which performs encoding using inter-frame prediction in units of rectangular areas (macroblocks), each being composed of 16×16 pixels, obtained by equally dividing a video frame input in the 4:4:4 format, and a decoding device corresponding to the encoding device will be described. The encoding device and the decoding device in the seventh embodiment of the invention are provided with characteristics specific to the present invention based on the encoding method employed in the MPEG-4 AVC (ISO/1EC 14496-10)/ITU-T H.264 standard (hereinafter, referred to simply as AVC).

Figure 30:
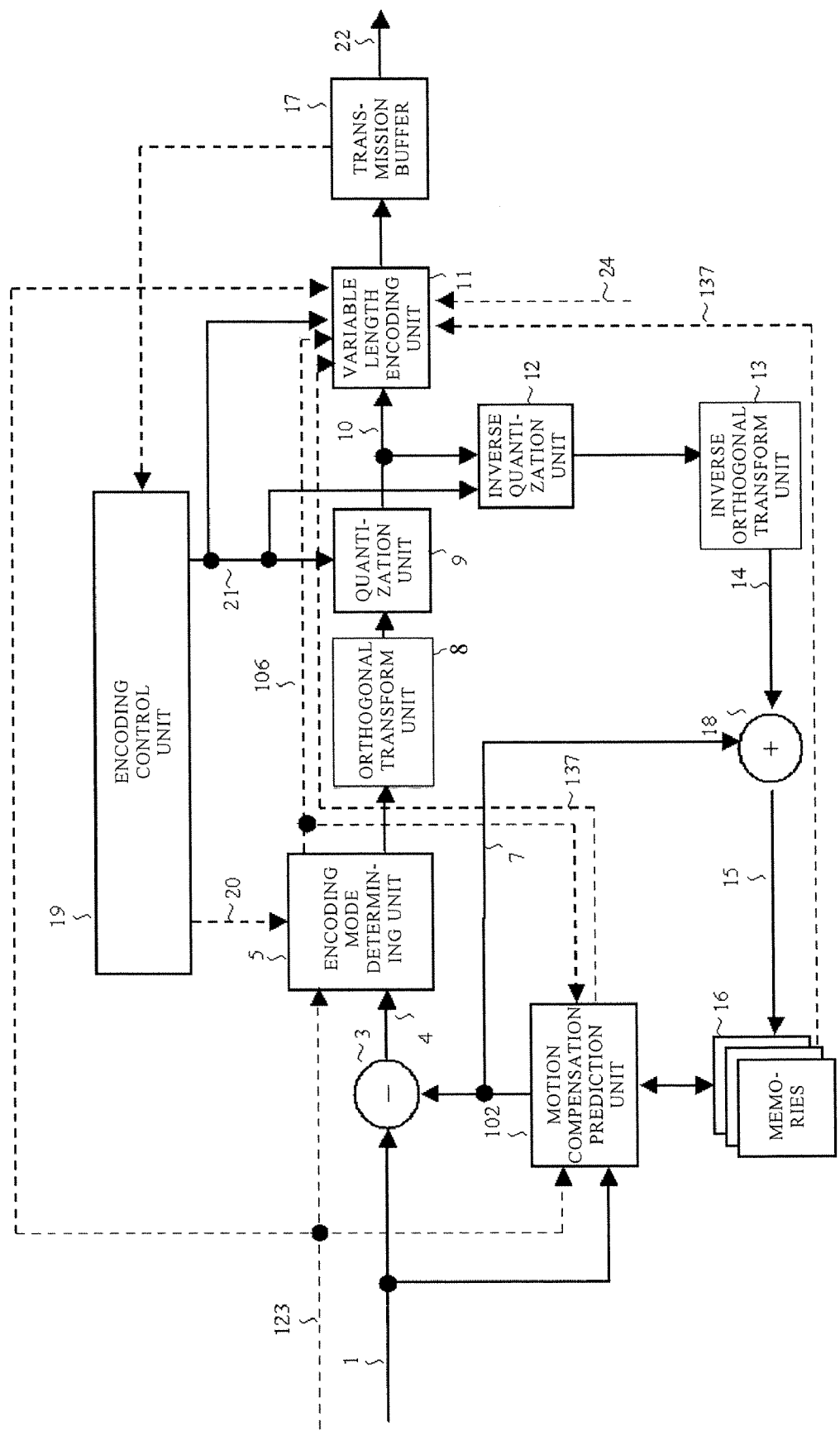
FIG. 30 is an explanatory view illustrating a configuration of the video encoding device in a seventh embodiment.
Figure 31:
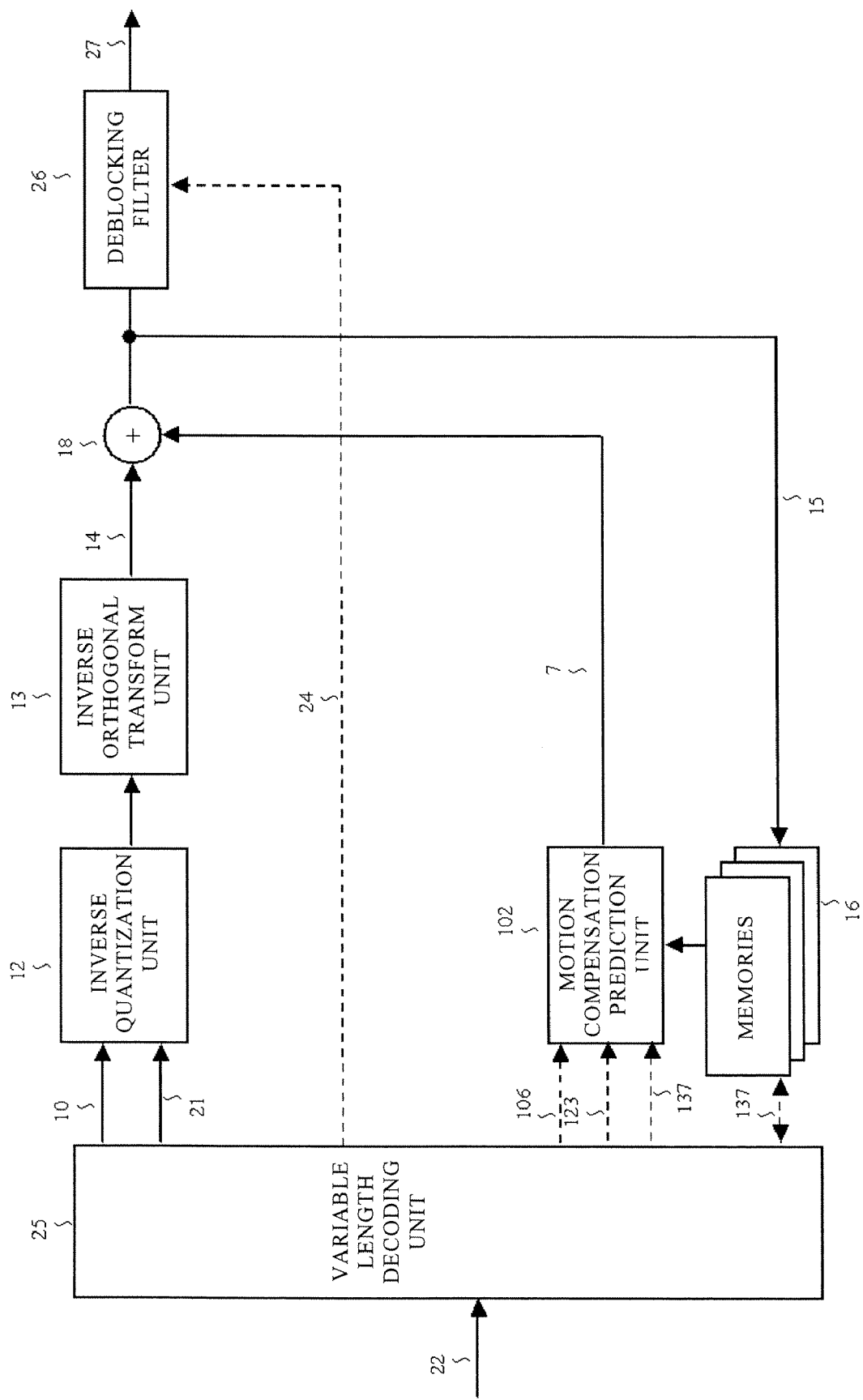
FIG. 31 is an explanatory view illustrating a configuration of the video decoding device in the seventh embodiment.

FIG. 30 illustrates a configuration of a video encoding device in the seventh embodiment of the invention, and FIG. 31 illustrates a video decoding device in the seventh embodiment of the invention. In FIG. 31, the components denoted by the same reference numerals as those of the encoding device illustrated in FIG. 30 are the same components.

Hereinafter, the operations of the entire encoding device and decoding device in the seventh embodiment, and an inter prediction mode determining process and a motion compensation prediction decoding process, which are specific operations according to the seventh embodiment, will be described based on FIGS. 30 and 31.

1. Outline of Operation of the Encoding Device

In the encoding device illustrated in FIG. 30, each video frame is input in the 4:4:4 format. Moreover, each of three color components is divided and gathered into the macroblock having the same size to be input to the encoding device as the input video signal 1.

First, in a motion compensation prediction unit 102, a one-frame reference image is selected from motion compensation prediction reference image data for one frame or more, which is stored in the memories 16, to perform a motion-compensation predicting process in units of the macroblocks for each of the color components. Three memories are prepared for the respective color components (the number of memories is described as three in this embodiment, but the number of memories may be appropriately changed according to the design). Seven block sizes are prepared for a motion compensation prediction. First, for each macroblock, any one of 16×16, 16×8, 8×16, and 8×8 sizes can be selected as illustrated in FIGS. 32A to 32D. Further, in the case of selection of the 8×8 size, any one of 8×8, 8×4, 4×8, and 4×4 sizes can be selected for each of the 8×8 blocks as illustrated in FIGS. 32E to 32H. As the information of the selected size, size information for each macroblock is output as a macroblock type, whereas size information for each 8×8 block is output as a sub-macroblock type. An identification number and motion vector information of the selected reference image are output for each block.

The video encoding device in the seventh embodiment of the present invention is characterized in that the motion compensation prediction method is switched for each of the three color components based on an inter prediction mode-sharing identification flag 123. This regard will be described in detail in the section 2 below.

The motion compensation prediction unit 102 executes the motion compensation predicting process for all the block sizes or sub-block sizes illustrated in FIGS. 32A to 32H, all motion vectors 137 within a predetermined search range, and one or more selectable reference image(s) to obtain a prediction difference signal 4 from the motion vectors 137 and the single reference image in the subtracter 3. The prediction efficiency of the prediction difference signal 4 is evaluated in the encoding mode determining unit 5. Then, through the prediction process executed in the motion compensation prediction unit 102, the macroblock type/sub-macroblock type 106, the motion vector 137, and the identification number of the reference image, which can provide the optimal prediction efficiency for the macroblock to be predicted, are output. For the selection of the macroblock type/sub-macroblock type 106, the weighting coefficient 20 for each type determined by the determination of the encoding control unit 19 is taken into consideration in some cases. The prediction difference signal 4, which is obtained by the motion compensation prediction based on the selected macroblock/sub-macroblock type, motion vector 137, and reference image, is output to the orthogonal transform unit 8. The orthogonal transform unit 8 transforms the input prediction difference signal 4 into an orthogonal transform coefficient to output the obtained orthogonal transform coefficient to the quantization unit 9. The quantization unit 9 quantizes the input orthogonal transform coefficient based on the quantization parameter 21 determined by the encoding control unit 19 to output the result of quantization as the quantized transform coefficient 10 to the variable length encoding unit 11. The quantized transform coefficient 10 is entropy-coded by means such as Huffman-encoding or arithmetic coding in the variable length encoding unit 11. The quantized transform coefficient 10 passes through the inverse quantization unit 12 and the inverse orthogonal transform unit 13 to be restored to the local decoded prediction difference signal 14. Then, the local decoded prediction difference signal 14 is added to the predicted image 7 generated based on the selected macroblock type/sub-macroblock type 106, motion vector 137, and reference image, in the adder 18 to generate the local decoded image 15. The local decoded image 15 is stored in the memories 16 to be used for a subsequent motion compensation prediction process. Moreover, the deblocking filter control flag 24 indicating whether or not a deblocking filter is to be applied to the macroblock is also input to the variable length encoding unit 11 (the deblocking filter process itself is not required for the encoding process because the pixel data prior to the application of the deblocking filter is stored in the memories 16 in the prediction process executed in the motion compensation prediction unit 102, however, in the decoding device the deblocking filter is applied upon instruction of the deblocking filter control flag 24 to obtain the final decoded image).

The inter prediction mode-sharing identification flag 123, the quantized transform coefficient 10, the macroblock type/sub-macroblock type 106, the motion vector 137, the reference image identification number, and the quantization parameter 21, which are input to the variable length encoding unit 11, are arranged and shaped as a bit stream according to a predetermined rule (syntax) to be output to the transmission buffer 17. The transmission buffer 17 smoothes the bit stream according to the band of a transmission path to which the encoding device is connected or the reading velocity of a recording medium to output the bit stream as the video stream 22. The transmission buffer 17 outputs feedback information to the encoding control unit 19 according to the state of accumulation of the bit streams in the transmission buffer 17 to control the amount of codes generated in the encoding of subsequent video frames.

2. Inter Prediction Mode Determining Process in the Encoding Device

Figure 33:
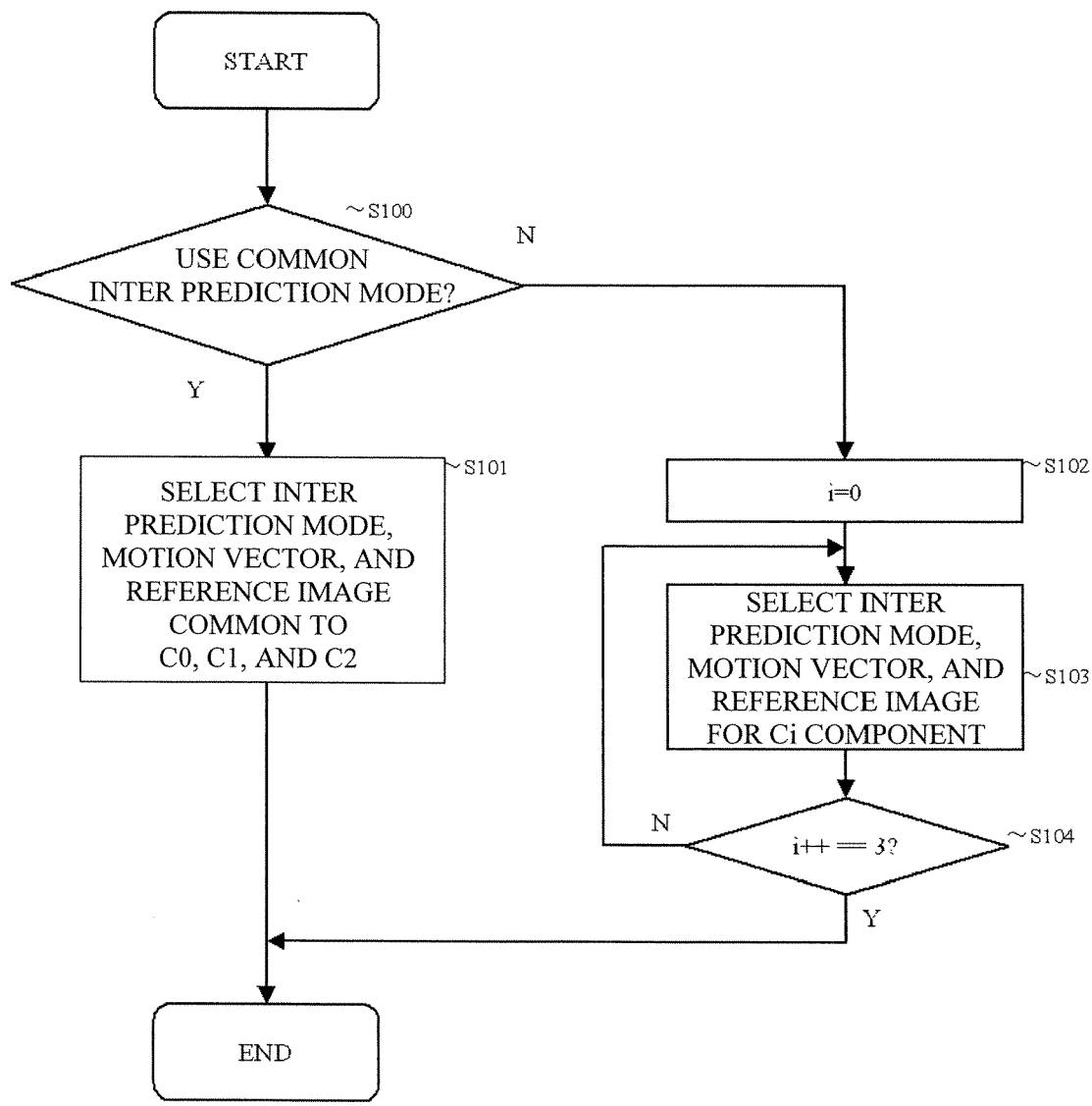
FIG. 33 is a flowchart illustrating a flow of the inter prediction mode determining process in the seventh embodiment.

The inter prediction mode determining process, which is a feature of the encoding device in the seventh embodiment of the present invention, will be described in detail. Note that the inter prediction mode in the following description denotes the block size serving as the unit of the motion compensation prediction described above, that is, the macroblock type/sub-macroblock type, and the inter prediction mode determining process is for selecting the macroblock type/sub-macroblock type, the motion vector, and the reference image. This process is executed on the macroblock basis, each macroblock being obtained by gathering the above-mentioned three color components, mainly by the motion compensation prediction unit 102 and the encoding mode determining unit 5 in the encoding device illustrated in FIG. 30. FIG. 33 is a flowchart illustrating a flow of this process. Hereinafter, image data of the three color components constituting the blocks are referred to as C0, C1, and C2, respectively.

First, the encoding mode determining unit 5 receives the inter prediction mode-sharing identification flag 123 to determine, based on a value of the inter prediction mode-sharing identification flag 123, whether or not the common inter prediction mode, the common motion vector 137, and the common reference image are used for C0, C1, and C2 (Step S100 of FIG. 33). If the common inter prediction mode, the common motion vector 137, and the common reference image are used, the process proceeds to Step S101 and the following steps. Otherwise, the process proceeds to Step S102 and the following steps.

When the inter prediction mode, the motion vector 137, and the reference image are common to C0, C1, and C2, the encoding mode determining unit 5 notifies the motion compensation prediction unit 102 of all the selectable inter prediction modes, motion vectors in the search range, and reference images. The motion compensation prediction unit 102 evaluates all the prediction efficiencies thereof to select the inter prediction mode, the motion vector 137, and the reference image common to and optimal for all the C0, C1, and C2 components (Step S101).

On the other hand, when the optimal mode is individually selected for each of C0, C1, and C2 without sharing the inter prediction mode, the motion vector 137, and the reference image between C0, C1, and C2, the encoding mode determining unit 5 notifies the motion compensation prediction unit 102 of all the inter prediction modes, the motion vectors in the search range, and the reference images selectable for the component Ci (i<=0<3). The motion compensation prediction unit 102 evaluates all the prediction efficiencies thereof to select the optimal inter prediction mode, the motion vector 137, and the reference image optimal for the component Ci (i<=0<3) (Steps S102, S103, and S104).

As a prediction efficiency evaluation norm of the prediction mode executed in the motion compensation prediction unit 102, for example, a rate-distortion cost given by:

$$Jm,v,r = Dm,v,r + \lambda Rm,v,r (\lambda: \text{a positive number})$$

can be used. In this expression, Dm,v,r is an encoding distortion or a prediction error amount when an inter prediction mode m, a motion vector v within a predetermined range, and a reference image r are used. The encoding distortion is obtained by obtaining a prediction error using the inter prediction mode m, the motion vector v, and the reference image r, decoding a video image from the result of transform and quantization of the prediction error, and then measuring an error with respect to a signal prior to the encoding. The prediction error amount is obtained by obtaining a difference between a predicted image and the signal prior to the encoding generated when the inter prediction mode m, the motion vector v, and the reference image r are used, and then quantifying the difference. For example, a sum of absolute distance (SAD) is used as the prediction error amount. Then, Rm,v,r is the amount of generated codes when the inter prediction mode m, the motion vector v, and the reference image r are used. Specifically, Jm,v,r is a value defining a tradeoff between the amount of codes and the degree of deterioration when the inter prediction mode m, the motion vector v, and the reference image r are used. The inter prediction mode m, the motion vector v, and the reference image r, which give the smallest Jm,v,r, provide the optimal solution.

When the encoding device executes the process after Step S101 and the following steps, one combination of information of the inter prediction mode, the motion vector 137, and the reference image is allocated to the macroblock containing three color components. On the other hand, when the encoding device executes the process after Step S102 and the following steps, the inter prediction mode information, the motion vector 137, and the reference image are allocated to each of the color components. Accordingly, since the information of the inter prediction mode, the motion vector 137, and the reference image, which is allocated to the macroblock, differs for each case, the inter prediction mode-sharing identification flag 123 is required to be multiplexed in the bit stream to enable the decoding device to recognize whether the encoding device has executed the process after S101 or the process after S102. A data sequence of such a bit stream is illustrated in FIG. 34.

Figure 34:
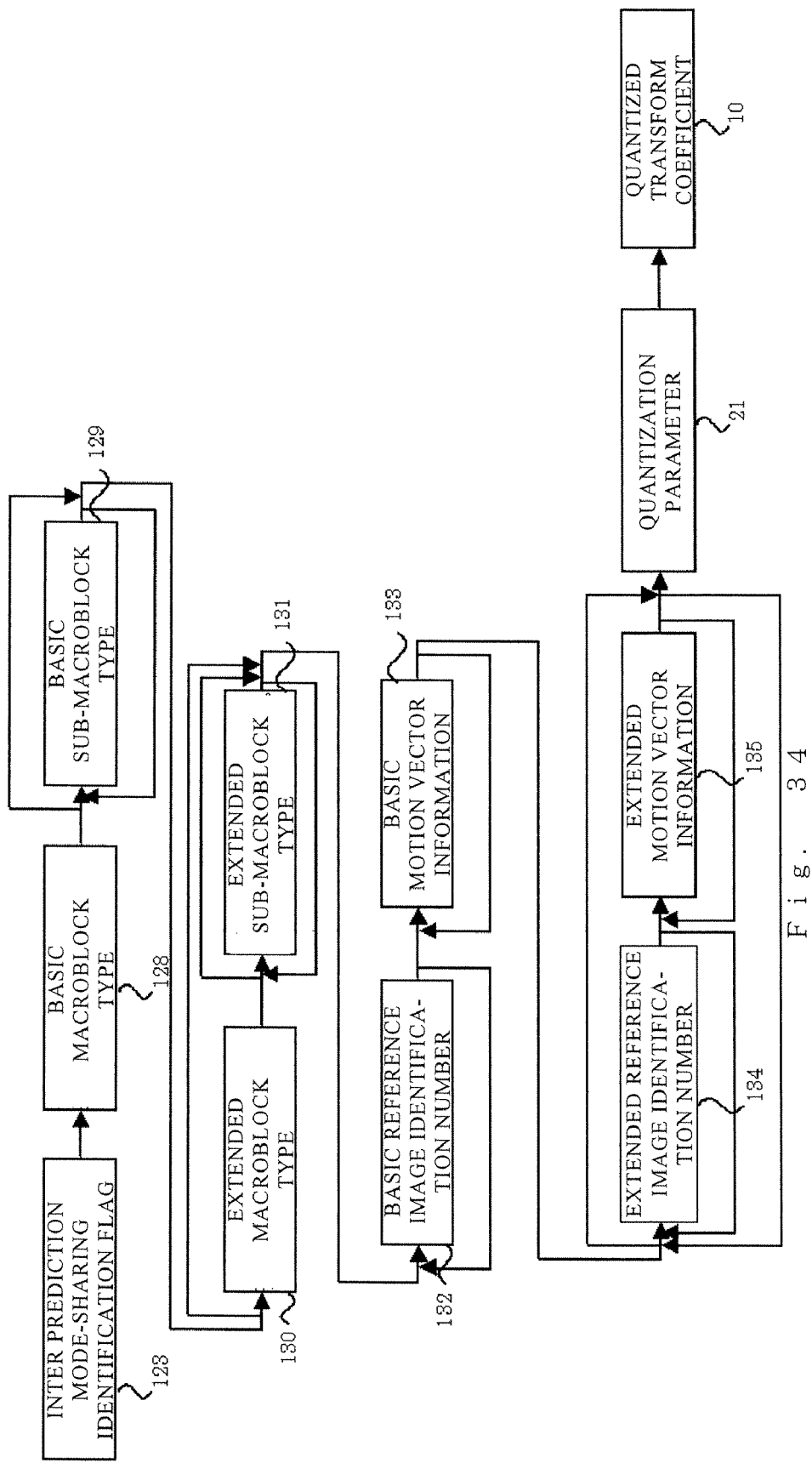
FIG. 34 is an explanatory view illustrating the data sequence of the video stream output from the video encoding device in the seventh embodiment.

FIG. 34 shows the data sequence of the bit stream at the macroblock level. The macroblock type contains information which indicates intra or inter prediction mode. When the macroblock type indicates the inter prediction mode, the information indicates the block size serving as the unit of motion compensation. The sub-macroblock type is multiplexed only when the 8×8 block size is selected as the macroblock type and contains block size information for each 8×8 block. A basic macroblock type 128 and a basic sub-macroblock type 129 each indicate a common macroblock type and a common sub-macroblock type when the inter prediction mode-sharing identification flag 123 indicates that the inter prediction mode is "common to C0, C1, and C2." Otherwise, the basic macroblock type 128 and the basic sub-macroblock type 129 indicate the macroblock type and the sub-macroblock type for C0. An extended macroblock type 130 and an extended sub-macroblock type 131 are multiplexed for each of C1 and C2 only when the inter prediction mode-sharing identification flag 123 indicates that the inter prediction mode is not "common to C0, C1, and C2," and indicate the macroblock type and the sub-macroblock type for C1 and C2.

The reference image identification number is information for specifying the reference image to be selected for each block of the 8×8 block size or larger serving as the unit of motion compensation. In the case of inter-frame mode, a selectable reference image is one-frame image. Therefore, one reference image identification number is multiplied for each block. One set of the motion vector information is multiplexed for each block serving as the unit of motion compensation. The number of the reference image identification numbers and the motion vector information which are multiplexed is required to correspond to that of the blocks contained in the macroblock, each block serving as the unit of the motion compensation. When the inter prediction mode-sharing identification flag 123 indicates that the mode is "common to C0, C1, and C2," the basic reference image identification number 132 and the basic motion vector information 133 are a common reference image identification number and common motion vector information. Otherwise, the basic reference image identification number 132 and the basic motion vector information 133 are the reference image identification number and the motion vector information for C0. The extended reference image identification number 134 and the extended motion vector information 135 are multiplexed for each of C1 and C2 only when the inter prediction mode-sharing identification flag 123 indicates that the mode is not "common to C0, C1, and C2," and are the reference image identification number and the motion vector information for C1 and C2.

Subsequently, the quantization parameter 21 and the quantized transform coefficient 10 are multiplexed (FIG. 34 does not illustrate the deblocking filter control flag 24 which is input to the variable length encoding unit 11 of FIG. 30, but the illustration thereof is herein omitted because the deblocking filter control flag 24 is not an essential component for the description of the characteristic of the seventh embodiment of the present invention).

In the 4:2:0 format which has been used in the conventional video encoding standard, the color space definition is fixed to Y, Cb, and Cr. In the 4:4:4: format, however, a color space is not limited to that of Y, Cb, and Cr, and various color spaces can be used. By configuring the inter prediction mode information as illustrated in FIG. 34, the optimal encoding process can be performed even when the definition of the color space of the input video signal 1 is varied. For example, when the color space is defined by R, G, and B, the structure of a video texture remains equally in the components R, G, and B. In such an area, the use of the common inter prediction mode information and the common motion vector information can reduce the redundancy of the inter prediction mode information and the motion vector information themselves to enhance the encoding efficiency. On the other hand, for example, in an area which does not contain red at all (the R component is 0), the inter prediction mode and the motion vector information optimal for the R component must differ from those optimal for the components G and B. Therefore, by adaptively using the extended inter prediction mode, the extended reference image identification information, and the extended motion vector information, the optimal encoding efficiency can be obtained.

3. Outline of Operation of the Decoding Device

The decoding device illustrated in FIG. 31 receives the video stream 22 according to the data sequence illustrated in FIG. 34, which is output from the encoding device illustrated in FIG. 30, and performs a decoding process on the macroblock basis, each macroblock containing three color components of the same size (in the 4:4:4 format), to restore each video frame.

First, the variable length decoding unit 25 receives the video stream 22 as an input to decipher the video stream 22 according to a predetermined rule (syntax), thereby extracting information such as the inter prediction mode-sharing identification flag 123, the quantized transform coefficient 10, the macroblock type/sub-macroblock type 106, the reference image identification number, the motion vector information, and the quantization parameter 21. The quantized transform coefficient 10 is input together with the quantization parameter 21 to the inverse quantization unit 12, in which the inverse quantization process is performed. Subsequently, the output from the inverse quantization unit 12 is input to the inverse orthogonal transform unit 13 to be restored to the local decoded prediction difference signal 14. On the other hand, the macroblock type/sub-macroblock type 106, the inter prediction mode-sharing identification flag 123, the motion vector 137, and the reference image identification number are input to the motion compensation prediction unit 102 to obtain the predicted image 7 according to the input information. A specific procedure for obtaining the predicted image 7 will be described below. The local decoded prediction difference signal 14 and the predicted image 7 are added by the adder 18 to obtain the temporary decoded image 15 (which is exactly the same signal as the local decoded image 15 in the encoding device). The temporary decoded image 15 is written back to the memories 16 to be used for the motion compensation prediction of the subsequent macroblocks. Three memories 16 are prepared for the respective color components (the number of memories is described as three in this embodiment, but the number of memories can be appropriately changed according to the design). Moreover, based on the indication of the deblocking filter control flag 24 deciphered by the variable length decoding unit 25, the deblocking filter 26 is caused to act on the temporary decoded image 15 to obtain the final decoded image 27.

4. Inter Prediction Decoding Process in the Decoding Device

The decoding device illustrated in FIG. 31 receives the video stream 22 according to the sequence illustrated in FIG. 34, which is output from the encoding device illustrated in FIG. 30, and performs a decoding process on the macroblock basis, each macroblock being composed of three color components of the same size (in the 4:4:4 format), to restore each video frame.

Figure 35:
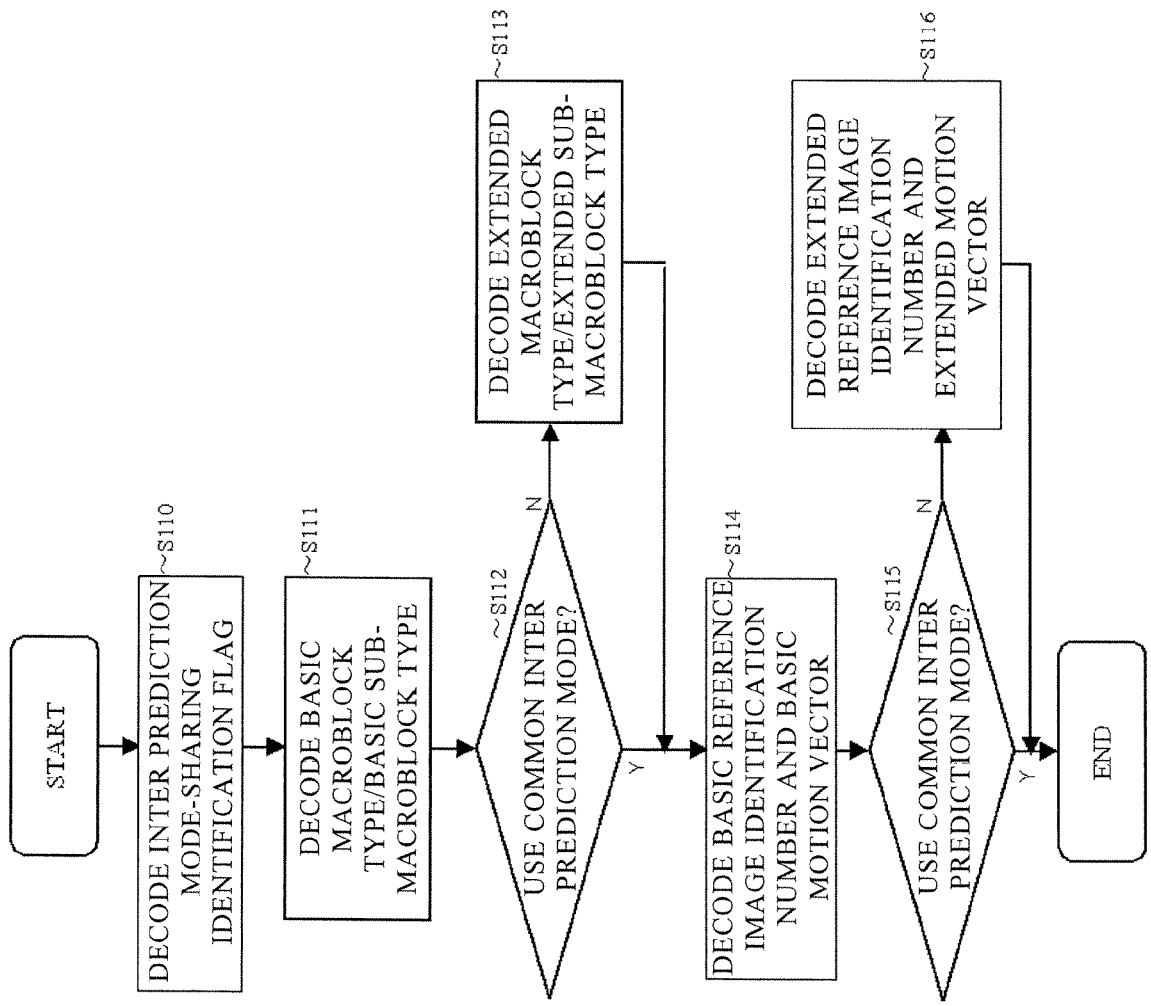
FIG. 35 is a flowchart illustrating a flow of a process performed in a variable length decoding unit in the seventh embodiment.

An inter prediction image generating process which is a feature of the decoding device according to the seventh embodiment will be described in detail. This process is implemented on the macroblock basis, each macroblock being obtained by gathering the three color components described above, and is mainly performed by the variable length decoding unit 25 and the motion compensation prediction unit 102 in the decoding device illustrated in FIG. 31. FIG. 35 is a flowchart illustrating a flow of a part of the inter prediction image generating process, which is implemented in the variable length decoding unit 25.

It is assumed that the video stream 22 which is an input to the variable length decoding unit 25 follows the data sequence illustrated in FIG. 34. In Step S110, the inter prediction mode-sharing identification flag 123 in the data illustrated in FIG. 34 is decoded (Step S110). Further, the basic macroblock type 128 and the basic sub-macroblock type 129 are decoded (Step S111). In Step S112, it is determined by using the result of the inter prediction mode-sharing identification flag 123 whether or not to use the inter prediction mode common to C0, C1, and C2. When the common inter prediction mode is used (Yes in Step S112), the basic macroblock type 128 and the basic sub-macroblock type 129 are used for all of C0, C1, and C2. Otherwise (No in Step S112), the basic macroblock type 128 and the basic sub-macroblock type 129 are used as the mode for C0. Then, the extended macroblock type 130 and the extended sub-macroblock type 131 are decoded for each of C1 and C2 (Step S13) to obtain the inter prediction mode information of C1 and C2. Next, the basic reference image identification number 132 and the basic motion vector information 133 are decoded (Step S114). When the inter prediction mode-sharing identification flag 123 indicates that the basic reference image identification number 132 and the basic motion vector information 133 "common to C0, C1, and C2" are used (Yes in Step S115), the basic reference image identification number 132 and the basic motion vector information 133 are used for all of C0, C1, and C2. Otherwise (No in Step S115), the basic reference image identification number 132 and the basic motion vector information 133 are used as information for C0. Then, for each of C1 and C2, the extended reference image identification number 134 and the extended motion vector information 135 are decoded (Step S116). Since the macroblock type/sub-macroblock type 106, the reference image identification number, and the motion vector information of each of the color components is determined through the above-mentioned process, the determined macroblock type/sub-macroblock type 106, reference image identification number, and motion vector information are output to the motion compensation prediction unit 102 to obtain a motion compensation prediction image of each of the color components.

Figure 36:
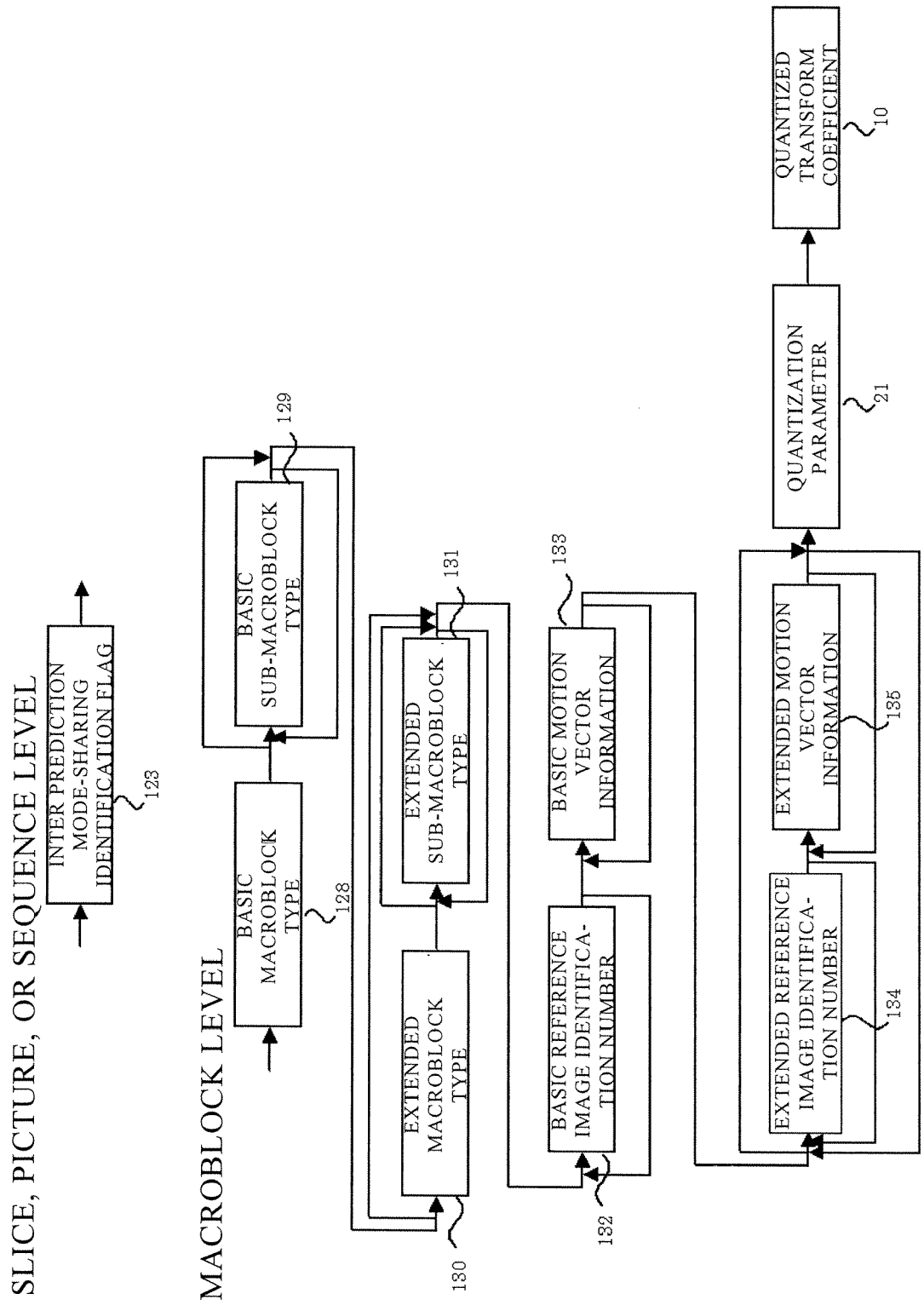
FIG. 36 is an explanatory view illustrating another data sequence of the video stream output from the video encoding device in the seventh embodiment.

FIG. 36 illustrates a variation of the bit stream data sequence illustrated in FIG. 34. In FIG. 36, the inter prediction mode-sharing identification flag 123 is multiplexed not as a flag at the macroblock level but as a flag positioned in the higher-order data layer such as the slice, the picture, or the sequence. As a result, when a sufficiently high prediction efficiency is ensured by the switching in the higher-order layer equal to or higher than the slice, overhead bits can be reduced without multiplexing the inter prediction mode-sharing identification flag 123 at the macroblock level for each time.

Figure 37:
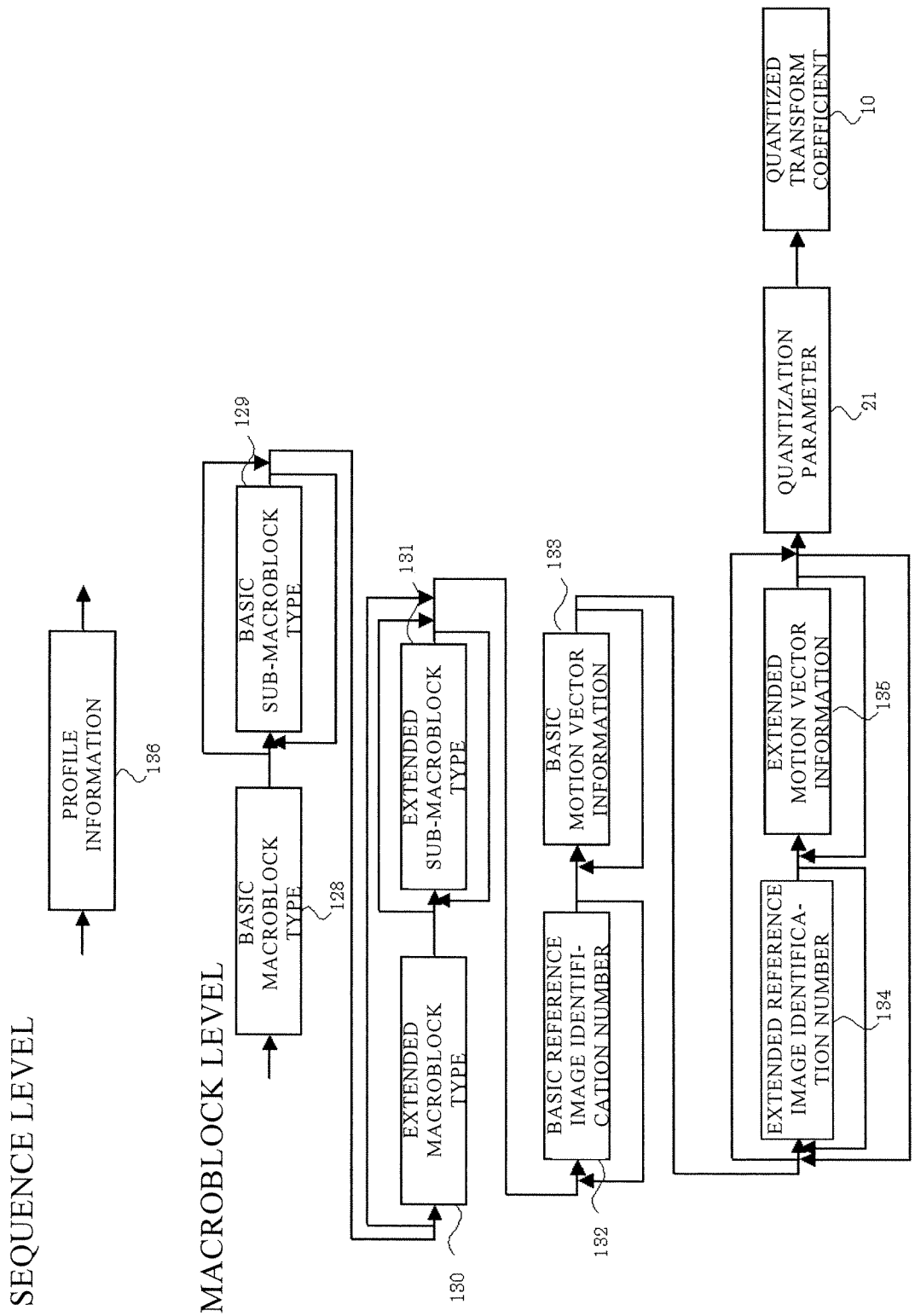
FIG. 37 is an explanatory view illustrating another data sequence of the video stream output from the video encoding device in the seventh embodiment.

In FIGS. 34 and 36, the inter prediction mode-sharing identification flag 123 is multiplexed for each macroblock or in the higher-order data layer such as the slice, the picture or the sequence. When the video image in the 4:4:4 format is encoded without multiplexing the inter prediction mode-sharing identification flag 123, the inter prediction mode and the motion vector information different for each component may always be used. A sequence of the bit stream data in this case is illustrated in FIG. 37. In FIG. 37, the inter prediction mode-sharing identification flag 123 is not present. Instead, profile information 136 which instructs the handling of an input image in the 4:4:4 format is multiplexed in the higher-order layer such as the sequence. Based on the result of decoding of the profile information, the extended macroblock type 130, the extended sub-macroblock type 131, the extended reference image identification number 134, and the extended motion vector information 135 are multiplexed.

Eighth Embodiment

In the seventh embodiment of the present invention, each of the macroblock type/sub-macroblock type, the motion vector, and the reference image can be set different for each of the color components. The eighth embodiment of the present invention describes a video encoding device and a video decoding device, which are characterized in that the macroblock type/sub-macroblock type and the motion vector common to the color components are used while only a motion vector to be used can be different for each of the color components. The configurations of the video encoding device and the video decoding device in the eighth embodiment are the same as those illustrated in FIGS. 30 and 31 in the seventh embodiment of the invention, but a difference lies in that a motion vector-sharing identification flag 123*b* is provided in place of the inter prediction mode-sharing identification flag 123.

1. Inter Prediction Mode Determining Process in the Encoding Device

An inter prediction mode determining process which is a feature of the encoding device in the eighth embodiment of the present invention will be described in detail mainly for a part different from the inter prediction mode determining process in the seventh embodiment of the invention.

Figure 38:
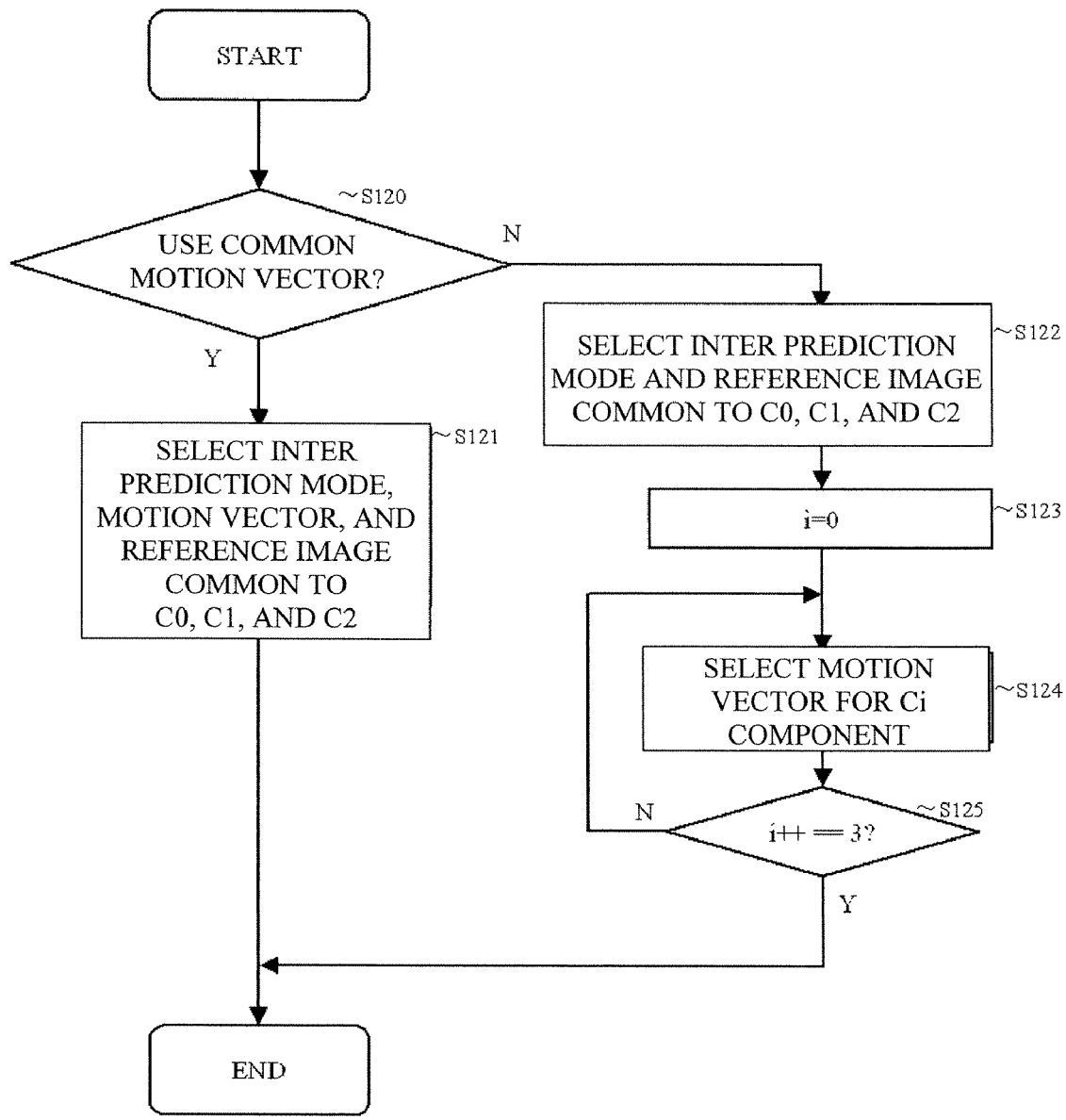
FIG. 38 is a flowchart illustrating a flow of the inter prediction mode determining process in an eighth embodiment.

This process is implemented on the macroblock basis, each macroblock being obtained by gathering the above-mentioned three color components, mainly by the motion compensation prediction unit 102 and the encoding mode determining unit 5 in the encoding device of FIG. 30. FIG. 38 is a flowchart illustrating a flow of this process. Hereinafter, image data of the three color components constituting the blocks are referred to as C0, C1, and C2, respectively.

First, the encoding mode determining unit 5 receives the motion vector-sharing identification flag 123*b* to determine, based on a value of the flag 123*b*, whether or not to use the motion vector 137 common to C0, C1, and C2 (Step S120 in FIG. 38). If the motion vector 137 common to C0, C1, and C2 is used, the process proceeds to Step S121 and the following steps. Otherwise, the process proceeds to Step S122 and the following steps.

When the motion vector 137 common to C0, C1, and C2 is used, the encoding mode determining unit 5 notifies the motion compensation prediction unit 102 of all the selectable inter prediction modes, motion vectors in the search range, and reference images. The motion compensation prediction unit 102 evaluates all the prediction efficiencies thereof to select the inter prediction mode, the motion vector 137, and the reference image, which are common to and optimal for C0, C1, and C2(Step S121).

When the best motion vector is selected for each of C0, C1, and C2 without using the motion vector 137 common to C0, C1, and C2, the encoding mode determining unit 5 notifies the motion compensation prediction unit 102 of all the selectable inter prediction modes, motion vectors in the search range, and reference images. The motion compensation prediction unit 102 evaluates all the prediction efficiencies thereof to select the inter prediction mode and the reference image common to and optimal for C0, C1, and C2 (Step S122).

Further, the optimal motion vector for the component Ci (i<=0<3) is selected (Steps S123, S124, and S125).

The motion vector-sharing identification flag 123*b* is required to be multiplexed in the bit stream to be recognized by the decoding device. A data sequence of such a bit stream is illustrated in FIG. 39.

Figure 39:
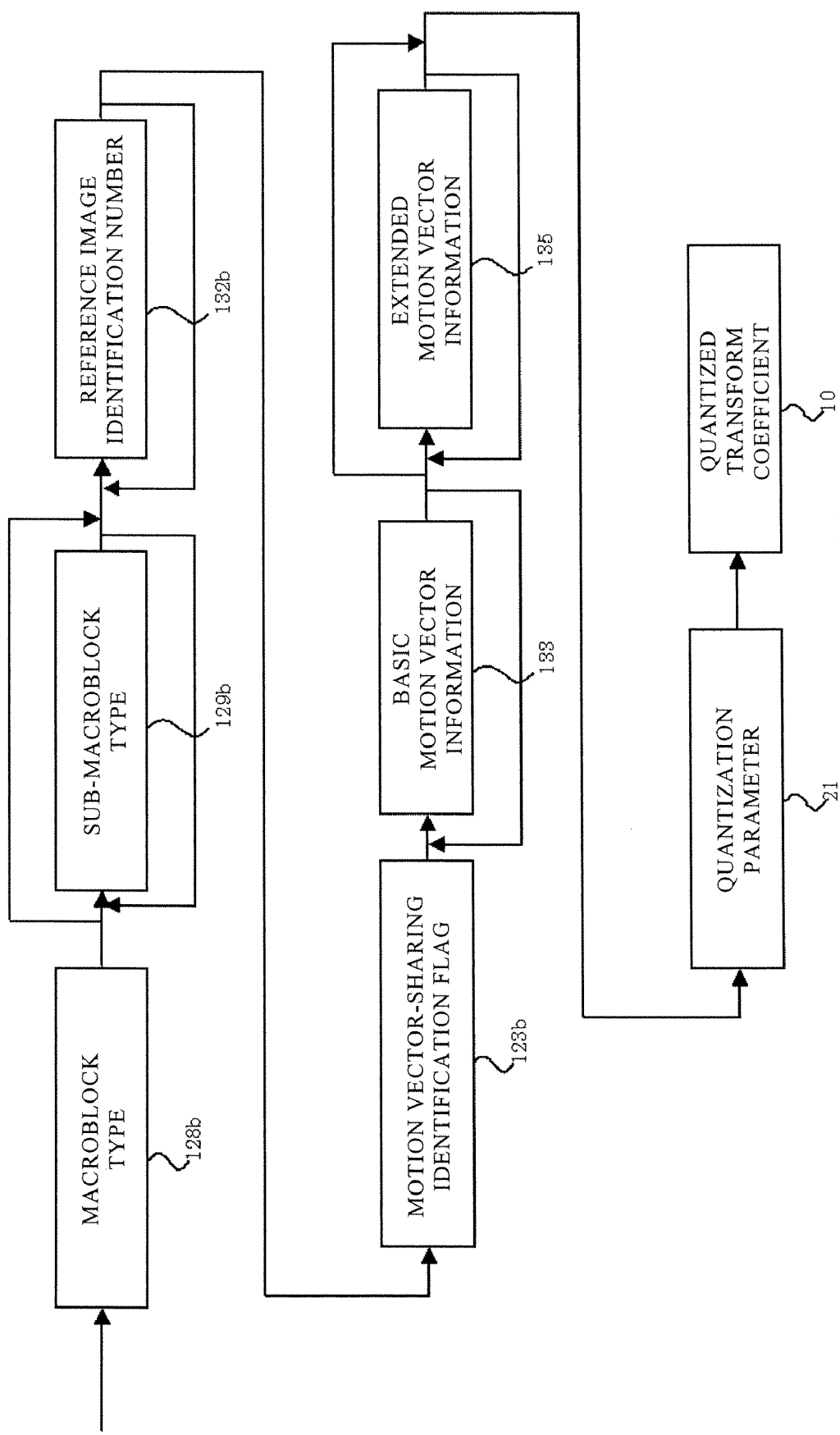
FIG. 39 is an explanatory view illustrating the data sequence of the bit stream at a macroblock level in the eighth embodiment.

FIG. 39 illustrates a data sequence of the bit stream at the macroblock level. A macroblock type 128*b*, a sub-macroblock type 129*b*, and a reference image identification number 132*b* are "common to C0, C1, and C2." The basic motion vector information 133 indicates common motion vector information when the motion vector-sharing identification flag 123*b* indicates "common to C0, C1, and C2." Otherwise, the basic motion vector information 133 indicates the motion vector information for C0. The extended motion vector information 135 is multiplexed for each of C1 and C2 to indicate the motion vector information for each of C1 and C2 only when the motion vector-sharing identification flag 123*b* is not "common to C0, C1, and C2." The macroblock type/sub-macroblock type 106 in FIGS. 30 and 31 is a collective designation of the macroblock type 128*b* and the sub-macroblock type 129*b* in FIG. 39.

2. Inter Prediction Decoding Process in the Decoding Device

The decoding device in the eighth embodiment of the present invention receives the video stream 22 according to the sequence illustrated in FIG. 39, which is output from the encoding device of the eighth embodiment of the invention, and performs a decoding process on the macroblock basis, each macroblock being composed of three color components of the same size (in the 4:4:4 format), to restore each video frame.

Figure 40:
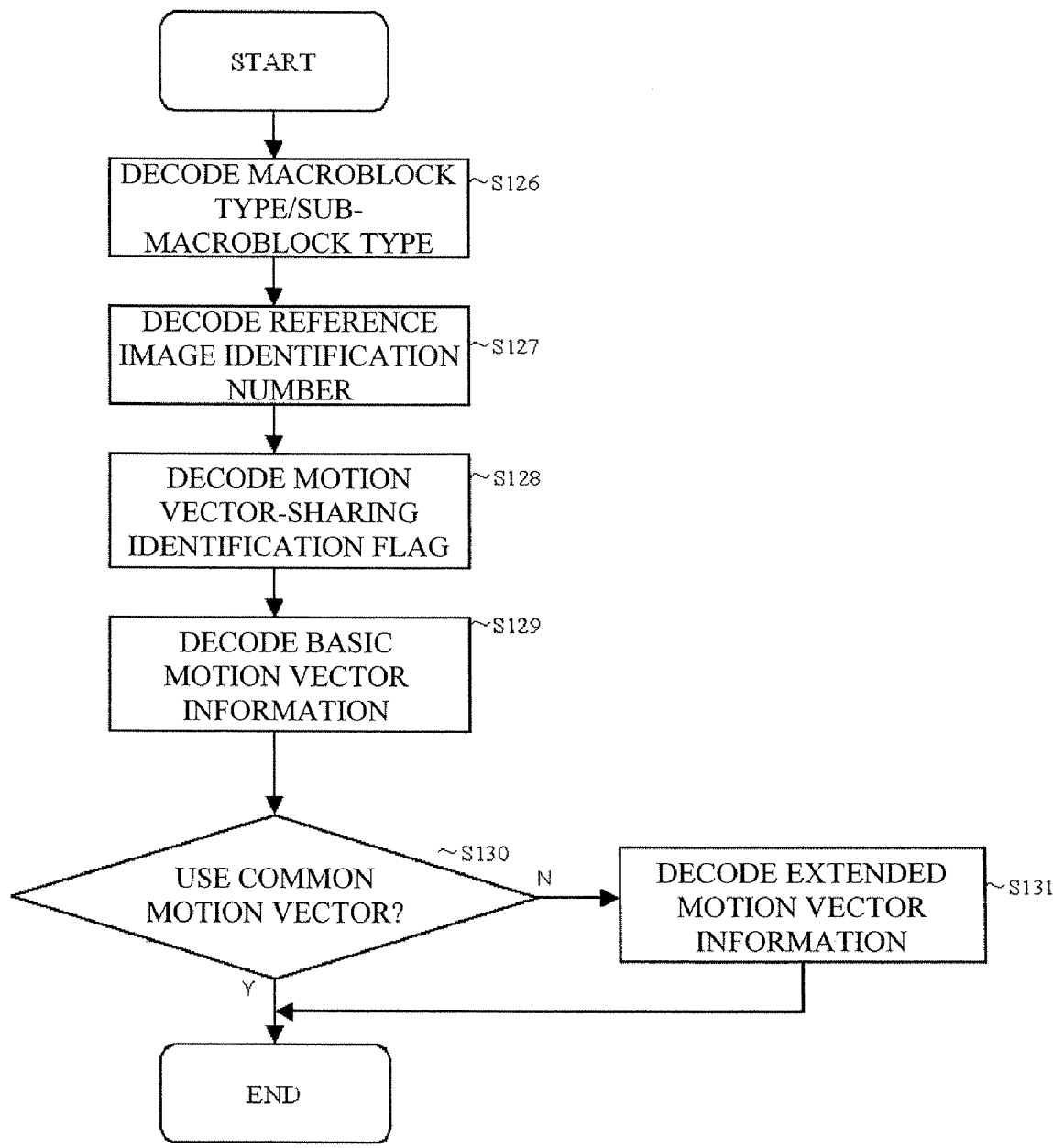
FIG. 40 is a flowchart illustrating a flow of an inter prediction image generating process in the eighth embodiment.

An inter prediction image generating process which is a feature of the decoding device in the eighth embodiment of the present invention will be described in detail mainly for a part of the process different from that in the seventh embodiment of the present invention. This process is implemented on the macroblock basis, each macroblock being obtained by gathering the three color components described above, and is mainly performed by the variable length decoding unit 25 and the motion compensation prediction unit 102 in the decoding device illustrated in FIG. 31. FIG. 40 is a flowchart illustrating a flow of a part of the inter prediction image generating process, which is implemented in the variable length decoding unit 25.

It is assumed that the data sequence of the video stream 22 which is input to the variable length decoding unit 25 is as that illustrated in FIG. 39. In Step S126, the macroblock type 128*b* or the sub-macroblock type 129*b* common to C0, C1, and C2 is decoded. Since the decoded macroblock type 128*b* or sub-macroblock type 129*b* determines the block size serving as the unit of motion compensation, the reference image identification number 132*b* common to C0, C1, and C2 is decoded for each block serving as the unit of motion compensation (Step S127). In Step S128, the motion vector-sharing identification flag 123*b* is decoded. Next, the basic motion vector information 133 is decoded for each block serving as the unit of motion compensation (Step S129). In Step S130, the result of the motion vector-sharing identification flag 123*b* is used to determine whether or not to use the motion vector 137 common to C0, C1, and C2. When the common motion vector 137 is used (Yes in Step S130), the basic motion vector information is used for all of C0, C1, and C2. Otherwise (No in Step S130), the basic motion vector 133 is used as the mode for C0. Further, the extended motion vector information 135 is decoded for each of C1 and C2 (Step S131). Through the above-mentioned process, the macroblock type/sub-macroblock type 106, the reference image identification number, and the motion vector information are determined for each of the color components. Therefore, the determined macroblock type/sub-macroblock type 106, reference image identification number, and motion vector information are output to the motion compensation prediction unit 102 to obtain the motion compensation prediction image of each of the color components.

Figure 41:
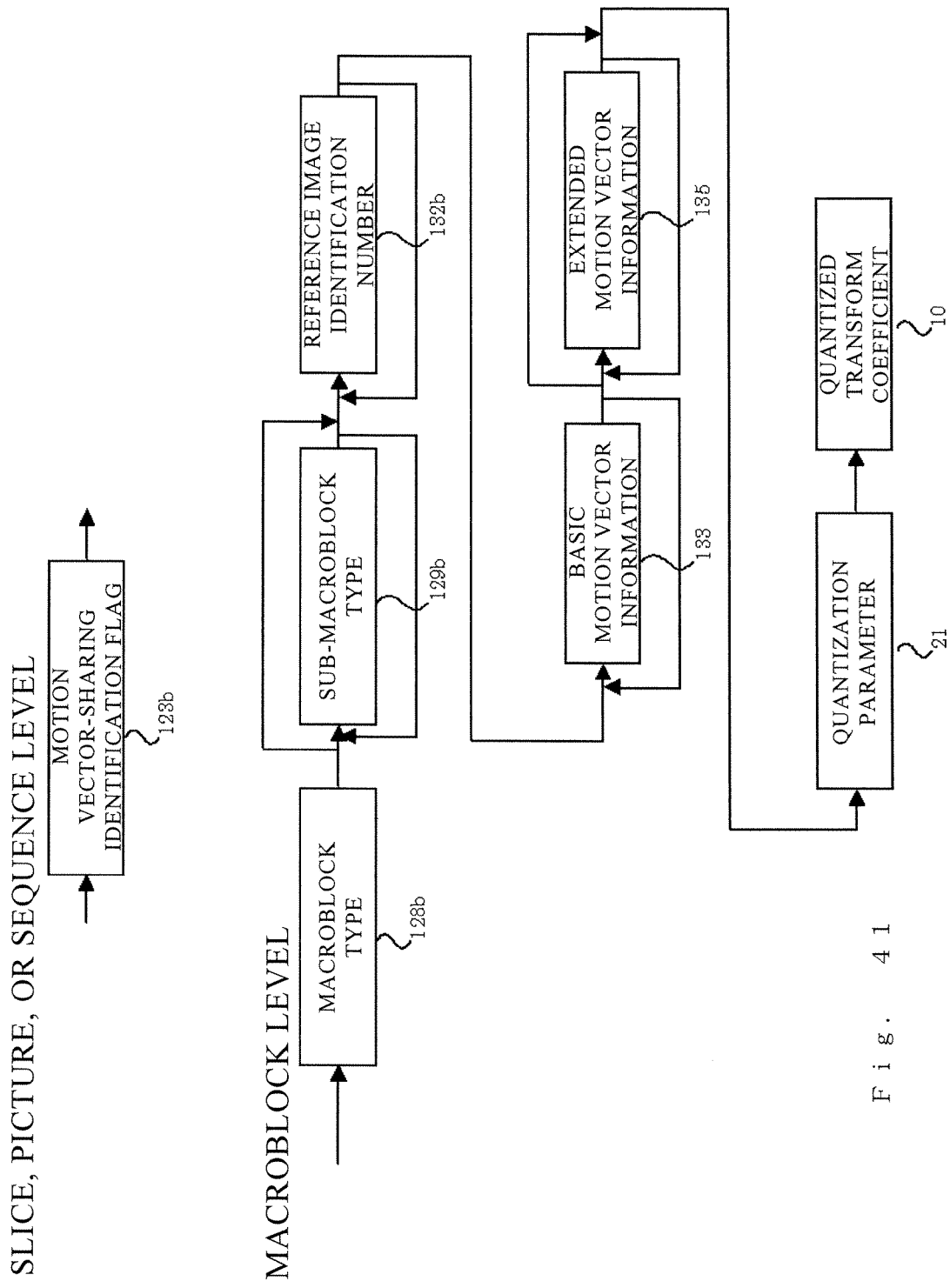
FIG. 41 is an explanatory view illustrating another data sequence of the bit stream at the macroblock level in the eighth embodiment.

FIG. 41 illustrates a variation of the bit stream data sequence illustrated in FIG. 39. In FIG. 39, the motion vector-sharing identification flag 123b is multiplexed not as a flag at the macroblock level but as a flag positioned in the higher-order data layer such as the slice, the picture or the sequence. As a result, when a sufficiently high prediction efficiency can be ensured by switching in the higher-order layer equal to or higher than the slice layer, overhead bits can be reduced without multiplexing the motion vector-sharing identification flag 123b at the macroblock level for each macroblock.

Figure 42:
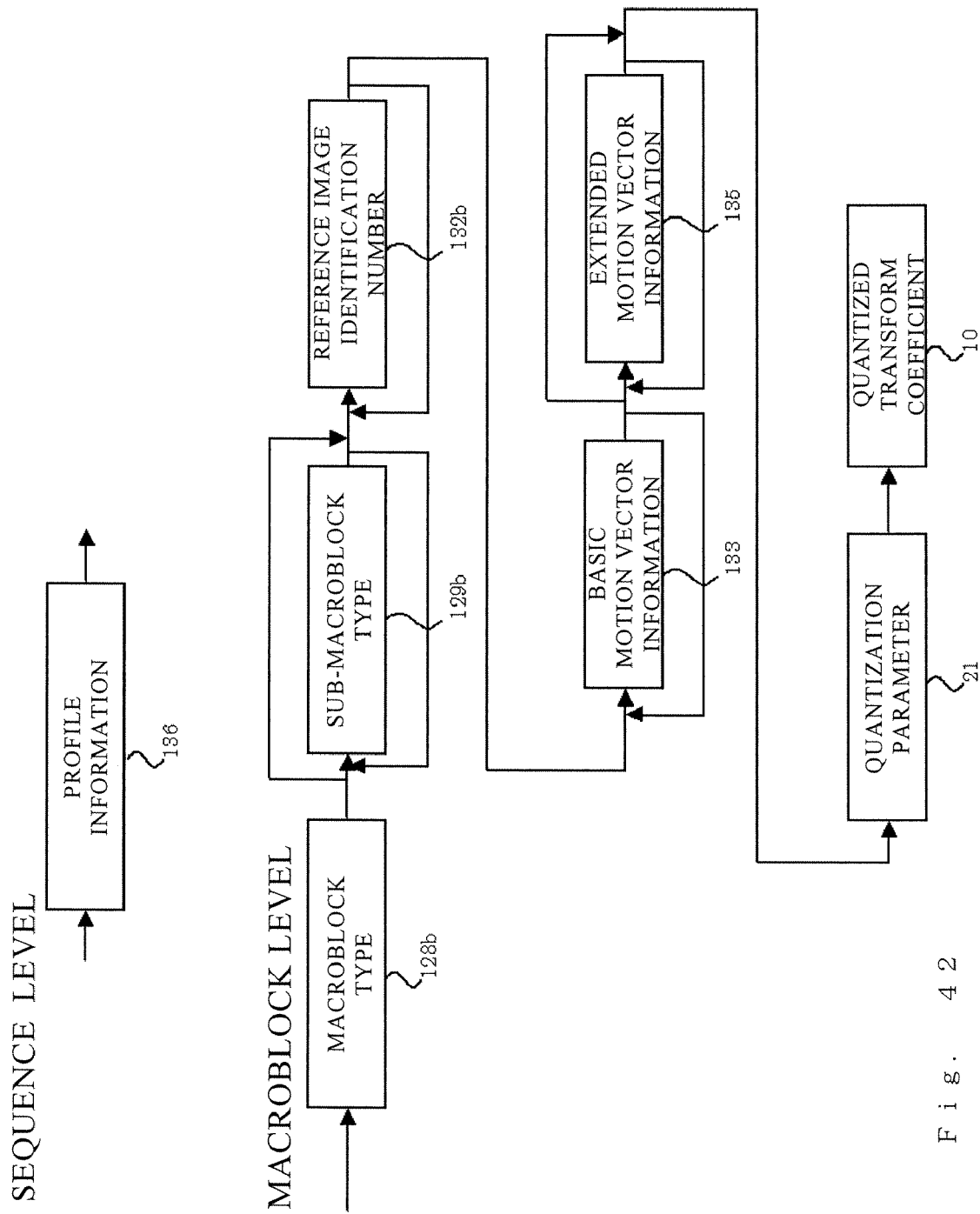
FIG. 42 is an explanatory view illustrating another data sequence of the bit stream at the macroblock level in the eighth embodiment.

In FIGS. 39 and 41, the motion vector-sharing identification flag 123b is multiplexed for each macroblock or in the higher-order data layer such as the slice, the picture or the sequence. Alternatively, in encoding the video image in the 4:4:4 format without multiplexing the motion vector-sharing identification flag 123b, different motion vector information may always be used for each component. A sequence of the bit stream data in such a case is illustrated in FIG. 42. In FIG. 42, the motion vector-sharing identification flag 123b is not present. The profile information 136 instructing the handling of an input image in the 4:4:4: format is multiplexed in the higher-order layer such as the sequence layer. Based on the result of decoding of the profile information 136, the extended motion vector information 135 is multiplexed.

In the eighth embodiment of the present invention, the macroblock type/sub-macroblock type 106 and the reference image common to the color components are used, whereas only the different motion vectors 137 can be used for each of the color components. As a result, when a sufficiently high prediction efficiency is obtained by adapting only the motion vector 137 to each of the color components, overhead bits can be reduced without multiplexing the macroblock type/sub-macroblock type 106 or the reference image identification number for each of the color components.

Ninth Embodiment

In the seventh embodiment of the present invention, the inter prediction mode-sharing identification flag 123 or the profile information 136 allows the switching between the common use of each of the macroblock type/sub-macroblock type 106, the motion vector 137, and the reference image for the three color components or the use of each of the macroblock type/sub-macroblock type 106, the motion vector 137, and the reference image different for each of the color components. In the ninth embodiment of the present invention, assuming the image in the 4:4:4 format such as in the Y, Cb, and Cr format, switching is enabled between the use of a mode common to the luminance component (Y) and the chrominance components (Cb and Cr) and the use of different modes for the luminance component and the chrominance components (in this case, the common mode is used for the two chrominance components). Specifically, a video encoding device and a video decoding device which are characterized in that switching is enabled between the use of a common mode to the three components, the use of a different mode for each of the components, and the use of different modes for the luminance component and the chrominance components will be described. The configurations of the video encoding device and the video decoding device in the ninth embodiment of the invention are the same as those illustrated in FIGS. 30 and 31 in the seventh embodiment of the invention.

1. Inter Prediction Mode Determining Process in the Encoding Device

An inter prediction mode determining process which is a feature of the encoding device in the ninth embodiment of the present invention will be described in detail, mainly for a part different from the inter prediction mode determining process in the seventh embodiment of the present invention.

Figure 43:
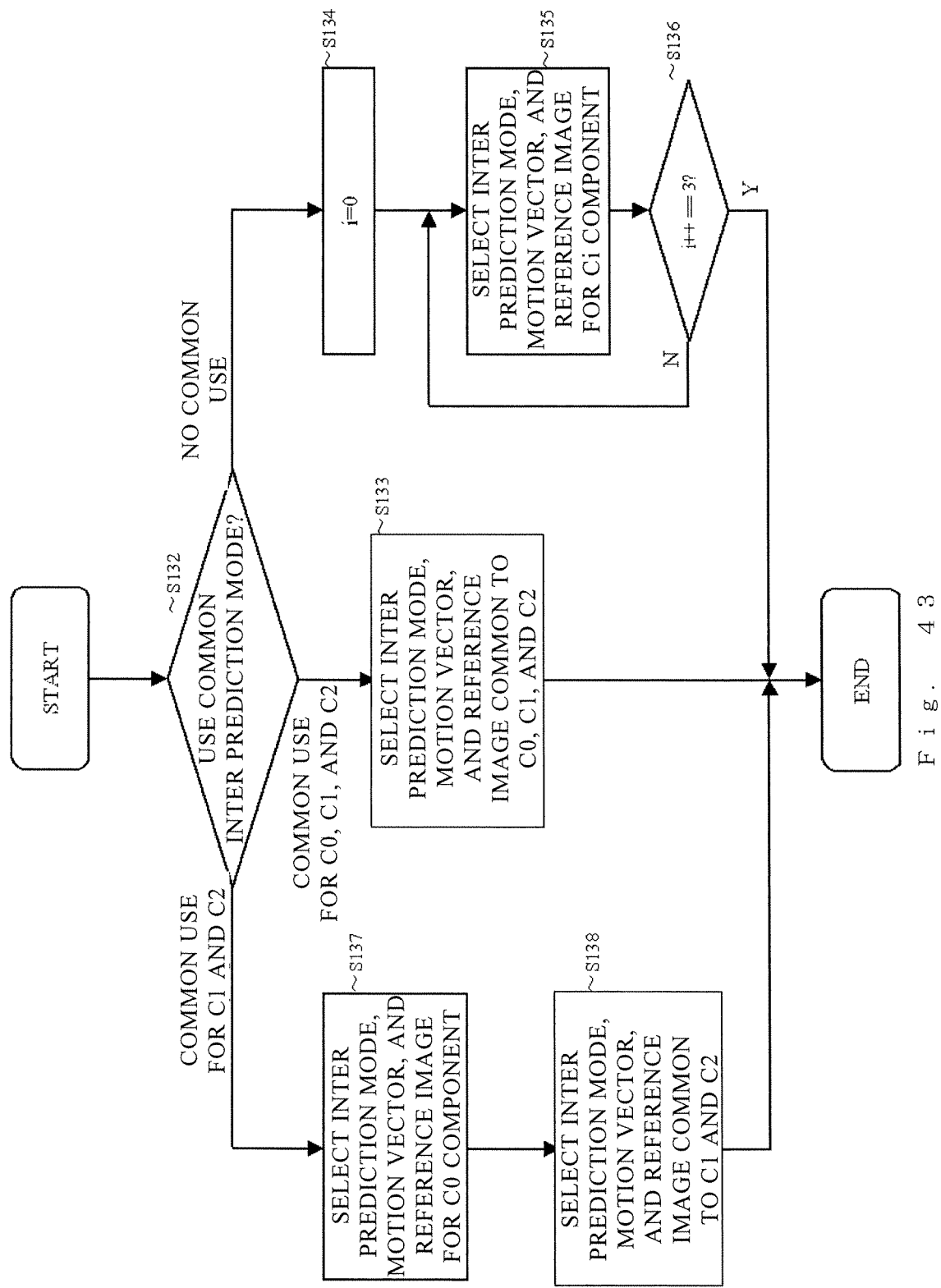
FIG. 43 is a flowchart illustrating a flow of the inter prediction mode determining process in a ninth embodiment.

This process is implemented on the macroblock basis, each macroblock being obtained by gathering the above-mentioned three color components, and is performed mainly by the motion compensation prediction unit 102 and the encoding mode determining unit 5 in the encoding device in FIG. 30. FIG. 43 is a flowchart illustrating a flow of this process. Hereinafter, image data of the three color components constituting the blocks are referred to as C0, C1, and C2, respectively.

First, the encoding mode determining unit 5 receives the inter prediction mode-sharing identification flag 123 to determine, based on a value of the flag 123, whether or not to use the inter prediction mode, the motion vector 137, and the reference image which are common to C0, C1, and C2 (Step S132 in FIG. 43). If the inter prediction mode, the motion vector 137, and the reference image which are common to C0, C1, and C2 are used, the process proceeds to Step S133 and the following steps. Otherwise, the process proceeds to Step S134 and the following steps or Step S137 and the following steps.

When the inter prediction mode, the motion vector 137, and the reference image which are common to C0, C1, and C2 are used, the encoding mode determining unit 5 notifies the motion compensation prediction unit 102 of all the selectable inter prediction modes, motion vectors in the search range, and reference images. The motion compensation prediction unit 102 evaluates all the prediction efficiencies thereof to select the optimal inter prediction mode, motion vector 137 and reference image common to C0, C1, and C2(Step S133).

When the best mode is selected for each of the color components C0, C1, and C2 without using the inter prediction mode, the motion vector 137, and the reference image common to C0, C1, and C2, the encoding mode determining unit 5 notifies the motion compensation prediction unit 102 of all the inter prediction modes, the motion vectors in the search range, and the reference images selectable for the component Ci (i<=0<3). The motion compensation prediction unit 102 evaluates all the prediction efficiencies thereof to select the optimal inter prediction mode, motion vector 137, and reference image for the component Ci (i<=0<3) (Steps S134, S135, and S136).

When the inter prediction mode, the motion vector 137, and the reference image common to C1 and C2 are used to select the best mode for C0 (corresponding to the luminance component) and that for C1 and C2 (corresponding to the chrominance components), the encoding mode determining unit 5 notifies the motion compensation prediction unit 102 of all the inter prediction modes, the motion vectors in the search range, and the reference images selectable for the C0 component. The motion compensation prediction unit 102 evaluates all the prediction efficiencies thereof to select the inter prediction mode, the motion vector 137, and the reference image optimal for the C0 component (Step S137). Further, the encoding mode determining unit 5 notifies the motion compensation prediction unit 102 of all the inter prediction modes, the motion vectors in the search range, and the reference images selectable for the C1 and C2 components. The motion compensation prediction unit 102 evaluates all the prediction efficiencies thereof to select the inter prediction mode, the motion vector 137, and the reference image, which are common to and optimal for the C1 and C2 components (Step S138).

A data sequence of the bit stream output from the encoding device in the ninth embodiment of the present invention is the same as that illustrated in FIG. 34. When the inter prediction mode-sharing identification flag 123 indicates that the mode is "common to C1 and C2," the extended macroblock type 130, the extended sub-macroblock type 131, the extended reference identification number 134, and the extended motion vector information 135 are information common to C1 and C2.

2. Inter Prediction Decoding Process in the Decoding Device

The decoding device in the ninth embodiment of the present invention receives the video stream 22 according to the sequence illustrated in FIG. 34, which is output from the encoding device in the ninth embodiment of the present invention, and performs a decoding process on the macroblock basis, each macroblock being composed of three color components of the same size (in the 4:4:4 format), to restore each video frame.

Figure 44:
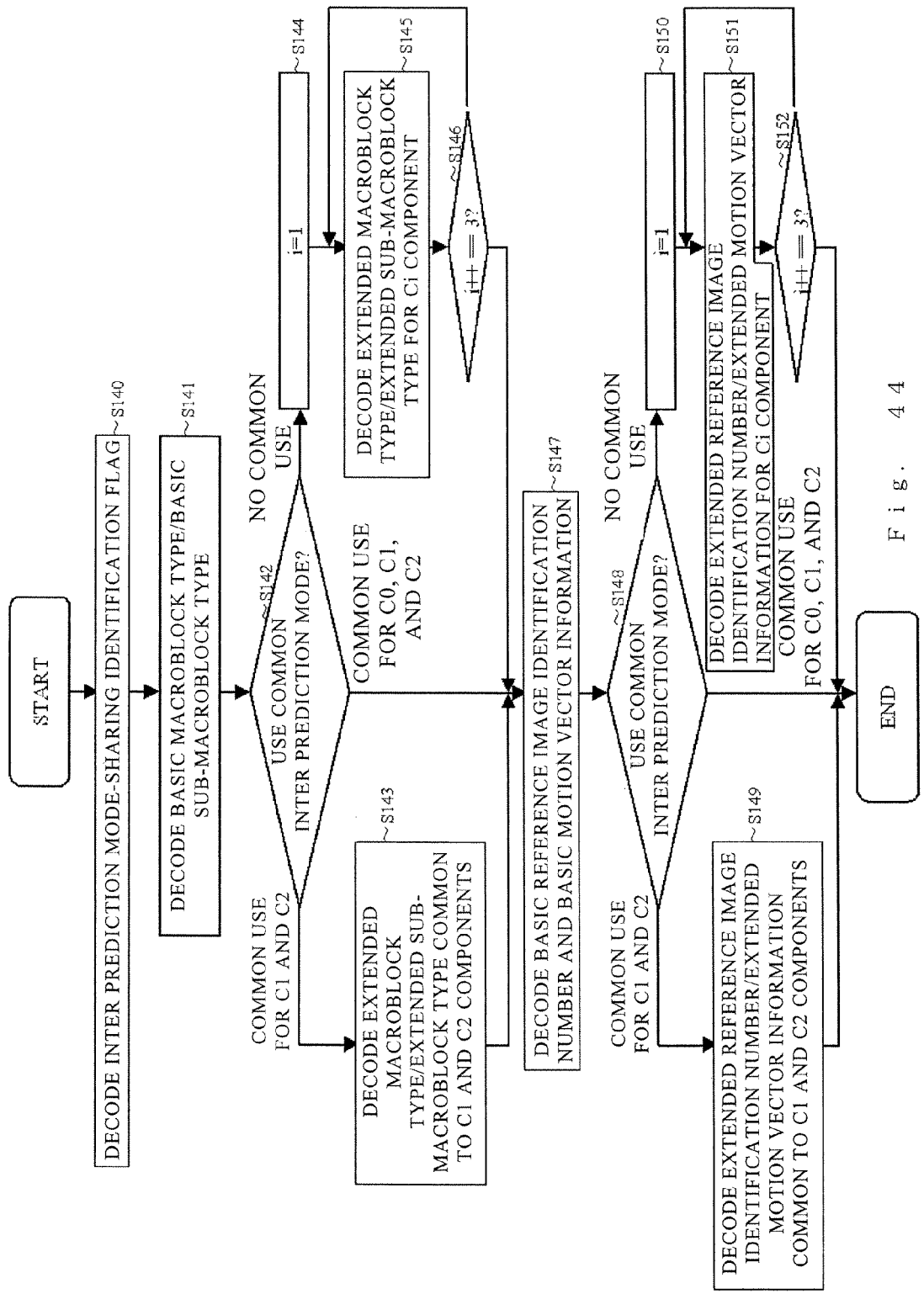
FIG. 44 is a flowchart illustrating a flow of the inter prediction image generating process in the ninth embodiment.

An inter prediction image generating process which is a feature of the decoding device in the ninth embodiment of the present invention will be described in detail mainly for a part of the process different from that in the seventh embodiment of the present invention. This process is implemented on the macroblock basis, each macroblock being obtained by gathering the three color components described above, and is mainly performed by the variable length decoding unit 25 and the motion compensation prediction unit 102 in the decoding device illustrated in FIG. 31. FIG. 44 is a flowchart illustrating a flow of a part of the inter prediction image generating process, which is implemented in the variable length decoding unit 25.

It is assumed that the video stream 22 which is input to the variable length decoding unit 25 follows the data sequence illustrated in FIG. 34. In Step S140, the inter prediction mode-sharing identification flag 123 in the data illustrated in FIG. 34 is decoded (Step S140). Further, the basic macroblock type 128 and the basic sub-macroblock type 129 are decoded (Step S141). In Step S142, the result of the inter prediction mode-sharing identification flag 123 is used to determine whether or not to use the inter prediction mode common to C0, C1, and C2. When the inter prediction mode common to C0, C1, and C2 is used, the basic macroblock type 128 and the basic sub-macroblock type 129 are used for all the color components C0, C1, and C2. Otherwise, the basic macroblock type 128 and the basic sub-macroblock type 129 are used as the mode for C0. Further, when the inter prediction mode is common to C1 and C2, the extended macroblock type 130 and the extended sub-macroblock type 131 common to the C1 and C2 components are decoded (Step S143). When different modes are used for the color components C0, C1, and C2, the extended macroblock type 130 and the extended sub-macroblock type 131 are decoded for each of C1 and C2 (Steps S144, S145, and S146) to obtain mode information of each of C1 and C2. Next, the basic reference image identification number 132 and the basic motion vector information 133 are decoded (Step S147). When the inter prediction mode-sharing identification 123 indicates that the inter prediction mode is "common to C0, C1, and C2," the basic reference image identification number 132 and the basic motion vector information 133 are used for all the color components C0, C1, and C2. Otherwise, the basic reference image identification number 132 and the basic motion vector information 133 are used as information for C0. Further, when the inter prediction mode is common to C1 and C2, the extended reference image identification number 134 and the extended motion vector information 135 common to the C1 and C2 components are decoded (Step S149). When different modes are used for each of C0, C1, and C2, the extended reference image identification number 134 and the extended motion vector information 135 are decoded for each of C1 and C2 (Steps S150, S151, and S152). Since the macroblock type/sub-macroblock type 106, the reference image identification number, and the motion vector information are determined for each of the color components through the above-mentioned process, the determined macroblock type/sub-macroblock type 106, reference image identification number, and motion vector information are output to the motion compensation prediction unit 102 to obtain a motion compensation prediction image of each of the color components.

As in the case of the data sequence of the bit stream as illustrated in FIG. 36, when the inter prediction mode-sharing identification flag 123 indicates that the inter prediction mode is "common to C1 and C2," the extended macroblock type 130, the extended sub-macroblock type 131, the extended reference identification number 134, and the extended motion vector information 135 are information common to C1 and C2. The operations of the video encoding device and the video decoding device, which receive as an input and output the video stream according to the data sequence illustrated in FIG. 36, are the same as those in the case of FIG. 34.

In the ninth embodiment of the present invention, each of the macroblock type/sub-macroblock type 106, the motion vector 137, and the reference image can be set different for each of the color components. Alternatively, the macroblock type/sub-macroblock type 106 and the reference image common to the color components are used, while switching is allowed between the use of the motion vector 137 common to the three components, the use of the motion vector 137 different for each of the components, and the use of the optimal motion vector 137 common to C1 and C2 and that for C0. The data sequence of the bit stream in this case follows that illustrated in FIG. 39 or 41. Even in this case, when the inter prediction mode-sharing identification flag 123 indicates that the inter prediction mode is "common to C1 and C2," the extended motion vector information 135 is common to C1 and C2.

Tenth Embodiment

In the tenth embodiment, a method of encoding the input motion vector 137 in the variable length encoding unit 11 of the encoding device described in the seventh embodiment of the present invention and then multiplexing the encoded motion vector 137 in the bit stream, and a method of decoding the motion vector 137 from the bit stream in the variable length decoding unit 25 of the corresponding decoding device will be described.

Figure 45:
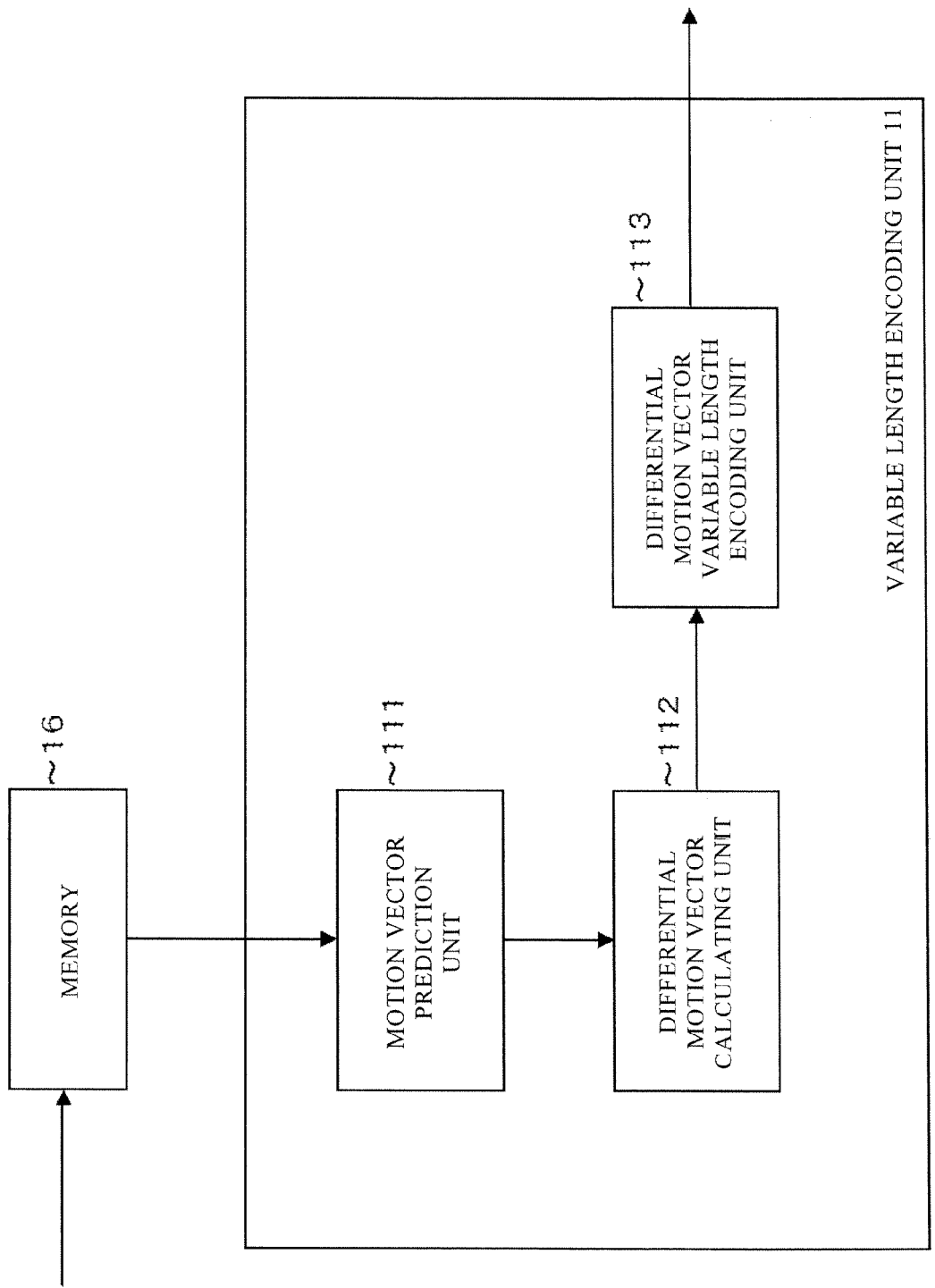
FIG. 45 is an explanatory view illustrating a configuration of a motion vector encoding unit.

FIG. 45 illustrates a configuration of a motion vector encoding unit for encoding the motion vector 137, which corresponds to a part of the variable length encoding unit 11 of the encoding device illustrated in FIG. 30.

A method of multiplexing the motion vectors 137 of the three color components (C0, C1, and C2) in the bit stream in the order of C0, C1, and C2 will be described.

The motion vector 137 of C0 is denoted by mv0. In a motion vector prediction unit 111, a prediction vector (mvp0) of the motion vector 137 of C0 is obtained. As illustrated in FIG. 46, motion vectors (mvA0, mvB0, and mvC0) of the neighboring blocks (blocks A, B, and C of FIG. 46) of the block in which the motion vector (mv0) to be encoded is located are obtained from the memories. It is assumed that the motion vectors 137 of the blocks A, B, and C have already been multiplexed in the bit stream. A median value of mvA0, mvB0, and mvC0 is calculated as mvp0. The calculated prediction vector mvp0 and the motion vector mv0 to be encoded are input to a difference motion vector calculation unit 112. The difference motion vector calculation unit 112 calculates a difference vector (mvd0) between mv0 and mvp0. The calculated difference vector mvd0 is input to a difference motion vector variable length encoding unit 113 to be entropy-coded by means such as Huffman encoding or arithmetic coding.

Next, a motion vector (mv1) of C1 is encoded. In the motion vector prediction unit 111, a prediction vector (mvp1) of the motion vector 137 of C1 is obtained. As illustrated in FIG. 46, motion vectors (mvA1, mvB1, and mvC1) of the neighboring blocks of the block in which the motion vector (mv1) to be encoded is located, and the motion vector (mv0) of C0 at the same position as that of the block in which mv1 is located are obtained from the memories 16. It is assumed that the motion vectors 137 of the blocks A, B, and C have already been multiplexed in the bit stream. A median value of mvA1, mvB1, mvC1 and mv0 is calculated as mvp1. The calculated prediction vector mvp1 and the motion vector mv1 to be encoded are input to the difference motion vector calculating unit 112 to calculate a difference motion vector (mvd1=mv1−mvp1) between mv1 and mvp1. The calculated mvd1 is input to the difference motion vector variable length encoding unit 113 to be entropy-coded by means such as Huffman encoding or arithmetic coding.

Next, a motion vector (mv2) of C2 is encoded. In the motion vector prediction unit 111, a prediction vector (mvp2) of the motion vector 137 of C2 is obtained. As illustrated in FIG. 46, motion vectors (mvA2, mvB2, and mvC2) of the neighboring blocks of the block in which the motion vector (mv2) to be encoded is located, and the motion vectors (mv1 and mv2) of C0 and C1 at the same position as that of the block in which mv2 is located are obtained from the memories 16. A median value of mvA2, mvB2, mvC2, mv0, and mv1 is calculated as mvp2. The calculated prediction vector mvp2 and the motion vector mv2 to be encoded are input to the difference motion vector calculating unit 112 to calculate a difference motion vector (mvd2=mv2−mvp2) between mv2 and mvp2. The calculated mvd2 is input to the difference motion vector variable length encoding unit 113 to be entropy-coded by means such as Huffman encoding or arithmetic coding.

Figure 47:
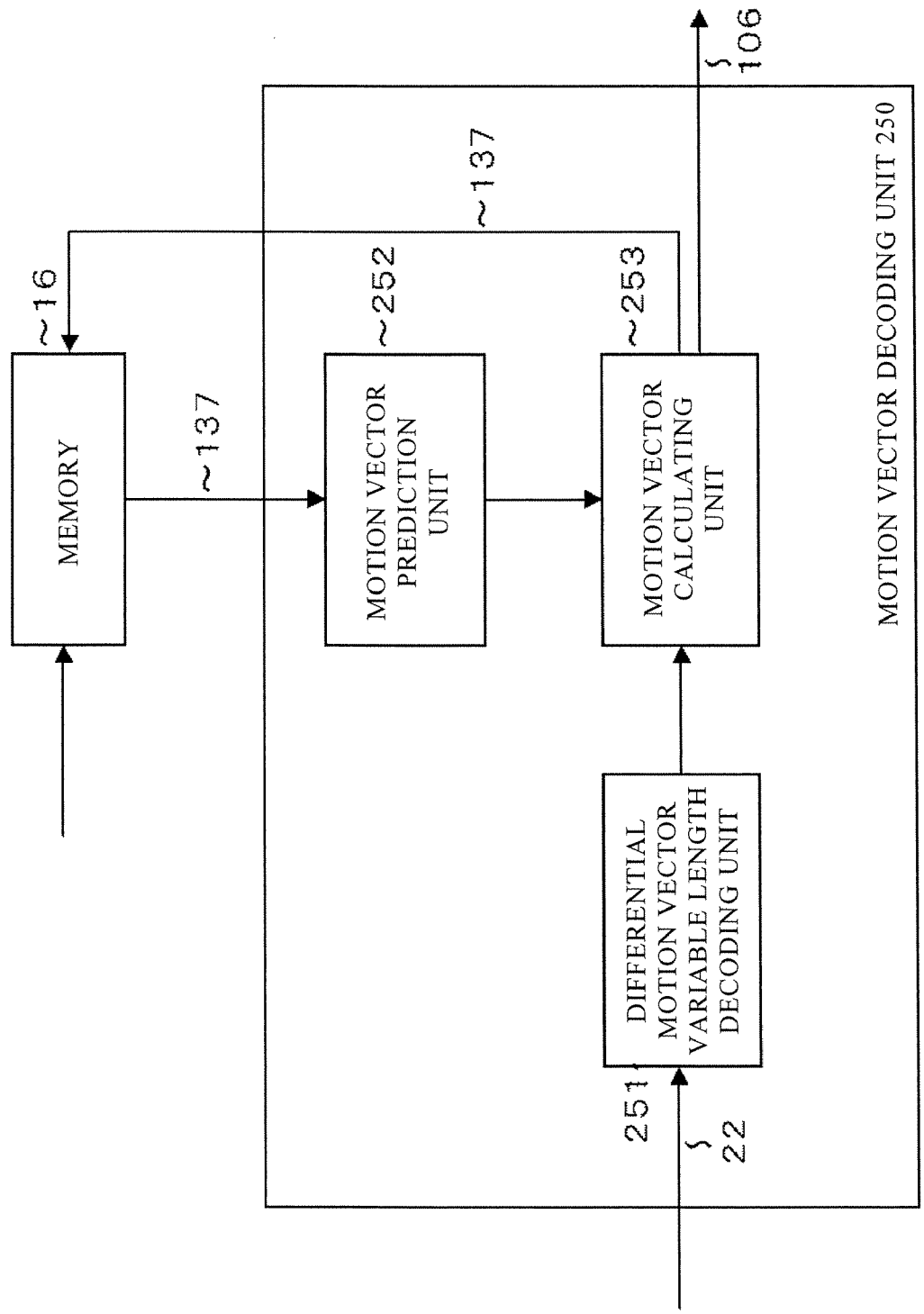
FIG. 47 is an explanatory view illustrating a configuration of a motion vector decoding unit.

FIG. 47 illustrates a configuration of a motion vector decoding unit 250 for decoding the motion vector 137, which corresponds to a part of the variable length decoding unit 25 of the decoding device illustrated in FIG. 31.

The motion vector decoding unit 250 decodes the motion vectors 137 of the three color components multiplexed in the video stream 22 in the order of C0, C1, and C2.

A difference motion vector variable length decoding unit 251 extracts the difference motion vectors (mvd0, mvd1, and mvd2) of the three color components (C0, C1, and C2) multiplexed in the video stream 22 to perform variable length decoding on the extracted difference motion vectors.

A motion vector prediction unit 252 calculates the prediction vectors (mvp0, mvp1, and mvp2) of the motion vectors 137 of C0, C1, and C2. A method of calculating the prediction vectors is the same as that performed in the motion vector prediction unit 111 of the encoding device.

Next, a motion vector calculating unit 253 adds the difference motion vector and its prediction vector to calculate the motion vector (mv1=mvd1+mvpi (i=0, 1, or 2)). The calculated motion vector 137 is stored in the memories 16 to be used as a prediction vector candidate.

According to this tenth embodiment, in encoding and decoding the motion vector, the motion vectors of the blocks of the same color component, which neighbor the block in which the motion vector to be encoded is located, and the motion vectors of the blocks of the different color components at the same position as that of the block in which the motion vector to be encoded is located are used as the prediction vector candidates. Therefore, when the motion vector has no continuity with the motion vectors of the neighboring blocks in the same color component in a boundary area of an object or the like, the effect of enhancing the prediction efficiency of the motion vector to reduce the amount of codes of the motion vector can be obtained by using the motion vectors of the blocks of the different colors at the same position as the prediction vector candidates.

Eleventh Embodiment

In the eleventh embodiment, an embodiment of another encoding device and another decoding device which derive from the encoding device and the decoding device described in the seventh embodiment of the present invention will be described. The encoding device and the decoding device according to the eleventh embodiment determine, based on a predetermined control signal, whether or not the color components C0, C1, and C2 in the macroblock are encoded according to individual header information, and multiplex information of the control signal in the video stream 22. The encoding device and the decoding device according to the eleventh embodiment are characterized in that there is provided means of multiplexing the header information required to decode the components C0, C1, and C2 in the video stream based on the control signal and efficiently encoding a skipped (or not encoded) macroblock when there is no motion vector or transform coefficient to be transmitted based on the control signal.

Figure 32:
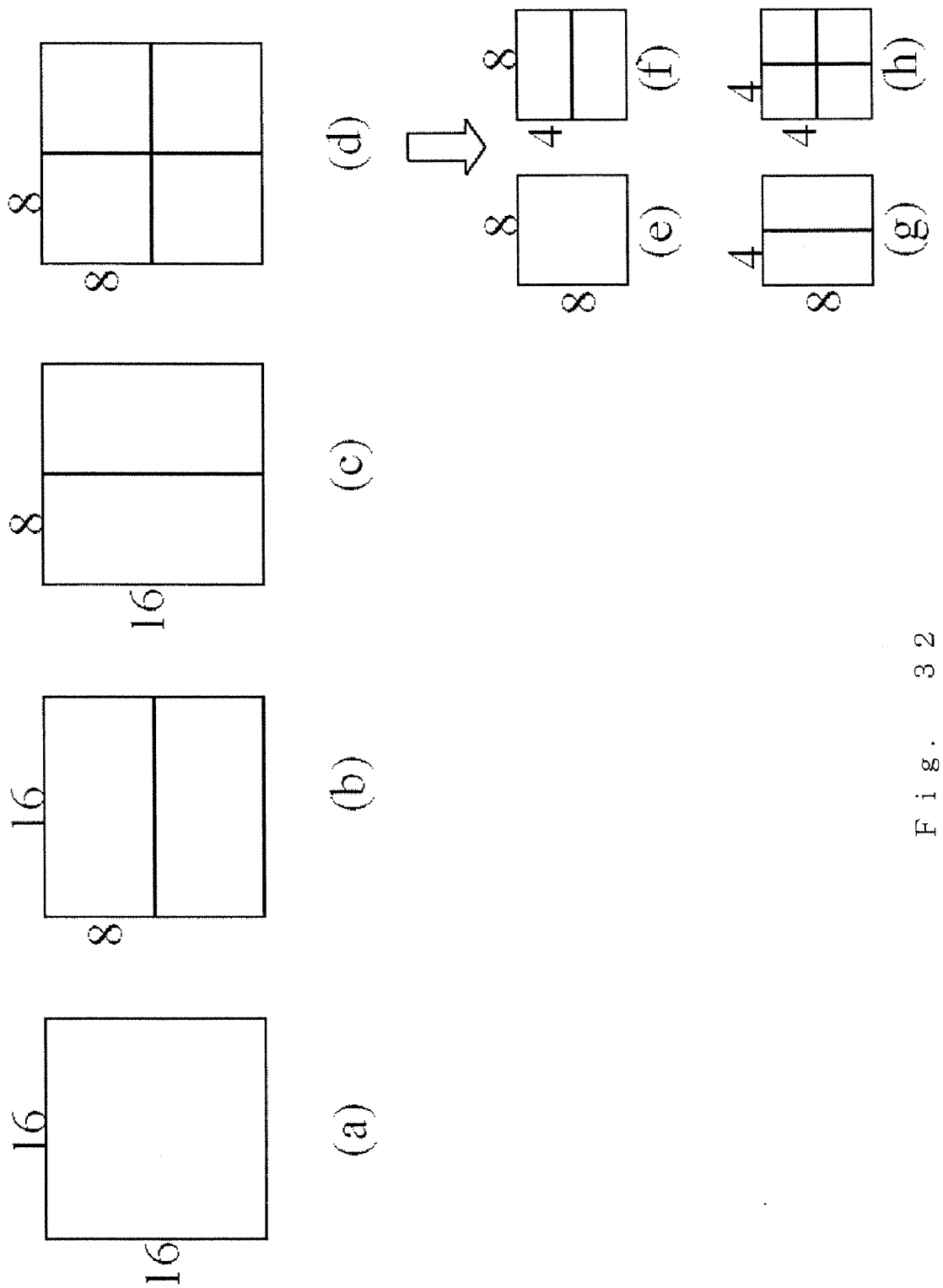
FIGS. 32A to 32H are explanatory views each illustrating the block size for each macroblock.

In the conventional MPEG video encoding methods including AVC, highly-efficient encoding with a minimized amount of codes of a macroblock to be encoded is realized by particularly signaling a case where there is no encoded information to be transmitted for the macroblock to be encoded. For example, in encoding a certain macroblock, when image data at exactly the same position on the reference image used for motion compensation prediction is used as a predicted image (specifically, the motion vector is zero) and all the quantized transform coefficients in the macroblock become zero as a result of transform and quantization of the obtained prediction error signal, an amplitude of the obtained prediction error signal is zero even if the decoding device performs inverse quantization. Therefore, there is no transform coefficient data to be transmitted to the decoding device. In addition, in consideration of the assumption that the motion vector is zero, a specific macroblock type that "the motion vector zero and no transform data" can be defined. Such a macroblock is conventionally referred to as skipped macroblock or not encoded macroblock. The skipped macroblock is particularly signaled not to transmit unnecessary information. In the AVC, the motion vector is determined by the conditions that "the 16×16 prediction of FIG. 32A is performed and prediction values (corresponding to the prediction vectors mvp0, mvp1, and mvp2) used for encoding motion vectors are equal to actual motion vectors." If a macroblock satisfies the above-mentioned conditions and there is no transform coefficient data to be transmitted, the macroblock is regarded as a skipped macroblock. In the conventional AVC, in encoding the skipped macroblock, any one of the following two methods is to be selected according to the employed variable length encoding method.

Method 1: the number of skipped macroblocks (RUN length) contiguous in a slice is counted to perform variable length coding on the RUN length.

Method 2: an indication flag indicating whether or not the macroblock is a skipped macroblock is encoded for each macroblock.

Bit stream syntaxes according to the respective methods are illustrated in FIGS. 48A and 48B. FIG. 48A illustrates the case where adaptive Huffman encoding is used as the variable length coding method (method 1), and FIG. 48B illustrates the case where adaptive arithmetic coding is used (method 2). A skipped macroblock is signaled by mb_skip_run in the method 1 and by mb_skip_flag in the method 2. Encoded data of the n-th (non-skipped) macroblock is denoted by MB(n). It should be herein noted that mb_skip_run or mb_skip_flag is allocated to a macroblock obtained by gathering the components C0, C1, and C2 as one unit.

On the other hand, in the encoding device and decoding device according to the eleventh embodiment, there is provided a method of changing header information including the motion vector and the like for each of the components C0, C1, and C2 according to the state of the above-mentioned control signal, specifically, a signal corresponding to the inter prediction mode-sharing identification flag 123 described in the seventh embodiment of the present invention, to signal a skipped macroblock for each of the components C0, C1, and C2. Specific examples of the bit stream syntax are illustrated in FIGS. 49 and 50.

Figure 49:
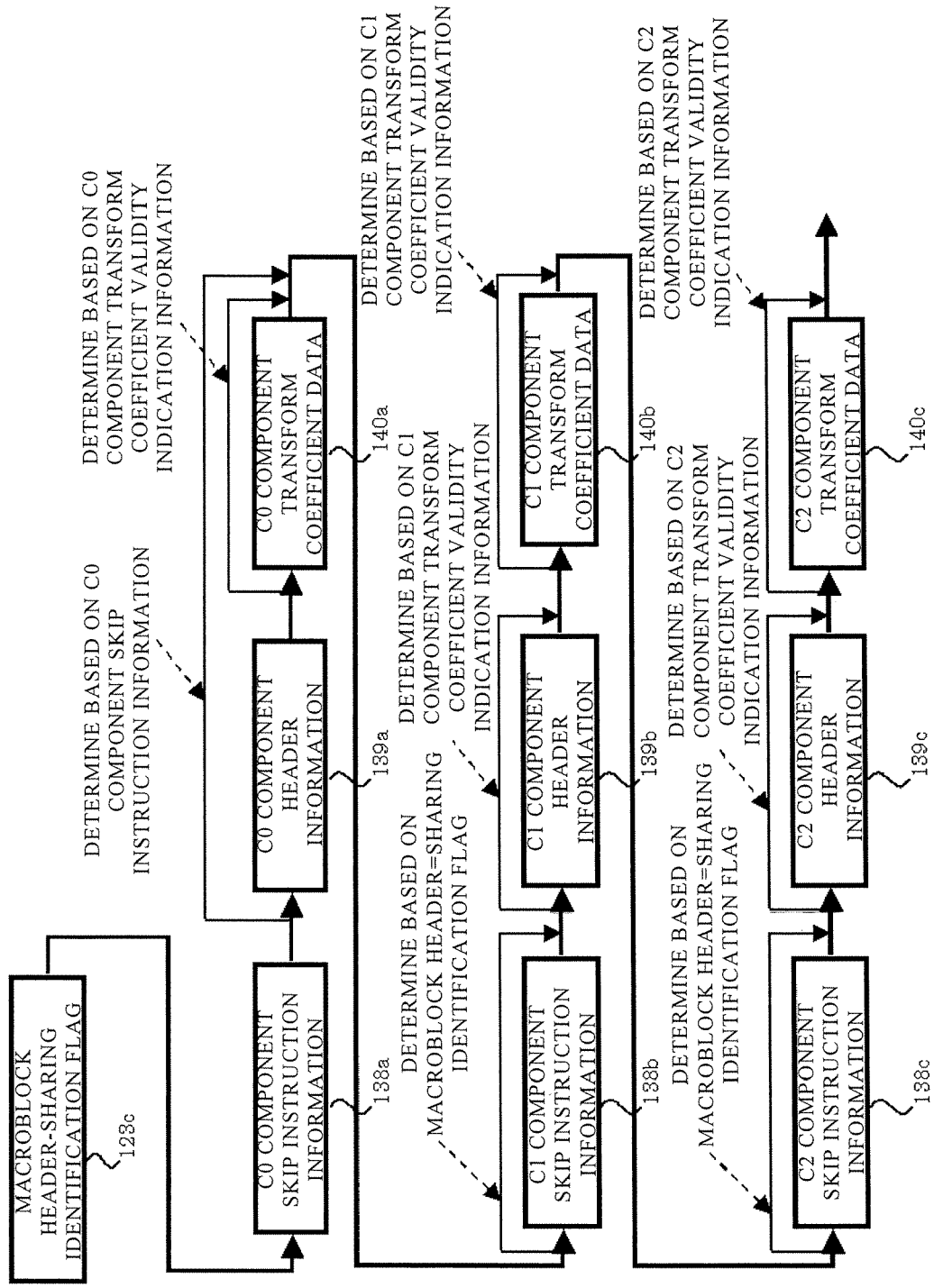
FIG. 49 is an explanatory view illustrating a structure of macroblock encoded data in an eleventh embodiment.
Figure 50:
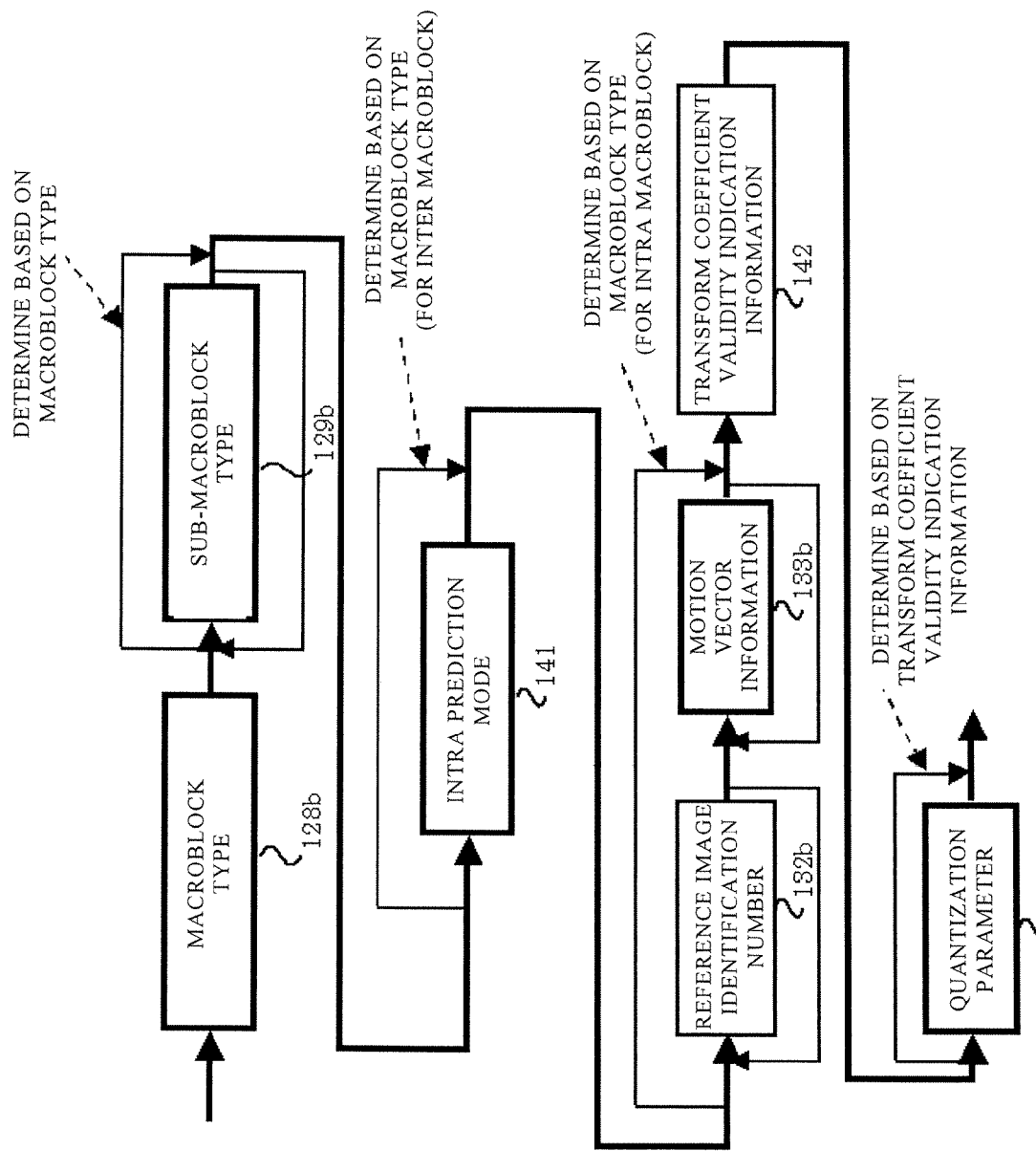
FIG. 50 is an explanatory view illustrating a detailed structure of encoded data of Cn component header information in FIG. 49 in the eleventh embodiment.

FIG. 49 illustrates a configuration of macroblock encoding data, which is output from the encoding device according to the eleventh embodiment to be input to the decoding device according to the eleventh embodiment, and FIG. 50 illustrates a detailed configuration of encoding data in Cn component header information illustrated in FIG. 49. Hereinafter, for the description of the effect of this bit stream configuration, an operation of the decoding device for receiving the bit stream to restore the video signal will be mainly described. For the description of the operation of the decoding device, FIG. 31 is referred to.

The definition of the inter prediction mode-sharing identification flag 123 in the seventh embodiment of the present invention is extended to be represented as a macroblock header-sharing identification flag 123c. The macroblock header-sharing identification flag 123c regards C0 component header information 139a as basic macroblock header information to instruct the multiplexing of only the C0 component header information 139a as header information commonly used for the C1 and C2 components or the individual multiplexing of each of C1 component header information 139b and C2 component header information 139c as extended header information. The macroblock header-sharing identification flag 123c is extracted from the video stream 22 and decoded by the variable length decoding unit 25. When the flag 123c instructs the multiplexing of the C0 component header information 139a alone as header information commonly used for the C1 and C2 components, all the components C0, C1, and C2 in the macroblock are decoded by using the C0 component header information 139a. When the flag 123c instructs the individual multiplexing of each of the C1 component header information 139b and the C2 component header information 139c as extended header information, the decoding is performed by using the header information 139a to 139c proper to the respective color components C0, C1, and C2 in the macroblock. Hereinafter, this regard will be described further in detail as a process implemented on the macroblock basis.

1. Multiplexing of the C0 Component Header Information Alone

When the macroblock header-sharing identification flag 123c indicates the multiplexing of the C0 component header information 139a alone as header information commonly used for the C1 and C2 components, the macroblock is decoded for all the components C0, C1, and C2 based on various macroblock header information contained in the C0 component header information 139a. In this case, since C0 component skip instruction information 138a and the C0 component header information 139a are commonly used for the C1 and C2 components, skip instruction information (138b and 138c) and header information (139b and 139c) for the C1 and C2 components are not multiplexed in the bit stream.

The variable length decoding unit 25 first decodes and evaluates the C0 component skip instruction information 138a. When the C0 component skip instruction information 138a indicates "skip," the C0 component header information 139a is regarded as not being encoded and transform coefficient validity indication information 142 in the C0 component header information 139a is regarded as zero (no encoded transform coefficient). As a result, C0 component transform coefficient data, C1 component transform coefficient data, and C2 component transform coefficient data (140a to 140c) are all regarded as not being encoded. Therefore, all the quantized transform coefficients 10 in the macroblock are output as zero. Further, according to the definition of the skipped macroblock, the motion vectors 137 of all the components C0, C1, and C2 are set to the same value to be output.

When the C0 component skip instruction information 138a indicates non-"skip," the C0 component header information 139a is regarded as being present and is decoded. When the macroblock type 128b in the C0 component header information 139a indicates intra encoding, the intra prediction mode 141, the transform coefficient validity indication information 142, and (if the transform coefficient validity indication information 142 is not zero) the quantization parameter are decoded. If the transform coefficient validity indication information 142 is not zero, the C0 component, C1 component, and C2 component transform coefficient data (140a to 140c) are decoded to be output in the form of the quantized transform coefficients 10. If the transform coefficient validity indication information 142 is zero, the C0 component, C1 component, and C2 component transform coefficient data (140a to 140c) are all regarded as being zero. Then, all the quantized transform coefficients 10 in the macroblock are output as zero. When the macroblock type 128b indicates the inter encoding, the sub-macroblock type 129b is decoded as needed. Further, the reference image identification number 132b, the motion vector information 133b, the transform coefficient validity indication information 142, and (if the transform coefficient validity indication information 142 is not zero) the quantization parameter 21 are decoded. If the transform coefficient validity indication information 142 is not zero, the C0 component, C1 component, and C2 component transform coefficient data (140a to 140c) are decoded to be output in the form of the quantized transform coefficients 10. If the transform coefficient validity indication information 142 is zero, the C0 component, C1 component, and C2 component transform coefficient data (140a to 140c) are all regarded as being zero. Then, all the quantized transform coefficients 10 in the macroblock are output as zero. The decoding of the macroblock according to a predetermined processing procedure by using the output from the variable length decoding unit 25 through the above-mentioned operation is the same as described in the seventh embodiment of the present invention.

2. Multiplexing of Corresponding Header Information for Each of the Components C0, C1, and C2

When the macroblock header-sharing identification flag 123c indicates the multiplexing of each of the C1 component header information 139b and the C2 component header information 139c as extended header information independently of the C0 component header information 139a, each color component image is decoded based on various macroblock header information contained in each of the corresponding header information (139a to 139c) for each of the components C0, C1, and C2. In this case, the skip instruction information (138b and 138c) and the header information (139b and 139c) for the C1 and C2 components are multiplexed in the bit stream.

The variable length decoding unit 25 first decodes and evaluates the C0 component skip instruction information 138a. When the C0 component skip instruction information 138a indicates "skip," the C0 component header information 139a is regarded as not being encoded and the transform coefficient validity indication information 142 in the C0 component header information 139a is regarded as zero (no encoded transform coefficient). As a result, the C0 component transform coefficient data 140a is regarded as not being encoded. Therefore, all the quantized transform coefficients 10 in the C0 component is output as zero (specifically, a value of the macroblock header-sharing identification flag 123c changes the relation between the C0 component skip instruction information 138a and the transform coefficient validity indication information 142). Further, the motion vector 137 of the C0 component is set according to the definition in the case of the skipping of the C0 component to be output.

When the C0 component skip instruction information 138a indicates non-"skip," the C0 component header information 139a is regarded as being present to be decoded. When the macroblock type 128b in the C0 component header information 139a indicates intra encoding, the intra prediction mode 141 (spatial pixel prediction mode using the neighboring pixels of the pixel to be predicted in the frame as a prediction value), the transform coefficient validity indication information 142, and (if the transform coefficient validity indication information 142 is not zero) the quantization parameter 21 are decoded. If the transform coefficient validity indication information 142 is not zero, the C0 component transform coefficient data is decoded to be output in the form of the quantized transform coefficient 10. If the transform coefficient validity indication information 142 is zero, the C0 component transform coefficient data are all zero. When the macroblock type indicates the inter encoding, the sub-macroblock type is decoded as needed. Further, the reference image identification number, the motion vector information, the transform coefficient validity indication information 142, and (if the transform coefficient validity indication information 142 is not zero) the quantization parameter are decoded. If the transform coefficient validity indication information 142 is not zero, the C0 component transform coefficient data is decoded to be output in the form of the quantized transform coefficient 10. If the transform coefficient validity indication information 142 is zero, the C0 component transform coefficient data are all regarded as being zero. The above-mentioned processing procedure is performed in the same manner on C1 and C2.

The decoding of each of the components C0, C1, and C2 in the macroblock according to a predetermined processing procedure by using the output from the variable length decoding unit 25 through the above-mentioned operation is the same as described in the seventh embodiment of the present invention.

The operation in the decoding device has mainly been described. By configuring the bit stream as described above, the following effects are obtained. First, there is only one set of header information (FIG. 50) available for each macroblock in the conventional AVC. The intra/inter determination is required to be performed for a set of all the components C0 to C2 according to the header information to implement the encoding. On the other hand, as in the 4:4:4 format, for a case where a signal component corresponding a luminance signal which transmits the contents of the image signal is equally contained in the three color components, a variation sometimes occurs in signal characteristics due to the superposition of a noise on the input video signal for each of the components, or the like. Therefore, the collective encoding of all the components C0 to C2 is not always optimal. On the premise of the bit stream configurations in FIGS. 49 and 50 according to the eleventh embodiment, by the macroblock header-sharing identification flag 123c, the encoding device can select the optimal encoding mode (the macroblock type including the intra/inter encoding type), motion vector and the like according to the signal characteristic for each of the color components C0 to C2 to implement the encoding, thereby enhancing the encoding efficiency. Moreover, since the encoding is conventionally performed on the macroblock basis, each macroblock being obtained by gathering all the components C0 to C2. Therefore, skipping and determination are performed on the condition that the encoded information of all the components are all absent. In the eleventh embodiment, however, the presence/absence of the encoded information is configured to be determined based on the skip instruction information 138 for each component. Therefore, for a case where only a certain component is to be skipped while the other components are not to be skipped, it is not necessary to determine that all the components are not to be skipped. Accordingly, the amount of codes can be more efficiently allocated. In the encoding device, the value of the skip instruction information 138 is determined in the variable length encoding unit 11 according to the definition of the skipped macroblock uniquely defined by both the encoding device and the decoding device as described in this paragraph based on the quantized transform coefficient data 10, the motion vector 137, the reference image identification number 132b, and the macroblock type/sub-macroblock type 106.

Figure 51:
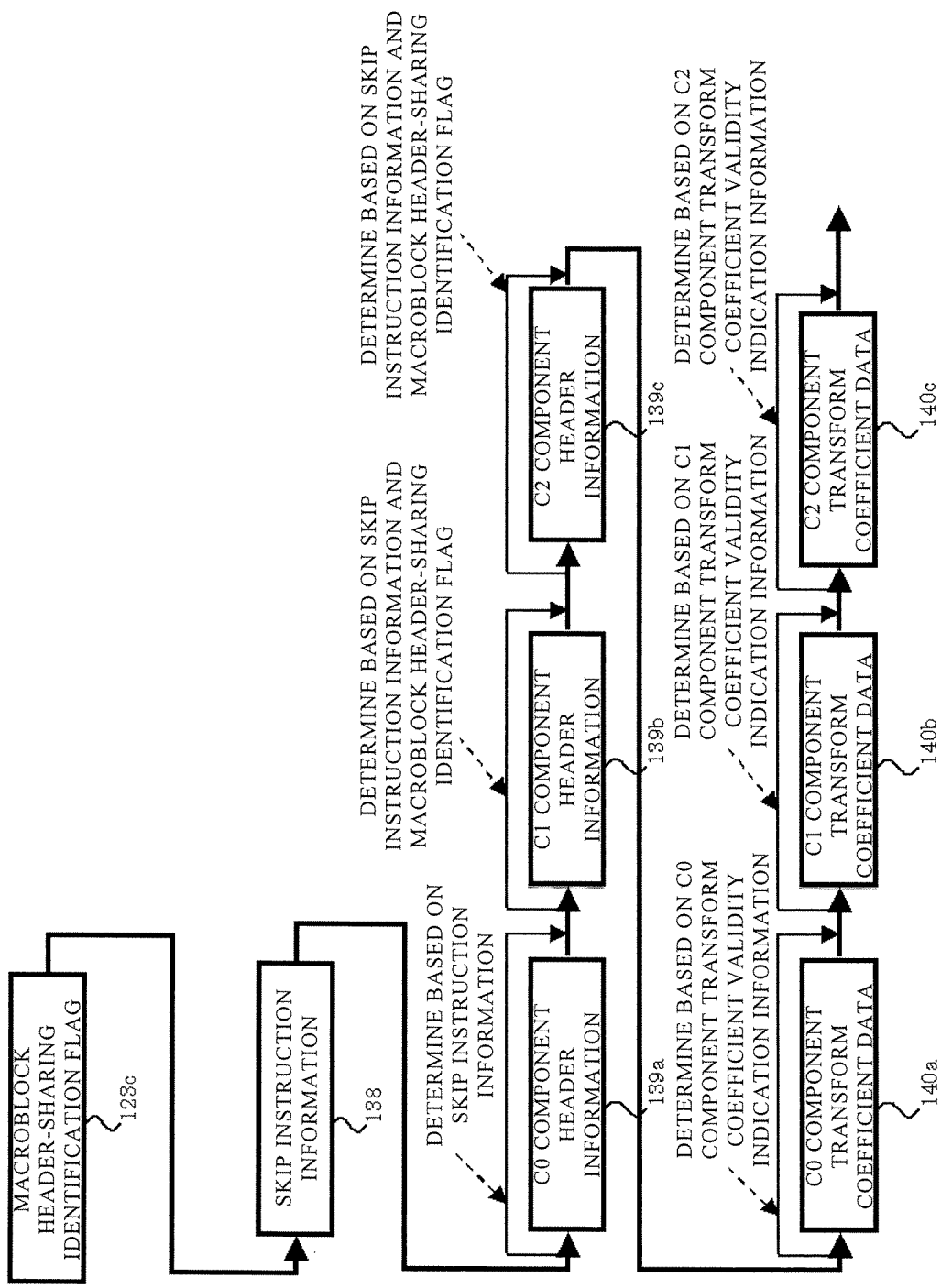
FIG. 51 is an explanatory view illustrating another structure of the macroblock encoded data in the eleventh embodiment.

Note that the bit stream handled by the encoding device and the decoding device according to the eleventh embodiment may be configured as illustrated in FIG. 51. In this example, the skip instruction information (138), the header information (139a to 139c), and the transform coefficient data (140a to 140c) are collectively arranged for each of the components C0, C1, and C2. In the skip instruction information 138, each of the states of the color components C0, C1, and C2 may be arranged as one-bit code symbol. Alternatively, eight states may be collectively encoded into one code symbol. When the color components have a high correlation in the skip state, the code symbols are gathered to appropriately define a context model of the arithmetic coding (described in a twelfth embodiment below) to enable the enhancement of the encoding efficiency of the skip instruction information 138 itself.

Note that the macroblock header-sharing identification flag 123c may be multiplexed in the bit stream in units of arbitrary data layers such as the macroblock, the slice, the picture, and the sequence. When there is steadily a difference in signal property between the color components in the input signal, efficient encoding can be performed with less overhead information by configuring the macroblock header-sharing identification flag 123c to be multiplexed for each sequence. Moreover, the macroblock header-sharing identification flag 123c is configured to be multiplexed for each picture. With this configuration, a header is commonly used for the color components in an I-picture having less variations in macroblock type, whereas a different individual header is used for each color component in P- and B-pictures having greater variations in macroblock type. As a result, the effect of improving the balance between the encoding efficiency and a calculation load is expected to be obtained. Further, it is believed that the switching in the picture layer is desirable even in view of the encoding control of the video signal having a property varying for each picture, for example, for a scene change. When the macroblock header-sharing identification flag 123c is multiplexed for each macroblock, the amount of codes per macroblock increases. On the other hand, it is possible to control whether or not to use the common header information based on the signal state of each of the color components for each macroblock. As a result, the encoding device which better follows a local variation in signal of the image to improve the compression efficiency can be configured.

Figure 52:
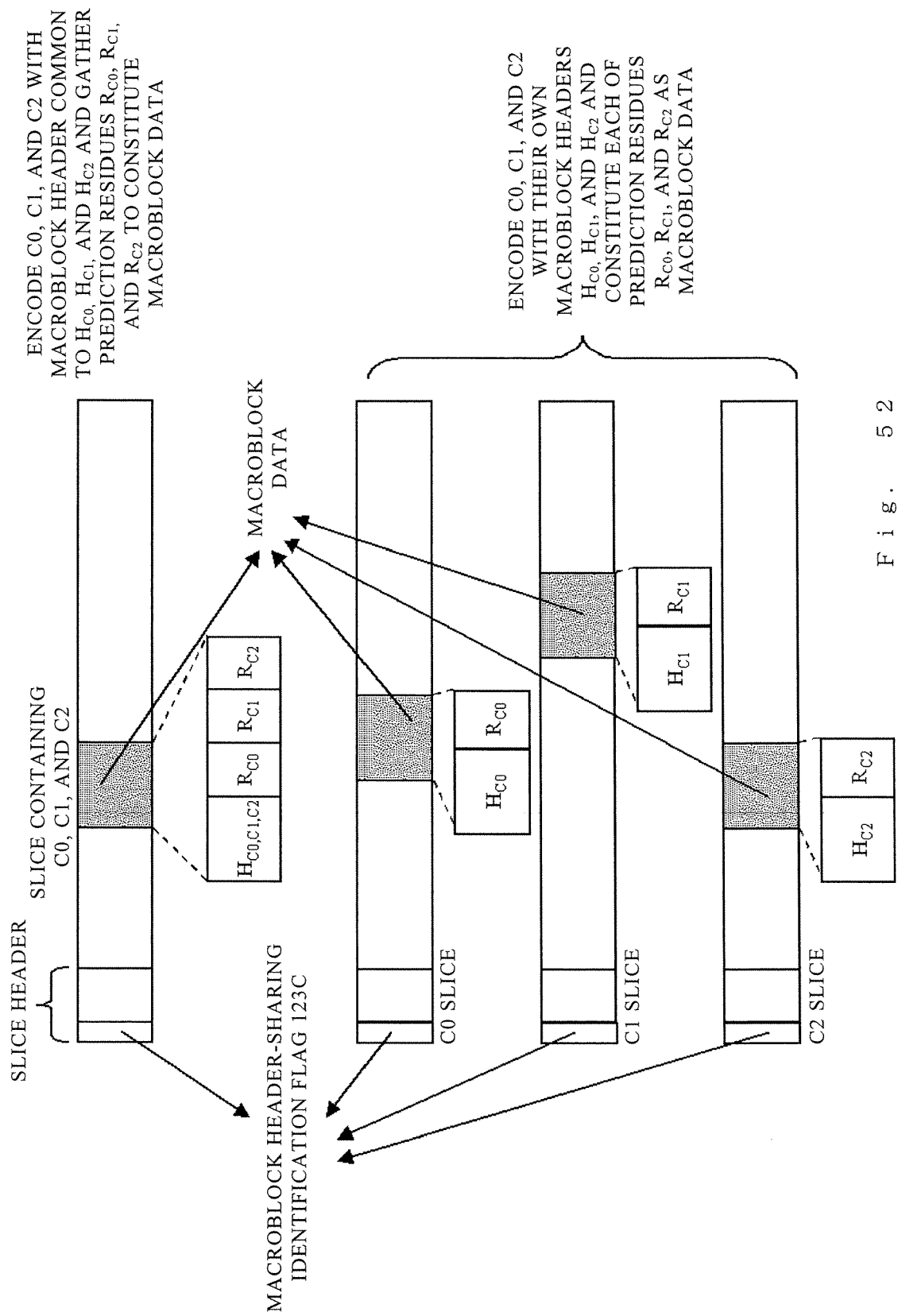
FIG. 52 is an explanatory view illustrating a structure of the bit stream in the eleventh embodiment.
Figure 53:
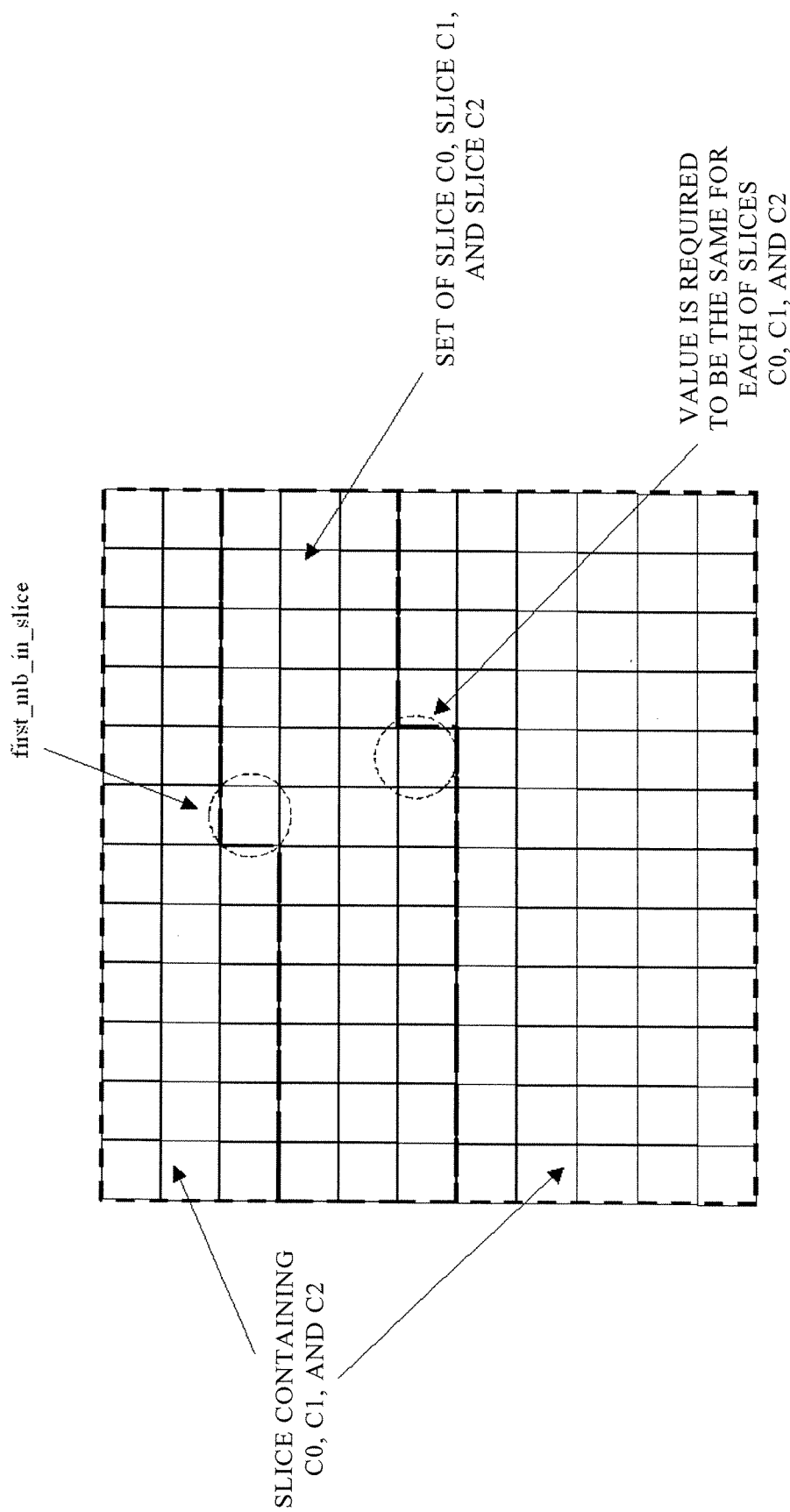
FIG. 53 is an explanatory view illustrating a structure of slices in the eleventh embodiment.

When the encoding type corresponding to the picture type is switched in the slice level as in the AVC, the following method is conceived. The macroblock header-sharing identification flag 123c is multiplexed for each slice. Then, when the macroblock header-sharing identification flag 123c indicates that the header information is "common to C0, C1, and C2," the bit stream is configured to allow the slice to contain all the encoded information of the three color components. On the other hand, when the macroblock header-sharing identification flag 123c indicates that the header information is not "common to C0, C1, and C2," the bit stream is configured to allow one slice to contain the information of one color component. This state is illustrated in FIG. 52. In FIG. 52, the macroblock header-sharing indication flag 123c also serves as slice configuration identification information indicating whether "a current slice contains all the encoded information of the three color components" or "a current slice contains the encoded information of a certain specific color component." It is apparent that the slice configuration identification information may be provided independently of the macroblock header-sharing identification flag 123c. When the slice configuration identification information indicates that "a current slice contains the encoded information of a certain specific color component," the identification also indicates "which of C0, C1, and C2 is the specific color component." For the switching between the common use of one macroblock header for the components C0, C1, and C2 (a slice containing C0, C1, and C2) and the individual multiplexing of a macroblock for each of the components C0, C1, and C2 (a slice C0, a slice C1, and a slice C2), when two types of slice are present in a single picture, the slice C0, the slice C1, and the slice C2 are restricted to be multiplexed in the bit stream in a set as data obtained by encoding the macroblock at always the same position in the screen. Specifically, first_mb_in_slice contained in the slice header to indicate the intra-picture position of the head macroblock in the slice has always the same value in one set of the slice C0, the slice C1, and the slice C2. Moreover, the number of macroblocks contained in one set of the slice C0, the slice C1, and the slice C2 is the same. This state is illustrated in FIG. 53. By providing such a restriction on the configuration of the bit stream, the encoding device can adaptively select the encoding method with a higher encoding efficiency for the slice containing C0, C1, and C2 or the set of the slice C0, the slice C1, and the slice C2 according to the local property of the signal in the picture. The decoding device can receive the bit stream efficiently encoded in the above-mentioned manner to reproduce the video signal. For example, assuming that the video stream 22 input to the decoding device illustrated in FIG. 31 has the configuration as described above, the variable length decoding unit 25 decodes the slice configuration identification information from the bit stream each time the slice data is input. Then, the variable length decoding unit 25 identifies the type of slice to be decoded from the slice types illustrated in FIG. 52. When it is determined, based on the slice configuration identification information, that the encoded data is configured as a set of the slice C0, the slice C1, and the slice C2, the state of the inter prediction mode-sharing identification flag 123 (or the macroblock header-sharing identification flag 123c) may be determined as "use a different individual inter prediction mode (or macroblock header) for each of C0, C1, and C2" to perform the decoding operation. Since it is ensured that the value of first_mb_in_slice of each slice and the number of macroblocks in the slice are always the same, the decoding process can be performed without generating an overlap or a gap with the slice containing C0, C1, and C2 on the picture based on the same value of first_mb_in_slice and the same number of macroblocks in the slice.

In order to prevent the encoding efficiency from being lowered by providing such a restriction when the properties of the signals of the respective slices C0, C1, and C2 greatly differ from each other, identification information which enables the selection of permission/non-permission of the presence of slices each including the slice configuration identification information having different values in the picture at the picture level or the sequence level may be provided.

Twelfth Embodiment

In the twelfth embodiment, an embodiment of another encoding device and another decoding device which derive from the encoding device and the decoding device described in the eleventh embodiment of the present invention will be described. When the adaptive arithmetic coding is employed to encode each of the components C0, C1, and C2 in the macroblock, the encoding device and the decoding device according to the twelfth embodiment adaptively perform the switching between the sharing of a symbol occurrence probability used for arithmetic coding and its learning process in all the components, and the separate use of the symbol occurrence probability and the learning process for each of the components, based on the identification information multiplexed in the bit stream.

The twelfth embodiment of the present invention differs from the eleventh embodiment of the present invention only in the process performed in the variable length encoding unit 11 of FIG. 30 for the encoding device and the process performed in the variable length decoding unit 25 of FIG. 31 for the decoding device. The remaining operation is as described in the eleventh embodiment of the invention. Hereinafter, an arithmetic coding process and an arithmetic decoding process which are important characteristics of the twelfth embodiment of the invention will be described in detail.

1. Encoding Process

Figure 54:
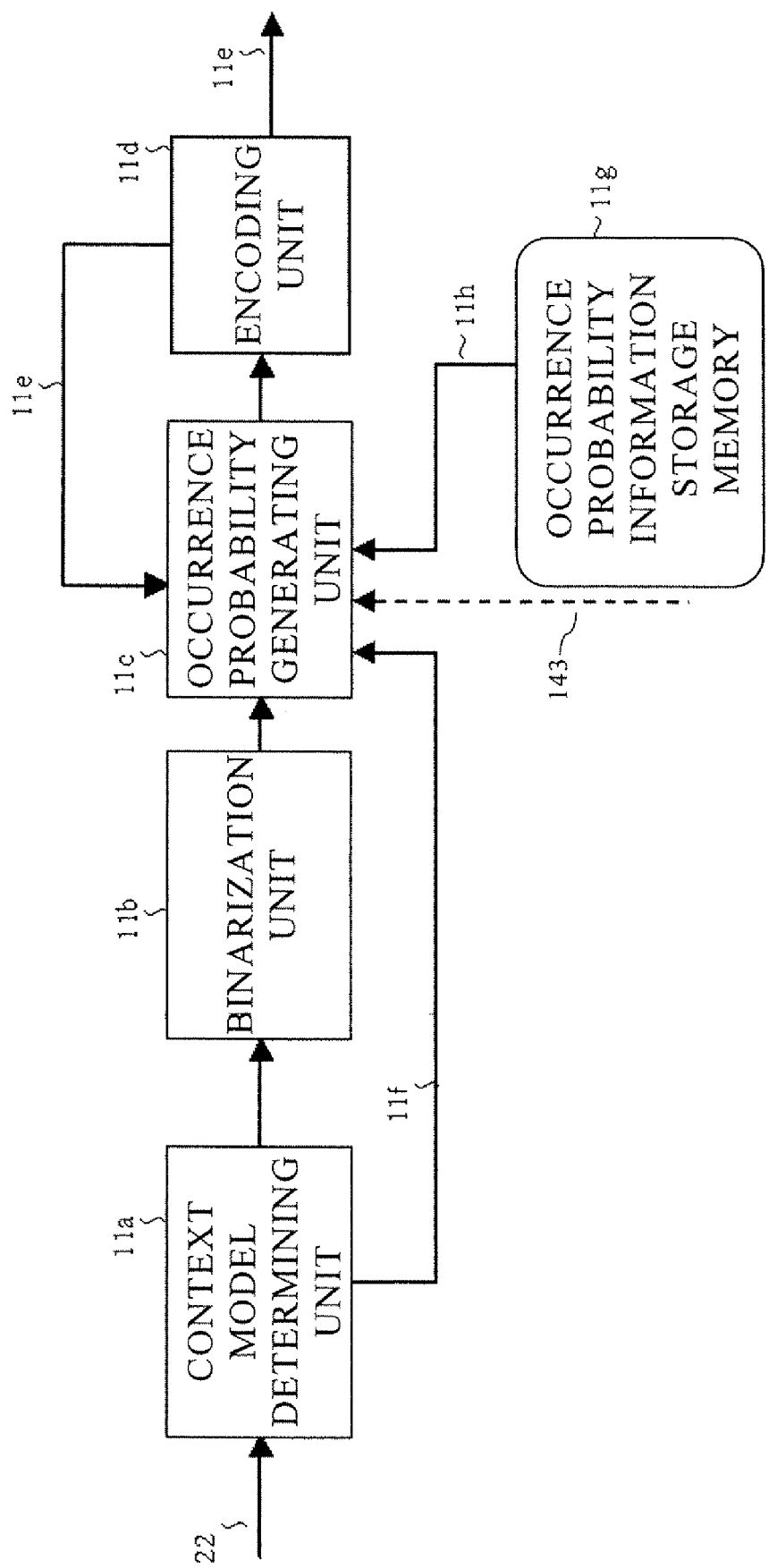
FIG. 54 is an explanatory view illustrating an internal configuration of a variable length encoding unit, which is related to an arithmetic coding process, in a twelfth embodiment.
Figure 55:
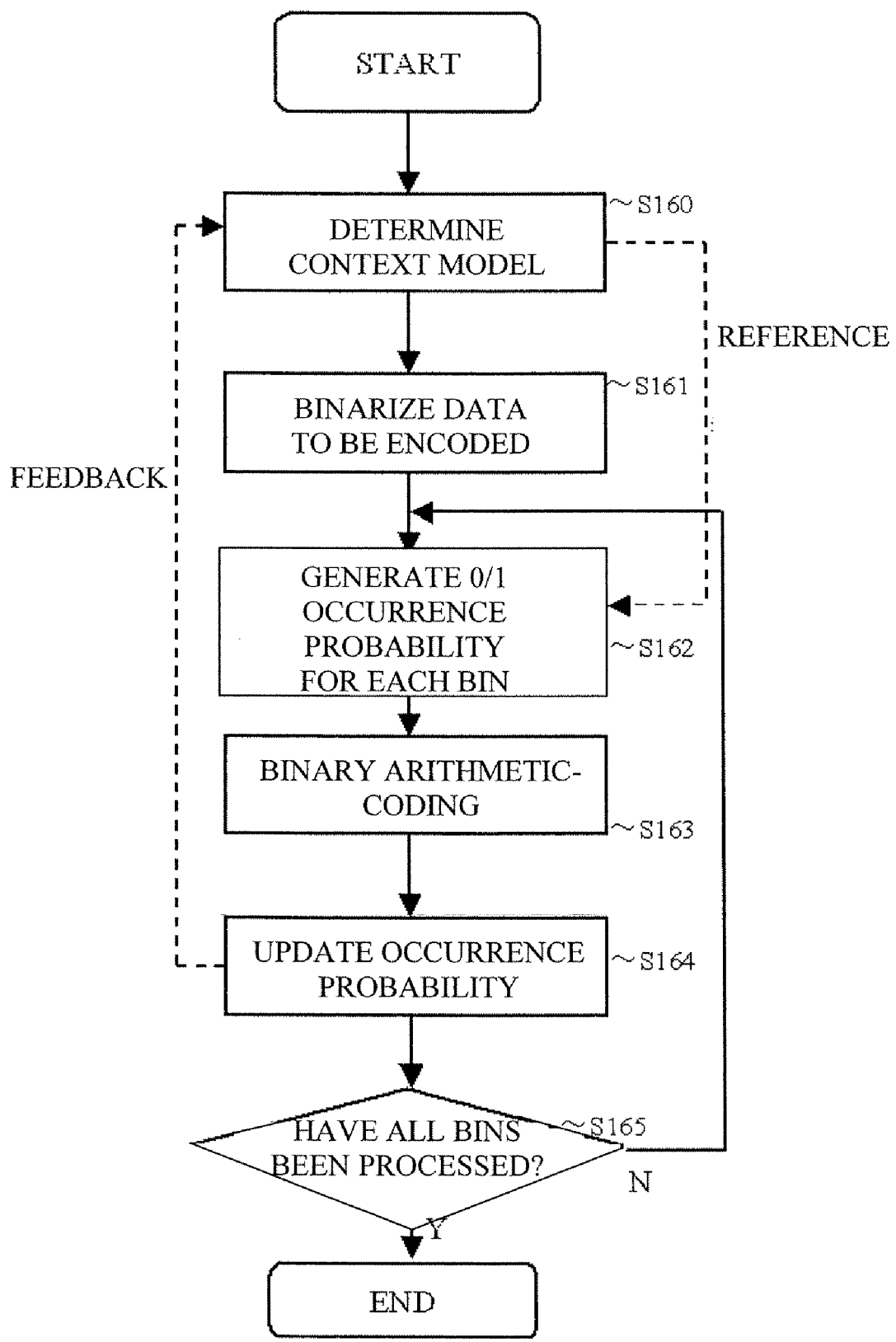
FIG. 55 is a flowchart illustrating a flow of the arithmetic coding process in the variable length encoding unit in the twelfth embodiment.
Figure 56:
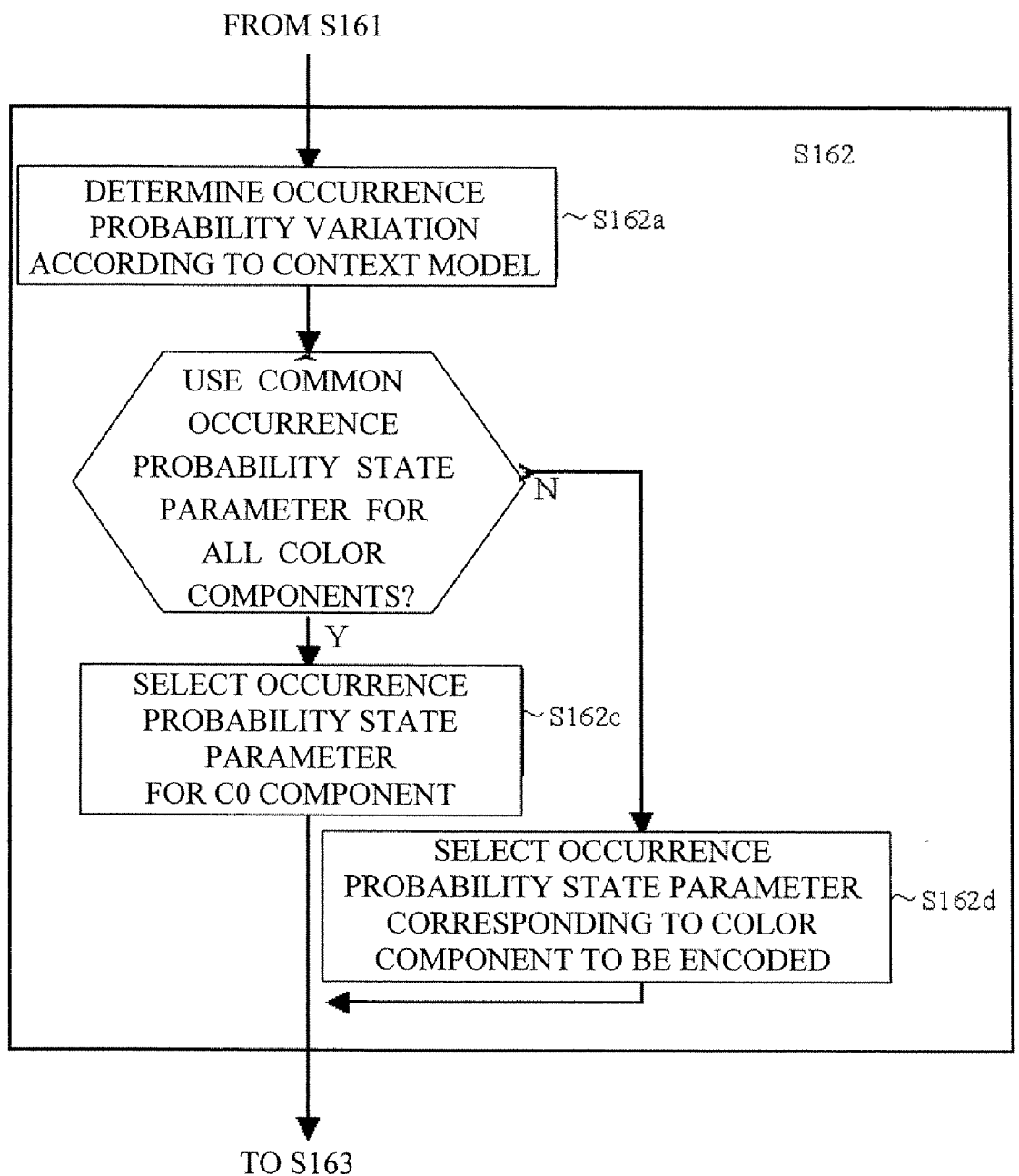
FIG. 56 is an explanatory view illustrating a detailed flow of a process of Step S162 in FIG. 55 in the twelfth embodiment.

FIG. 54 illustrates an internal configuration related with the arithmetic coding process in the variable length encoding unit 11, and FIGS. 55 and 56 are flowcharts, each illustrating an operation flow of the arithmetic coding process.

The variable length encoding unit 11 in the twelfth embodiment of the invention includes a context model determining unit 11a, a binarization unit 11b, an occurrence probability generation unit 11c, an encoding unit 11d, and a memory 11g. The context model determining unit 11a determines a context model (described below) defined for each data type such as the motion vector 137, the reference image identification number 132b, the macroblock type/sub-macroblock type 106, the intra prediction mode 141, or the quantized transform coefficient 10, which is data to be encoded. The binarization unit 11b converts multivalued data into binary data according to a binarization rule determined for each of the types of data to be encoded. The occurrence probability generation unit 11c provides an occurrence probability of a value (0 or 1) of each bin obtained after the binarization. The encoding unit 11d executes the arithmetic coding based on the generated occurrence probability. The memory 11g stores occurrence probability information. Various data input to the variable length encoding unit 11 as data to be encoded, such as the motion vector 137, the reference image identification number 132b, the macroblock type/sub-macroblock type 106, the intra prediction mode 141, and the quantized transform coefficient 10, are input to the context model determining unit 11a. An output from the encoding unit 11d corresponds to information for the macroblock in the video stream 22.

(1) Context Model Determining Process (Step S160 in FIG. 55)

Figure 57:
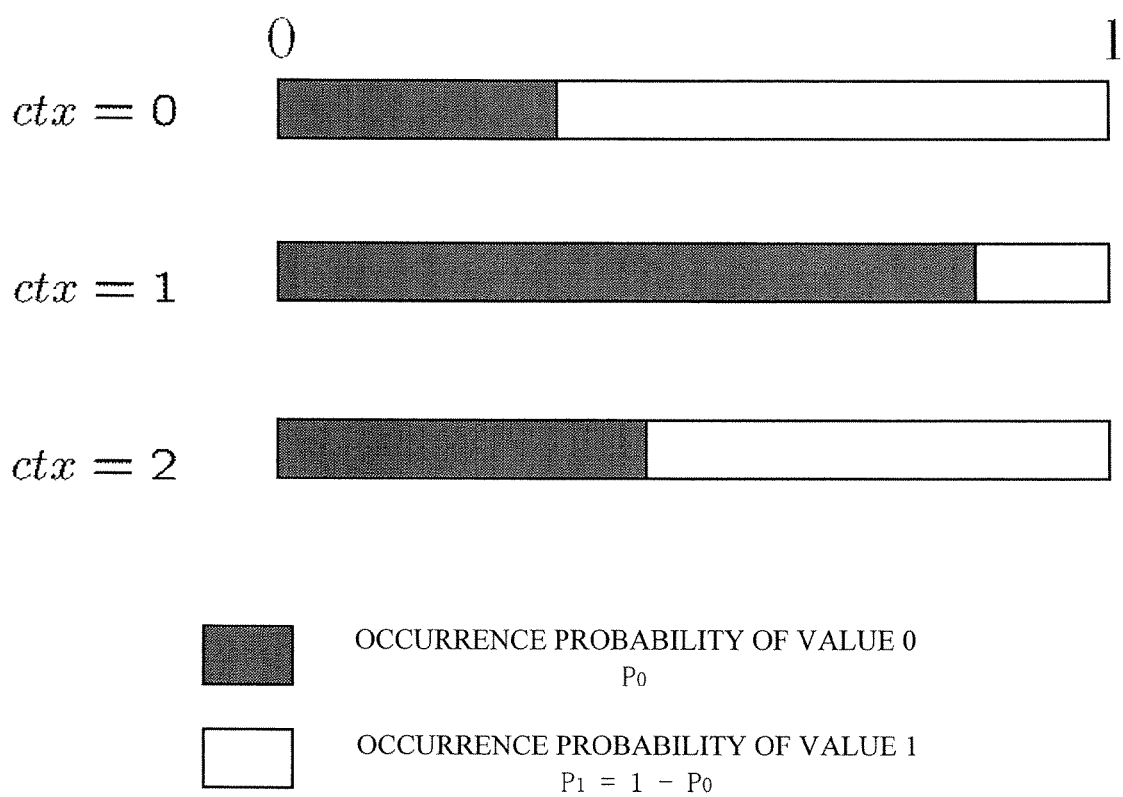
FIG. 57 is an explanatory view illustrating a concept of a context model (ctx)
Figure 58:
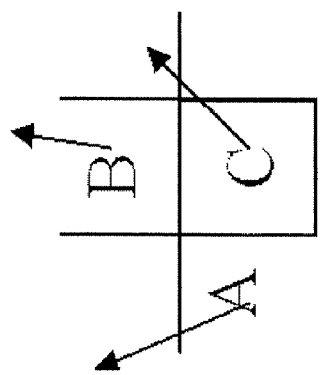
FIG. 58 is an explanatory view illustrating an example of the context model regarding the motion vector of the macroblock.

The context model is obtained by modeling the dependency on the other information which causes a variation in occurrence probability of an information source symbol. By switching a state of the occurrence probability to correspond to the dependency, the encoding more adaptive to an actual occurrence probability of the symbol is enabled. FIG. 57 illustrates the concept of the context model (ctx). Note that the information source symbol is binary in FIG. 57, but the information source symbol may be multivalued. Options 0 to 2 of FIG. 57 as the context model ctx are defined supposing that the state of the occurrence probability of an information source symbol which uses the ctx will change according to the condition. In the case of video encoding in the twelfth embodiment of the present invention, the value of ctx is switched according to the dependency between the encoded data in a certain macroblock and the encoded data of the neighboring macroblocks. For example, FIG. 58 illustrates an example of the context model for the motion vector of the macroblock, which is disclosed in "Video Compression Using Context-Based Adaptive Arithmetic Coding" by D. Marpe et al., International Conference on Image Processing 2001. In FIG. 58, a motion vector of a block C is to be encoded (more precisely, a prediction difference value $mvd_k(C)$ obtained by predicting the motion vector of the block C from the neighboring blocks is encoded), and ctx_mvd(C,k) indicates a context model. A motion vector prediction difference value in a block A is denoted by $mvd_k(A)$ and a motion vector prediction difference value in a block B is denoted by $mvd_k(B)$, which are used for defining a switching evaluation value $e_k(C)$ of the context model. The evaluation value $e_k(C)$ indicates a variation between the neighboring motion vectors. Generally, when the variation is small, $mvd_k(C)$ tends to be small. On the other hand, when the variation is large, $mvd_k(C)$ tends to be large. Therefore, it is desirable that a symbol occurrence probability of $mvd_k(C)$ be adapted based on $e_k(C)$. A set of variations of the occurrence probability is a context model. In this case, it can be said that there are three occurrence probability variations.

Besides, a context model is predefined for each data to be encoded such as the macroblock type/sub-macroblock type 106, the intra prediction mode 141, and the quantized transform coefficient 10 to be shared by the encoding device and the decoding device. The context model determining unit 11a performs a process of selecting the predefined model based on the type of the data to be encoded as described above (the selection of the occurrence probability variation from those in the context model corresponds to an occurrence probability generating process described in (3) below).

(2) Binarization Process (Step S161 in FIG. 55)

The context model is determined according to each bin (binary position) in a binary sequence obtained by binarizing the data to be encoded in the binarization unit 11b. According to the binarization rule, a variable length transform into a binary sequence is performed according to a rough distribution of possible values for each of the encoded data. For the binarization, the number of divisions of a probability number line can be reduced to advantageously simplify the calculation and to enable the context model to be streamlined by encoding the data to be encoded for each bin, which can otherwise be multivalued, rather than by arithmetic coding.

(3) Occurrence Probability Generating Process (Step S162 in FIG. 55 (a Detailed Process in Step S162 is Illustrated in FIG. 56))

Through the above-mentioned processes (1) and (2), the binarization of the multivalued data to be encoded and the setting of the context model used for each bin are completed to complete the preparation for encoding. Subsequently, the occurrence probability generation unit 11c performs a process of generating an occurrence probability state used for the arithmetic coding. Each context model contains the occurrence probability variations for each of values 0 and 1. Therefore, as illustrated in FIG. 54, the process is performed referring to the context model 11f determined in Step S160. The evaluation value for selecting the occurrence probability as indicated by $e_k(C)$ of FIG. 58 is determined. According to the determined evaluation value, the occurrence probability variation to be used for the current encoding is determined from the context model options to be referred to (Step S162a in FIG. 56). Further, the variable length encoding unit 11 according to the twelfth embodiment includes the occurrence probability information storage memory 11g which has the mechanism of storing an occurrence probability state 11h sequentially updated in the encoding process, separately for each of the color components. The occurrence probability generation unit 11c determines the selection of the occurrence probability state 11h to be used for the current encoding from those stored separately for each of the color components C0 to C2 or the sharing of the occurrence probability state 11h for the C0 component by the C1 and C2 components based on a value of an occurrence probability state parameter-sharing identification flag 143, to thereby determine the occurrence probability state 11h actually used for the encoding (Steps S162b to S162d in FIG. 56).

Since the occurrence probability state parameter-sharing identification flag 143 is required to be multiplexed in the bit stream to enable the same selection in the decoding device. Such a configuration provides the following effect. For example, taking FIG. 58 as an example, when the macroblock header-sharing identification flag 123c indicates that the C0 component header information 139a is used even for the other components, one evaluation value $e_k(C)$ in FIG. 58 is determined per macroblock if the macroblock type 128b indicates the 16×16 prediction mode. In this case, the occurrence probability state prepared for the C0 component is always used. On the other hand, when macroblock header-sharing identification flag 123c indicates that the header information (139a to 139c) corresponding to the respective components are used, the value $e_k(C)$ in FIG. 58 can have three variations per macroblock if the macroblock type 128b indicates the 16×16 prediction mode for all of C0, C1, and C2. The encoding unit 11d in the later stage has two options for each variation. Specifically, any one of the common use and update of the occurrence probability state 11h prepared for the C0 component, and the individual use and update of the occurrence probability state 11h prepared for each of the color components can be selected. With the former option, when the components C0, C1, and C2 have nearly the same motion vector distribution, there is a possibility that the common use and update of the occurrence probability state 11h increases a learning frequency to enable better learning of the occurrence probability of the motion vector. With the latter option, when the components C0, C1, and C2 have different motion vector distributions, there is a possibility that the individual use and update of the occurrence probability state 11h can reduce mismatches in learning to enable better learning of the occurrence probability of the motion vector. Since the video signal is non-stationary, the efficiency of the arithmetic coding can be enhanced by enabling the adaptive control as described above.

(4) Encoding Process

Since the occurrence probability of each of the values 0 and 1 on the probability number line required for the arithmetic coding process through the process (3) can be obtained, the arithmetic coding is performed in the encoding unit 11d according to the process described in the conventional examples (Step S163 in FIG. 55). The actual encoded value (0 or 1) 11e is fed back to the occurrence probability generation unit 11c to count an occurrence frequency of 0 or 1 for updating the used occurrence probability state 11h (Step S164). For example, it is assumed that the occurrence probabilities of 0 and 1 in the occurrence probability variation are 0.25 and 0.75 after the encoding process of one hundred bins has been performed using a specific occurrence probability state 11h. In this case, when 1 is encoded by using the same occurrence probability variation, an appearance frequency of 1 is updated to change the occurrence probabilities of 0 and 1 to 0.247 and 0.752, respectively. This mechanism enables the efficient encoding adaptive to the actual occurrence probability. The encoded value 11e is an output from the variable length encoding unit 11, and is output from the encoding device as the video stream 22.

Figure 59:
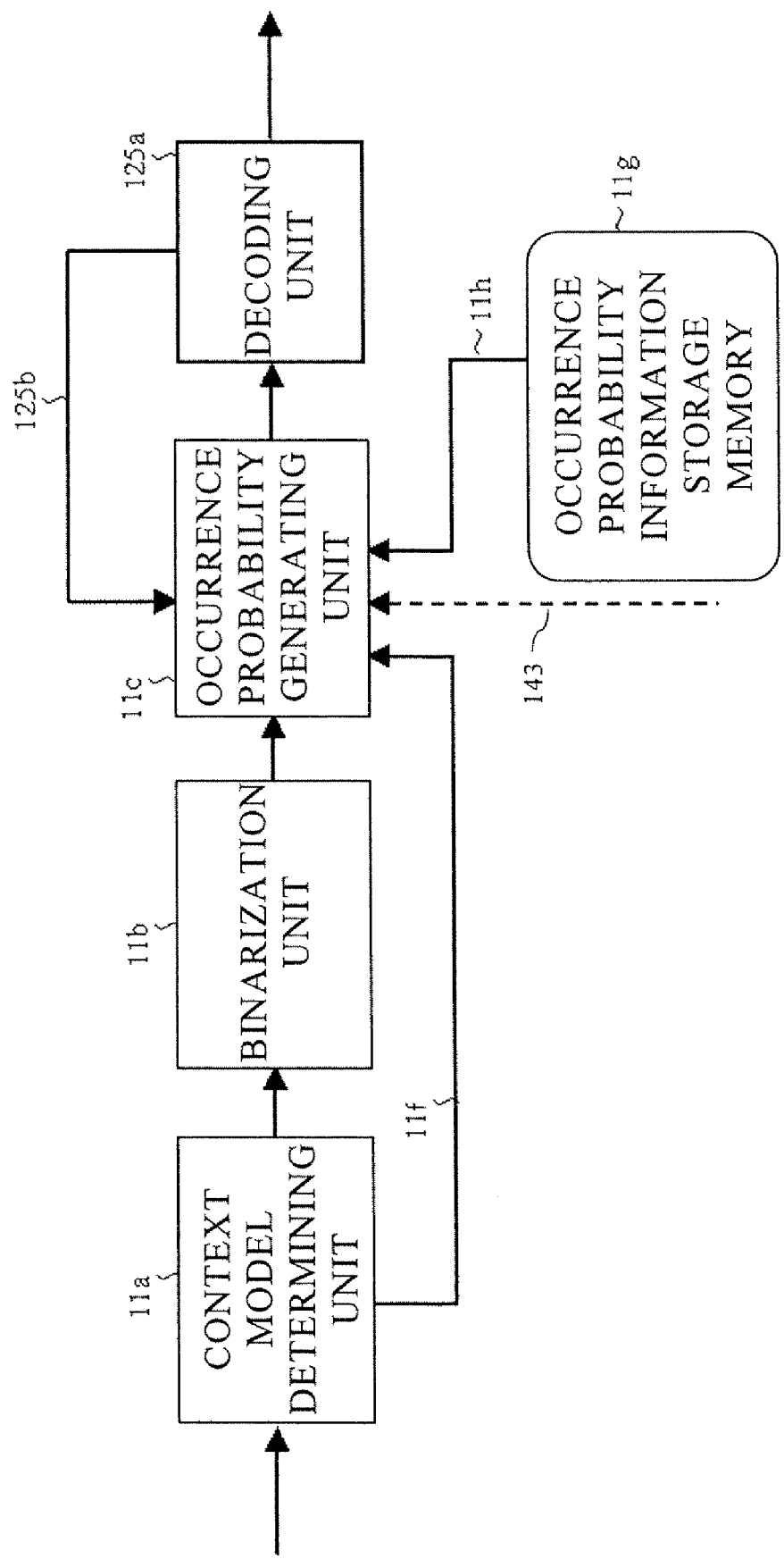
FIG. 59 is an explanatory view illustrating an internal configuration of the variable length decoding unit, which is related to an arithmetic decoding process, in the twelfth embodiment.
Figure 60:
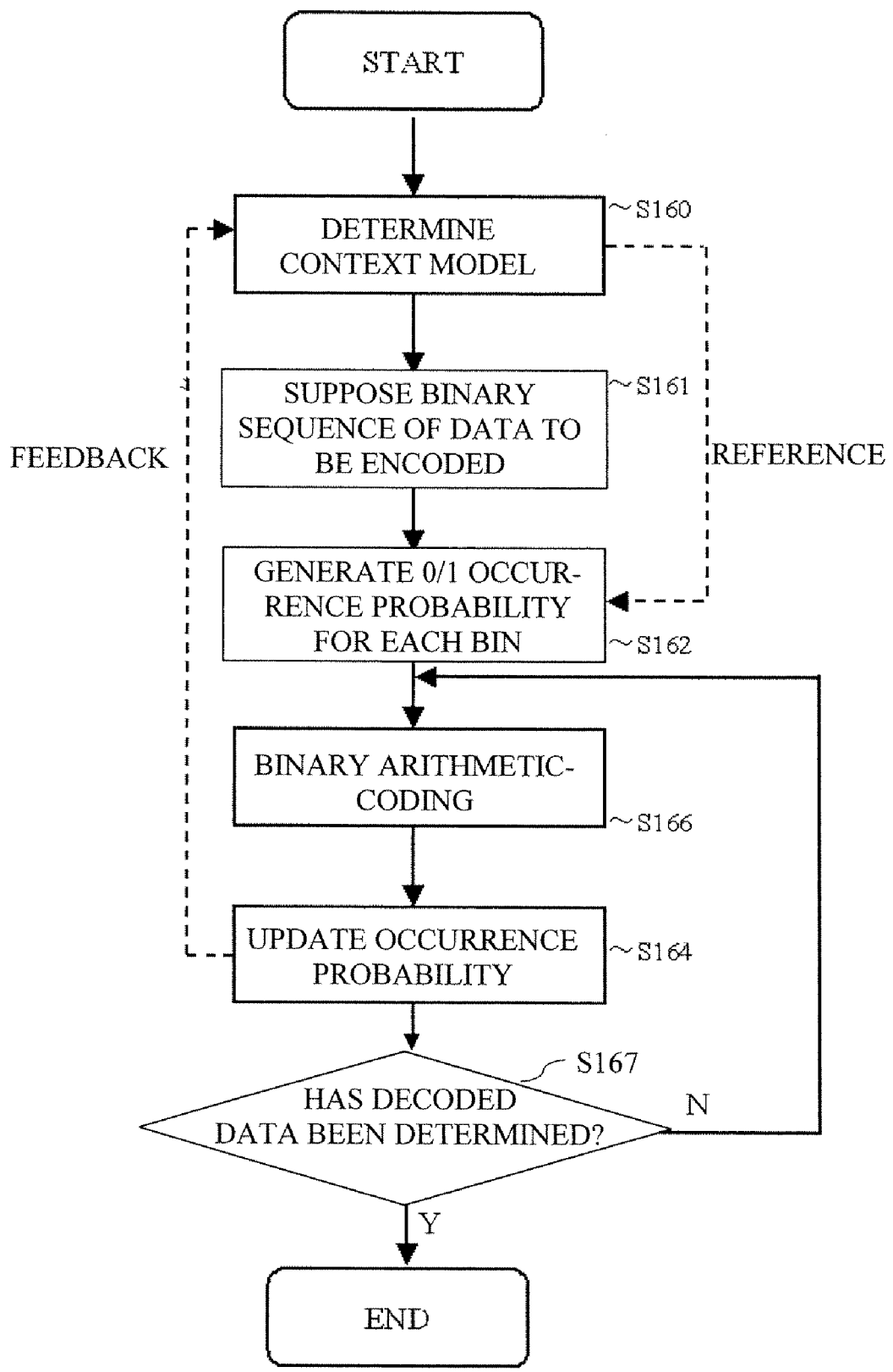
FIG. 60 is a flowchart illustrating a flow of the arithmetic decoding process in the variable length decoding unit in the twelfth embodiment.

FIG. 59 illustrates an internal configuration related with the arithmetic decoding process in the variable length decoding unit 25, and FIG. 60 is a flowchart illustrating an operation flow of the arithmetic decoding process.

The variable length decoding unit 25 according to the twelfth embodiment includes the context model determining unit 11a, the binarization unit 11b, the occurrence probability generation unit 11c, a decoding unit 25a, and the memory 11g. The context model determining unit 11a specifies the type of data to be decoded such as the motion vector 137, the reference image identification number 132b, the macroblock type/sub-macroblock type 106, the intra prediction mode 141, and the quantized transform coefficient 10 to determine a context model defined commonly to the encoding device for each data type. The binarization unit 11b generates a binarization rule determined based on the type of the data to be decoded. The occurrence probability generation unit 11c provides an occurrence probability of each bin (0 or 1) according to the binarization rule and the context model. The decoding unit 25a executes the arithmetic decoding based on the generated occurrence probability to decode the data such as the motion vector 137, the reference image identification number 132b, the macroblock type/sub-macroblock type 106, the intra prediction mode 141, and the quantized transform coefficient 10 based on the resultant binary sequence and the above-mentioned binarization rule. The memory 11g stores the occurrence probability information. The internal components 11a to 11c and 11g are the same as those of the variable length encoding unit 11 of FIG. 54.

(5) Context Model Determining Process, Binarization Process, and Occurrence Probability Generating Process These processes are the same as the processes (1) to (3) performed in the encoding device. It is assumed that the occurrence probability state parameter-sharing identification flag 143 has already been extracted from the video stream 22, which is not shown in the drawings.

(6) Arithmetic Decoding Process

Since the occurrence probability of a bin to be decoded is determined by the processes (1) to (6), the decoding unit 25a decodes a value of the bin according to a predetermined arithmetic decoding process (Step S166 in FIG. 60). A restored value 25b of the bin is fed back to the occurrence probability generation unit 11c to count an occurrence frequency of 0 or 1 to update the used occurrence probability state 11h (Step S164). The decoding unit 25a confirms the matching with the binary sequence pattern determined based on the binarization rule each time the restored value of each bin is determined to output a data value indicated by the matching pattern as a decoded data value (Step S167). Unless the decoded data is determined, the process returns to Step S166 to continue the decoding process.

According to the encoding device including the arithmetic coding process and the decoding device including the arithmetic decoding process in the above-mentioned configurations, in adaptively performing arithmetic coding on the encoded information for each color component according to the macroblock header-sharing identification flag 123c, more efficient encoding is enabled.

The occurrence probability state parameter-sharing identification flag 143 is multiplexed for any one of each macroblock, each slice, each picture, and each sequence, which is not particularly illustrated. By multiplexing the occurrence probability state parameter-sharing identification flag 143 as a flag positioned in the higher-order data layer such as the slice, the picture, or the sequence, overhead bits can be reduced without multiplexing the occurrence probability state parameter-sharing identification flag 143 at the macroblock level for each time when a sufficiently high encoding efficiency is ensured by the switching in the higher-order layer equal to or higher than the slice.

Moreover, the occurrence probability state parameter-sharing identification flag 143 may be information determined in the decoding device based on relative information contained in a bit stream different from the bit stream containing the flag 143.

In the twelfth embodiment, in performing arithmetic coding on the macroblock header-sharing identification flag 123c on the macroblock basis, a model illustrated in FIG. 61 is used for the context model 11f. In FIG. 61, it is assumed that a value of the macroblock header-sharing identification flag 123c in the macroblock X is $IDC_X$. In encoding the macroblock header-sharing identification flag 123c in the macroblock C, the value $IDC_X$, has the following three states according to Formula in FIG. 61 based on a value $IDC_A$ of the macroblock header-sharing identification flag 123c in the macroblock A and a value $IDC_B$ of the macroblock header-sharing identification flag 123c in the macroblock B.

Value 0: both A and B are in a mode of "using a macroblock header common to C0, C1, and C2."

Value 1: any one of A and B is in the mode of "using a macroblock header common to C0, C1, and C2," and the other one is in a mode of "using different macroblock headers for C0, C1, and C2."

Value 2: both A and B are in the mode of "using different macroblock headers for C0, C1, and C2."

By encoding the macroblock header-sharing identification flag 123c in this manner, the arithmetic coding can be performed to be adapted to the encoded states of the neighboring macroblocks to enhance the encoding efficiency. It is apparent from the description of the operation of the decoding device in the twelfth embodiment described above that the context model is defined in the same procedure for arithmetic decoding in the encoding device as well as in the decoding device.

In the twelfth embodiment, for the header information (the macroblock type, the sub-macroblock type, the intra prediction mode, the reference image identification number, the motion vector, the transform coefficient validity indication information, and the quantization parameter) illustrated in FIG. 50, which is contained in the macroblock header, the arithmetic coding is performed with the context mode defined for each of the information types. As illustrated in FIGS. 62A and 62B, any of the context models is defined for the current macroblock C by referring to corresponding information of the macroblocks A and B. If the macroblock C is in the mode of "using a macroblock header common to C0, C1, and C2" and the macroblock B is in the mode of "using different macroblock headers for C0, C1, and C2" as illustrated in FIG. 62A, information of a specific color component selected from any of C0, C1, and C2 is used as the reference information for the definition of the context model.

For example, when the components C0, C1, and C2 correspond to the color components R, G, and B, a method of selecting the G component containing the closest component to that of the luminance signal conventionally used for encoding as a signal which well represents the structure of an image is conceived. This is because there are many cases where the information of the macroblock header is determined based on the G component for the encoding even in the mode of "using a macroblock header common to C0, C1, and C2."

On the other hand, in the reverse case, specifically, when the macroblock C is in the mode of "using different macroblock headers for C0, C1, and C2" whereas the macroblock B is in the mode of "using a macroblock header common to C0, C1, and C2," as illustrated in FIG. 62B, it is necessary to encode and decode the header information of the three color components in the macroblock C. For encoding and decoding, as the reference information in the definition of the context model of the header information of each of the color components, the header information common to the three components is used as the same value for the three components for the macroblock B. It is apparent that, when the macroblock header-sharing identification flag 123c indicates the same value for all the macroblocks A, B, and C, the reference information corresponding to the macroblocks A, B, and C are always present. Therefore, these reference information are used.

It is apparent from the description of the operation of the decoding device in the twelfth embodiment described above that the context model is defined in the same procedure to perform the arithmetic decoding in both the encoding device and the decoding device. Moreover, after the determination of the context model to be used while specifying the component whose information is referred to by the context model, the occurrence probability state associated with the context model is updated based on the state of the occurrence probability state parameter-sharing identification flag 143.

Further, in the twelfth embodiment, the transform coefficient data of each of the components C0, C1, and C2 is arithmetically encoded according to the occurrence probability distribution of each of the data to be encoded. The encoded data for the three components are contained in the bit stream regardless of whether or not the macroblock header is commonly used. Since the intra prediction or the inter prediction is performed in the color space of the encoded input signal to obtain a prediction difference signal in the twelfth embodiment of the present invention, it is believed that a similar occurrence probability distribution is obtained as a distribution of the transform coefficient data obtained by an integer transform of the prediction difference signal, regardless of the state of the neighborhood, for example, regardless of whether or not the macroblock header is commonly used, as illustrated in FIGS. 62A and 62B. Therefore, in the twelfth embodiment, a common context model is defined for each of the components C0, C1, and C2 to be used for the encoding and the decoding, regardless of whether or not the macroblock header is commonly used for the three components.

It is apparent from the description of the operation of the decoding device in the twelfth embodiment described above that the context model is defined in the same procedure to perform the arithmetic decoding in both the encoding device and the decoding device. Moreover, after the determination of the context model to be used while specifying the component whose information is referred to by the context model, the occurrence probability state associated with the context model is updated based on the state of the occurrence probability state parameter-sharing identification flag 143.

Thirteenth Embodiment

The thirteenth embodiment of the present invention describes an example of another encoding device and another decoding device deriving from those described in the seventh to twelfth embodiments of the present invention. The encoding device and the decoding device in the thirteenth embodiment of the present invention are characterized in the following configurations. The encoding device performs a color space transform process in an input stage of the encoding device described in the seventh to twelfth embodiments of the invention to transform a color space of a video signal, which is input to the encoding device after image capture, into an arbitrary color space suitable for the encoding, and then multiplexes information, which designates an inverse transform process for restoring the color space obtained at the time of image capture in the decoding device, in the bit stream. Then, the information designating the inverse transform process is extracted from the bit stream to obtain a decoded image by the decoding device described in the seventh to twelfth embodiments of the invention. Thereafter, an inverse color space transform is performed based on the information designating the inverse transform process.

Figure 63:
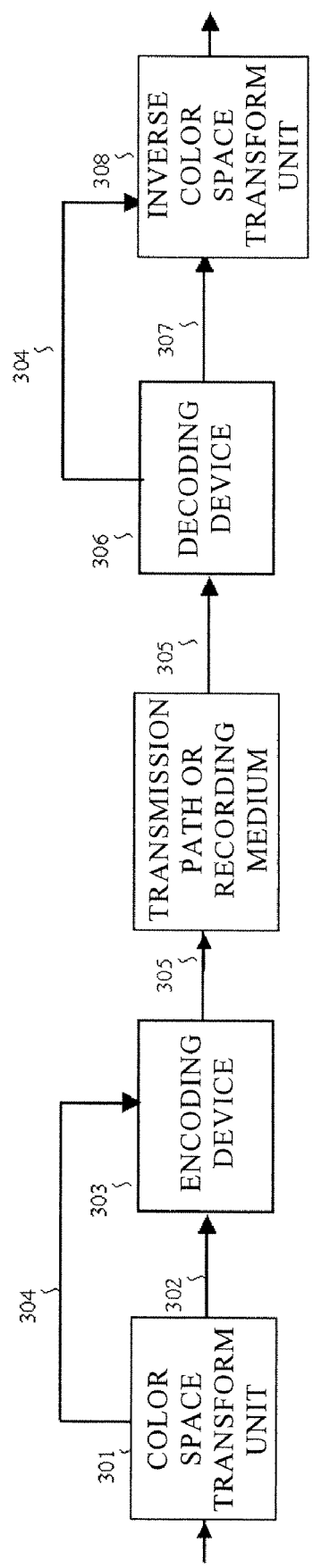
FIG. 63 is an explanatory view illustrating the configurations of the encoding device and the decoding device in a thirteenth embodiment.

FIG. 63 illustrates the configurations of the encoding device and the decoding device according to the thirteenth embodiment. Referring to FIG. 63, the encoding device and the decoding device in the thirteenth embodiment will be described.

The encoding device in the thirteenth embodiment includes an encoding device 303 described in the seventh to twelfth embodiments of the invention and a color space transform unit 301 in the previous stage of the encoding device 303. The color space transform unit 301 includes at least one color space transform process. The color space transform unit 301 selects the color space transform process to be used according to the property of a video signal to be input or the system setting to perform the color space transform process on the input video signal. Then, the color space transform unit 301 transmits a transformed video signal 302 obtained by the color space transform process to the encoding device 303. At the same time, the color space transform unit 301 transmits information for identifying the used color space transform process as color space transform method identification information 304 to the encoding device 303. After multiplexing the color space transform method identification information 304 in a bit stream 305 obtained by the compression encoding of the transformed video signal 302 in the method described in the seventh to twelfth embodiments of the invention as a signal to be encoded, the encoding device 303 transmits the bit stream 305 to a transmission path or outputs the bit stream 305 to a recording device for recording on a recording medium.

As the prepared color space transform method, for example, there are the following methods. Specifically, there are a transform of RGB conventionally used in the standard to YUV;

$$C0 = Y = 0.299 \times R + 0.587 \times G + 0.114 \times B$$

$$C1 = U = -0.169 \times R - 0.3316 \times G + 0.500 \times B$$

$$C2 = V = 0.500 \times R - 0.4186 \times G - 0.0813 \times B,$$

a prediction between the color components;

$$C0 = G' = G$$

$$C1 = B' = B - f(G) \text{ (where } f(G) \text{ is the result of a filtering process on the } G \text{ component)}$$

$$C2 = R' = R - f(G),$$

and a transform of RGB to YCoCg;

$$C0 = Y = R/2 + G/2 + B/4$$

$$C1 = Co = R/2 - B/2$$

$$C2 = Cg = R/4 + G/2 - B/4.$$

An input to the color space transform unit 301 is not required to be limited to RGB, and the transform process is not limited to the above-mentioned three processes.

The decoding device according to the thirteenth embodiment includes a decoding device 306 in the seventh to twelfth embodiments of the present invention and an inverse color space transform unit 308 in the subsequent stage of the decoding device 306. The decoding device 306 receives the bit stream 305 as an input to extract and output the color space transform method identification information 304 from the bit stream 305 and also outputs a decoded image 307 obtained by the operation of the decoding device described in the seventh to twelfth embodiments of the present invention. The inverse color space transform unit 308 includes an inverse transform process corresponding to each of the color space transform methods selectable in the above-mentioned color space transform unit 301. The transform executed in the color space transform unit 301 is specified based on the color space transform method identification information 304 output from the decoding device 306 to perform the inverse transform process on the decoded image 307 to restore the color space of the video signal input to the decoding device in the thirteenth embodiment.

According to the encoding device and the decoding device as in the thirteenth embodiment of the present invention, the optimal color space transform processes are performed in the previous stage of the encoding process and the subsequent stage of the decoding process on the video signal to be encoded. As a result, the correlation contained in the image signal composed of the three color components is removed prior to the encoding to allow the encoding with a reduced redundancy. Accordingly, the compression efficiency can be enhanced. In the conventional standard encoding method such as the MPEG, the type of color space of the signal to be encoded is limited to one, i.e., YUV. In the thirteenth embodiment, however, the color space transform unit 301 and the inverse color space transform unit 308 are provided, and the color space transform method identification information 304 is contained in the bit stream 305. As a result, a restriction on the color space of the video signal to be encoded and input can be removed. At the same time, the video signal can be encoded by using the optimal transform selected from a plurality of types of means for removing the correlation between the color components. The color space transform method identification information 304 may be multiplexed at the level such as the picture, the slice, or the macroblock. For example, by multiplexing the color space transform method identification information 304 on the macroblock basis, the transform which can remove the largest amount of the local correlation between the three color components can be selectively used to enhance the encoding efficiency.

The thirteenth embodiment of the present invention has been described on the premise of the constant operations of the color space transform unit 301 and the inverse color space transform unit 308. Alternatively, information which instructs to ensure the compatibility with the conventional standard without operating the color space transform unit 301 and the inverse color space transform unit 301 may be encoded in the higher-order layer such as the sequence.

Figure 64:
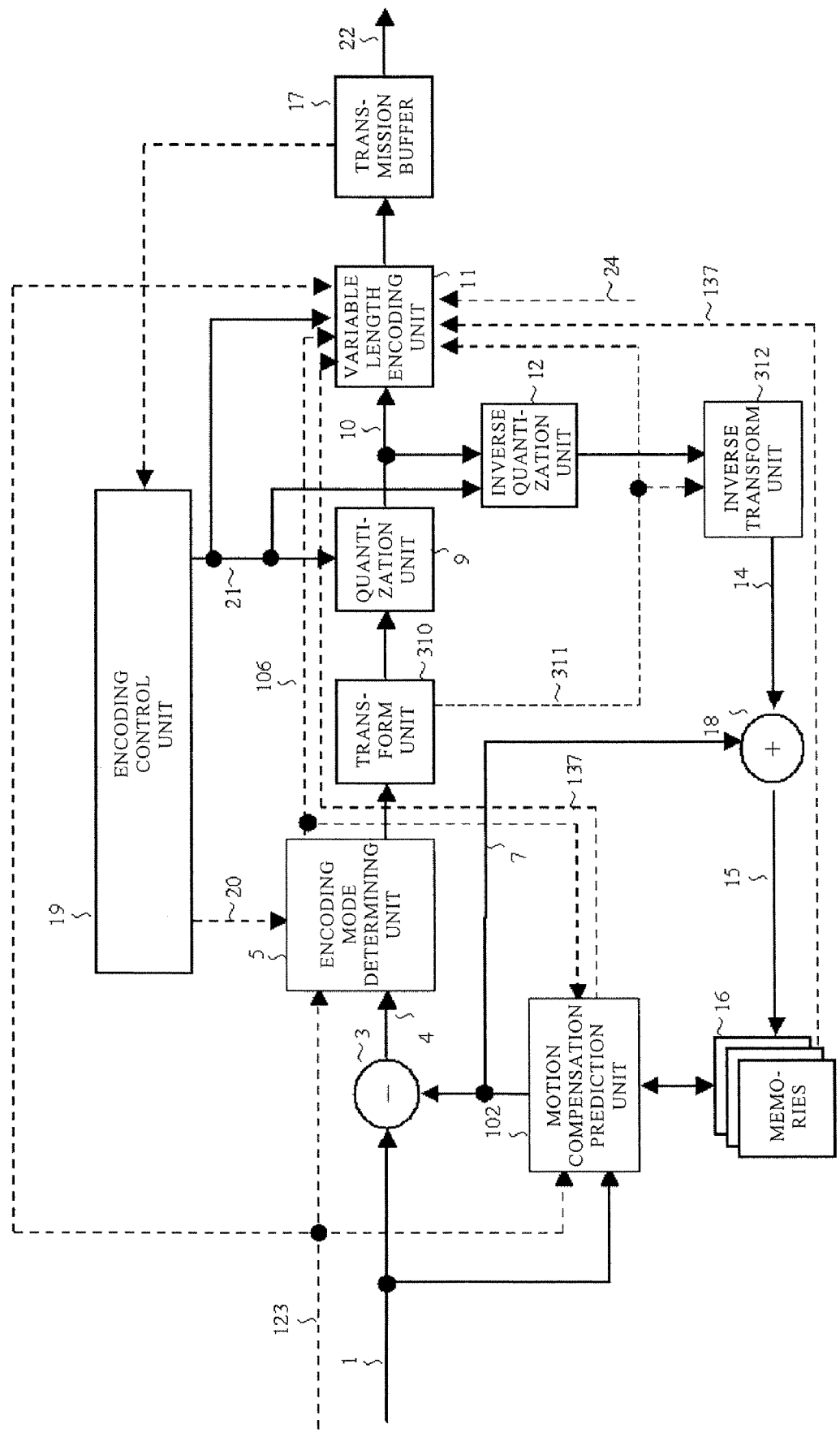
FIG. 64 is an explanatory view illustrating the configuration of the video encoding device in the thirteenth embodiment.
Figure 65:
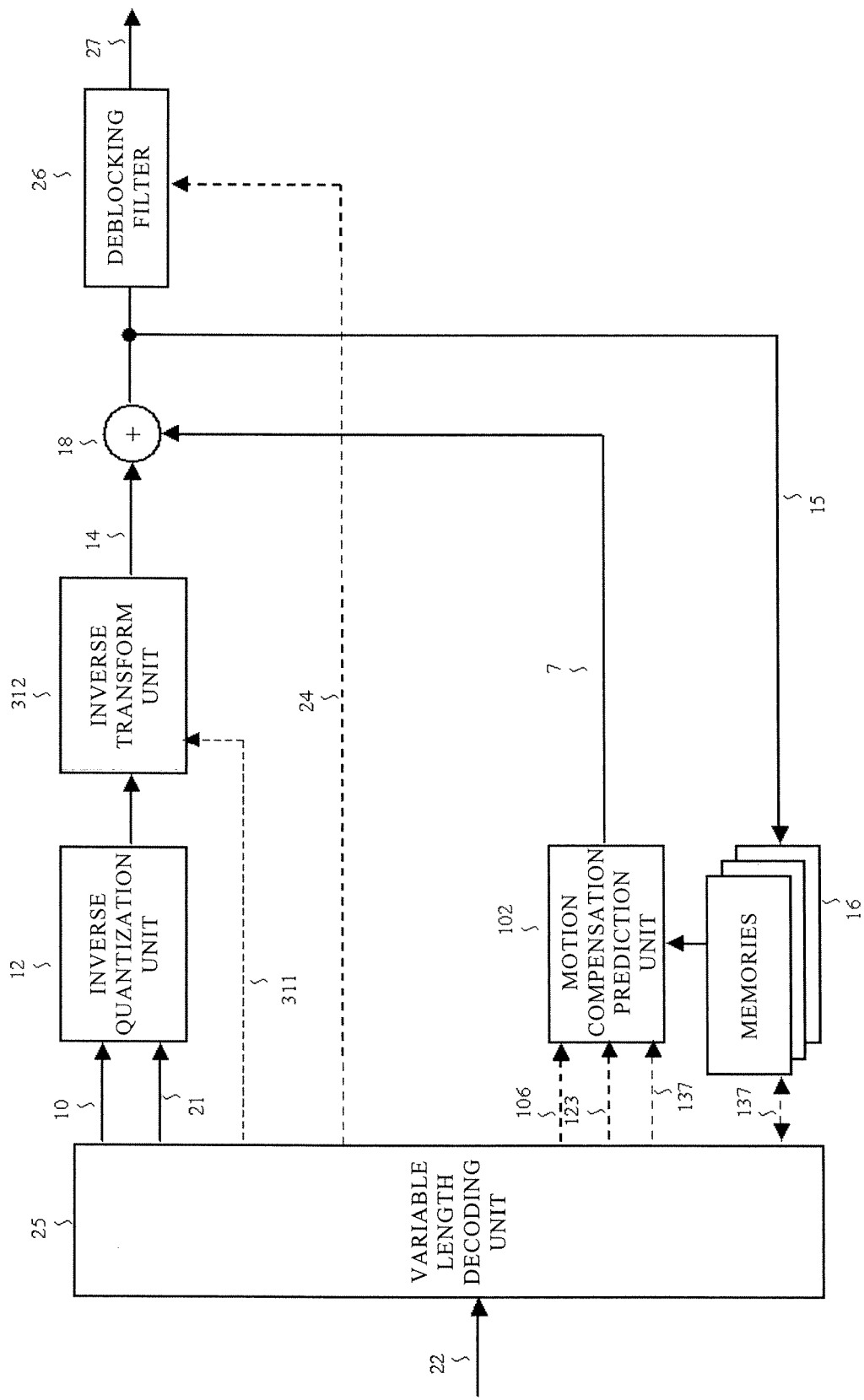
FIG. 65 is an explanatory view illustrating the configuration of the video decoding device in the thirteenth embodiment.

Further alternatively, the color space transform unit 301 and the inverse color space transform unit 308 in the thirteenth embodiment may each be incorporated into the internal configurations of the encoding device and the decoding device in the seventh to twelfth embodiments of the present invention to perform the color space transform at the prediction difference signal level. The encoding device thus configured is illustrated in FIG. 64, whereas the decoding device thus configured is illustrated in FIG. 65. The encoding device in FIG. 64 includes a transform unit 310 in place of the orthogonal transform unit 8 and an inverse transform unit 312 in place of the inverse orthogonal transform unit 13, whereas the decoding device in FIG. 65 includes the inverse transform unit 312 in place of the inverse orthogonal transform unit 13.

The transform unit 310 first selects the optimal transform process from the plurality of color space transform processes to implement the color space transform as described above as the process in the color space transform unit 301, for the prediction difference signal 4 of the components C0, C1, and C2, which is output from the encoding mode determining unit 5. Thereafter, the transform unit 310 executes a transform corresponding to that performed in the orthogonal transform unit 8 for the result of the color space transform. The color space transform method identification information 311 indicating the selected transform process is transmitted to the variable length encoding unit 11 and then is multiplexed in the bit stream to be output as the video stream 22. After performing an inverse transform process corresponding to that performed in the inverse orthogonal transform unit 13, the inverse transform unit 312 uses the color space transform process designated by the color space transform method identification information 311 to implement the inverse color space transform process.

In the decoding device, the variable length decoding unit 25 extracts the color space transform method identification information 311 from the bit stream to transmit the result of extraction to the inverse transform unit 312, thereby performing the similar process as that in the inverse transform unit 312 in the encoding device described above. With such a configuration, when the correlation remaining between the color components can be sufficiently removed in the prediction difference area, the removal can be executed as a part of the encoding process to provide the effect of enhancing the encoding efficiency. However, when different macroblock headers are used for the components C0, C1, and C2, respectively, the correlation is unlikely to be maintained in the area of the prediction difference signal 4 because the prediction method can primarily be varied for each component, for example, the intra prediction for the C0 component and the inter prediction for the C1 component. Therefore, when different macroblock headers are used for the components C0, C1, and C2, respectively, the transform unit 310 and the inverse transform unit 312 may be operated not to execute the color space transform. Alternatively, identification information indicating whether or not the color space transform is to be executed in the area of the prediction difference signal 4 may be multiplexed in the bit stream. The color space transform method identification information 311 may be switched in units of any of sequences, pictures, slices, and macroblocks.

With the configurations of the encoding device illustrated in FIG. 64 and the decoding device illustrated in FIG. 65, the transform coefficient data of each of the components C0, C1, and C2 has a different signal definition domain of the signal to be encoded according to the color space transform method identification information 311. Therefore, it is believed that the transform coefficient data generally has a different occurrence probability distribution according to the color space transform method identification information 311. Therefore, when the encoding device and the decoding device are configured as illustrated in FIGS. 64 and 65, respectively, the encoding and the decoding are performed by using the context model associated with each occurrence probability state for each state of the color space transform method identification information 311 for each of the components C0, C1, and C2.

It is apparent from the description of the operation of the decoding device in the twelfth embodiment of the present invention described above that the context model is defined in the same procedure to perform the arithmetic decoding in both the encoding device and the decoding device. Moreover, after the determination of the context model to be used while specifying the component whose information is referred to by the context model, the occurrence probability state associated with the context model is updated based on the state of the occurrence probability state parameter-sharing identification flag 143.

Fourteenth Embodiment

In the fourteenth embodiment, for the encoding device and the decoding device in the embodiments described above, further specific device configurations will be discussed.

In the above-mentioned embodiments, the operations of the encoding device and the decoding device have been described referring to, for example, FIGS. 1, 2, 30, 31 and the drawings corresponding thereto. Referring to these drawings, the following operation has been described. The input video signal composed of the three color components is collectively input to the encoding device. The encoding device encodes the input video signal while selecting the encoding method from the method for encoding three color components within the encoding device based on the common prediction mode or macroblock header and the encoding method based on different prediction modes or macroblock headers for the three color components. The encoding device inputs the resultant bit stream to the decoding device. The decoding device decodes the bit stream while determining based on the flag decoded and extracted from the bit stream (for example, the intra prediction mode-sharing identification flag 23, the inter prediction mode-sharing identification flag 123, or the like) whether the three color components have been decoded within the decoding device based on the common prediction mode or macroblock header or based on the different prediction modes or macroblock headers. In this manner, a reproduced video image is obtained. The possibility of encoding and decoding of the flag in units of arbitrary data layers such as the macroblocks, the slices, the pictures, and the sequences has already been described. In the fourteenth embodiment of the present invention, in particular, a device configuration and an operation for encoding and decoding three color component signals while determining for each frame (or each field) whether the three color component signals are encoded based on a common macroblock header or different macroblock headers will be described based on specific drawings. Hereinafter, unless otherwise noted, "one frame" is regarded as one-frame or one-field data unit.

The macroblock header in the fourteenth embodiment of the present invention contains macroblock overhead information other than the transform coefficient data, such as the transformed block size identification flag as illustrated in FIG. 15, the encoding/prediction mode information such as the macroblock type/sub-macroblock type and the intra prediction mode as illustrated in FIG. 50, the motion prediction information such as the reference image identification number and the motion vector, the transform coefficient validity identification information, and the quantization parameter for the transform coefficient.

Figure 66:
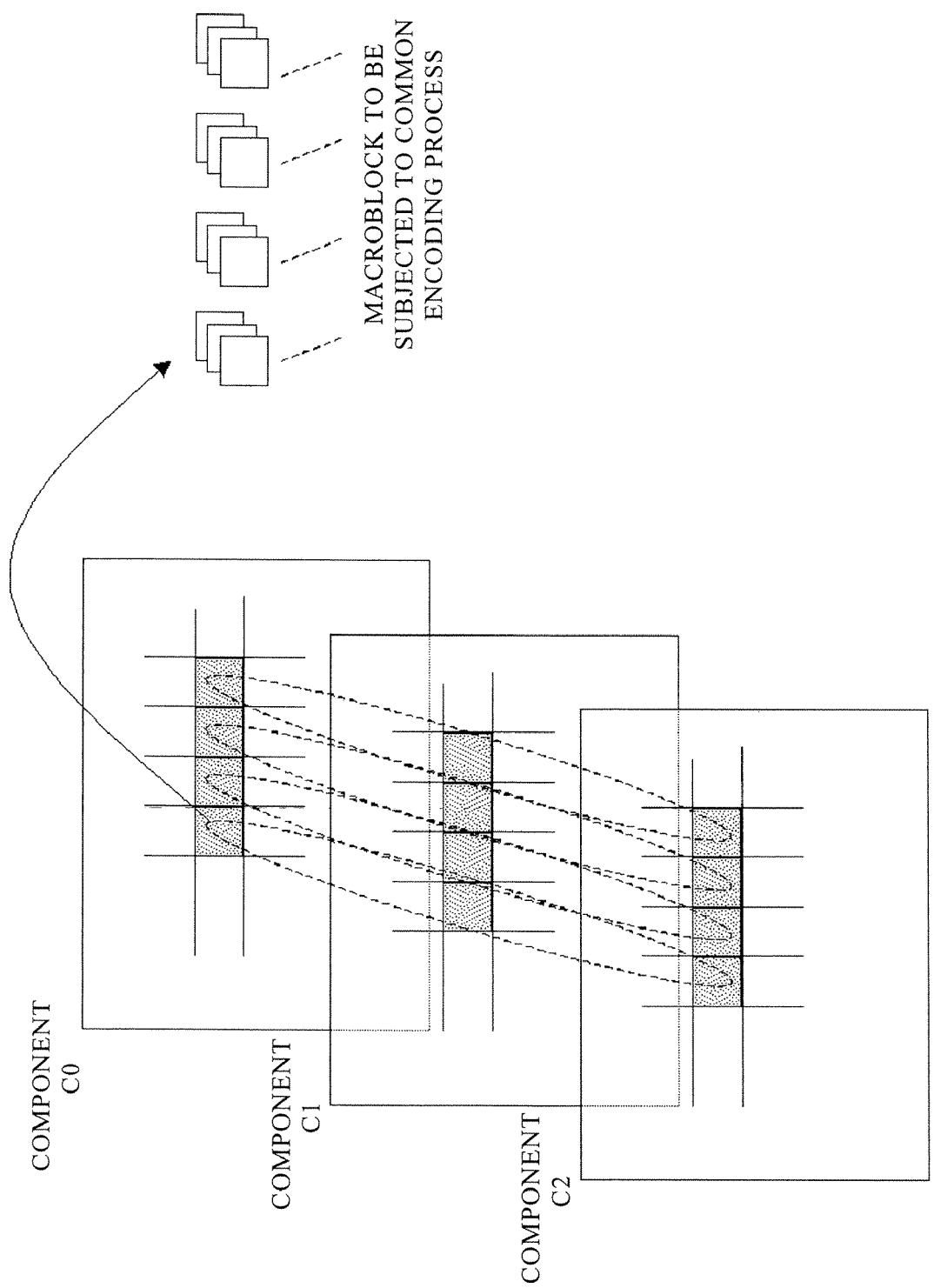
FIG. 66 is an explanatory view illustrating a common encoding process in a fourteenth embodiment.
Figure 67:
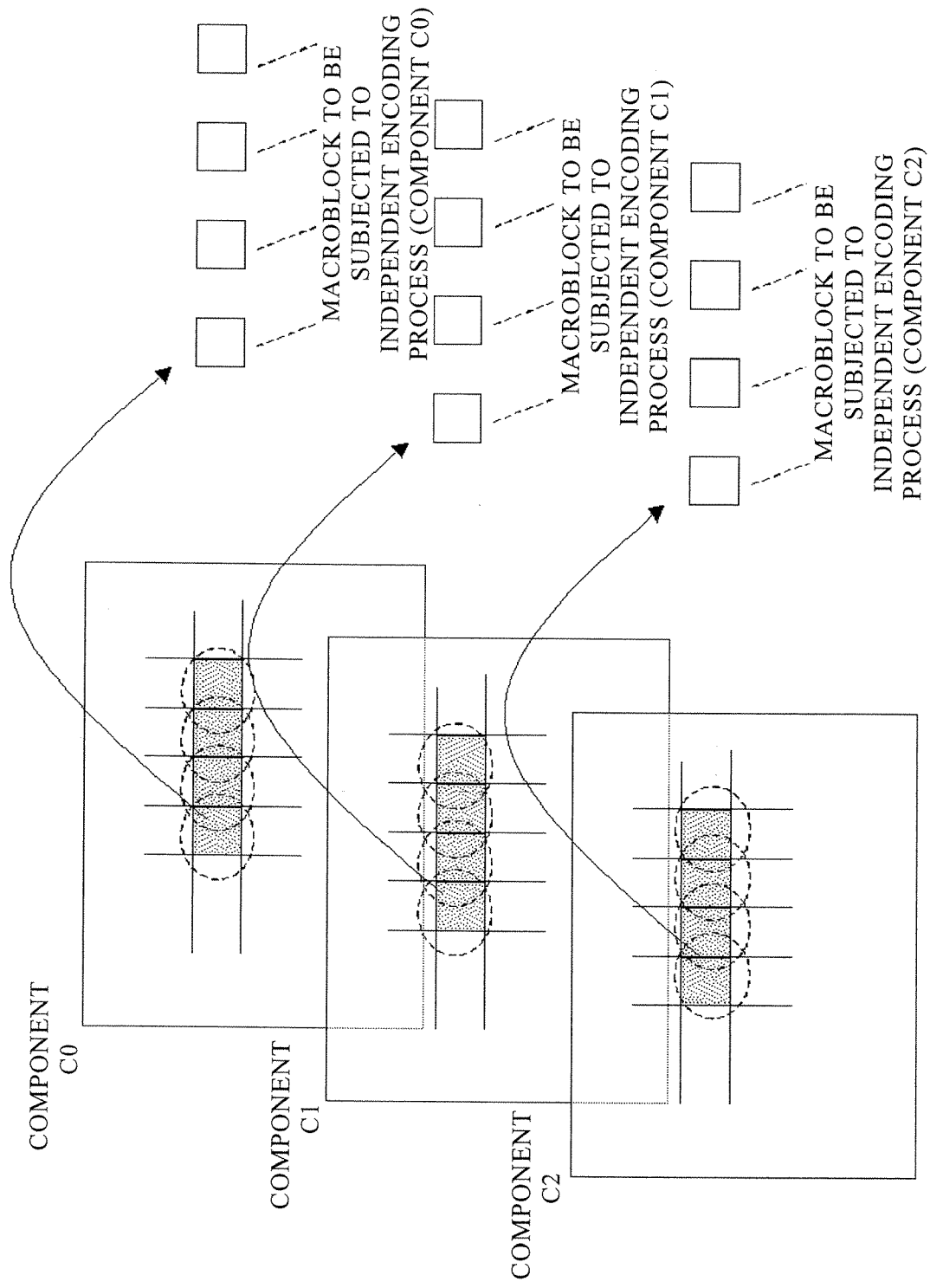
FIG. 67 is an explanatory view illustrating an independent encoding process in the fourteenth embodiment.

Hereinafter, a process of encoding three color component signals for one frame with a common macroblock header is referred to as "common encoding process," whereas a process of encoding three color component signals for one frame with different independent macroblock headers is referred to as "independent encoding process." Similarly, a process of decoding frame image data from the bit stream obtained by encoding three color component signals for one frame with a common macroblock header is referred to as "common decoding process," whereas a process of decoding frame image data from the bit stream obtained by encoding three color component signals for one frame with different independent macroblock headers is referred to as "independent decoding process." In the common encoding process in the fourteenth embodiment of the present invention, as illustrated in FIG. 66, the input video signal for one frame is divided into macroblocks, each macroblock being obtained by gathering three color components. On the other hand, in the independent encoding process, as illustrated in FIG. 67, the input video signal for one frame is first divided into three color components. Each of the three color components is further divided into macroblocks, each macroblock being composed of a single color component. Specifically, the macroblock to be subjected to the common encoding process includes three color component samples of C0, C1, and C2, whereas the macroblock to be subjected to the independent encoding process includes only any one of samples of the C0, C1, and, C2 components.

Figure 68:
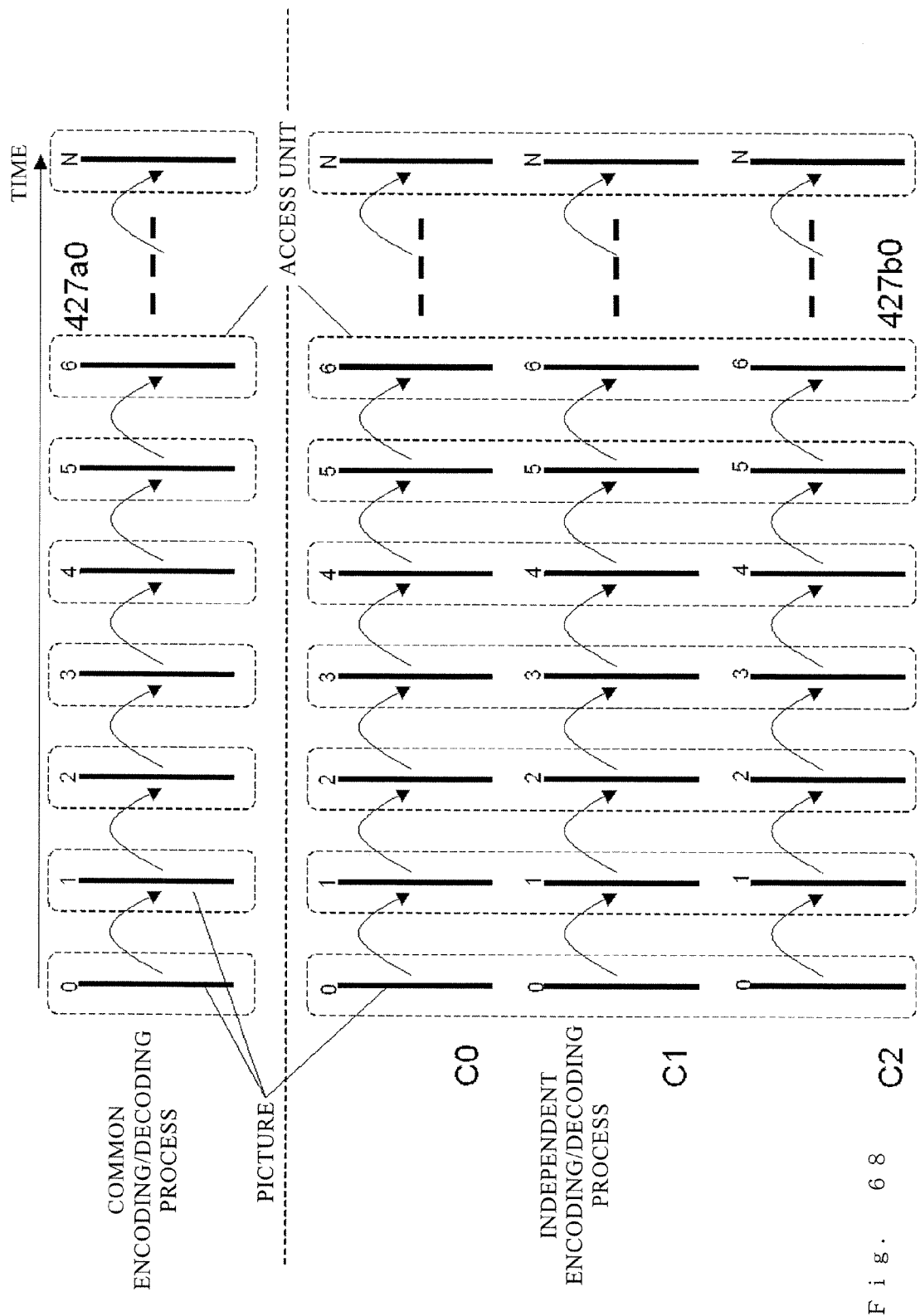
FIG. 68 is an explanatory view illustrating a motion prediction reference relationship in a time direction between pictures in the encoding device and the decoding device in the fourteenth embodiment.

FIG. 68 is an explanatory view illustrating a motion prediction reference relationship between pictures in a time direction in the encoding device and the decoding device in the fourteenth embodiment. In this example, the unit of data indicated by a thick vertical line is a picture. The relationship between the picture and an access unit is indicated by a dotted circle. In the case of the common encoding/decoding process, one picture is data representing a video signal for one frame, which contains three color components. On the other hand, in the case of independent encoding/decoding process, one picture is a video signal for one frame, which contains any one of the color components. The access unit is the minimum unit of data for providing a time stamp to the video signal for the purpose of synchronization with audio or sound information and the like. In the common encoding/decoding process, one access unit contains data for one picture (denoted by 427a in FIG. 68). On the other hand, in the independent encoding/decoding process, one access unit contains three pictures (denoted by 427b in FIG. 68). This is because it is only after the pictures of all the three color components sharing the same display time are obtained that a reproduced video signal for one frame can be obtained. Each of the numbers above the respective pictures denotes the order of encoding or decoding of the picture in the time direction (frame_num in the AVC). In FIG. 68, an arrow between the pictures indicates a reference direction in the motion prediction. Specifically, in the independent encoding/decoding process, the motion prediction reference between the pictures contained in the same access unit and the motion prediction reference between different color components are not performed. The picture of each of the color components C0, C1, and C2 is encoded or decoded while limiting the prediction reference to a signal of the same color component. With such a configuration, in the independent encoding/decoding process in the fourteenth embodiment of the present invention, each of the color components can be encoded or decoded without depending on the encoding/decoding process of the other color components at all, thereby facilitating a parallel process.

In the AVC, an instantaneous decoding device refresh (IDR) picture which performs the intra encoding by itself and resets the contents in a reference image memory used for the motion compensation prediction is defined. Since the IDR picture can be decoded without depending on any other pictures, the IDR picture is used as a random access point. In the common encoding process, one access unit is equal to one picture. In the independent encoding process, however, one access unit is composed of a plurality of pictures. Therefore, when a certain color component picture is the IDR picture, the other color component pictures are also IDR pictures to define an IDR access unit, to thereby ensure the random access function.

In the fourteenth embodiment below, identification information indicating whether the encoding has been performed in the common encoding process or in the independent encoding process is referred to as common encoding/independent encoding identification signal.

Figure 69:
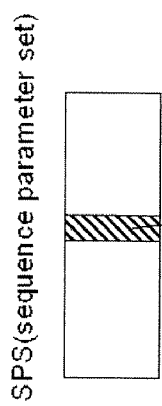
FIG. 69 is an explanatory view illustrating an example of the structure of the bit stream generated in the encoding device in the fourteenth embodiment and input and subjected to a decoding process in the decoding device in the fourteenth embodiment.

FIG. 69 is an explanatory view illustrating an example of the structure of a bit stream, which is generated by the encoding device in the fourteenth embodiment to be input to and decoded by the decoding device in the fourteenth embodiment. FIG. 69 illustrates a bit stream structure from the sequence level to the frame level. First, the common encoding/individual encoding identification signal 423 is multiplexed in a higher-order header at the sequence level (a sequence parameter set in the case of the AVC). Each frame is encoded for each access unit. An access unit delimiter NAL unit is a unique NAL unit for identifying the boundary between the access units in the AVC. When the common encoding/independent encoding identification signal 423 indicates "picture encoding in the common encoding process," the access unit contains encoded data for one picture. It is assumed that the picture in this case is data representing a video signal for one frame, which contains three color components, as described above. The encoded data in the i-th access unit is constituted as a set of slice data, Slice(i, j), where j is an index of slice data in one picture.

On the other hand, when the common encoding/independent encoding identification signal 423 indicates "picture encoding in the independent encoding process," one picture is a video signal for one frame, which is composed of any one of the color components. In this case, encoded data in the p-th access unit is constituted as a set of slice data, Slice (p,q,r), of the q-th picture in the access unit, where r is an index of the slice data in one picture. For the video signal composed of three color components as in the case of RGB, the number of possible values for q is three. Moreover, in addition to the video signal composed of three primary colors, for example, when additional data such as transmittance information for alpha blending is encoded or decoded as the same access unit or when a video signal composed of four or more color components (for example, YMCK used in color printing) is encoded or decoded, the number of possible values for q is set to four or larger. If the encoding device and the decoding device in the fourteenth embodiment of the present invention select the independent encoding process, each of the color components constituting the video signal is completely independently encoded. Therefore, the number of color components can be freely changed without changing the encoding/decoding process in principle. If the signal format for the color representation of a video signal is changed in the future, the independent encoding process in the fourteenth embodiment has the effect capable of coping with such a change.

In order to realize the configuration as described above, in the fourteenth embodiment of the present invention, the common encoding/independent encoding identification signal 423 is represented in the form of the "number of pictures contained in one access unit, which are independently encoded without mutually referring to the motion prediction." In this case, the common encoding/independent encoding identification signal 423 can be represented by the number of possible values for the parameter q. The number of possible values for the parameter q is hereinafter referred to as num_pictures_in_au. Specifically, num_pictures_in_au=1 indicates the "common encoding process," whereas num_pictures_in_au=3 indicates the "independent encoding process" in the fourteenth embodiment of the invention. When the number of color components is equal to or larger than four, the value of num_pictures_in_au can be set to satisfy: num_pictures_in_au>3. Owing to such signaling, by simply decoding and referring to num_pictures_in_au, the decoding device can not only distinguish the encoded data obtained by the common encoding process and that obtained by the independent encoding process but also simultaneously know the number of single color component pictures present in one access unit. As a result, the compatibility with a future extension of the color representation of the video signal is ensured. At the same time, the common encoding process and the independent encoding process can be seamlessly handled in the bit stream.

Figure 70:
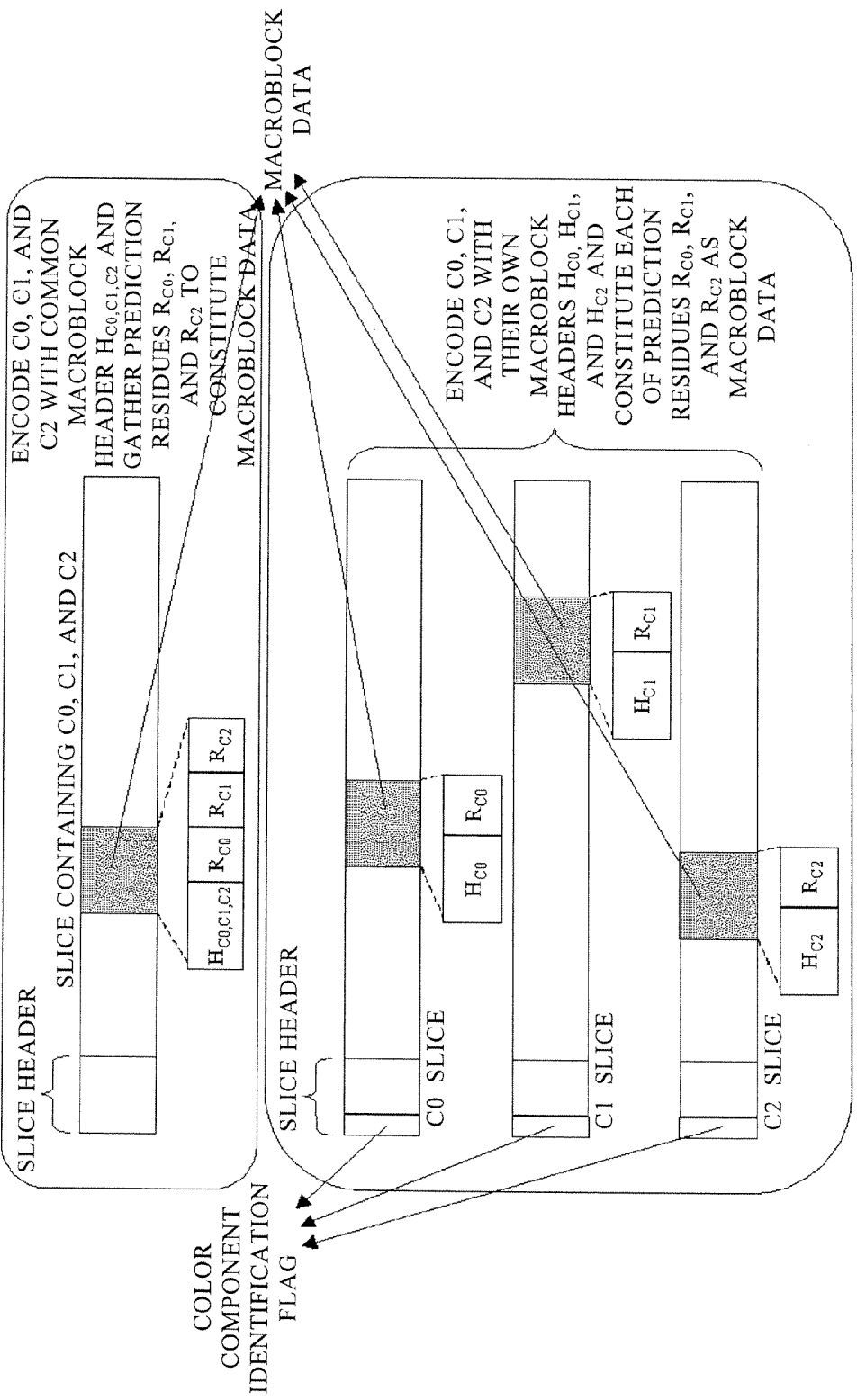
FIG. 70 is an explanatory view illustrating the bit stream structures of slice data in the common encoding process and the independent encoding process, respectively.

FIG. 70 is an explanatory view illustrating a bit stream structure of the slice data in each of the common encoding process and the independent encoding process. In the bit stream encoded by the independent encoding process, a color component identification flag (color_channel_idc) is provided in a header area in the slice data to enable the identification of the color component picture in the access unit, to which the slice data received by the decoding device belongs, in order to achieve the effect described below. The slices having the same value of color_channel_idc are gathered into a group. Specifically, the slices having different values of color_channel_idc are not allowed to have any dependency in encoding/decoding (for example, a motion compensation reference, context modeling and occurrence probability learning in CABAC, and the like). Such a definition ensures the dependency of each of the pictures in the access unit in the independent encoding process. Moreover, a value of frame_num (the order of encoding/decoding of the picture containing the slice) multiplexed in each slice header is the same value for the pictures of all the color components in one access unit.

Figure 71:
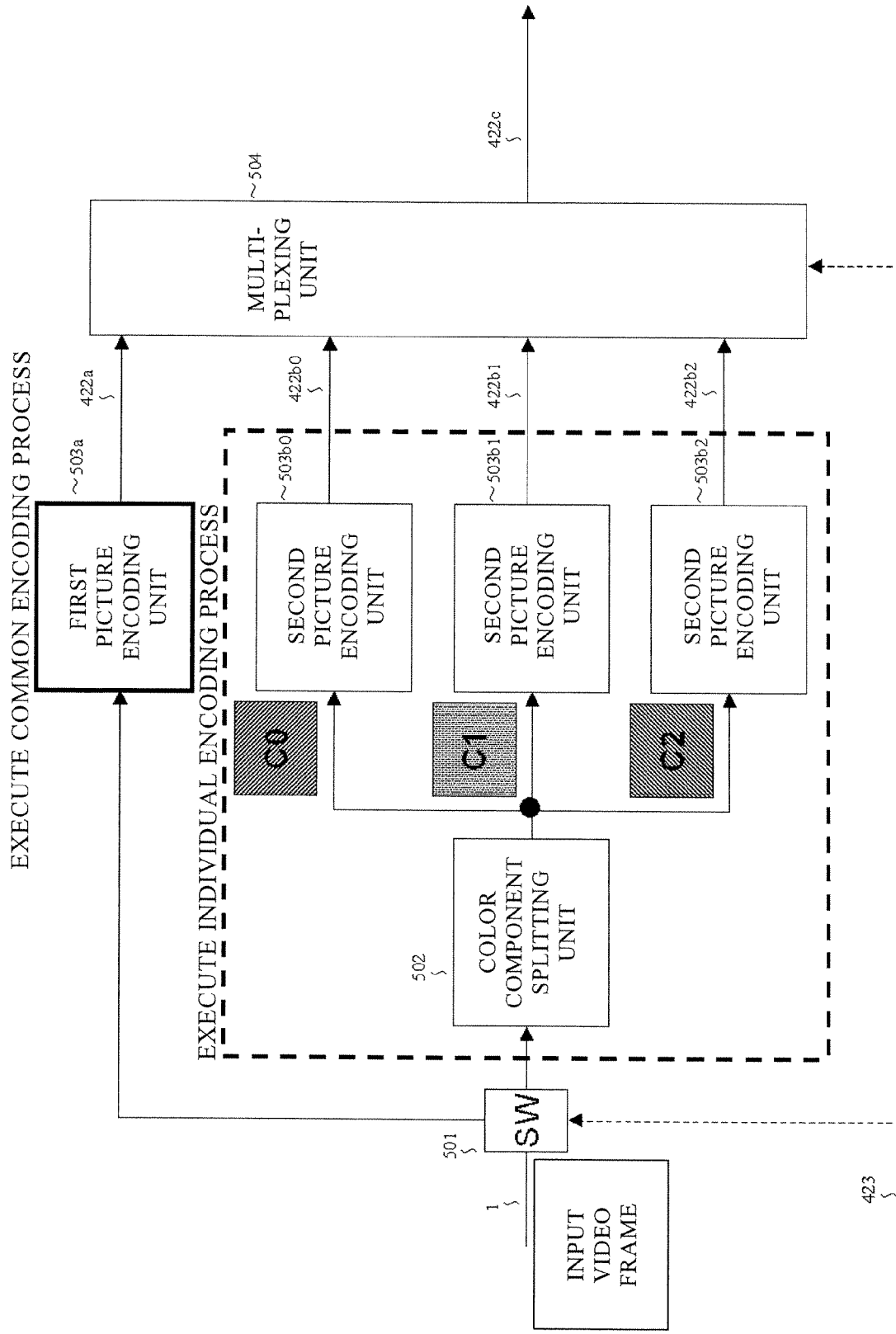
FIG. 71 is an explanatory view illustrating a schematic configuration of the encoding device in the fourteenth embodiment.

FIG. 71 is an explanatory view illustrating a schematic configuration of the encoding device in the fourteenth embodiment of the present invention. In FIG. 71, the common encoding process is implemented in a first picture encoding unit 503*a*, whereas the independent encoding process is implemented in second picture encoding units 503*b*0, 503*b*1, and 503*b*2 (each prepared for the three color components). The input video signal 1 is fed by a switch (SW) 501 to any one of the first picture encoding unit 503*a*, and a color component separating unit 502 and the second picture encoding units 503*b*0 to 503*b*2. The switch 501 is driven by the common encoding/independent encoding identification signal 423 to feed the input video signal 1 to a designated path. Hereinafter, a case is described where the common encoding/independent encoding identification signal (num_pictures_in_au) 423 is multiplexed in a sequence parameter set for the input video signal in the 4:4:4 format to be a signal for selecting any of the common encoding process and the independent encoding process for each sequence. This case is conceptually the same as the inter prediction mode-sharing identification flag 123 described in the seventh embodiment of the present invention and the macroblock header-sharing identification flag 123*c* described in the eleventh embodiment of the present invention. For the use of the common encoding process, the decoding device is required to execute the common decoding process. On the other hand, for the use of the independent encoding process, the decoding device is required to execute the independent decoding process. Therefore, the common encoding/independent encoding identification signal 423 is required to be multiplexed in the bit stream as information designating the process to be executed. Therefore, the common encoding/independent encoding identification signal 423 is input to a multiplexing unit 504. The unit of multiplexing of the common encoding/independent encoding identification signal 423 may be any unit, for example, the unit of a group of picture (GOP) composed of some picture groups in the sequence as long as the unit is in the higher-order layer at the level equal to or higher than the picture.

For the implementation of the common encoding process, the first picture encoding unit 503*a* divides the input video signal 1 into macroblocks, each macroblock being obtained by gathering the samples of three color components as illustrated in FIG. 66, and proceeds with the encoding process on the macroblock basis. The encoding process performed in the first picture encoding unit 503*a* will be described below. For the selection of the independent encoding process, the color component separating unit 502 separates the input video signal 1 into data of C0 for one frame, data of C1 for one frame, and data of C2 for one frame, which are each fed to the corresponding second picture encoding units 503*b*0 to 503*b*2. Each of the second picture encoding units 503*b*0 to 503*b*2 divides the signal for one frame, which is obtained by separating the video signal for the respective color components, into macroblocks in the form as illustrated in FIG. 67, and proceeds with the encoding process in the units of macroblocks. The encoding process in the second picture encoding units 503*b*0 to 503*b*2 will be described below.

The video signal composed of three color components for one picture is input to the first picture encoding unit 503*a* which in turn outputs the encoded data as a video stream 422*a*. On the other hand, the video signal composed of a single color component for one picture is input to each of the second picture encoding units 503*b*0 to 503*b*2. Then, the second picture encoding units 503*b*0 to 503*b*2 output the encoded data as video streams 422*b*0 to 422*b*2, respectively. The video streams 422*b*0 to 422*b*2 are multiplexed in the form of a video stream 422*c* in the multiplexing unit 504 based on the state of the common encoding/independent encoding identification signal 423. Then, the video stream 422*c* is output.

Figure 72:
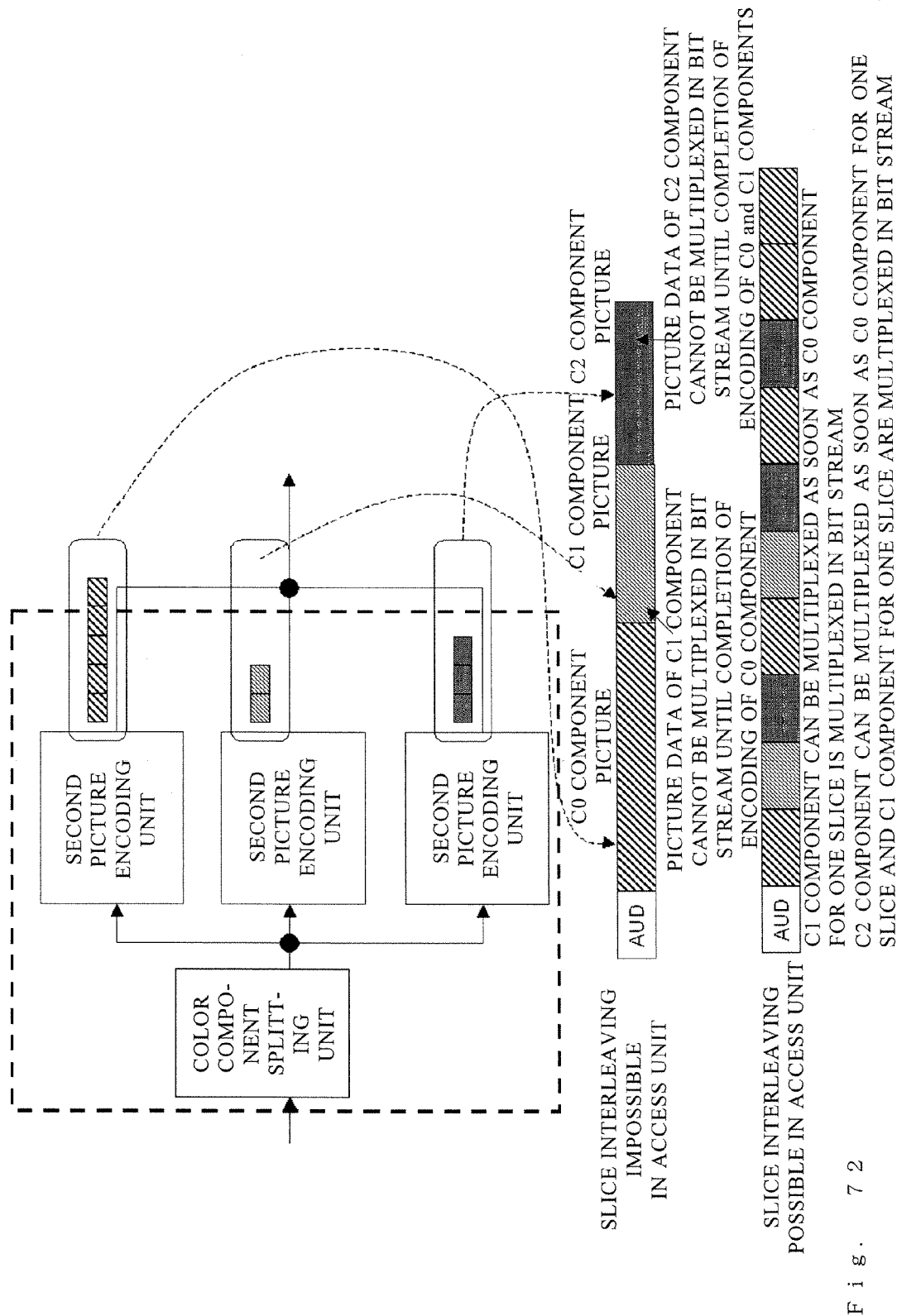
FIG. 72 is an explanatory view illustrating a state where a processing delay on an encoding device side is reduced.

For the multiplexing of the video stream 422*c*, in the access unit of the case of the independent encoding process, the order of multiplexing and the order of transmission of slice data in the bit stream can be interleaved between the pictures (color components) in the access unit (FIG. 72). In this case, the decoding device is required to identify the color component in the access unit, to which the received slice data belongs. For this purpose, the color component identification flag multiplexed in the header area of the slice data as in FIG. 70 is used.

With such a configuration, when the encoding device uses the independent three second picture encoding units 503*b*0 to 503*b*2 to encode the pictures of the three color components in a parallel process as in the encoding device illustrated in FIG. 71, the encoding device can transmit the encoded data as soon as the slice data of the picture of one of the color components is ready for transmission without waiting for the preparation of the encoded data of the other color component pictures. In the AVC, one picture can be divided into a plurality of slice data for the encoding. The slice data length or the number of macroblocks contained in the slice can be flexibly varied according to the encoding conditions. In order to ensure the independency of the decoding process of the slice, the neighborhood context such as the intra prediction or the arithmetic coding cannot be used between the neighboring slices in the image space. Therefore, as the slice data length increases, the higher encoding efficiency is obtained. On the other hand, if an error is mixed into the bit stream during the transmission or the recording, a quicker recovery from the error can be made as the slice data length becomes shorter. As a result, the quality can be more likely to be prevented from being deteriorated. If the length or the structure of a slice, the order of the color components or the like is fixed without multiplexing the color component identification flag, the condition of generating the bit stream is fixed in the encoding device. As a result, the encoding device cannot flexibly cope with various encoding requirements.

Moreover, the configuration of the bit stream as illustrated in FIG. 72 enables the reduction of a transmitted buffer size required for the transmission in the encoding device, specifically, the reduction of a processing delay in the encoding device. FIG. 72 illustrates the reduction of the processing delay. If the multiplexing of the slice data over the pictures is not allowed, the encoding device is required to buffer the encoded data of the other pictures until the encoding of the picture of a certain specific color component is terminated. This means the generation of a delay at the picture level. On the other hand, as illustrated in the lowermost part in FIG. 72, if the slice data can be interleaved at the slice level, the picture encoding unit for one specific color component can output the encoded data to the multiplexing unit in units of slice data to prevent the delay.

The slice data contained in a single color component picture may be transmitted in the order of raster scan of the macroblocks or may be configured to allow an interleaved transmission even in a single picture.

Hereinafter, the operations of the first and the second picture encoding units will be described in detail.

Outline of Operation of the First Picture Encoding Unit

Figure 73:
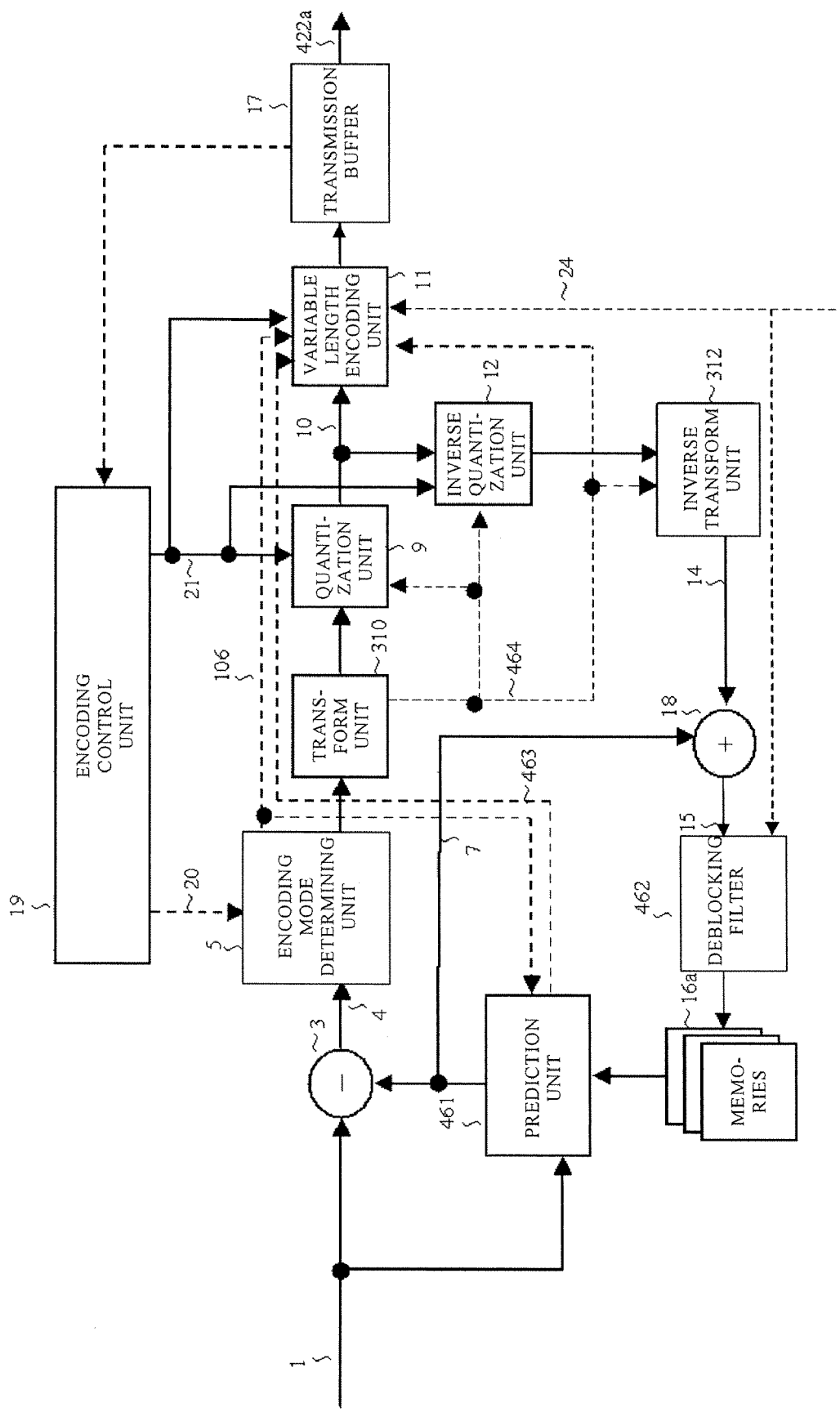
FIG. 73 is an explanatory view illustrating an internal configuration of a first picture encoding unit.

FIG. 73 illustrates an internal configuration of the first picture encoding unit 503*a*. In FIG. 73, the input video signal 1 is in the 4:4:4 format and is input on the macroblock basis as illustrated in FIG. 66, each macroblock being obtained by gathering three color components.

First, a prediction unit 461 selects a reference image from the motion compensation prediction reference image data stored in the memories 16*a* to perform the motion compensation prediction process on the macroblock basis described above. The memories 16a store a plurality of reference image data composed of three color components over a plurality of times. The prediction unit 461 selects the optimal reference image from the plurality of reference image data for each macroblock to perform the motion prediction. The reference image data stored in the memories 16a may be arranged in a frame sequential manner for each color component, or the samples of each of the color components may be stored in a dot sequential manner. Seven block sizes are prepared for the motion compensation prediction. First, for each macroblock, any one of the sizes 16×16, 16×8, 8×16, and 8×8 can be selected as illustrated in FIGS. 32A to 32D. Then, for the selection of the 8×8 size, any one of the sizes 8×8, 8×4, 4×8, and 4×4 can be selected for each 8×8 block, as illustrated in FIGS. 32E and 32H.

The prediction unit 461 executes the motion compensation prediction process for all or a part of the block sizes and the sub-block sizes in FIGS. 32A to 32H, the motion vectors in a predetermined search range, and one or more available reference images, for each macroblock. Then, the prediction difference signal 4 is obtained for each block serving as the unit of motion compensation prediction by the motion vector information and the reference image identification number used for the prediction in the subtracter 3. The prediction efficiency of the prediction difference signal 4 is evaluated in the encoding mode determining unit 5. Of the prediction processes executed in the prediction unit 461, the prediction unit 461 outputs the macroblock type/sub-macroblock type 106, the motion vector information/reference image identification number with which the optimal prediction efficiency for the macroblock to be predicted is obtained. All the macroblock header information such as the macroblock type, the sub-macroblock type, the reference image index, and the motion vector are determined as header information common to the three color components to be used for encoding, and is multiplexed in the bit stream. For the evaluation of the optimality of the prediction efficiency, a prediction error amount may be evaluated only for a predetermined color component (for example, the G component of RGB, the component Y of YUV) in order to reduce the amount of calculations. Alternatively, the prediction error amount for all the color components may be comprehensively evaluated to obtain the optimal prediction performance, but the amount of calculations is increased in this case. Further, for the ultimate selection of the macroblock type/sub-macroblock type 106, the weighting coefficient 20 for each type, which is determined by the encoding control unit 19, is sometimes taken into consideration.

Similarly, the prediction unit 461 also implements the intra prediction. In the implementation of the intra prediction, the intra prediction mode information is output as an output signal. Hereinafter, when the intra prediction and the motion compensation prediction are not particularly distinguished from each other, the output signal is referred to as prediction overheard information containing the intra prediction mode information, the motion vector information, and the reference image identification number. Even for the intra prediction, the prediction error amount only for a predetermined color component may be evaluated, or the prediction error amount for all the color components may be comprehensively evaluated. Ultimately, the use of the intra prediction or the inter prediction for the macroblock type is determined by evaluating the prediction efficiency or the encoding efficiency in the encoding mode determining unit 5.

Then, the prediction difference signal 4 obtained by the intra prediction or the motion compensation prediction based on the selected macroblock type/sub-macroblock type 106 and the prediction overheard information 463 is output to the transform unit 310. The transform unit 310 transforms the input prediction difference signal 4 into a transform coefficient to be output to the quantization unit 9. For this process, the size of the block serving as the unit of transform may be selected from 4×4 and 8×8. When the transformation block size is selectable, the block size selected at the time of encoding is reflected in a value of a transformation block size designating flag 464 to multiplex the flag 464 in the bit stream. The quantization unit 9 quantizes the input transform coefficient based on the quantization parameter 21 determined by the encoding control unit 19 to output the result of quantization as the quantized transform coefficient 10 to the variable length encoding unit 11. The quantized transform coefficient 10 contains the information for the three color components and is entropy-encoded by means such as Huffman encoding or arithmetic coding in the variable length encoding unit 11. The quantized transform coefficient 10 passes through the inverse quantization unit 12 and the inverse transform unit 312 to be restored to the local decoded prediction difference signal 14. The local decoded prediction difference signal 14 is added to the predicted image 7 generated based on the selected macroblock type/sub-macroblock type 106 and the prediction overhead information 463 in the adder 18 to generate the local decoded image 15. After the implementation of a block distortion removal process through the deblocking filter 462, the local decoded image 15 is stored in the memories 16a to be used for the subsequent motion compensation prediction process. The deblocking filter control flag 24 indicating whether or not to apply the deblocking filter to the macroblock is also input to the variable length encoding unit 11.

The quantized transform coefficient 10, the macroblock type/sub-macroblock type 106, the prediction overhead information 463, and the quantization parameter 21, which are input to the variable length encoding unit 11, are arranged and shaped as a bit stream according to a predetermined rule (syntax). Then, the bit stream is output as encoded data in the NAL unit for each slice data obtained by gathering one or more macroblock(s) in the form illustrated in FIG. 66 to the transmission buffer 17. The transmission buffer 17 smoothes the bit stream according to the band of a transmission path to which the encoding device is connected or the reading velocity of a recording medium to output the bit stream as the video stream 422a. The transmission buffer 17 outputs feedback information to the encoding control unit 19 according to the state of accumulation of the bit streams in the transmission buffer 17 to control the amount of codes to be generated in the encoding of subsequent video frames.

Since an output from the first picture encoding unit 503a is in the unit of a slice obtained by gathering three component and is equivalent to the amount of codes in the unit obtained by gathering access units, the transmission buffer 17 may be still located in the multiplexing unit 504.

In the first picture encoding unit 503a in the fourteenth embodiment, since all the slice data in the sequence can be identified as the slices, each slice containing C0, C1, and C2 (specifically, the slice containing information for three color components) based on the common encoding/independent encoding identification signal 423, the color component identification flag is not multiplexed in the slice header.

Outline of Operation of the Second Picture Encoding Unit

Figure 74:
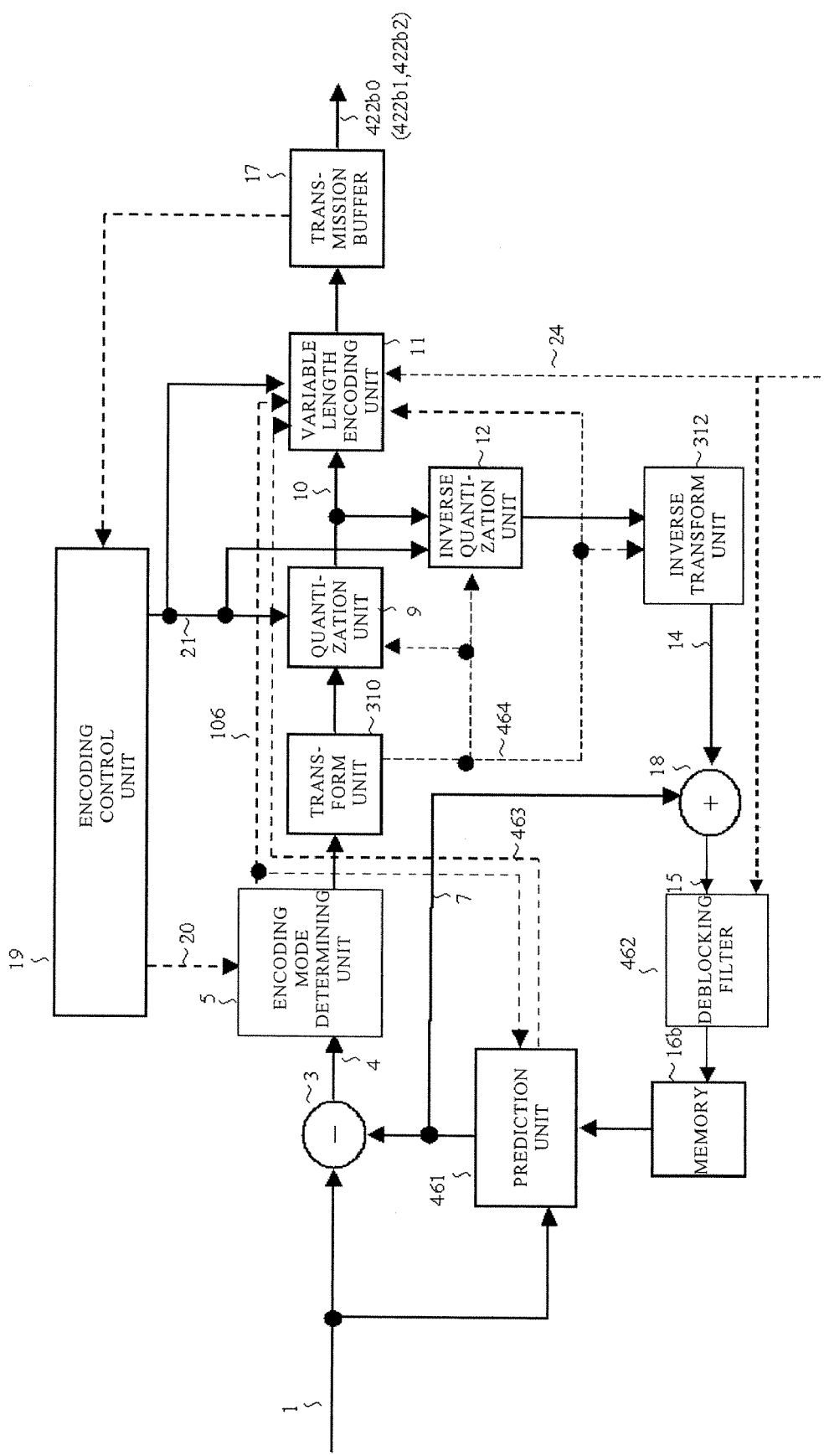
FIG. 74 is an explanatory view illustrating an internal configuration of a second picture encoding unit.

FIG. 74 illustrates an internal configuration of the second picture encoding unit 503b0 (503b1 or 503b2). In FIG. 74, the input video signal 1 is input on the macroblock basis, each macroblock being composed of a single color component sample, in the form illustrated in FIG. 67.

First, the prediction unit 461 selects the reference image from the motion compensation reference image data stored in a memory 16*b* to perform the motion compensation prediction process on the macroblock basis. The memory 16*b* can store the data of a plurality of reference images, each data being composed of a single color component, over a plurality of times. The prediction unit 461 selects the optimal reference image from the reference image data on the macroblock basis to perform the motion compensation. The memory 16*b* may be used with the memories 16*a* for the unit of three color components. Seven block sizes are prepared for the motion compensation prediction. First, for each macroblock, any one of the sizes 16×16, 16×8, 8×16, and 8×8 can be selected as illustrated in FIGS. 32A to 32D. Then, for the selection of the 8×8 size, any one of the sizes 8×8, 8×4, 4×8, and 4×4 can be selected for each 8×8 block, as illustrated in FIGS. 32E to 32H.

The prediction unit 461 executes the motion compensation prediction process for all or a part of the block sizes and the sub-block sizes in FIGS. 32A to 32H, the motion vectors in a predetermined search range, and one or more available reference images, for each macroblock. Then, the prediction difference signal 4 is obtained for each block serving as the unit of motion compensation prediction by the motion vector information and the reference image identification number used for the prediction in the subtracter 3. The prediction efficiency of the prediction difference signal 4 is evaluated in the encoding mode determining unit 5. Of the prediction processes executed in the prediction unit 461, the prediction unit 461 outputs the macroblock type/sub-macroblock type 106 and the motion vector information/the reference image identification number with which the optimal prediction efficiency for the macroblock to be predicted is obtained. All the macroblock header information such as the macroblock type, the sub-macroblock type, the reference image index, and the motion vector are determined as header information for a single color component signal of the input video signal 1 to be used for encoding, and is multiplexed in the bit stream. For the evaluation of the optimality of the prediction efficiency, a prediction error amount is evaluated only for a single color component to be encoded. For the ultimate selection of the macroblock type/sub-macroblock type 106, the weighting coefficient 20 for each type, which is determined by the encoding control unit 19, is sometimes taken into consideration.

Similarly, the prediction unit 461 also implements the intra prediction. In the implementation of the intra prediction, the intra prediction mode information is output as the output signal. Hereinafter, when the intra prediction and the motion compensation prediction are not particularly distinguished from each other, the output signal is referred to as prediction overheard information containing the intra prediction mode information, the motion vector information, and the reference image identification number. Even for the intra prediction, the prediction error amount only for a single color component to be encoded may be evaluated. Ultimately, the use of the intra prediction or the inter prediction for the macroblock type is determined based on the evaluation of the prediction efficiency or the encoding efficiency.

Then, the prediction difference signal 4 obtained based on the selected macroblock type/sub-macroblock type 106 and the prediction overheard information 463 is output to the transform unit 310. The transform unit 310 transforms the input prediction difference signal 4 of the single color component into a transform coefficient to be output to the quantization unit 9. For this process, the size of the block serving as the unit of transform may be selected from 4×4 and 8×8. When the transformation block size is selectable, the block size selected at the time of the encoding is reflected in the value of the transformation block size designating flag 464 to multiplex the flag 464 in the bit stream. The quantization unit 9 quantizes the input transform coefficient based on the quantization parameter 21 determined by the encoding control unit 19 to output the result of quantization as the quantized transform coefficient 10 to the variable length encoding unit 11. The quantized transform coefficient 10 contains the information for the single color component and is entropy-coded by means such as Huffman encoding or arithmetic coding in the variable length encoding unit 11. The quantized transform coefficient 10 passes through the inverse quantization unit 12 and the inverse transform unit 312 to be restored to the local decoded prediction difference signal 14. The local decoded prediction difference signal 14 is added to the predicted image 7 generated based on the selected macroblock type/sub-macroblock type 106 and the prediction overhead information 463 in the adder 18 to generate the local decoded image 15. After the implementation of the block distortion removal process through the deblocking filter 462, the local decoded image 15 is stored in the memory 16*b* to be used for the subsequent motion compensation prediction process. The deblocking filter control flag 24 indicating whether or not to apply the deblocking filter to the macroblock is also input to the variable length encoding unit 11.

The quantized transform coefficient 10, the macroblock type/sub-macroblock type 106, the prediction overhead information 463, and the quantization parameter 21, which are input to the variable length encoding unit 11, are arranged and shaped as a bit stream according to a predetermined rule (syntax). Then, the bit stream is output as encoded data in the NAL unit for each slice data obtained by gathering one or more macroblock(s) in the form illustrated in FIG. 67 to the transmission buffer 17. The transmission buffer 17 smoothes the bit stream according to the band of a transmission path to which the encoding device is connected or the reading velocity of a recording medium to output the bit stream as the video stream 422*b*0 (422*b*1 or 422*b*2). The transmission buffer 17 outputs feedback information to the encoding control unit 19 according to the state of accumulation of the bit streams in the transmission buffer 17 to control the amount of codes to be generated in the encoding of subsequent video frames.

An output from each of the second picture encoding units 503*b*0 to 503*b*2 is the slice composed of the data for a single color component. When the amount of codes is required to be controlled in the unit of a set of access units, a common transmission buffer, for the unit obtained by multiplexing the slices of all the color components, may be provided in the multiplexing unit 504 to output feedback information to the encoding control unit 19 for each of the color components based on the amount of occupancy in the common transmission buffer. Moreover, in this case, the encoding control may be performed by using only the amount of generated information for all the color components or may be performed in consideration of the state of the transmission buffer 17 of each of the color components. When the encoding control is performed by using only the amount of generated information for all the color components, the function equivalent to that of the transmission buffer 17 may be realized by the common transmission buffer in the multiplexing unit 504 to omit the transmission buffer 17.

Since the second picture encoding units 503*b*0 to 503*b*2 in the fourteenth embodiment of the present invention can identify, based on the common encoding/independent encoding identification signal 423, that all the slice data in the sequence are single color component slices (specifically, the slice C0, the slice C1, or the slice C2), the color component identification flag is always multiplexed in the slice header to allow the decoding device to identify the correspondence relation between the slice and the picture data in the access unit. Therefore, each of the second picture encoding units 503b0 to 503b2 can transmit data as soon as the data for one slice is obtained without waiting for the accumulation of outputs for one picture from its own transmission buffer 17.

The common encoding/independent encoding identification signal (num_pictures_in_au) is enabled to simultaneously represent the information (common encoding identification information) for distinguishing the data encoded by the common encoding process and the data encoded by the independent encoding process and the information indicating how many single color component pictures are present (number of color components) in one access unit. However, each of the above-mentioned two information may be encoded as independent information.

The first picture encoding unit 503a and the second picture encoding units 503b0 to 503b2 differ from each other only in the handling of the macroblock header and in the bit stream structure of the slice data. The handling of the macroblock header herein means whether the macroblock header information is handled as the information common to the three components or the information of a single color component. Many of the basic processing blocks in FIG. 73 or 74, such as the prediction unit, the transform unit/the inverse transform unit, the quantization unit/the inverse quantization unit, and the deblocking filter, can be realized by functional blocks common to the first picture encoding unit 503a and the second picture encoding units 503b0 to 503b2 with only a difference in the handling of the information, specifically, whether the information is handled as information for the three color components or information for a single color component. Therefore, the first picture encoding unit 503a and the second picture encoding units 503b0 to 503b2 can be realized not only as the completely independent encoding processing units as in FIG. 71. An arbitrary combination of the basic components as illustrated in FIG. 73 or 74 can also realize the mounting of various encoding devices. Moreover, by providing the memories 16a in a frame sequential manner in the first picture encoding unit 503a, the common configuration of the reference image storage memory can be used for the first picture encoding unit 503a and the second picture encoding units 503b0 to 503b2.

The presence of a virtual stream buffer (encoded picture buffer) for buffering the video stream 422c according to the sequence illustrated in FIGS. 69 and 70 and a virtual frame memory (decoded picture butter) for buffering the decoded images 427a and 427b, which is not illustrated, is supposed in the encoding device in the fourteenth embodiment of the present invention. In this case, the video stream 422c is generated so as not to cause the overflow or underflow of the encoded picture buffer or the collapse of the decoded picture buffer. The control is mainly performed in the encoding control unit 19. The control ensures that the decoding device does not collapse when the video stream 422c is decoded according to the operations of the encoded picture buffer and the decoded picture buffer (virtual buffer model) in the decoding device. The virtual buffer model is defined as follows.

The encoded picture buffer is operated for each access unit. As described above, for the common encoding process, one access unit contains the encoded data for one picture. On the other hand, for the independent decoding process, one access unit contains the encoded data for the number of pictures equal to that of the color components (for three pictures if three color components are used). The operation defined for the encoded picture buffer is performed at the times when the first bit and the last bit in the access unit are input to the encoded picture buffer and when the bits in the access unit are read from the encoded picture buffer. The reading from the encoded picture buffer is defined as being done immediately. It is assumed that all the bits in the access unit are read from the encoded picture buffer at the same time. After being read from the encoded picture buffer, the bits in the access unit are input to a higher-order header analyzing unit and then are decoded in the first picture decoding unit or the second picture decoding unit as described above to be output as a color video frame bundled into the access unit. The process from the reading of the bits from the encoded picture buffer to the output of the color video frame in the access unit is immediately executed according to the definition of the virtual buffer model. The color video frame configured for each access unit is input to the decoded picture buffer to calculate an output time from the decoded picture buffer. The output time from the decoded picture buffer is obtained by adding a predetermined delay time to the reading time from the encoded picture buffer. The delay time can be multiplexed in the bit stream to control the decoding device. When the delay time is 0, specifically, the output time from the decoded picture buffer is the same as the reading time from the encoded picture buffer, the color video frame is output from the decoded picture buffer simultaneously with the input of the color video frame to the decoded picture buffer. Otherwise, specifically, when the output time from the decoded picture buffer is later than the reading time from the encoded picture buffer, the color video frame is stored in the decoded picture buffer until the output time from the decoded picture buffer. As described above, the operation of the decoded picture buffer is defined for each access unit.

Figure 75:
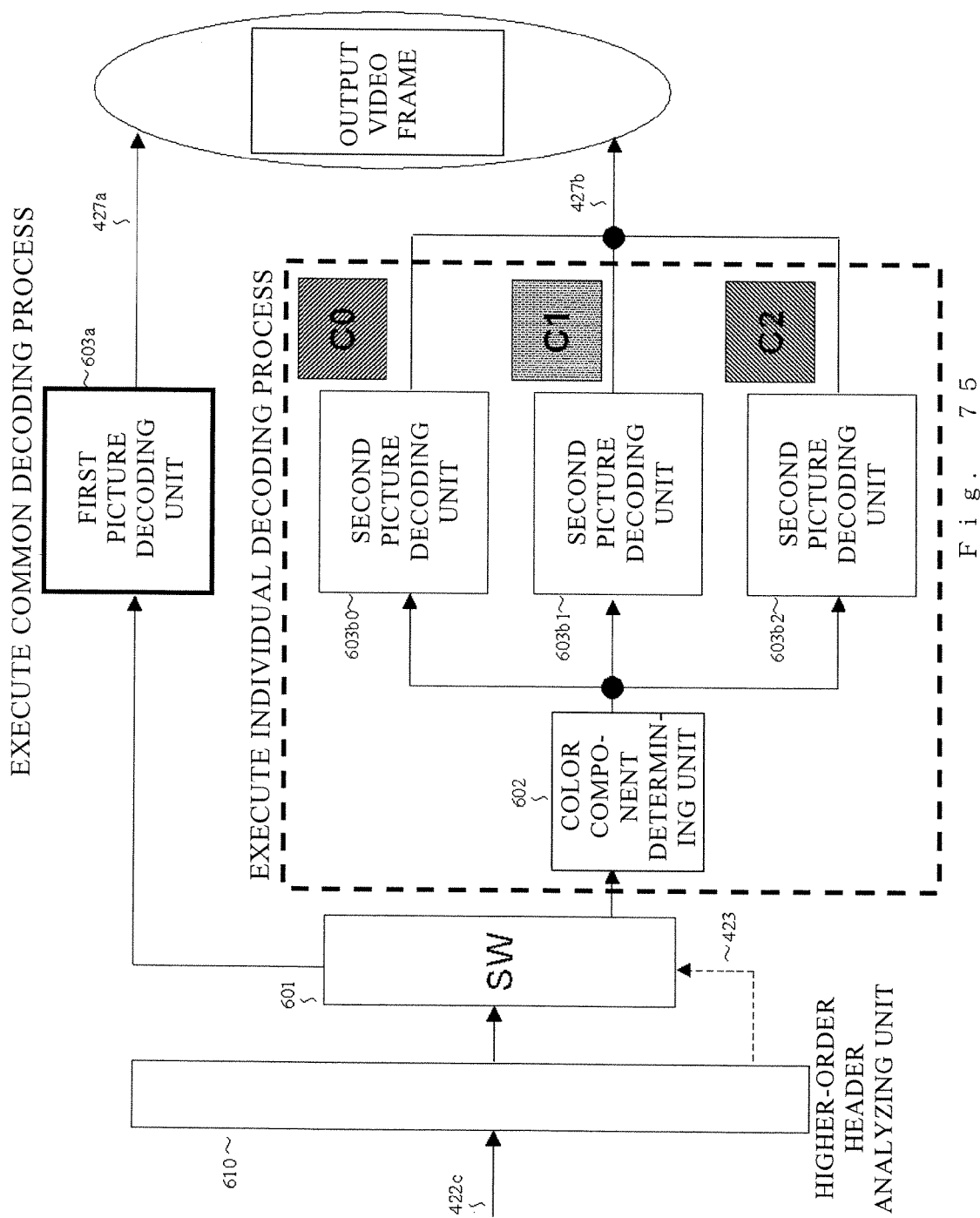
FIG. 75 is an explanatory view illustrating a schematic configuration of the decoding device in the fourteenth embodiment.

FIG. 75 is an explanatory view illustrating a schematic configuration of the decoding device in the fourteenth embodiment of the present invention. In FIG. 75, the common decoding process is executed in a first picture decoding unit 603a, whereas the independent decoding process is executed in a color component determining unit 602 and second picture decoding units 603b0, 603b1, and 603b2 (each prepared for three color components).

The video stream 422c is divided into NAL units in a higher-order header analyzing unit 610. Higher-order header information such as a sequence parameter set or a picture parameter set is decoded to be stored in a predetermined memory area in the decoding device, which can be referred to by the first picture decoding unit 603a, the color component determining unit 602, and the second picture decoding units 603b0 to 603b2. The common encoding/independent encoding identification signal 423 (num_pictures_in_au) multiplexed for each sequence is decoded and retained as a part of the higher-order header information.

The decoded num_pictures_in_au is fed to a switch (SW) 601. For num_pictures_in_au=1, the switch 601 feeds the slice NAL unit for each picture to the first picture decoding unit 603a. For num_pictures_in_au=3, the switch 601 feeds the slice NAL unit for each picture to the color component determining unit 602. Specifically, for num_pictures_in_au=1, the first picture decoding unit 603a performs the common decoding process. For num_pictures_in_au=3, each of the three second picture decoding units 603b0 to 603b2 performs the independent decoding process. The detailed operations of the first picture decoding unit 603a and the second picture decoding units 603b0 to 603b2 will be described below.

The color component determining unit 602 identifies the color component picture in the current access unit to which the slice NAL unit corresponds, based on the value of the color component identification flag illustrated in FIG. 70, to feed the slice NAL unit to a suitable one of the second picture decoding units 603b0 to 603b2. With such a configuration of the decoding device, even when the bit stream encoded with the slices being interleaved in the access unit as illustrated in FIG. 72 is received, the effect of easily determining the color component picture, to which the slice of interest belongs, to allow correct decoding is obtained.

Outline of Operation of the First Picture Decoding Unit

Figure 76:
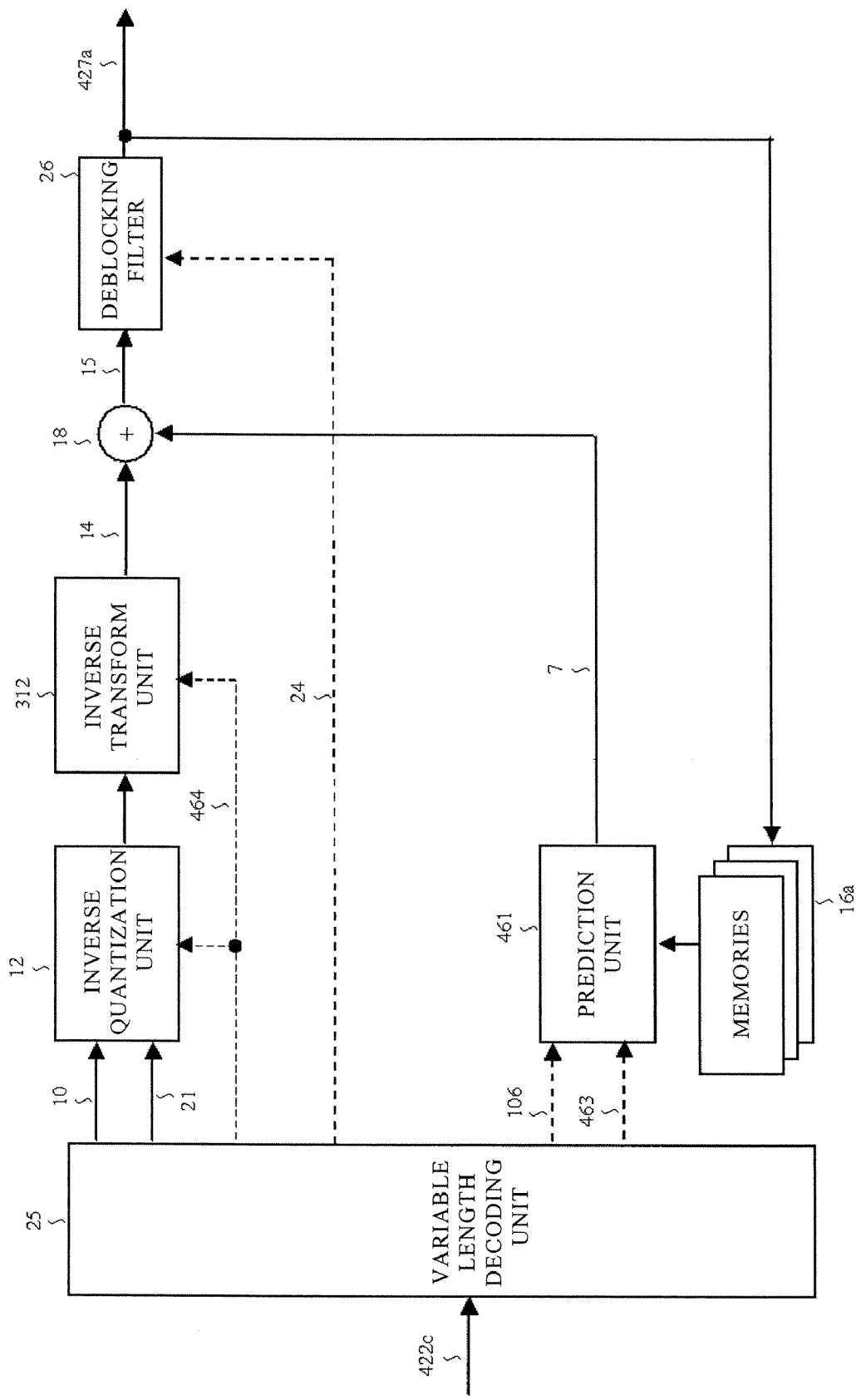
FIG. 76 is an explanatory view illustrating an internal configuration of a first picture decoding unit.

FIG. 76 illustrates an internal configuration of the first picture decoding unit 603a. After dividing the video stream 442c according to the sequence illustrated in FIG. 69 or 70, which is output from the encoding device illustrated in FIG. 71, into NAL units in the higher-order header analyzing unit 610, the first picture decoding unit 603a receives the NAL units in units of slices, each slice containing C0, C1, and C2. The decoding process is performed on the macroblock basis, each macroblock being composed of three color components, illustrated in FIG. 66, to restore the output video frame.

The variable length decoding unit 25 receives as an input the video stream 442c divided into the NAL units and deciphers the video stream 442c according to a predetermined rule (syntax) to extract the quantized transform coefficient 10 for three color components, and the macroblock header information (the macroblock type/sub-macroblock type 106, the prediction overhead information 463, the transformation block size designating flag 464, and the quantized parameter 21) used commonly to the three color components. The quantized transform coefficient 10 is input together with the quantization parameter 21 to the inverse quantization unit 12 which performs the same process as that performed in the first picture encoding unit 503a to perform the inverse quantization process. Subsequently, the output from the inverse quantization unit 12 is input to the inverse transform unit 312 which performs the same process as that in the first picture encoding unit 503a to be restored to the local decoded prediction difference signal 14 (if the transformation block size designating flag 464 is present in the video stream 422c, the transformation block size designating flag 464 is referred to in the inverse quantization and the inverse transform processes). On the other hand, of the processes performed in the prediction unit 461 in the first picture encoding unit 503a, the prediction unit 461 includes only the process of referring to the prediction overhead information 463 to generate the predicted image 7. The macroblock type/sub-macroblock type 106 and the prediction overheard information 463 are input to the prediction unit 461 to obtain the predicted images 7 for three components. When the macroblock type indicates the intra prediction, the predicted images 7 for three color components are obtained according to the intra prediction mode information from the prediction overhead information 463. On the other hand, when the macroblock type indicates the inter prediction, the predicted images 7 for three components are obtained according to the motion vector and the reference image index from the prediction overhead information 463. The local decoded prediction difference signal 14 and the predicted images 7 are added in the adder 18 to obtain the temporary decoded images (local decoded images) 15 for three components. Since the temporary decoded images 15 are used for the motion compensation prediction of the subsequent macroblocks, the block distortion removal process is performed on the temporary decoded image samples for three components through the deblocking filter 462 which performs the same process as that performed in the first picture encoding unit 503a. Thereafter, the temporary decoded image samples are output as a decoded image 427a to be stored in the memories 16a. At this time, the deblocking filter process is acted on the temporary decoded images 15 based on the indication of the deblocking filter control flag 24 deciphered by the variable length decoding unit 25. The memories 16a store the data for a plurality of reference images, which is composed of three color components, over a plurality of times. The prediction unit 461 selects the reference image indicated by the reference image index extracted from the bit stream for each macroblock from the plurality of reference images to generate the predicted image. The reference image data may be stored in a frame sequential manner for each color component in the memories 16a. Alternatively, as the reference image, the samples of the respective color components may be stored in a dot sequential manner in the memories 16a. The decoded image 427a contains three color components, and serves as a color video frame constituting the access unit 427a0 in the common decoding process.

Outline of Operation of the Second Picture Decoding Units

Figure 77:
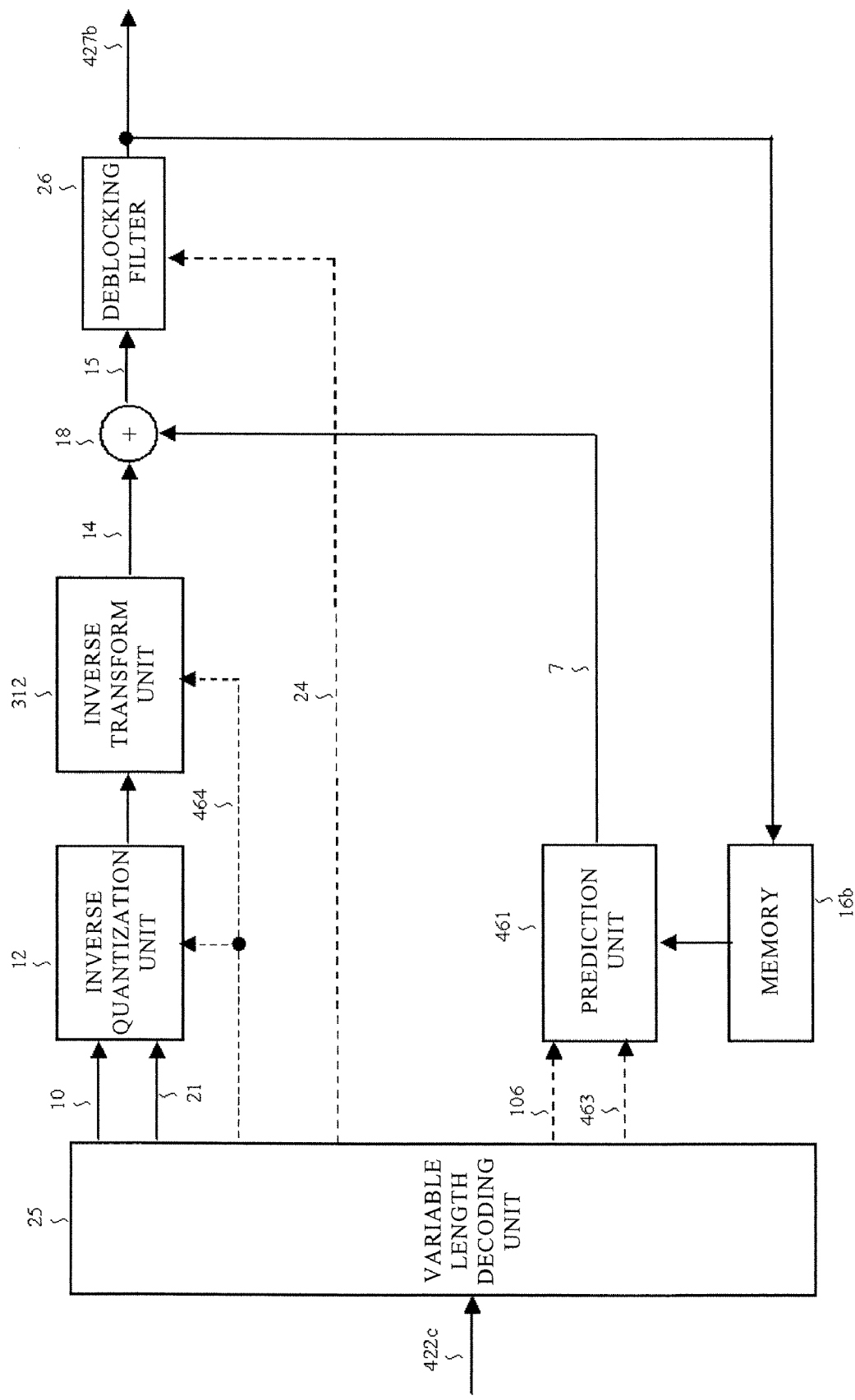
FIG. 77 is an explanatory view illustrating an internal configuration of a second picture decoding unit.

FIG. 77 illustrates an internal configuration of each of the second picture decoding units 603b0 to 603b2. The video stream 442c according to the sequence illustrated in FIG. 69 or 70, which is output from the encoding device illustrated in FIG. 71, is divided into NAL units in the higher-order header analyzing unit 610 and then classified into slice NAL units of C0, C1, and C2 in the color component determining unit 602. Each of the second picture decoding units 603b0 to 603b2 receives each slice NAL unit of C0, C1, or C2 and then performs the decoding process on the macroblock basis, each macroblock being composed of a single color component sample illustrated in FIG. 67, to restore the output video image frame.

The variable length decoding unit 25 receives the video stream 442c as an input and deciphers the video stream 442c according to a predetermined rule (syntax) to extract the quantized transform coefficient 10 for a single color component, and the macroblock header information (the macroblock type/sub-macroblock type 106, the prediction overhead information 463, the transformation block size designating flag 464, and the quantized parameter 21) used for the single color component. The quantized transform coefficient 10 is input together with the quantization parameter 21 to the inverse quantization unit 12 which performs the same process as that performed in the second picture encoding unit 503b0 (503b1 or 503b2) to implement the inverse quantization process. Subsequently, the output from the inverse quantization unit 12 is input to the inverse transform unit 312 which performs the same process as that in the second picture encoding unit 503b0 (503b1 or 503b2) to be restored to the local decoded prediction difference signal 14 (if the transformation block size designating flag 464 is present in the video stream 422c, the transformation block size designating flag 464 is referred to in the inverse quantization and the inverse orthogonal transform processes). On the other hand, of the processes performed in the prediction unit 461 in the second picture encoding unit 503b0 (503b1 or 503b2), the prediction unit 461 includes only the process of referring to the prediction overhead information 463 to generate the predicted image 7. The macroblock type/sub-macroblock type 106 and the prediction overheard information 463 are input to the prediction unit 461 to obtain the predicted image 7 for a single color component. When the macroblock type indicates the intra prediction, the predicted image 7 for a single color component is obtained according to the intra prediction mode information from the prediction overhead information 463. On the other hand, when the macroblock type indicates the inter prediction, the predicted image 7 for a single color component is obtained according to the motion vector and the reference image index from the prediction overhead information 463. The local decoded prediction difference signal 14 and the predicted image 7 are added in the adder 18 to obtain the temporary decoded image (local decoded image) 15 for a single color component. Since the temporary decoded image 15 is used for the motion compensation prediction of the subsequent macroblocks, the block distortion removal process is performed on the temporary decoded image sample for a single color component through the deblocking filter 26 which performs the same process as that in the second picture encoding unit 5030b (503b1 or 503b2). Thereafter, the temporary decoded image sample is output as a decoded image 427b to be stored in the memory 16b. At this time, the deblocking filter process is acted on the temporary decoded image 15 based on the indication of the deblocking filter control flag 24 deciphered by the variable length decoding unit 25. The decoded image 427b contains only the sample of a single color component. The decoded images 427b output from each of the second picture encoding units 603b0 to 603b2, which are processed in parallel in FIG. 75, are bundled into an access unit 427b0 to be constituted as a color video frame.

As is apparent from the above description, the first picture decoding unit 603a and the second picture decoding units 603b0 to 603b2 differ from each other only in the handling of the macroblock header information and in the bit stream structure of the slice data. The handling of the macroblock header information means whether the macroblock header information is handled as the information common to the three components or as the information of a single color component. Many of the basic decoding blocks in FIG. 73 or 74, such as the motion compensation prediction process, the inverse transform, and the inverse quantization, can be realized by functional blocks common to the first picture decoding unit 603a and the second picture decoding units 603b0 to 603b2. Therefore, the first picture decoding unit 603a and the second picture decoding units 603b0 to 603b2 are realized not only as the completely independent decoding processing units as in FIG. 75. An appropriate combination of the basic components as illustrated in FIG. 76 or 77 can realize the mounting of various decoding devices. Moreover, by providing the memories 16a in a frame sequential manner in the first picture decoding unit 603a, the common configuration of the memories 16a and the memory 16b can be used for the first picture decoding unit 603a and the second picture decoding units 603b0 to 603b2.

As a variation of the encoding device illustrated in FIG. 71, the decoding device in FIG. 75 can constantly fix the common encoding/independent encoding identification signal 423 to the "independent encoding process" to receive and decode the bit stream output from the encoding device configured to independently encode all the frames without using the first picture encoding unit 503a at all. As a variation of the decoding device illustrated in FIG. 75, in the use premised on that the common encoding/independent encoding identification signal 423 is constantly fixed to the "independent encoding process," the decoding device may be configured to perform the independent decoding process alone with the omission of the switch 601 and the first picture decoding unit 603a.

The common encoding/independent decoding identification signal (num_pictures_in_au) is made to contain the information (common encoding identification information) for distinguishing the data encoded in the common encoding process and the data encoded in the independent encoding process from each other and the information indicating how many single color component pictures (number of color components) are present in one access unit. However, each of the two information described above may be encoded as independent information.

Further, the first picture encoding unit 603a may be provided with a function of decoding the bit stream compliant with the AVC high-profile, which is obtained by encoding a signal in a conventional YUV 4:2:0 format for three components at a time. In the higher-order header analyzing unit 610, the format in which the bit stream is encoded is determined by referring to the profile identifier decoded from the video stream 422c. Then, the result of determination is transmitted as a part of information of a signal line of the common encoding/independent encoding identification signal 423 to the switch 601 and the first picture decoding unit 603a. With such a configuration of the higher-order header analyzing unit 610, the decoding device which ensures the compatibility with the bit stream in the conventional YUV 4:2:0 format can be configured.

Figure 78:
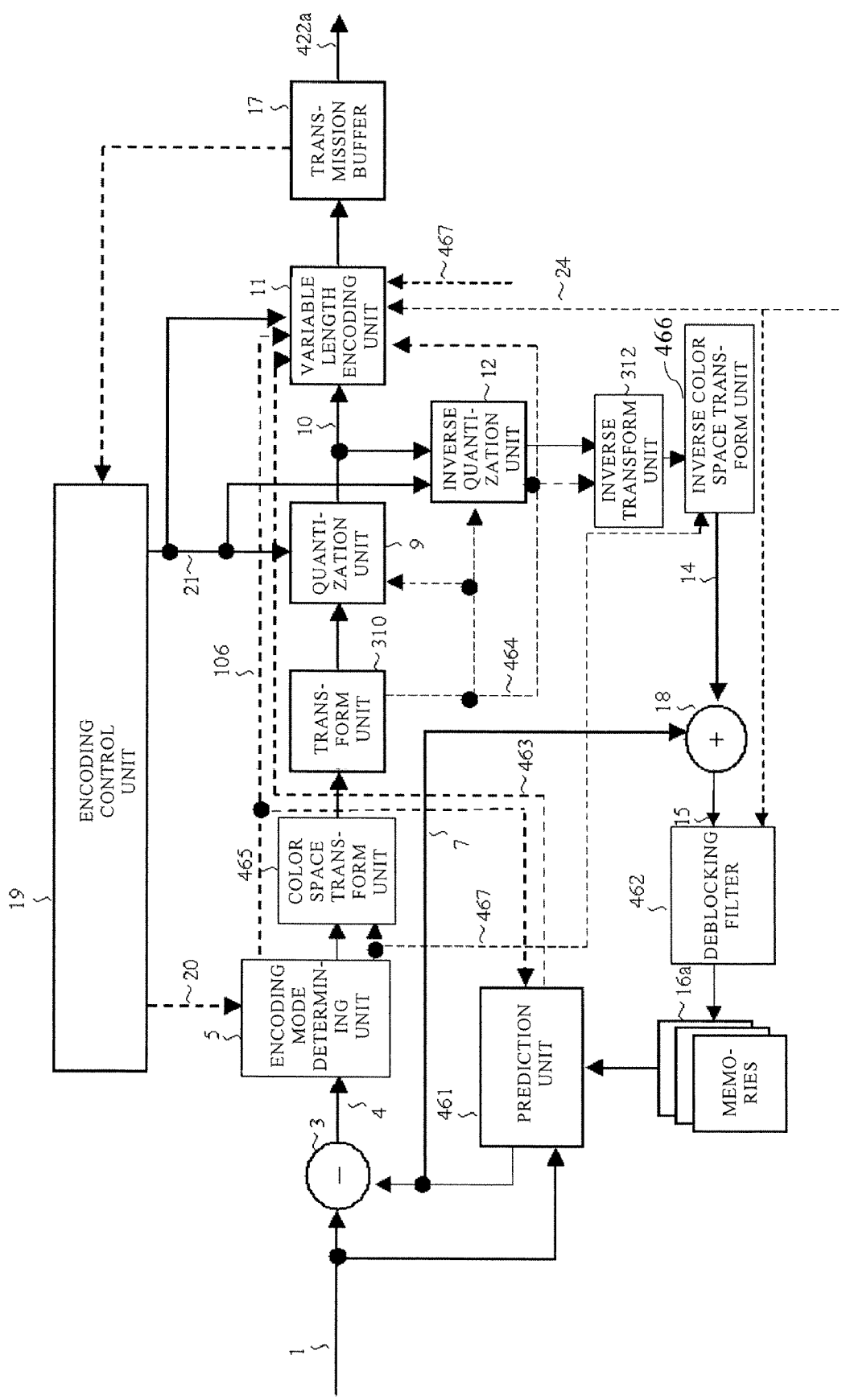
FIG. 78 is an explanatory view illustrating an internal configuration of the first picture encoding unit which is subjected to a color space transform process.
Figure 79:
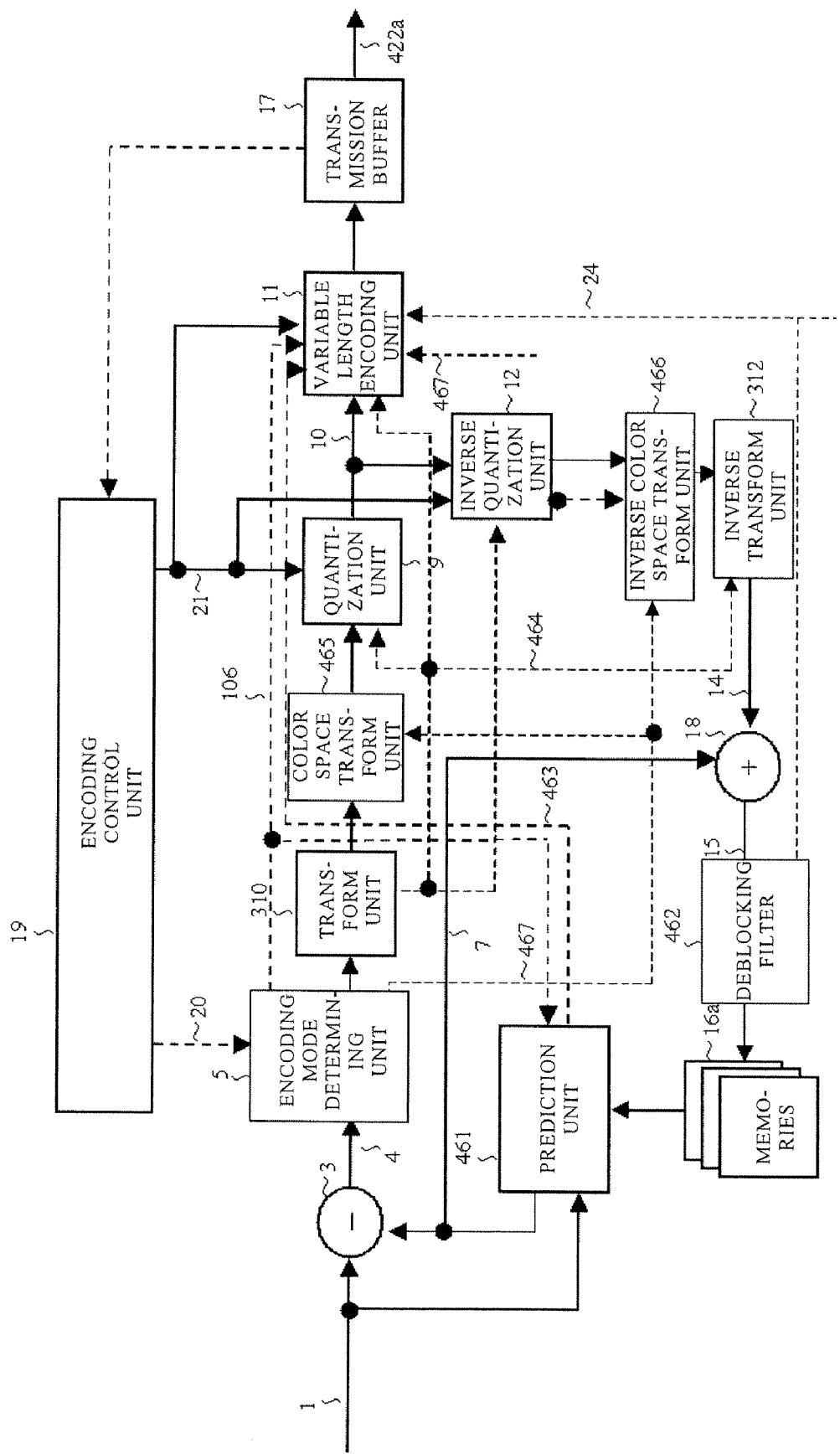
FIG. 79 is another explanatory view illustrating the internal configuration of the first picture encoding unit which is subjected to the color space transform process.

In the first picture encoding unit 503a in the fourteenth embodiment of the present invention, the information for three color components are present in the slice data. Besides, exactly the same intra/inter prediction process is implemented for the three color components. Therefore, the signal correlation between the color components sometimes remains in a prediction error signal space. In order to remove the signal correlation, for example, the color space transform process as described above in the thirteenth embodiment of the present invention may be performed on the prediction error signal. FIGS. 78 and 79 illustrate examples of the first picture encoding unit 503a having the configuration as described above. FIG. 78 illustrates an example where the color space transform process is implemented at the pixel level prior to the transform process. In this example, the color space transform unit 465 is provided before the transform unit 310, whereas the inverse color space transform unit 466 is provided after the inverse transform unit 312. FIG. 79 illustrates an example where the color space transform process is implemented while a frequency component to be subjected to the color space transform process is being appropriately selected for the coefficient data obtained after the implementation of the transform process. In this example, the color space transform unit 465 is provided after the transform unit 310, whereas the inverse color space transform unit 466 is provided before the inverse transform unit 312. By limiting the frequency component to be subjected to the color space transform, the effect of preventing a harmonic noise component contained in a specific color component from propagating to another color component which scarcely contains noise can be obtained. When the frequency component to be subjected to the color space transform process can be adaptively selected, signaling information 467 for allowing the decoding device to determine the selection in encoding is multiplexed in the bit stream.

As the color space transform process, a plurality of transform methods as described in the thirteenth embodiment of the present invention described above may be switched for each macroblock according to the property of the image signal to be encoded. Alternatively, whether or not to perform the transform may be determined for each macroblock. Further alternatively, the types of selectable transform methods may be designated at the sequence level or the like. In this case, the selection of the transform method may be made for each picture, slice, or macroblock. Further alternatively, whether the color space transform process is performed prior to or after the orthogonal transform may be selectable. For the implementation of the adaptive encoding processes, the encoding efficiencies of all the selectable options can be evaluated in the encoding mode determining unit 5 to select the adaptive encoding process having the highest encoding efficiency. Moreover, for the implementation of the adaptive encoding processes, the signaling information 467 to allow the decoding device to determine the selection in encoding is multiplexed in the bit stream. Such signaling may be designated at a level of the slice, the picture, the GOP, or the sequence different from that of the macroblock.

Figure 80:
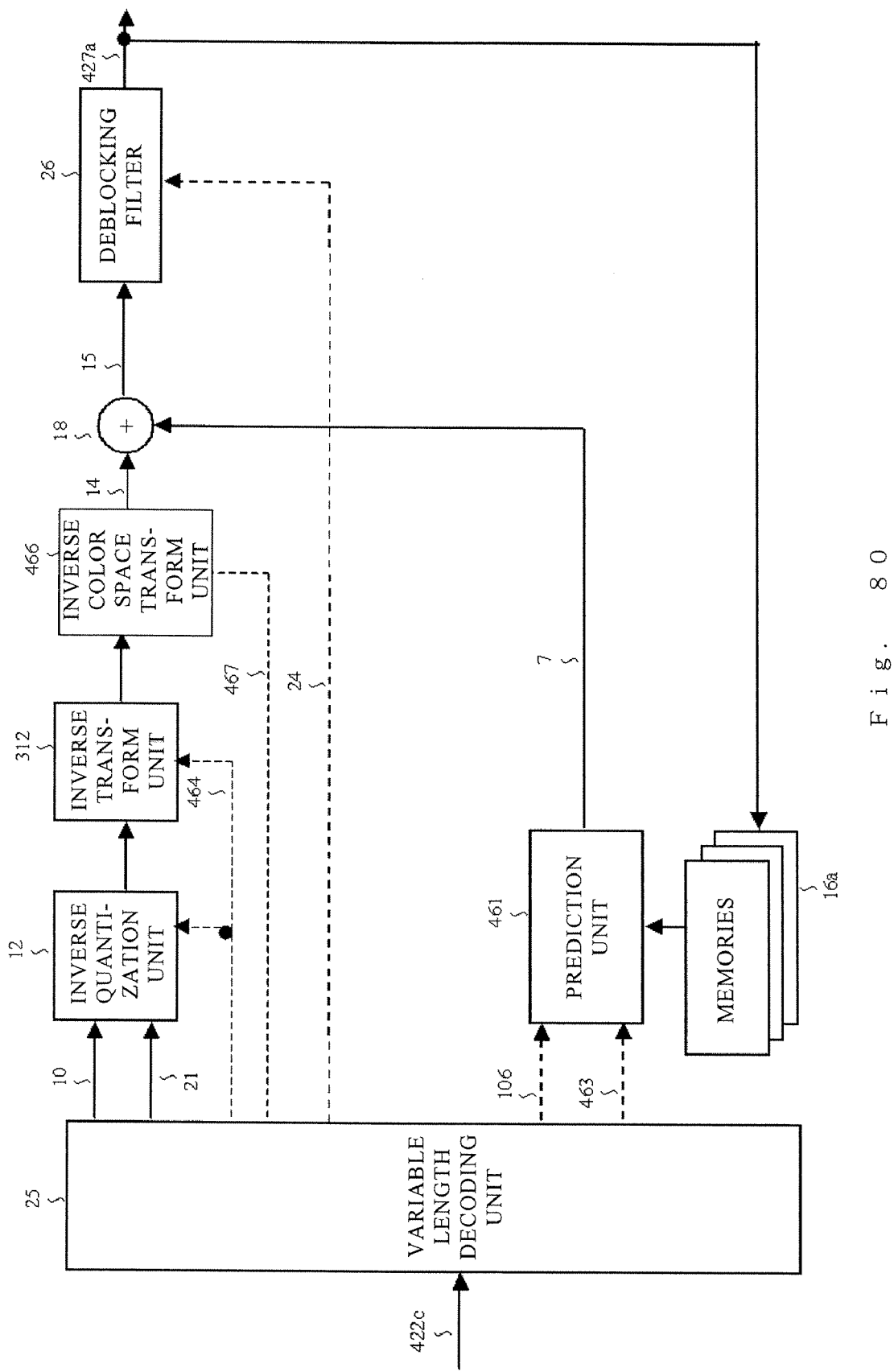
FIG. 80 is an explanatory view illustrating the internal configuration of the first picture encoding unit which is subjected to an inverse color space transform process.
Figure 81:
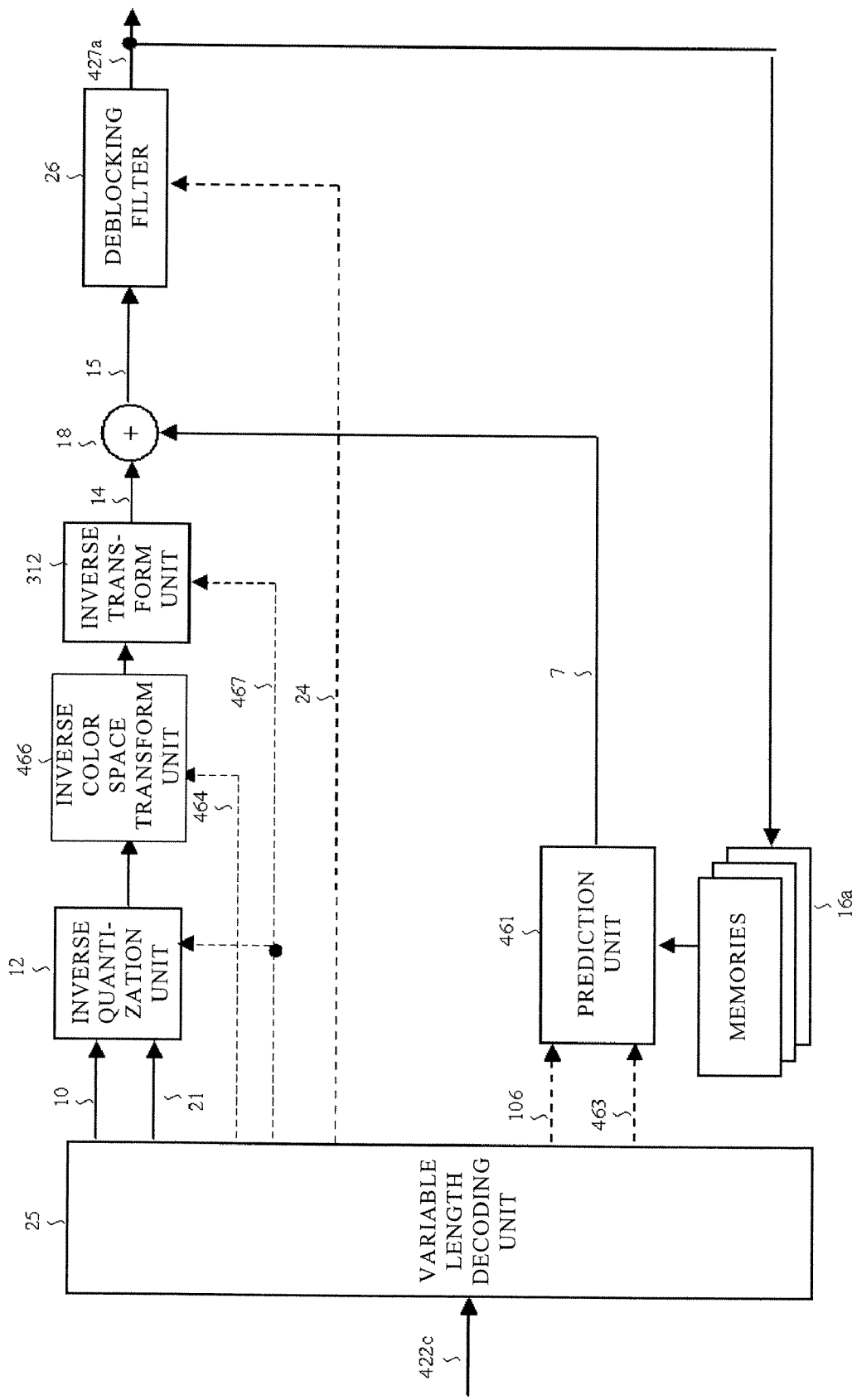
FIG. 81 is another explanatory view illustrating the internal configuration of the first picture encoding unit which is subjected to the inverse color space transform process.

The decoding devices corresponding to the encoding devices illustrated in FIGS. 78 and 79 are illustrated in FIGS. 80 and 81. FIG. 80 illustrates a decoding device for decoding the bit stream which is encoded by the color space transform prior to the transform process by the encoding device of FIG. 78. The variable length decoding unit 25 decodes, from the bit stream, the signaling information 467 such as the information for selecting whether or not to perform the transform in the inverse color space transform unit 466 or the information for the selection of an executable transform method in the inverse color space transform unit 466 to feed the decoded information to the inverse color space transform unit 466. The decoding device in FIG. 80 implements the color space transform process on the inversely-transformed prediction error signal based on the above-mentioned information in the inverse color space transform unit 466. FIG. 81 illustrates the decoding device for decoding the bit stream encoded by the color space transform while selecting the frequency component to be subjected to the color space transform after the transform process by the encoding device illustrated in FIG. 79. The variable length decoding unit decodes, from the bit stream, the signaling information 467 which is identification information containing the information for selecting whether or not to implement the transform in the inverse color space transform unit 466, the information for the selection of an executable transform method in the inverse color space transform unit, and the information for specifying a frequency component to be subjected to the color space transform to feed the decoded information to the inverse color space transform unit 466. The decoding device illustrated in FIG. 81 implements the color space transform process on the inversely-quantized transform coefficient data based on the decoded information in the inverse color space transform unit 466.

As in the decoding device illustrated in FIG. 75, the first picture decoding unit 603*a* in each of the decoding devices in FIGS. 80 and 81 is provided with the function of decoding the bit stream compliant with the AVC high profile obtained by collectively encoding a video signal in the conventional YUV 4:2:0 format for the three components. The higher-order header analyzing unit 610 refers to the profile identifier decoded from the video stream 422*c* to determine the format in which the bit stream is encoded. Then, the result of determination is transmitted as a part of the information of the signal line of the common encoding/independent encoding identification signal 423 to the switch 601 and the first picture encoding unit 603*a*. With such a configuration, the decoding device for ensuring the compatibility with the bit stream in the conventional YUV 4:2:0 format can be configured.

Figure 82:
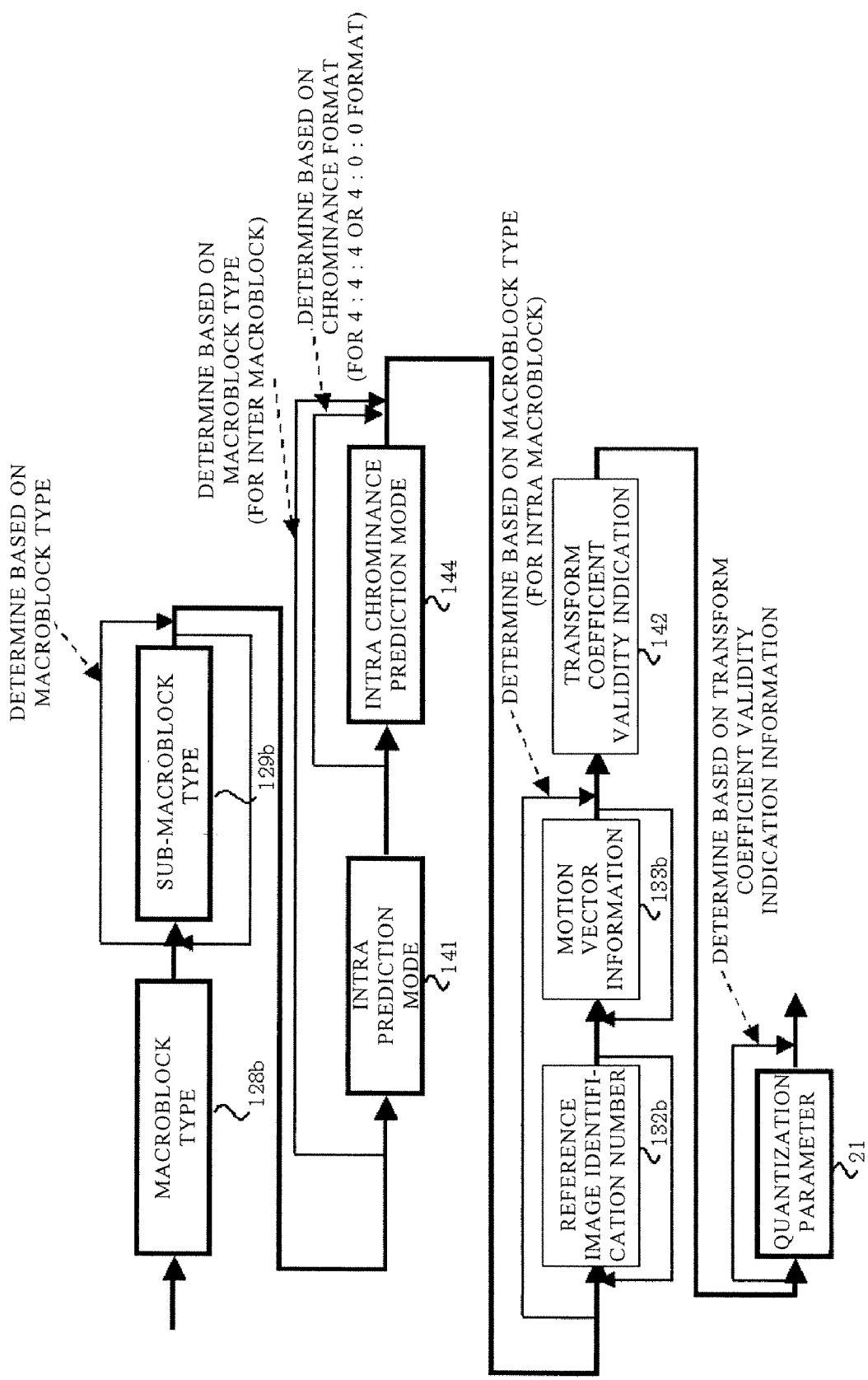
FIG. 82 is an explanatory view illustrating a structure of encoded data of macroblock header information contained in the bit stream in a conventional YUV 4:2:0 format.

FIG. 82 illustrates a structure of encoded data of macroblock header information contained in the bit stream in the conventional YUV 4:2:0 format. The macroblock header information illustrated in FIG. 82 differs from the Cn component header information illustrated in FIG. 50 only in that encoded data of an intra chrominance prediction mode 144 is contained when the macroblock type is the intra prediction. When the macroblock type is the inter prediction, the structure of the encoded data of the macroblock header information is the same as that of the Cn component header information illustrated in FIG. 50. However, a motion vector of the chrominance component is generated by a method different from that for the luminance component, using the reference image identification number and the motion vector information contained in the macroblock header information.

An operation of the decoding device for ensuring the compatibility with the bit stream in the conventional YUV 4:2:0 format will be described. As described above, it is assumed that the first picture decoding unit 603*a* has the function of decoding the bit stream in the conventional YUV 4:2:0 format. An internal configuration of the first picture decoding unit 603*a* is the same as that illustrated in FIG. 76.

An operation of the variable length decoding unit 25 of the first picture decoding unit having the function of decoding the bit stream in the conventional YUV 4:2:0 format will be described. Upon input of the video stream 422*c* to the variable length decoding unit, the variable length decoding unit decodes a chrominance format indication flag. The chrominance format indication flag is contained in a sequence parameter header of the video stream 422*c*, and indicates the input video image format. In this case, the input video image format is any one of the 4:4:4 format, the 4:2:2 format, the 4:2:0 format, and the 4:0:0 format. The decoding process of the macroblock header information of the video stream 422*c* is switched depending on a value of the chrominance format indication flag. When the macroblock type indicates the intra prediction and the chrominance format indication flag indicates the 4:2:0 format or the 4:2:2: format, the variable length decoding unit 25 decodes the intra chrominance prediction mode 144 from the bit stream. When the chrominance format indication flag indicates the 4:4:4 format, the variable length decoding unit 25 skips the decoding of the intra chrominance prediction mode 144. When the chrominance format indication flag indicates the 4:0:0 format, the variable length decoding unit 25 skips the decoding of the intra chrominance prediction mode 144 because the input video signal in the format (4:0:0) means that the input video signal is composed of a luminance signal alone. The process of decoding the macroblock header information other than the intra chrominance prediction mode 144 is the same as that of the variable length decoding unit in the first picture decoding unit 603*a* which is not provided with the function of decoding the bit stream in the conventional YUV 4:2:0 format. Upon input of the video stream 422*c* to the variable length decoding unit 25 by the above process, the chrominance format indication flag (not shown), and the quantized transform coefficients 10 and the macroblock header information (the macroblock type/sub-macroblock type 106, the prediction overhead information 463, the transformation block size designating flag 464, and the quantization parameter 21) for the three color components are extracted. The chrominance format indication flag (not shown) and the prediction overhead information 463 are input to the prediction unit 461 to obtain the predicted images 7 for the three components.

Figure 83:
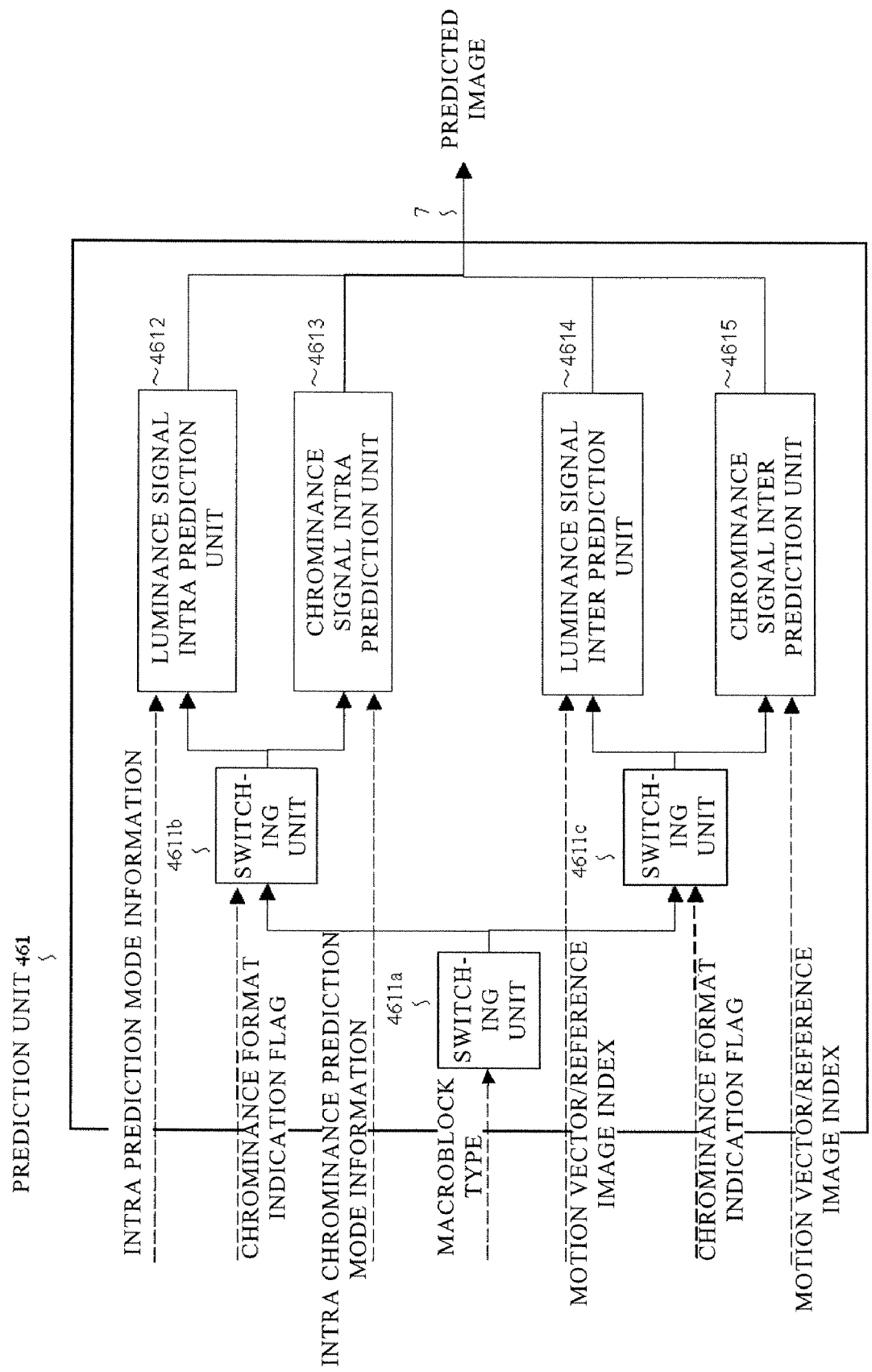
FIG. 83 is an explanatory view illustrating an internal configuration of a prediction unit in the first picture decoding unit which ensures compatibility with respect to the bit stream in the conventional YUV 4:2:0 format.

FIG. 83 illustrates an internal configuration of the prediction unit 461 in the first picture encoding unit which ensures the compatibility with the bit stream in the conventional YUV 4:2:0 format, and its operation will be described below.

A switching unit 461*a* determines the macroblock type. When the macroblock type indicates the intra prediction, a switching unit 4611*b* determines a value of the chrominance format indication flag. When the value of the chrominance format indication flag indicates any one of the 4:2:0 format and the 4:2:2 format, the predicted images 7 for the three components are obtained according to the intra prediction mode information and the intra chrominance prediction mode information from the prediction overhead information 463. Among the predicted images 7 for three components, the predicted image of the luminance signal is generated in a luminance signal intra prediction unit 4612 according to the intra prediction mode information. The predicted images of the two chrominance signals are generated in a chrominance signal intra prediction unit 4613 which performs a process different from that for the luminance component according to the intra chrominance prediction mode information. When the value of the chrominance format indication flag indicates the 4:4:4 format, the predicted images for all the three components are generated in the luminance signal intra prediction unit 4612 according to the intra prediction mode information. When the value of the chrominance format indication flag indicates the 4:0:0 format, only the predicted image of the luminance signal is generated in the luminance signal intra prediction unit 4612 according to the intra prediction mode information because the signal in the 4:0:0 format is composed of the luminance signal (one component) alone.

When the macroblock type indicates the inter prediction in the switching unit 4611a, a switching unit 4611c determines a value of the chrominance format indication flag. When the value of the chrominance format indication flag indicates any one of the 4:2:0 format and the 4:2:2 format, the predicted image is generated in a luminance signal inter prediction unit 4614 for the luminance signal by the predicted image generating method of the luminance signal defined in the AVC standard according to the motion vector and the reference image index from the prediction overhead information 463. For each of the predicted images of the two chrominance signals, a chrominance motion vector is generated in the chrominance signal inter prediction unit 4615 by scaling the motion vector obtained from the prediction overhead information 463 based on a chrominance format. The predicted image is generated from a reference image indicated by the reference image index obtained from the prediction overhead information 463 based on the chrominance motion vector according to the method defined in the AVC standard. When the value of the chrominance format indication flag indicates the 4:0:0 format, only the predicted image of the luminance signal is generated in the luminance signal inter prediction unit 4614 according to the motion vector and the reference image index because the 4:0:0 format indicates that the signal is composed of the luminance signal (one component) alone.

As described above, the means of generating the predicted images of the chrominance signals in the conventional YUV 4:2:0 format is provided to switch the means used for generating the predicted images for the three components according to the value of the chrominance format indication flag decoded from the bit stream. Therefore, the decoding device which ensures the compatibility with the bit stream in the conventional YUV 4:2:0 format can be configured.

If information indicating whether or not it is a bit stream decodable even by the decoding device which does not support the color space transform process as in the case of the decoding device illustrated in FIG. 75 is provided for the video stream 422c fed to the decoding devices in FIGS. 80 and 81 for each sequence parameter set or the like, the bit stream can be decoded in any one of the decoding devices illustrated in FIGS. 80, 81, and 75 according to its own decoding performance. As a result, the effect of easily ensuring the compatibility with the bit stream can be produced.

Fifteenth Embodiment

The fifteenth embodiment of the present invention describes another embodiment of the encoding device and the decoding device in the fourteenth embodiment of the invention, as illustrated in FIGS. 71 and 75. This fifteenth embodiment differs from the fourteenth embodiment of the invention only in the structure of the bit stream to be input to and output from the encoding device and the decoding device. An encoding device in this fifteenth embodiment multiplexes the encoded data in a bit stream structure illustrated in FIG. 84.

In the bit stream having the structure illustrated in FIG. 69, the AUD NAL unit contains information, primary_pic_type, as an element. FIG. 85 illustrates information of a picture encoding type when the picture data in the access unit beginning with the AUD NAL unit is encoded.

For example, primary_pic_type=0 indicates that all the slices in the picture are intra encoded. For primary_pic_Jype=1, the picture can contain a slice to be intra encoded and a slice which can be subjected to the motion compensation prediction by using only one reference picture list. Since primary_pic_type is information for defining the encoding mode which can encode one picture, the encoding device operates the information primary_pic_type to enable the encoding suitable for various conditions such as the property of the input video signal and the random access function. Since only one primary_pic_type is provided for each access unit in the above-mentioned fourteenth embodiment of the invention, primary_pic_type is common to three color component pictures in the access unit when the independent encoding process is performed. In this fifteenth embodiment, for the independent encoding of each of the color component pictures, primary_pic_type for the remaining two color component pictures are additionally inserted into the AUD NAL unit illustrated in FIG. 69, according to the value of num_pictures_in_au. Alternatively, as in the case of the bit stream structure illustrated in FIG. 84, the encoded data of each of the color component pictures is configured to begin with a NAL unit (Color Channel Delimiter) indicating the beginning of the color component picture, and the CCD NAL unit is configured to contain the primary_pic_type information of the corresponding picture. Since the encoded data of the respective color component pictures are collectively multiplexed for one picture in this structure, the color component identification flag (color_channel_idc) described in the fourteenth embodiment of the invention is contained not in the slice header but in the CCD NAL unit. As a result, the information of the color component identification flag, which is required to be multiplexed for each slice, can be concentrated in the data for each picture. Therefore, the effect of reducing the overhead information is obtained. Moreover, it is sufficient to detect the CCD NAL unit constituted as a byte sequence to verify color_channel_idc only once for one color component picture. Therefore, since the head of the color component picture can be quickly found without performing the variable length decoding process, the decoding device is no longer required to verify color_channel_idc in each slice header to separate the NAL unit to be decoded for each component. As a result, the data can be smoothly fed to the second picture decoding unit.

On the other hand, with such a configuration, the effect of reducing the buffer size and the processing delay of the encoding device as described in the fourteenth embodiment of the present invention referring to FIG. 72 is reduced. Therefore, signaling may be performed at a higher-order level (the sequence or the GOP) to indicate that the color component identification flag is multiplexed for each slice or each color component picture. In such a bit stream structure, the encoding device can be flexibly mounted according to its mode of use.

Figure 86:
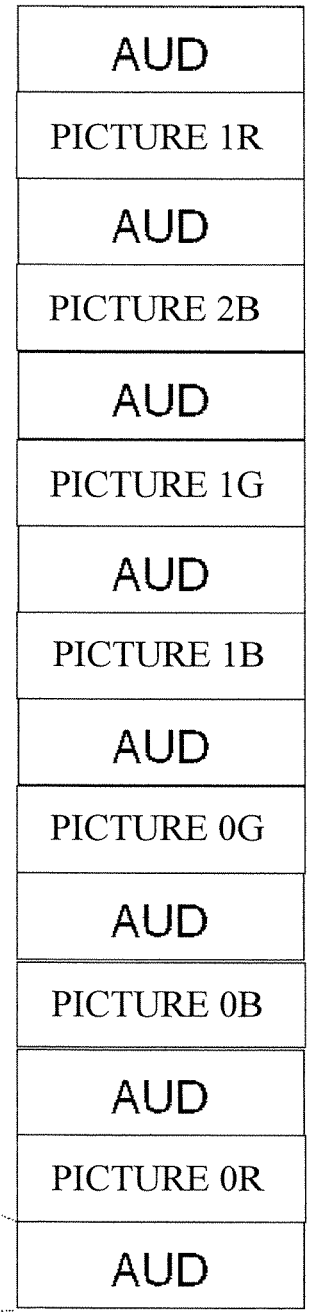
FIG. 86 is an explanatory view illustrating another structure of the bit stream of the encoded data to be multiplexed in the fifteenth embodiment.

As a further embodiment, the encoded data may be multiplexed in the bit stream structure illustrated in FIG. 86. In FIG. 86, color_channel_idc and primary_pic_type, which are contained in the CCD NAL unit in the case of FIG. 84, are contained in each AUD. In the bit stream structure in this fifteenth embodiment, one (color component) picture is contained in one access unit even in the case of the independent encoding process. Even in such a structure, the effect of reducing the overhead information by concentrating the information of the color component identification flag into the data for each picture is obtained. Moreover, it is sufficient to detect the AUD NAL unit constituted as the byte sequence to perform only one verification of color_channel_idc for each picture. The head of the color component picture can be quickly found without performing the variable length decoding process. Therefore, the decoding device is no longer required to verify color_channel_idc in each slice header to separate the NAL unit to be decoded for each component. As a result, the data can be smoothly fed to the second picture decoding unit. On the other hand, since one-frame or one-field image is composed of three access units, it is necessary to designate that the three access units are image data sharing the same time. Therefore, in the bit stream structure illustrated in FIG. 86, AUD may further contain a sequence number of each picture (the order of encoding/decoding in the time direction). With such a structure, the decoding device can verify the order of decoding and display of each picture, a color component attribute, the possibility of IDR, and the like without decoding the slice data at all, thereby effectively performing edit and special reproduction at the bit stream level.

Moreover, in the bit stream structure in FIG. 69, 84, or 86, information designating the number of the slice NAL units to be contained in one color component picture may be stored in the AUD or CCD area.

For all the embodiments described above, each of the transform process and the inverse transform process may be a transform which ensures orthogonality such as a DCT or may be a transform, which is not an orthogonal transform as in the case of the DCT in a strict sense, to be combined with the quantization or inverse quantization process to approximate the orthogonality, as in the case of the AVC. Alternatively, the prediction error signal may be encoded as the information at the pixel level without performing the transform.

Sixteenth Embodiment

This sixteenth embodiment describes an encoding device which uses an intra-frame or inter-frame adaptive prediction to perform the encoding in units of rectangular areas obtained by dividing a video frame input in the 4:4:4 format independently for each color component, each rectangular area being composed of $M_i \times M_i$ pixels (i=0, 1, or 2), and a corresponding decoding device. Herein, $M_i$ indicates the size of an area obtained by dividing a signal of the i-th color component in the video frame.

1. Outline of Operation of the Encoding Device

Figure 87:
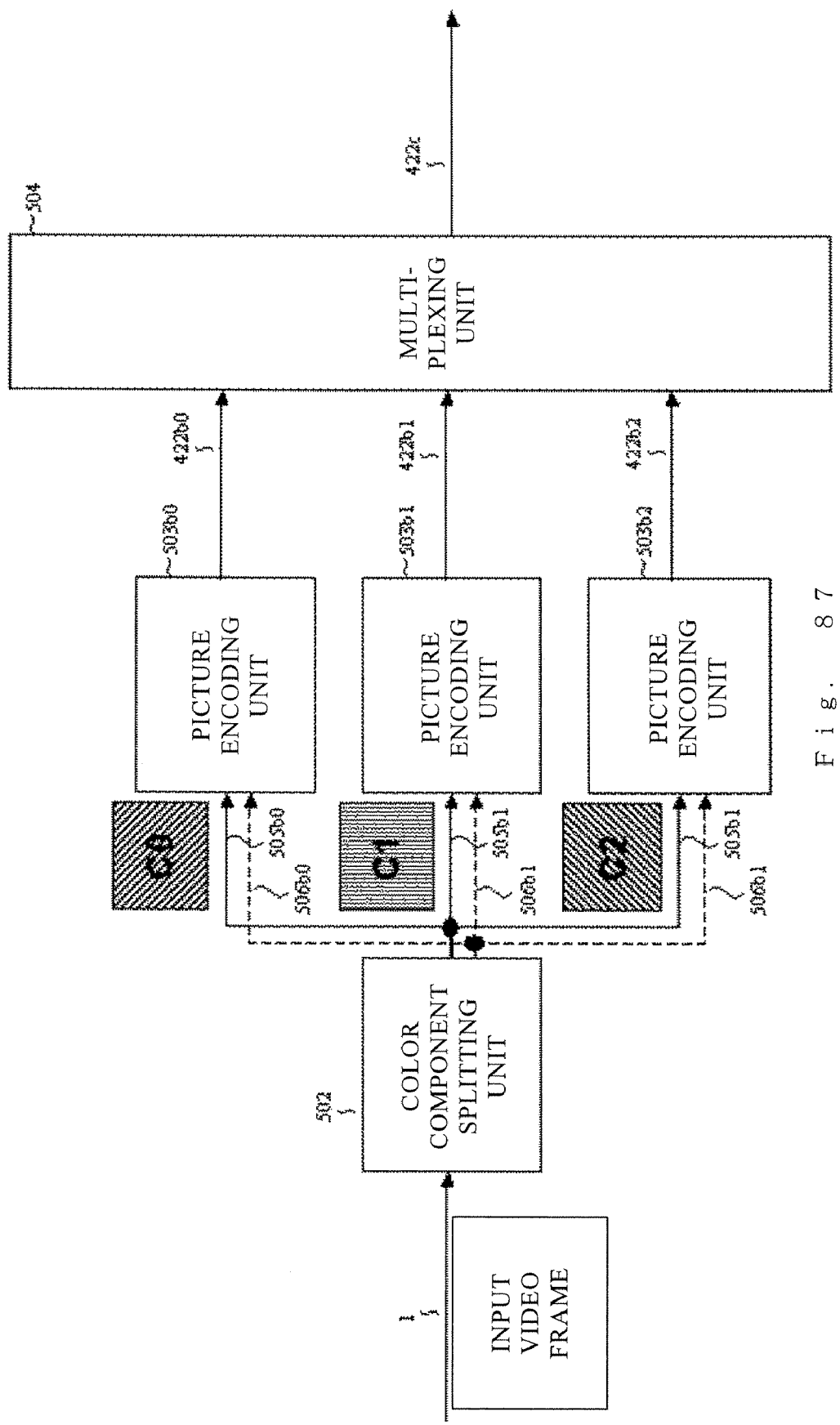
FIG. 87 is an explanatory view illustrating a schematic configuration of the encoding device in a sixteenth embodiment.

FIG. 87 illustrates a configuration of the video encoding device in the sixteenth embodiment of the present invention. The input video signal 1 in the 4:4:4 format is separated into screen components of the respective color components 505*b*0, 505*b*1, and 505*b*2 in the color component separating unit 502, which are then input to the second picture encoding units 503*b*0, 503*b*1, and 503*b*2, each having the same configuration. At this time, from the color component separating unit 502, information 506*b*0, 506*b*1, and 506*b*2 designating the size $M_i$ of the rectangular area corresponding to the unit of encoding in the respective picture encoding units 503*b*0, 503*b*1, and 503*b*2 are each input to the corresponding picture encoding units 503*b*0, 503*b*1, and 503*b*2. As a result, the picture encoding units 503*b*0, 503*b*1, and 503*b*2 for encoding the color component Ci divide the corresponding screen components 505*b*0, 505*b*1, and 505*b*2 based on the rectangular area size $M_i$ to perform the encoding in units of the rectangular areas.

Figure 88:
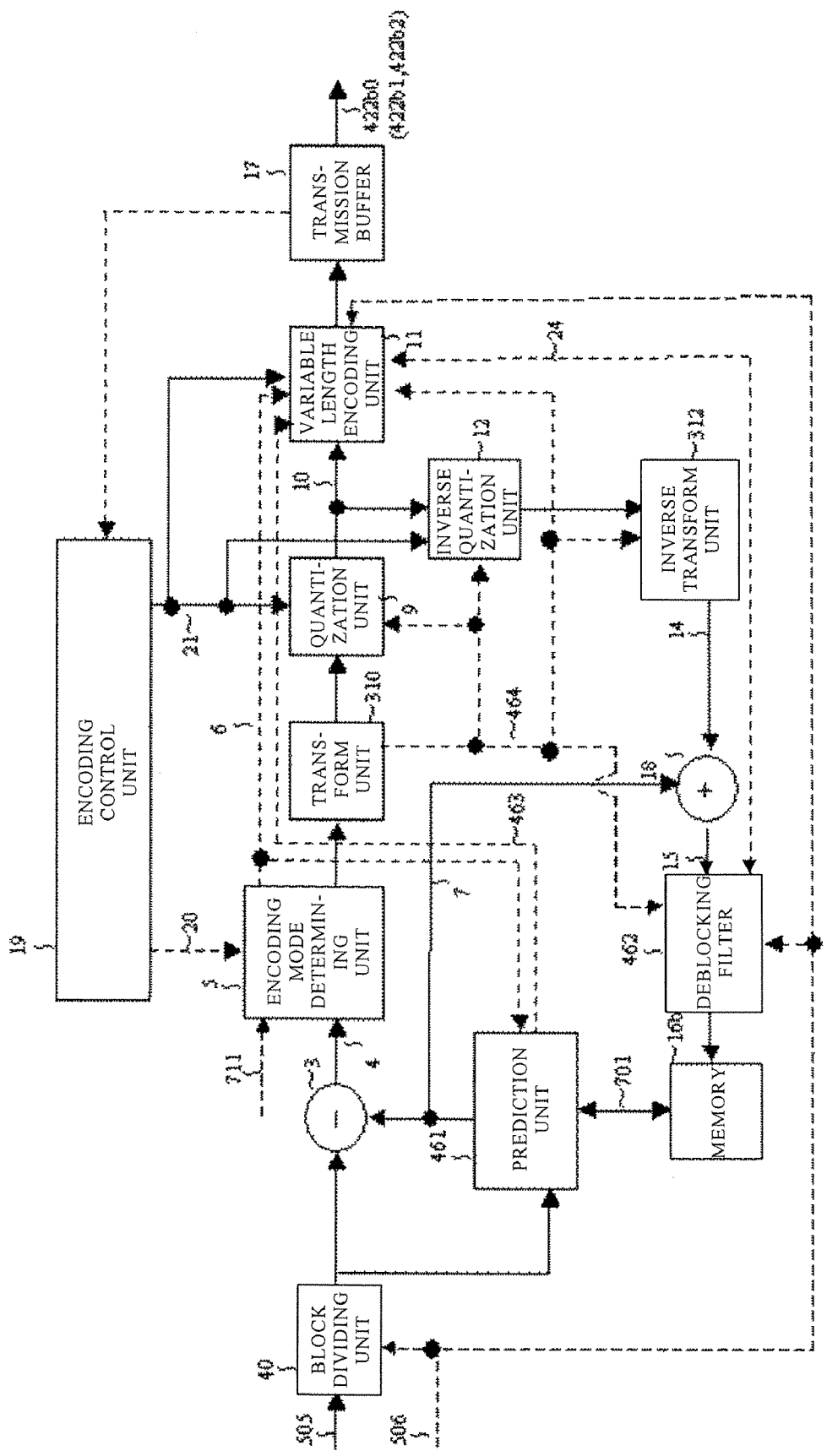
FIG. 88 is an explanatory view illustrating an internal configuration of a picture encoding unit.

Hereinafter, an operation of each of the picture encoding units 503*b*0, 503*b*1, and 503*b*2 will be described in detail. The picture encoding units 503*b*0, 503*b*1, and 503*b*2 will be described in the sixteenth embodiment of the present invention as a variation of the configuration illustrated in FIG. 74. FIG. 88 illustrates an internal configuration of each of the picture encoding units 503*b*0, 503*b*1, and 503*b*2. In FIG. 88, the functional blocks and the signal lines denoted by the same reference numerals as those of the picture encoding unit illustrated in FIG. 74 are the same as those in FIG. 74 unless otherwise noted. For the following description of the picture encoding units 503*b*0, 503*b*1, and 503*b*2, the screen components 505*b*0, 505*b*1, and 505*b*2 of the respective color components are representatively denoted by an input signal 505. In the same manner, the information 506*b*0, 506*b*1, and 506*b*2 designating the size $M_i$ of the rectangular area corresponding to the unit of encoding are representatively denoted by encoded block size indication information 506. The input signal 505 is divided into rectangular blocks by a block dividing unit 40 based on the encoded block size indication information 506. In the following description, the input signal 505 corresponding to the color component Ci is sometimes referred to as picture as the unit of data for the encoding process.

When the input video signal 1 is a signal represented in a color space of luminance/chrominance signals (for example, Y, Cb, and Cr, or Y, Co, and Cg, and the like), there is an encoding method of allocating the luminance component as the screen component 505*b*0 and the chrominance components as the screen components 505*b*1 and 505*b*2 in the input signal 505. In this case, the luminance component is a signal component in which the texture information contained in the image signal is concentrated, whereas each of the chrominance signals is a signal component, from which the correlation with the luminance component associated with the texture information is removed, to visually have the role of coloring a monochromic image. Therefore, in the signal prediction such as the inter-frame motion compensation prediction based on the texture structure or the intra-frame spatial prediction as employed in the AVC, the size of the block serving as the unit of prediction is not necessarily required to be the same as that of the luminance component. On the contrary, for the chrominance signal, the prediction is not necessarily performed in the same block size as that of the luminance component. It is believed that the prediction in different block sizes which allow the maximum use of the correlation of the chrominance signals in the screen can enhance the encoding efficiency. For example, when the component Y is C0, the component Cb is C1, and the component Cr is C2, the block size of each of the chrominance components is determined to be larger than that of the luminance component by setting $M_0=16$ and $M_1=M_2=32$. As a result, for two of the three components, the overhead information (the prediction mode, the motion vector, and the like) for each unit of encoding can be reduced to about ¼ of that of the luminance component. This state is illustrated in FIG. 89.

The size $M_i$ may be determined according to the image size. For example, in comparison between a video image of an HDTV signal (1920 pixels×1080 lines) and a low-resolution video image of a CIF signal (352 pixels×288 lines) having the same contents, a block of 4 pixels×4 lines of the HDTV signal has the size of only one pixel area in the CIF signal. Therefore, as the image resolution becomes higher, a substantial image texture area covered by each pixel is reduced. In the inter-frame motion compensation prediction or the intra-frame spatial prediction, similarity of the texture structure of the original image is detected to use a signal area having the highest similarity as a prediction value. Therefore, unless a certain degree of the texture structure is kept in the signal in the block corresponding to the unit of prediction, the prediction is not successfully performed (prediction performance is inhibited by a noise component). Therefore, it is desirable that a large block size be determined for a high-resolution video image to cover the texture area which is otherwise covered in the case of a low-resolution video image. Thus, the size $M_i$ can be increased as the image size becomes larger. Hereinafter, the rectangular area composed of $M_i \times M_i$ pixels is referred to as macroblock.

For the input signal 505 divided into the macroblocks by the block dividing unit 40, the intra prediction process for performing the spatial prediction from the local decoded neighboring pixels of the current picture, which are stored in the memory 16b, or the motion compensation prediction process for each color component, using the reference image from the prediction reference image data for one frame or more, which is stored in the memory 16b, is performed in the prediction unit 461. Since the process of the prediction unit 461 in this sixteenth embodiment differs from that of the prediction unit 461 of FIG. 74, the process will be described below.

1.1 Intra Prediction Process

The intra prediction process is performed in the prediction unit 461 for each macroblock by using a reference image 701 stored in the memory 16b. The intra prediction has two modes. One is the intra N×N prediction mode for performing the spatial prediction using the neighboring pixels for each block composed of N pixels×N lines. The other is a macroblock unit intra prediction mode for performing the spatial prediction using the neighboring pixels for each macroblock illustrated in FIG. 89.

(a) Intra N×N Prediction Mode

After the macroblock is divided into blocks, each block being composed of N×N pixels, the spatial prediction is performed for each block. As a block size N corresponding to the unit of the intra N×N prediction, the size, which can be obtained by equally dividing the macroblock size $M_i$, is selected. For example, for $M_i=16$, N is any one of 4 and 8, and for $M_i=32$, N is any one of 4, 8, and 16. As the prediction value, the pixels of the neighboring (upper left, upper, upper right, and left) blocks of a current picture, which have already been encoded and subjected to the local decoding process to be stored in the memory 16b, are used. As the prediction mode, for example, a plurality of modes as illustrated in FIG. 3 is prepared. As in the first embodiment of the present invention described above, FIG. 3 illustrate nine prediction modes for N=4. Any one of the nine prediction modes is selected for each 4×4 pixel block.

Intra4×4_pred_mode=0: use upper neighboring pixels as a predicted image

Intra4×4_pred_mode=1: use left neighboring pixels as a predicted image

Intra4×4_pred_mode=2: use an average value of eight neighboring pixels as a predicted image Intra4×4_pred_mode=3: calculate a weighted average of every two or three pixels from the neighboring pixels to use the obtained weighted average as a predicted image (corresponding to a diagonal down-left edge at 45 degrees)

Intra4×4_pred_mode=4: calculate a weighted average of every two or three pixels from the neighboring pixels to use the obtained weighted average as a predicted image (corresponding to a diagonal down-right edge at 45 degrees)

Intra4×4_pred_mode=5: calculate a weighted average of every two or three pixels from the neighboring pixels to use the obtained weighted average as a predicted image (corresponding to a vertical right edge at 22.5 degrees)

Intra4×4_pred_mode=6: calculate a weighted average of every two or three pixels from the neighboring pixels to use the obtained weighted average as a predicted image (corresponding to a horizontal down edge at 67.5 degrees)

Intra4×4_pred_mode=7: calculate a weighted average of every two or three pixels from the neighboring pixels to use the obtained weighted average as a predicted image (corresponding to a vertical left edge at 22.5 degrees)

Intra4×4_pred_mode=8: calculate a weighted average of every two or three pixels from the neighboring pixels to use the obtained weighted average as a predicted image (corresponding to a horizontal up edge at 112.5 degrees)

For N=4, sixteen pieces of mode information are required for each macroblock. In order to reduce the amount of codes of the mode information itself, prediction encoding is performed based on the mode information of the neighboring blocks, taking advantage of a high correlation in the mode information between the neighboring blocks. Although not illustrated, for N=8 or 16, the spatial prediction mode in consideration of the directionality of the image texture as in the case of N=4 is defined to perform the intra prediction process for each of N×N sub-blocks obtained by equally dividing the $M_i \times M_i$ macroblock.

(b) Macroblock Unit Intra Prediction Mode

In this mode, the $M_i \times M_i$ pixel block corresponding to the macroblock size is predicted at a time. For $M_i=16$, any one of the four modes illustrated in FIG. 4 is selected for each macroblock. As in the case of the intra N×N prediction mode, the pixels of the neighboring (upper left, upper, and left) macroblocks, which have already been encoded and subjected to the local decoding process to be stored in the memory 16b, are used for generating the predicted image.

Intra 16×16_pred_mode=0: use sixteen pixels in the lowermost line of the upper macroblock as a predicted image Intra 16×16_pred_mode=1: use sixteen pixels in the rightmost line of the left macroblock as a predicted image Intra 16×16_pred_mode=2: use an average value of thirty-two pixels, i.e., sixteen pixels (A of FIG. 4) in the lowermost line of the upper macroblock and sixteen pixels (B of FIG. 4) in the leftmost line in the left macroblock, as a predicted image Intra 16×16_pred_mode=3: use thirty-one pixels corresponding to a pixel at the lower right corner in the upper left macroblock, fifteen pixels in the lowermost line of the upper macroblock (except for a white pixel), and fifteen pixels in the rightmost line of the left macroblock (except for a white pixel) to perform a predetermined computing process (weighted addition process according to the used pixels and pixel positions to be predicted) to obtain the predicted image Even if $M_i$ is not 16, the macroblock unit spatial prediction mode in consideration of the directionality of the image texture as in the case of $M_i=16$ is defined.

As a prediction efficiency evaluation norm for selecting the intra prediction mode executed in the prediction unit 461, for example, a rate-distortion cost given by:

$$Jm=Dm+\lambda Rm(\lambda: \text{a positive number})$$

can be used. In this expression, Dm is an encoding distortion or a prediction error amount when an intra prediction mode m is used. The encoding distortion is obtained by obtaining a prediction difference signal using the intra prediction mode m, decoding a video image from the result of transform and quantization of the prediction difference signal, and then measuring an error of the video image from a signal prior to encoding. The prediction error amount is obtained by obtaining a difference between a predicted image and a signal prior to encoding when the intra prediction mode m is used and then quantifying the difference. For example, a sum of absolute distance (SAD) is used as the prediction error amount. Then, Rm is a generated code amount when the intra prediction mode m is used. Specifically, Jm is a value defining a tradeoff between the amount of codes and the degree of deterioration when the intra prediction mode m is used. The intra prediction mode m providing the smallest Jm gives the optimal solution.

1.2 Motion Compensation Prediction Process

In the prediction unit 461, the inter-frame motion compensation prediction process is also performed for each of the macroblocks by using the local decoded image 15 which has been encoded to be stored in the memory 16b. As the block size to be subjected to the motion compensation prediction, as illustrated in FIGS. 90A to 90D, any one of the division types, that is, $M_i \times M_i$ pixels, $M_i \times (M_i/2)$, $(M_i/2) \times M_i$, and $(M_i/2) \times (M_i/2)$ can be selected for each macroblock. Further, for the selection of the size $(M_i/2) \times (M_i/2)$, any one of the sizes $(M_i/2) \times (M_i/2)$, $(M_i/2) \times (M_i/4)$, $(M_i/4) \times (M_i/2)$, and $(M_i/4) \times (M_i/4)$ can be further selected for each $(M_i/2) \times (M_i/2)$ block, as illustrated in FIGS. 90E to 90H.

Further, as illustrated in FIGS. 90I to 90L, an area obtained by unequally dividing the macroblock can be used as the motion compensation prediction unit. The image signal generally contains a subject having a profile. In the vicinity of the profile, discontinuity in motion frequently occurs. If only the macroblock or the rectangular block corresponding to a subset thereof serves as the unit of motion detection, the prediction efficiency is disadvantageously prevented from being enhanced unless the block is further divided into smaller ones to increase the number of motion vectors when the boundary of an object is present in the block to cause the discontinuity in motion. If the area obtained by unequally dividing the macroblock as illustrated in FIGS. 90I to 90L is prepared as a motion compensation prediction unit, the discontinuity in motion on the object profile can be covered with a reduced number of motion vectors to enhance the prediction efficiency.

Moreover, when a profile is present in the macroblock, the profile in the macroblock can generally have various positions or shapes. In order to define all the positions or shapes, not only the shapes as illustrated in FIGS. 90I to 90L but also every type of division of the block are required to be defined. By limiting the unit area constituting the shape of unequal division "up to the block $(M_i/2) \times (M_i/2)$" as illustrated in FIGS. 90I to 90L in the sixteenth embodiment of the present invention, the effects of holding down the amount of codes of additional information which is required to be encoded to represent the division pattern, holding down the amount of calculations required to perform the motion detection for each of the division patterns, and enhancing the efficiency of an access to the memory 16b to generate the prediction value to hold down a memory band width are obtained.

The selection of the division pattern from those illustrated in FIGS. 90A to 90H for the motion compensation prediction is determined as the inter prediction mode. The motion vectors allocated to the selected division pattern are generated and output. For the types of the inter prediction mode available for one picture, the inter prediction mode may be defined to allow all the division patterns in FIGS. 90A to 90H to be designated, or the number of selectable division patterns as the inter prediction mode may be limited according to the conditions to reduce the amount of calculations required for selecting the optimal inter prediction mode or the amount of codes of the information for designating the inter prediction mode. For example, as the number of divisions of the macroblock is increased, the amount of information of the motion vectors, which is required to be encoded, also increases. Therefore, when the encoding is performed at a low bit rate, the patterns for sub-division into the size of $(M_i/2) \times (M_i/2)$ pixels or smaller as illustrated in FIGS. 90E to 90H are not used. Instead, the division patterns illustrated in FIGS. 90I to 90L, which require only a smaller amount of codes of the motion vectors, are selected. For example, the value of the quantization parameter can be used as a criterion for determining whether the bit rate is high or low. Therefore, the definition of the inter prediction mode can be switched according to the value of an initial state of the quantization parameter for encoding the picture. Alternatively, a dedicated identification bit for determining the definition of the inter prediction mode may be multiplexed in the bit stream.

Further, when the motion vector for each reference image has to be individually encoded in a picture using a predicted image obtained from a plurality of reference images, as in the case of a B-picture in the MPEG-2 or a bidirectional prediction in the AVC, the patterns for sub-division into the size of $(M_i/2) \times (M_i/2)$ pixels or smaller as illustrated in FIGS. 90E to 90H are not used. Instead, in order to reduce the amount of information of the motion vectors, the division patterns illustrated in FIGS. 90I to 90L, which require a smaller amount of codes of the motion vectors, may be selected. Besides, the definition of the inter prediction mode may be switched based on the pre-estimation of motions in the entire screen or the information indicating the process of encoding of the picture, which has been encoded immediately before. For example, in a scene containing complicated motions, the definition of the inter prediction mode is defined to allow the division pattern into blocks of the smaller size to be used. On the other hand, when a motion is uniform and therefore it is determined that a satisfactory prediction can be performed even in the units of large blocks, the definition of the inter prediction mode which does not use the division pattern into the smaller size is determined. Alternatively, the reference image used for generating a prediction value can be designated for each of the blocks obtained by dividing the macroblock to encode an identification number of the reference image.

As a prediction efficiency evaluation norm for selecting the inter prediction mode executed in the motion compensation prediction process, for example, a rate-distortion cost given by:

$$Jm,v,r = Dm,v,r + \lambda Rm,v,r (\lambda: \text{a positive number})$$

can be used. In this expression, Dm,v,r is an encoding distortion or a prediction error amount when an inter prediction mode m, and a motion vector v and a reference image r determined according to the inter prediction mode m are used. The encoding distortion is obtained by obtaining a prediction difference signal using the inter prediction mode m, the motion vector v, and the reference image r, decoding a video image from the result of transform and quantization of the prediction difference signal, and then measuring an error of the video image for a signal prior to encoding. The prediction error amount is obtained by obtaining a difference between a predicted image and a signal prior to encoding when the inter prediction mode m, the motion vector v, and the reference image r are used and then quantifying the difference. For example, a sum of absolute distance (SAD) is used as the prediction error amount. Then, Rm,v,r is the amount of generated codes when the inter prediction mode m, the motion vector v, and the reference image r are used. Specifically, Jm,v,r is a value defining a tradeoff between the amount of codes and the degree of deterioration when the inter prediction mode m, the motion vector v, and the reference image r are used. The inter prediction mode m, the motion vector v, and the reference image r, which provide the smallest Jm,v,r, give the optimal solution.

1.3 Picture Encoding Process

Figure 90:
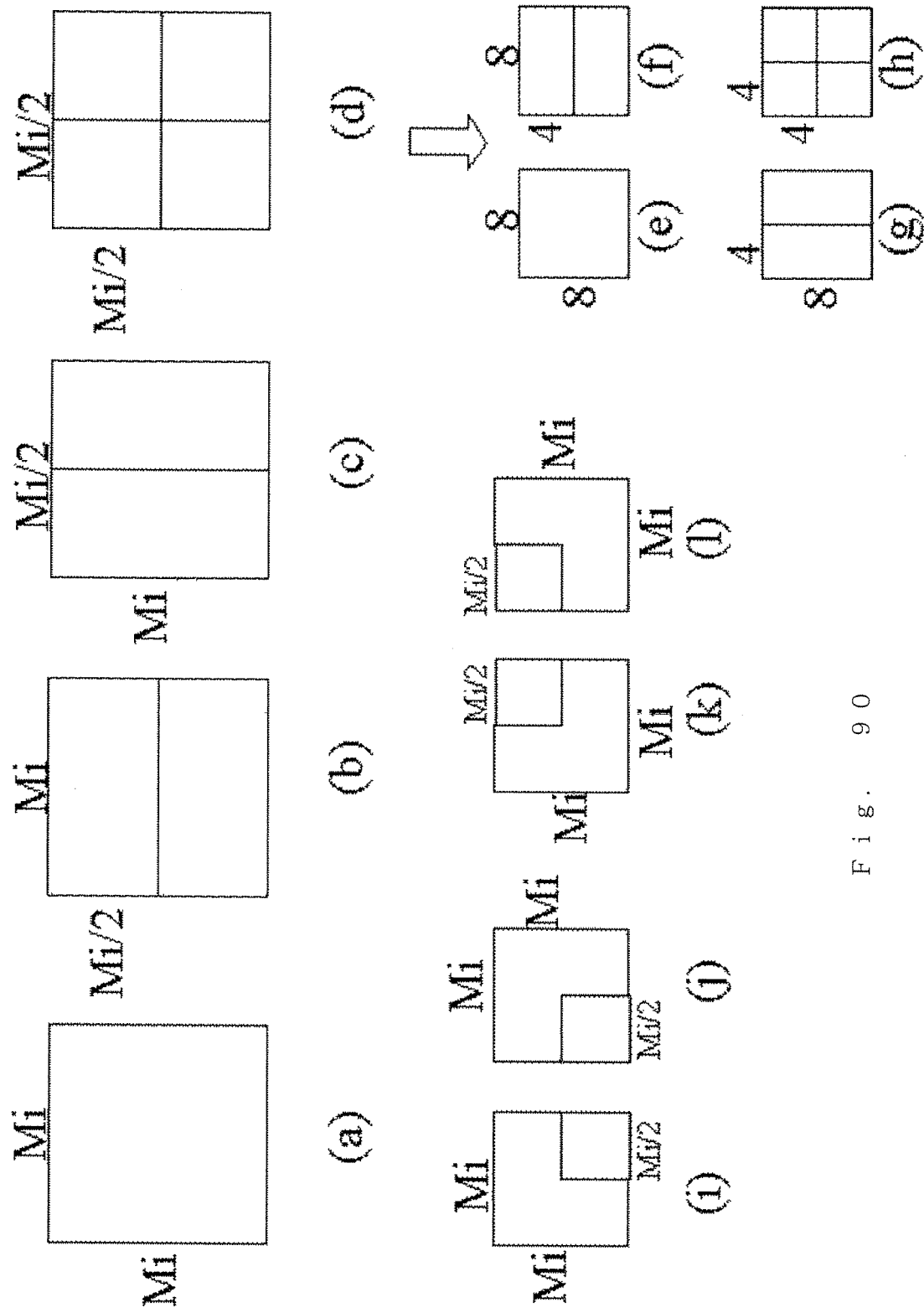
FIGS. 90A to 90L are explanatory views each illustrating the block size for each macroblock.

The prediction unit 461 executes the intra prediction process for all the intra prediction modes illustrated in FIG. 3 or 4 or the sub-set thereof to generate an intra prediction image for each macroblock. The prediction unit 461 also executes the motion compensation prediction process for all the motion compensation prediction modes illustrated in FIG. 90 and the sub-set thereof to output the predicted image 7 for the $M_i \times M_i$ block. The predicted image 7 is subtracted from the input signal 505 by the subtracter 3 to obtain the prediction difference signal 4. The prediction efficiency of the prediction difference signal 4 is evaluated in the encoding mode determining unit 5 to output the prediction mode, with which the optimal prediction efficiency is obtained for the macroblock to be predicted, from the prediction process executed in the prediction unit 461, as the encoding mode 6. Specifically, the encoding mode 6 contains information of the macroblock type for identifying the use of the intra N×N prediction mode as illustrated in FIG. 3, the use of the macroblock unit intra prediction mode as illustrated in FIG. 4, or the division pattern selected from any of the division patterns as illustrated in FIG. 90 used for the motion compensation prediction. Moreover, in this sixteenth embodiment, the type of the encoding mode selectable for the current picture is switched based on encoding mode definition selection information 711 determined by the encoding control unit 19 or the like. As the encoding mode definition selection information 711, dedicated selection indication information may be used. Besides, without using dedicated information, for example, an initial value of the quantization parameter 21 for encoding the current picture or encoded block size indication information 506 notified to the block dividing unit 40 may be used alone or in combination. In selecting the encoding mode 6, the weighting coefficient 20 for each of the encoding modes, which is determined by the encoding control unit 19, is sometimes taken into consideration. The optimal prediction difference signal 4 obtained by using the encoding mode 6 in the encoding mode determining unit 5 is output to the transform unit 310.

The transform unit 310 transforms the prediction difference signal 4 composed of the input $M_i \times M_i$ pixel block to output the result of transform as the transform coefficient to the quantization unit 9. For the transform, the $M_i \times M_i$ pixel block is divided into L×L pixel blocks (L<=$M_i$ and $M_i$ is a multiple of L). The transformation block size L is designated by a transformation block size indication flag 464. With such a configuration, the transform process adapted to the local property of the signal in the $M_i \times M_i$ pixel block can be performed. As the transformation block size L, the transform may be performed for all the settable values of L to select the value providing the highest efficiency. Alternatively, the transformation block size L may be selected to be the same as the block size in the intra prediction mode or the block size in the motion compensation prediction mode. In the latter case, since the encoding mode 6 contains information corresponding to the transformation block size indication flag 464, the effect of omitting the multiplexing of the transformation block size indication flag 464 in the bit stream is obtained. The quantization unit 9 quantizes the input transform coefficient based on the quantization parameter 21 determined by the encoding control unit 19 to output the result of quantization as the quantized transform coefficient 10 to the variable length encoding unit 11. The quantized transform coefficient 10 is entropy-coded by means such as Huffman encoding or arithmetic coding in the variable length encoding unit 11. The quantized transform coefficient 10 passes through the inverse quantization unit 12 and the inverse transform unit 312 to be restored to the local decoded prediction difference signal 14. The local decoded prediction difference signal 14 is added to the predicted image 7 generated by the prediction method corresponding to the encoding mode 6 in the adder 18 to generate the local decoded image 15. For the use of the local decoded image 15 in the following prediction process, the distortion removal filter is applied to a boundary between the blocks in the deblocking filter unit 462 based on the deblocking filter control flag 24 indicating whether or not the deblocking filter is to be applied. Alternatively, the local decoded image 15 is stored in the memory 16*b* without the application of the deblocking filter. The deblocking filter unit 462 refers to the encoded block size indication information 506 and the transformation block size indication flag 464 to perform the optimal block distortion removal process for each of the boundary between the macroblocks and the boundary between the transform blocks. Since the same process is required to be performed in the decoding device, the deblocking filter control flag 24 is input to the variable length encoding unit 11 to be multiplexed in the bit stream.

The encoded block size indication information 506 for defining the macroblock size $M_i$, the quantized transform coefficient 10, the encoding mode 6, the prediction overhead information 463, and the quantization parameter 21 are entropy-coded by means such as Huffman encoding or arithmetic coding in the variable length encoding unit 11 to be arranged and shaped as a bit stream according to a predetermined rule (syntax). Then, the obtained bit stream is output to the transmission buffer 17. The prediction overhead information 463 in this sixteenth embodiment contains the prediction mode information (Intra4×4_pred_mode, Intra16×16_pred_mode or the like) used for each prediction unit block when the intra prediction process is selected as the encoding mode 6. On the other hand, when the motion compensation prediction process is selected as the encoding mode 6, the overhead information 463 contains the motion vector information or the reference image index according to the division pattern defined for each of the macroblock types illustrated in FIGS. 90A to 90H. The transmission buffer 17 smoothes the bit stream according to the band of a transmission path to which the encoding device is connected or the reading velocity of a recording medium to output the bit stream as the video stream 422*b*0. The transmission buffer 17 also outputs feedback information to the encoding control unit 19 according to a state of accumulation of the bit streams in the transmission buffer 17 to control the amount of codes to be generated in the encoding of the subsequent video frames. The video stream 422*b*0 is unitized into slices, each being obtained by gathering a plurality of macroblocks, and is then output.

2. Structure of the Encoded Bit Stream

By executing the above-mentioned process in the picture encoding unit 503, the input video signal 1 to the encoding device is independently encoded in the three independent picture encoding units 503*b*0, 503*b*1, and 503*b*2 to be output as video streams 422*b*0, 422*b*1, and 422*b*2 in units of slices, each being obtained by gathering a plurality of macroblocks. Then, after the video streams 422*b*0, 422*b*1 and 422*b*2 are arranged into the video stream 422*c* in the multiplexing unit 504 as the input video signal 1 composed of three components, the video stream 422*c* is output from the encoding device.

Figure 91:
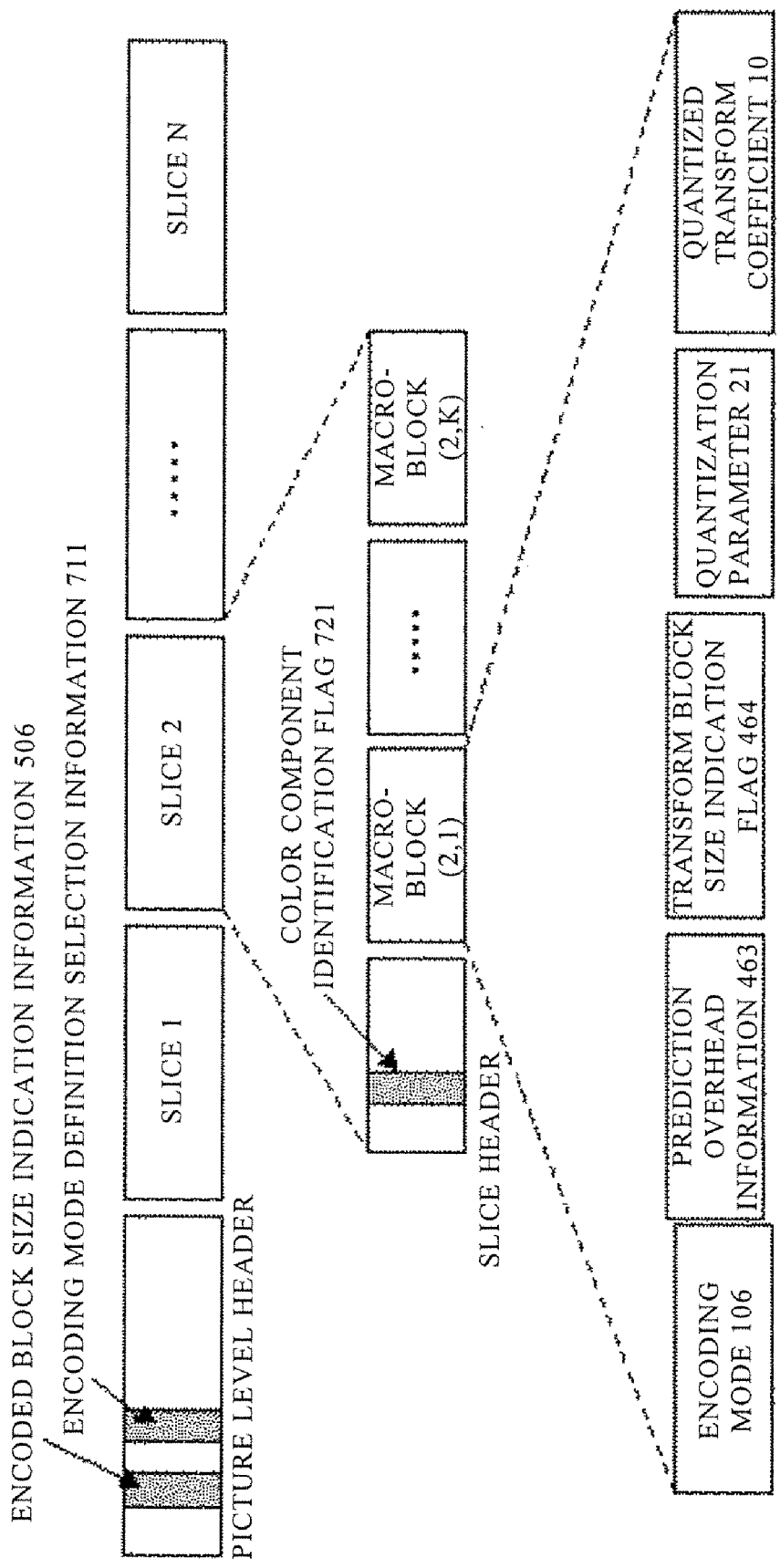
FIG. 91 is an explanatory view illustrating the data sequence of the video stream output from the picture encoding unit.

A data sequence of each of the video streams 422*b*0 to 422*b*2 each output from the picture encoding units 503*b*0 to 503*b*2 is illustrated in FIG. 91. Each of the video streams 422*b*0 to 422*b*2 obtained by the picture encoding units is constituted as the encoded data for the number of the macroblocks contained in the picture.

A plurality of macroblocks are put into a slice corresponding to the unit of data. A picture level header, which is referred to by the macroblocks contained in the same picture as a common parameter, is prepared. In the picture level header, the encoded block size indication information 506 and encoding mode definition selection information 711 are stored. For all the macroblocks contained in the picture, the macroblock size $M_i$ is determined based on the encoded block size indication information 506 contained in the picture level header which is referred to by the macroblocks. Then, the variable length encoding procedure of the encoding mode 6 is determined according to the encoding mode definition selection information 711.

Each slice begins with a slice header. The slice header contains a color component identification flag 721 for indicating the color component of the encoded data contained in the slice of interest (information for defining any of the color components 505*b*0 to 505*b*2) (as in the case of the slice encoded data obtained by the independent encoding process in FIG. 69). Subsequent to the slice header, the encoded data of each of the macroblocks in the slice is arranged (in this example, K macroblocks are contained in the second slice in one picture). As the data of each macroblock, the encoding mode 6, the prediction overhead information 463, the transformation block size indication flag 464, the quantization parameter 21 (only when the quantization parameter is changed for each macroblock), and the quantized transform coefficient 10 are arranged. The video stream 422*c* output from the encoding device illustrated in FIG. 87 is obtained by multiplexing the video streams 422*b*0 to 422*b*2 for three components, each having the structure illustrated in FIG. 91. The encoded block size indication information 506 and the encoding mode definition selection information 711 are arranged in the picture level header in FIG. 91, but these information may be stored in a sequence level header which is provided for each sequence obtained by gathering a plurality of video frames for the information for three components. In this manner, information different for each of the three components is not required to be encoded and transmitted with its own picture level header, and the amount of information of the header can be reduced.

3. Outline of Operation of the Decoding Device

Figure 92:
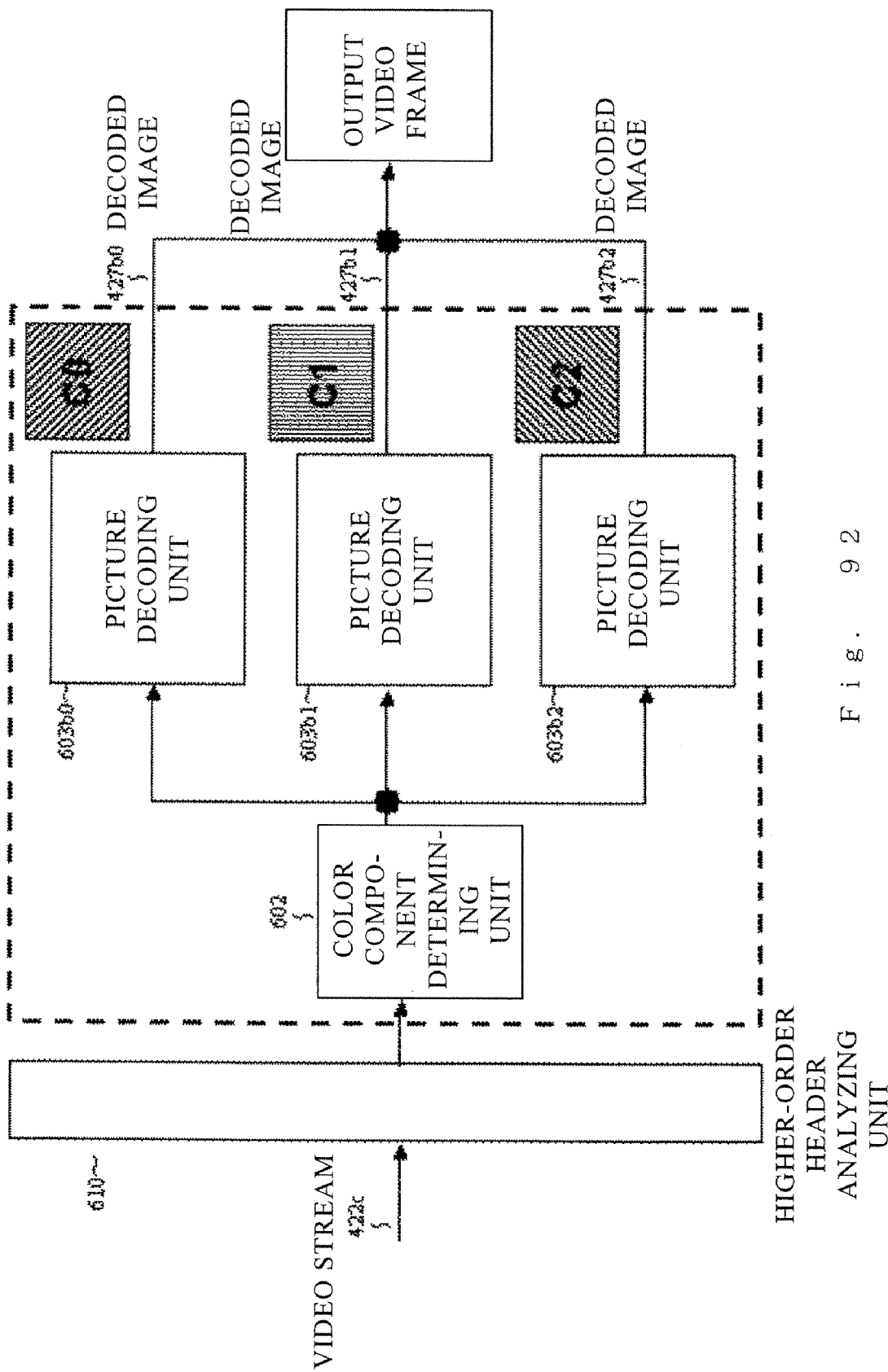
FIG. 92 is an explanatory view illustrating a schematic configuration of the decoding device in a sixteenth embodiment.

The decoding device illustrated in FIG. 92 receives the video stream 422*c* output from the encoding device illustrated in FIG. 87 and performs the decoding process on the macroblock basis to restore each video frame.

In FIG. 92, the higher-order header information such as the sequence level header or the picture level header of the video stream 422*c* is decoded in the higher-order header analyzing unit 610 to be stored in a predetermined memory area which can be referred to by the color component determining unit 602 and the picture decoding units 603*b*0 to 603*b*2.

The color component determining unit 602 identifies the color component picture to which the slice corresponds, based on the value of the color component identification flag 721 illustrated in FIG. 91 to distribute and feed the slice to an appropriate one of the picture decoding units (603*b*0 to 603*b*2). With such a configuration of the decoding device, even if the decoding device receives a video stream containing three color components, the decoding device can easily determine the color component picture, to which the slice belongs, to correctly decode the color component picture.

3.1 Outline of Operation of the Picture Decoding Units 603

Figure 93:
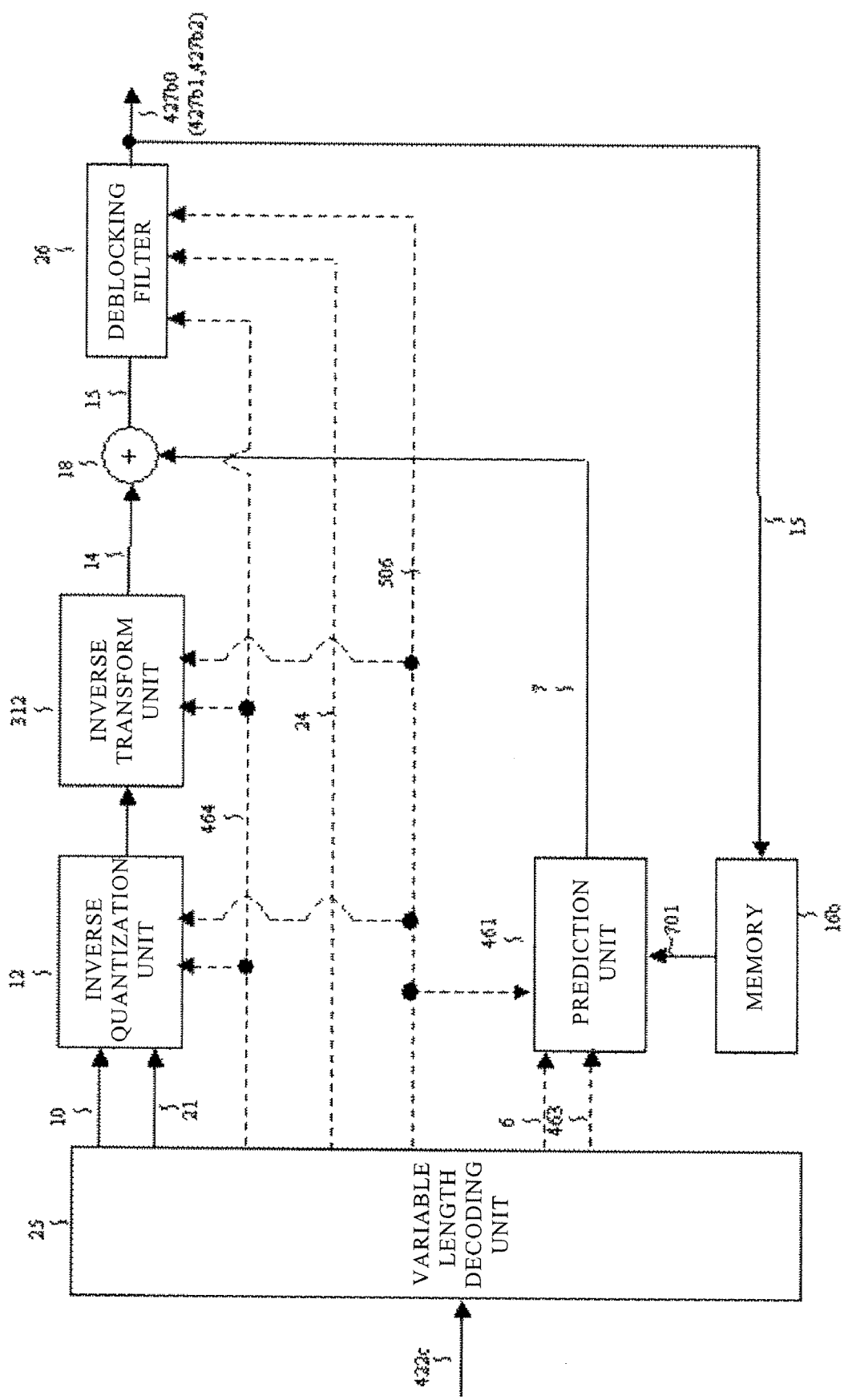
FIG. 93 is an explanatory view illustrating an internal configuration of a decoding unit.

Hereinafter, an operation of each of the picture decoding units 603*b*0 to 603*b*2 will be described in detail. The description of the picture decoding units 603*b*0 to 603*b*2 in the sixteenth embodiment will be made as a variation of the configuration illustrated in FIG. 77. FIG. 93 illustrates an internal configuration of each of the picture decoding units 603*b*0 to 603*b*2. In FIG. 93, the functional blocks and the signal lines denoted by the same reference numerals as those of the picture decoding unit illustrated in FIG. 77 are the same as those in FIG. 77 unless otherwise noted.

Each of the picture decoding units 603*b*0 to 603*b*2 receives C0, C1, or C2 slice encoded data classified in the color component determining unit 602 to perform the decoding process on the macroblock basis, each macroblock being composed of samples of a single color component, to restore a signal 427*b*0 (or 427*b*1 or 472*b*2) of the corresponding color component of the output video frame.

The variable length decoding unit 25 receives the input of the video stream 422*c* and deciphers the video stream 422*c* according to a predetermined rule (syntax) to extract the slice header, and the quantized transform coefficient 10, the prediction overheard information 463, the transformation block size indication flag 464, the quantization parameter 21, and the encoding mode 6 for each macroblock. The sequence or picture level header is decoded in the higher-order header analyzing unit 610 in FIG. 92. In this case, the information such as the encoded block size indication information 506 or the encoding mode definition selection information 711 is made referable prior to the start of the decoding of the slice in the picture decoding units 603*b*0 to 603*b*2 for decoding the corresponding color component. When the sequence or the picture level header is decoded in the variable length decoding unit 25 in each of the picture decoding units 603*b*0 to 603*b*2, the picture level header is decoded in the variable length decoding unit 25 prior to the start of the decoding of the slice to extract the information such as the encoded block size indication information 506 or the encoding mode definition selection information 711 from the bit stream. Although not illustrated, the encoding mode definition selection information 711 is used to determine the variable length decoding procedure when the encoding mode 6 is decoded in the variable length decoding unit 25.

The quantized transform coefficient 10 is input together with the quantization parameter 21 to the inverse quantization unit 12 which performs the same process as that in each of the picture encoding units 503*b*0 to 503*b*2 to be subjected to the inverse quantization process. Subsequently, an output from the inverse quantization unit 12 is input to the inverse transform unit 312 which performs the same process as that in each of the picture encoding units 503*b*0 to 503*b*2 to be restored to the local decoded prediction difference signal 14. Through the above-mentioned process, in order to constitute the transformation block size designation flag 464 providing the transformation block size L serving as the unit of the inverse transform and the inverse quantization and the inverse transform output as the prediction error image of the $M_i \times M_i$ pixel block, the encoded block size indication information 506 is referred to. On the other hand, the prediction unit 461 includes only the process of referring to the encoding mode 6 and the prediction overhead information 463 to generate the predicted image 7 of those performed in the prediction unit 461 in each of the picture encoding units 503*b*0 to 503*b*2. The encoding mode 6 and the prediction overhead information 463 are input to the prediction unit 461 to obtain the predicted image 7. The prediction unit 461 is notified of the encoded block size indication information 506 to generate the predicted image for the $M_i \times M_i$ pixel block based on the macroblock size $M_i$.

When the encoding mode 6 indicates the intra prediction mode such as the intra N×N prediction or the macroblock unit intra prediction, the predicted image 7 is obtained by using the intra prediction mode information for each N×N block or the intra prediction mode information for each macroblock, and the reference image 701 stored in the memory 16b according to the macroblock size $M_i$ from the prediction overhead information 463. When the encoding mode 6 indicates the inter (motion compensation) prediction, the division pattern of the macroblock is identified from those in the FIGS. 90A to 90H based on the encoding mode 6. Then, the predicted image 7 is obtained by using the reference image 701 stored in the memory 16b according to the motion vector, the reference image index, and the macroblock size $M_i$ obtained from the prediction overhead information 463.

The local decoded prediction difference signal 14 and the predicted image 7 are added by the adder 18 to obtain a decoded image 427b0 (or 427b1 or 427b2). Since the decoded image 427b0 (or 427b1 or 427b2) is used for the motion compensation prediction of the subsequent macroblocks, the block distortion removal process may be performed in the deblocking filter 26 based on the deblocking filter control flag 24 as in the picture encoding units 503b0 to 503b2. In this case, since the result of the process of the deblocking filter 26 is stored in the memory 16b to be referred to as the reference image 701 for the subsequent picture decoding, the block distortion removal process adapted to each of the macroblocks and the transform blocks is performed by referring to the encoded block size indication information 506 and the transformation block size designation flag 464 as in the case of encoding. The decoded image 427b0 (or 427b1 or 427b2) is stored in the memory 16b to be used for the subsequent motion compensation prediction process. The decoded image 427b0 (or 427b1 or 427b2) contains only the samples of a single color component. The decoded images 427b0, 427b1 and 427b2, which are respectively output from the picture decoding units 603b0 to 603b2 for decoding the other color components, are bundled into a video frame to constitute a color video frame.

According to the above-mentioned encoding device and the decoding device, in order to efficiently encode the color video signal in the 4:4:4 format, each of the color components can be independently subjected to the prediction encoding. In addition, the size of the macroblock to be predicted and encoded can be dynamically switched according to the property of the signal of each of the color components. Therefore, the amount of codes of the prediction overhead information 463 such as the intra prediction mode, the motion vector, or the reference image index, which has a high rate with respect to a total amount of codes in low-bit rate encoding at a high compression ratio, can be efficiently held down in the encoding. Further, in the motion compensation prediction process, the unequal division pattern is used for the macroblock for enhancing the prediction efficiency with a reduced number of motion vectors to hold down the amount of codes of the prediction overhead information 463. As a result, the balance between the prediction efficiency and the amount of codes is improved. At the same time, the type of the inter prediction mode representing the division pattern is diversified to enhance the prediction efficiency for various motions. In addition, the type of required inter prediction mode can be switched according to the encoding conditions such as the bit rate or the image resolution. As a result, the encoding device which can efficiently encode the color video signal in the 4:4:4 format and the decoding device corresponding to such an encoding device can be provided.

Although the encoding device illustrated in FIG. 88 obtained by adding the block dividing unit 40 to the encoding device illustrated in FIG. 74 and the decoding device corresponding to such an encoding device have been described in the sixteenth embodiment, similar effects can be obtained also by using the encoding device obtained by adding the block dividing unit 40 to the processing function for performing an individual and independent encoding process for each color component and the decoding device corresponding thereto as described in other embodiments. By replacing the part for executing the individual encoding process in the encoding device in FIG. 71 with the encoding device in FIG. 87 and the part for executing the individual decoding process in the decoding device in FIG. 75 with the decoding device in FIG. 92, the encoding device which is more highly adaptive to and efficient for the encoding of the color video signal in the 4:4:4 format and the decoding device corresponding thereto can be provided.

Seventeenth Embodiment

In contrast to the encoding device and the decoding device in the sixteenth embodiment, the encoding device and the decoding device, which dynamically switch motion vector detection accuracies for performing the motion compensation prediction process in the prediction unit, will be described in the seventeenth embodiment.

In principle, the input signal 505 corresponding to a digital image contains only discrete pixel information generated by sampling (hereinafter, referred to as an integer pixel). A technique for creating a virtual sample between the integer pixels by an interpolation operation to use the obtained virtual sample as a prediction image is widely employed. The technique is known to be advantageous in two points: improvement of a prediction accuracy by the increased number of prediction candidates; and improvement of the prediction efficiency by the reduced singularity of the prediction image by the filtering effect produced by the interpolation operation. On the other hand, it should be noticed that the amount of codes of the motion vectors, which represent the amount of motion, also increases with the improvement of the accuracy of the virtual sample because the accuracy of the motion vectors is also required to be increased.

Figure 94:
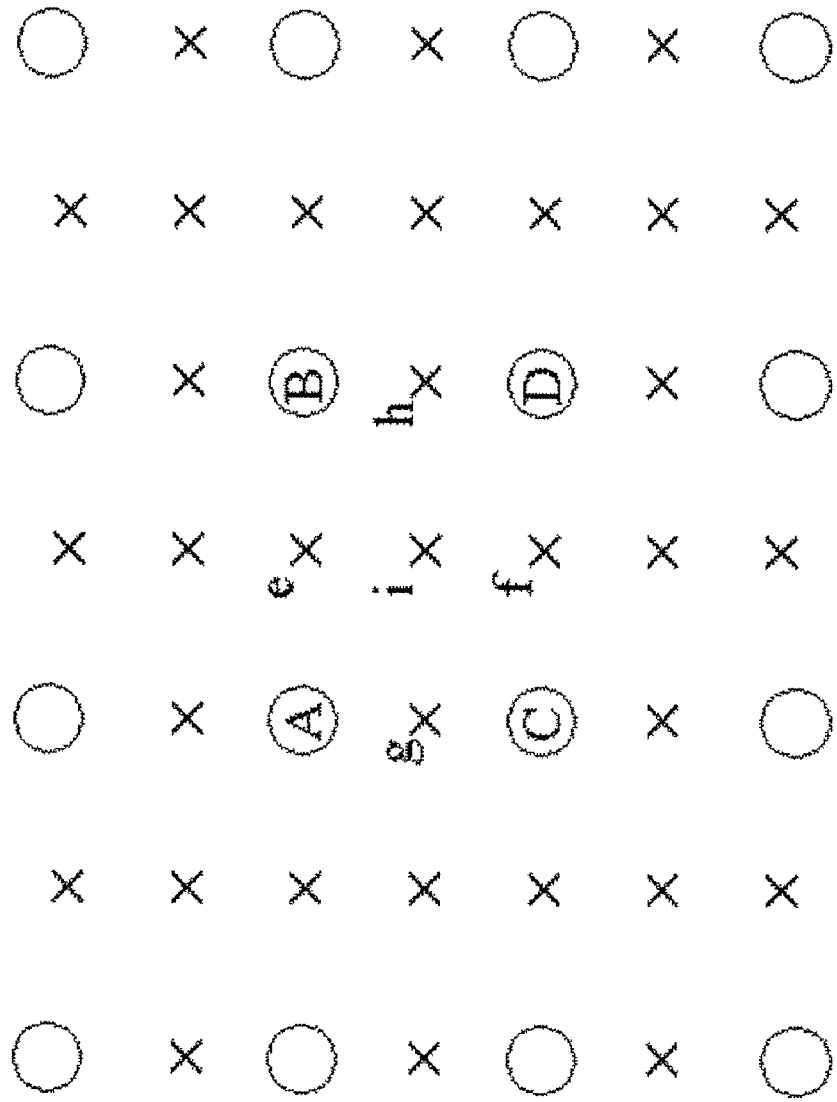
FIG. 94 is an explanatory view illustrating a method of creating a half-pixel prediction pixel.

In the encoding methods such as the MPEG-1 and the MPEG-2, a half-pixel prediction allowing the use of the accuracy of the virtual sample up to a half-pixel accuracy is employed. FIG. 94 illustrates a state where samples at a ½ pixel accuracy are created. FIG. 94 illustrates integer pixels A, B, C, and D, and virtual samples at a half-pixel accuracy, e, f, g, h, and i, which are created from the integer pixels A to D.

$e=(A+B)//2$ $f=(C+D)//2$ $g=(A+C)//2$ $h=(B+D)//2$ $i=(A+B+C+D)//2$ (where // indicates a rounding division)

Figure 95:
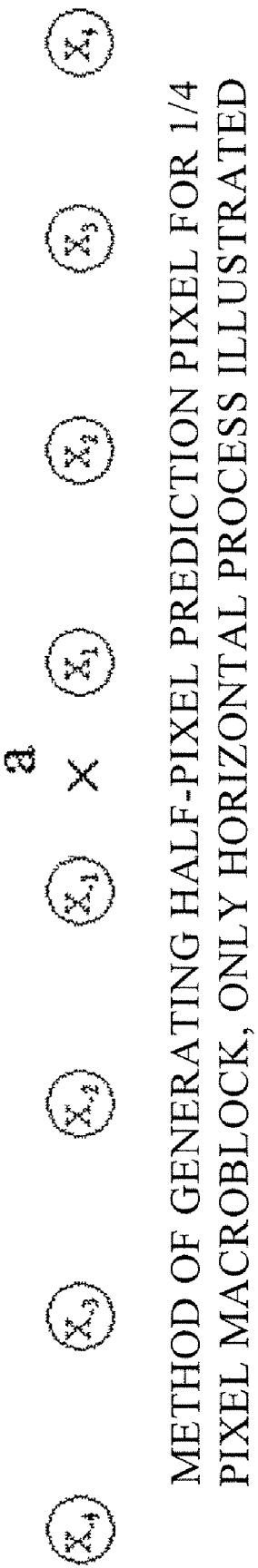
FIG. 95 is an explanatory view illustrating only a horizontal process in the method of creating a half-pixel prediction pixel at a time of a ¼ pixel MC.

In the MPEG-4 (ISO/IEC 14496-2), a ¼ pixel accuracy prediction using a virtual sample up to a ¼ pixel accuracy is employed. In the ¼ pixel accuracy prediction, after creating the half-pixel samples, ¼ pixel accuracy samples are created by using the obtained half-pixel samples. In order to prevent excessive smoothing for creating the half-pixel samples, a filter having a large number of taps is designed to be used to retain a frequency component of the original signal as much as possible. For example, in the ¼ pixel accuracy prediction in the MPEG-4, a virtual sample a at the half-pixel accuracy, which serves to create a virtual sample at the ¼ pixel accuracy, is created by eight neighboring pixels in the following manner. The following Formula is applied only to a horizontal process. The virtual sample a at the half pixel accuracy, which is created to create the virtual sample at the ¼ pixel accuracy, and X components $X_{-4}$ to $X_4$ corresponding the integer pixels in the following Formula have the positional relation as illustrated in FIG. 95.

$$a = (COE1*X1 + COE2*X2 + COE3*X3 + COE4*X4 + COE_{-1}*X_{-1} + COE_{-2}*X_{-2} + COE_{-3}*X_{-3} + COE_{-4}*X_{-4})//256$$

(where $COE_k$: a filter coefficient (the sum of coefficients is 256); and // indicates a rounding division)

In the AVC (ISO/IEC 14496-10), a filter including six taps, [1, −5, 20, 20, −5, 1], is employed to create the virtual samples at the half-pixel accuracy. Further, the virtual samples at the ¼ pixel accuracy are created by the linear interpolation process similar to that for creating the half-pixel samples in the MPEG-1 and the MPEG-2 described above.

1. Operation of the Encoding Device

Figure 96:
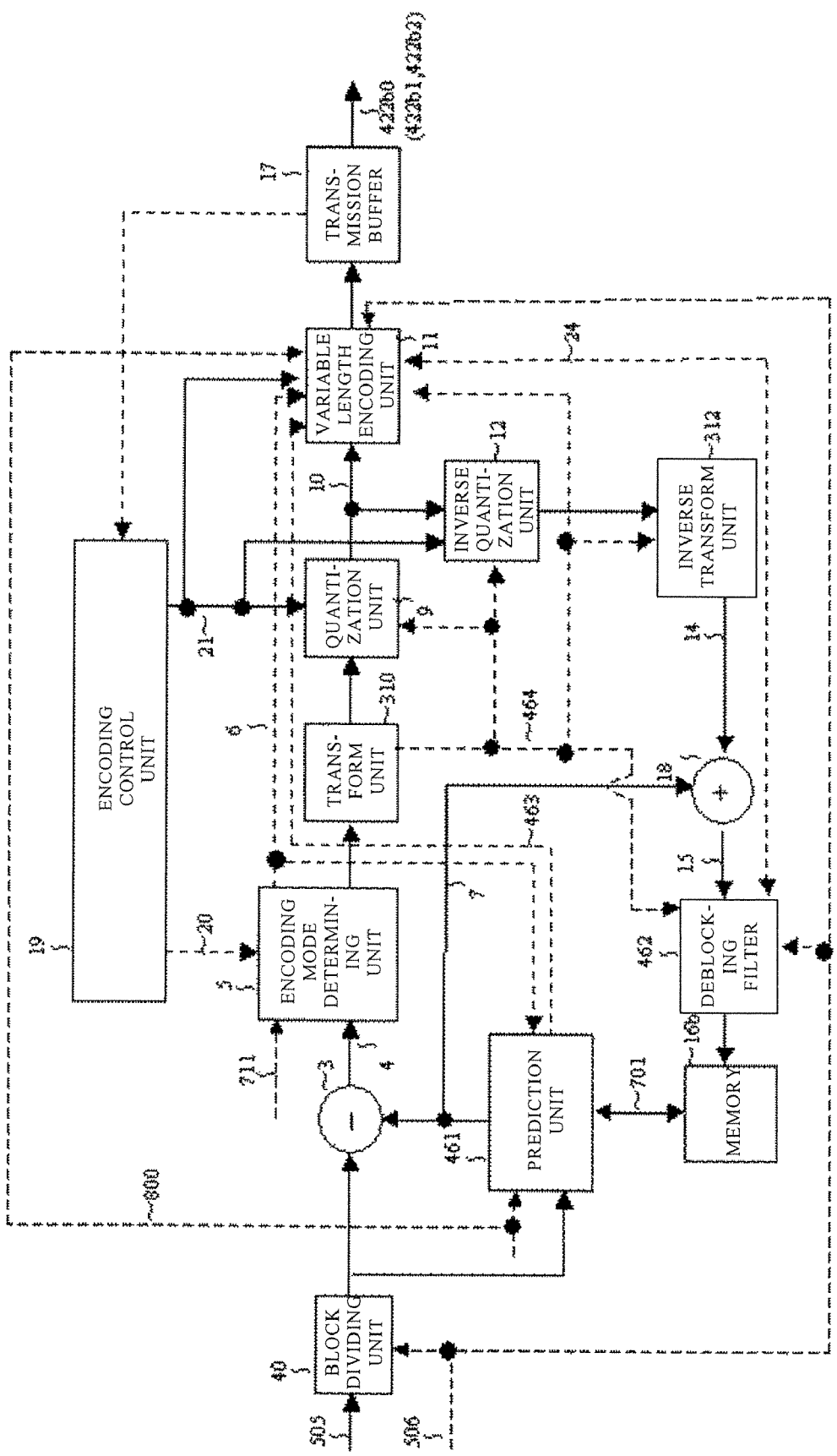
FIG. 96 is an explanatory view illustrating a schematic configuration of the encoding device in a seventeenth embodiment.

Even in the seventeenth embodiment, the half-pixel or ¼ pixel accuracy can be designated as the accuracy of the virtual sample in the motion compensation prediction process. Based on this condition, the encoding device and the decoding device in the seventeenth embodiment are configured so that the accuracy of the virtual sample used for each color component can be designated. FIG. 96 illustrates a configuration of each of the picture encoding units 503b0 to 503b2 in the seventeenth embodiment. The picture encoding units 503b0 to 503b2 in FIG. 96 differ from those illustrated in FIG. 88 only in the operations of the prediction unit 461 and the variable length encoding unit 11.

The prediction unit 461 in the seventeenth embodiment receives virtual pixel accuracy indication information 800. Based on the received information 800, the prediction unit 461 determines the accuracy of the virtual pixel, for which the motion vector detection is performed, to perform a process. Although not illustrated, the virtual pixel accuracy indication information 800 is configured to be individually designated to the picture encoding units 503b0 to 503b2 which encode the respective color components for each color component Ci. When the virtual pixel accuracy indication information 800 indicates a "motion vector detection at the ¼ pixel accuracy," the prediction unit 461 performs the motion vector detection while the samples at the ¼ pixel accuracy are being created by linear interpolation after the creation of the half-pixel accuracy samples based on a multi-tap filter as in the MPEG-4 or the AVC. On the other hand, when the virtual pixel accuracy indication information 800 indicates only a "motion vector detection at the half-pixel accuracy," the motion vector detection is performed while the samples at the half-pixel accuracy are being created based on the multi-tap filter as in the MPEG-4 or the AVC described above or while the samples at the half-pixel accuracy are being created by the linear interpolation as in the MPEG-1 and the MPEG-2 described above. Since the decoding device is required to create the virtual samples in the same manner to obtain the predicted image, the virtual pixel accuracy indication information 800 is multiplexed and output in the bit stream. The method of creating the half-pixel accuracy sample may involve performing the process by a method determined in advance in the same procedure by the encoding device and the decoding device. Alternatively, a plurality of methods may be prepared and the selected method may be multiplexed in the bit stream as virtual sample creating method indication information 811 and transmitted to the decoding device. As a method of setting the virtual pixel accuracy indication information 800, for example, for encoding in the color space as that of Y, Cb, and Cr, the following method is conceivable. The motion vector detection is performed at a higher accuracy for the component Y which greatly reflects the texture structure of the image with the virtual pixel accuracy indication information 800 set to indicate the "motion vector detection at the ¼ pixel accuracy," whereas the virtual pixel accuracy indication information 800 is set to indicate "only the motion vector detection at the half-pixel accuracy" for the chrominance components (Cb and Cr) having a lower correlation with the texture structure than the component Y signal. This method can be configured not only to change the virtual pixel accuracy indicated for each color component but also to perform the motion detection at a higher accuracy by setting the virtual pixel accuracy indication information 800 to indicate the "motion vector detection at the ¼ pixel accuracy" for all the components when all the components preserve a certain degree of the texture structure of the image. Therefore, the effect in that a flexible motion compensation prediction process according to the property of the signal of each of the color components can be performed for a signal in any color space is obtained.

The virtual pixel accuracy indication information 800 is transmitted to the variable length encoding unit 11 to be used for identifying the unit of a value of the motion vector (contained in the prediction overhead information 463) detected in the prediction unit 461. In the variable length encoding unit 11, the motion vector to be encoded is denoted by MV, and a prediction vector determined for the MV according to a predetermined prediction value determining procedure is denoted by PMV. As the PMV, the already encoded value is used. The variable length encoding unit 11 encodes an MV-PMV value. In this case, when the virtual pixel accuracy indication information 800 indicates the "motion vector detection at the ¼ pixel accuracy," the unit of the value of MV is the ¼ pixel. On the other hand, when the virtual pixel accuracy indication information 800 indicates the "motion vector detection at the half-pixel accuracy," the unit of the value of MV is the ½ pixel. The motion vector regarding the ¼ pixel as one has a value range double to that in the case where the half-pixel is regarded as one for both the horizontal and vertical components. Therefore, when only the samples at the ½ pixel accuracy are used, by setting the unit of the value of MV to the half-pixel, as compared with the case where the ¼ pixel is used as the unit of value of MV, the amount of information required for encoding the MV can be reduced.

By using the above-mentioned property, not only for a difference in signal property in a different color space, but also for performing a high compression encoding in which the ratio of the amount of codes of the prediction overhead information 463 such as the motion vector is increased with respect to a total amount of codes, the virtual pixel accuracy indication information 800 can be adjusted to perform the encoding with the amount of codes of the motion vector being held down. Since the virtual pixel accuracy indication information 800 can be set independently for each color component, the control adaptive to the condition of each color component in high compression can be performed. As a result, a more highly adaptive encoding process becomes possible.

2. Structure of the Encoded Bit Stream

Figure 97:
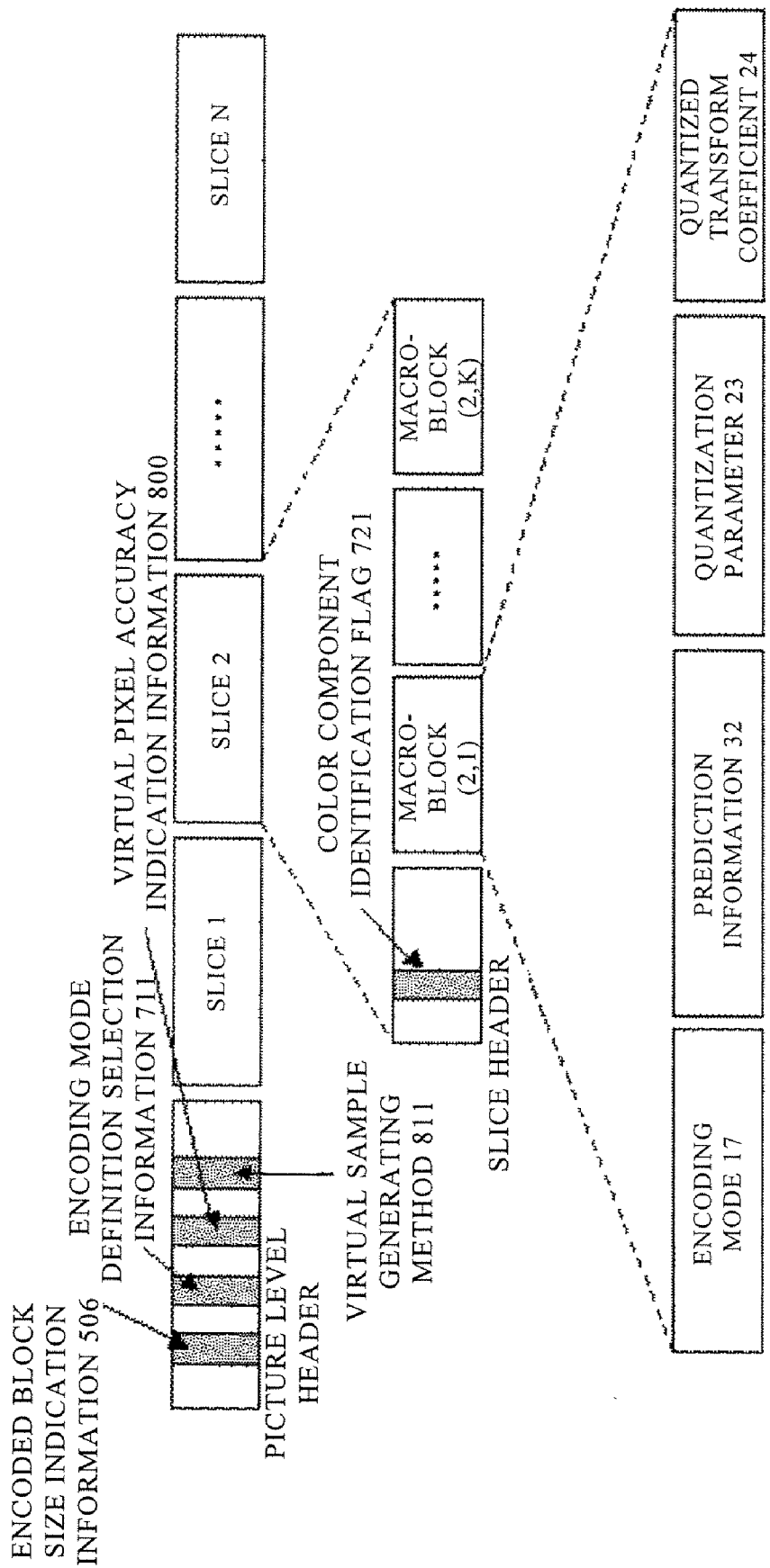
FIG. 97 is an explanatory view illustrating a data sequence of the video stream output from the picture encoding unit.

FIG. 97 illustrates a data sequence of each of the video streams 422b0 to 422b2 output from the encoding device illustrated in FIG. 96. The stream sequence of FIG. 97 differs from that of FIG. 91 in that the virtual pixel accuracy indication information 800 is multiplexed in the picture level header. As a result, the decoding device that receives the bit stream becomes capable of recognizing the unit of the value of the motion vector contained in the prediction overhead information 463 for each color component to decode the motion vector in the same manner as in the encoding device, and creating the predicted image. Moreover, for example, when a plurality of methods for creating the samples at the half-pixel accuracy can be prepared as described above, the virtual sample creating method indication information 811 may be multiplexed in the picture level header. Although the virtual pixel accuracy indication information 800 and the virtual sample creating method indication information 811 are multiplexed in the area of the pixel level header in FIG. 97, the information 800 and 811 for three color components may be collectively multiplexed in a higher-order header area than the sequence level header.

3. Operation of the Decoding Device

Figure 98:
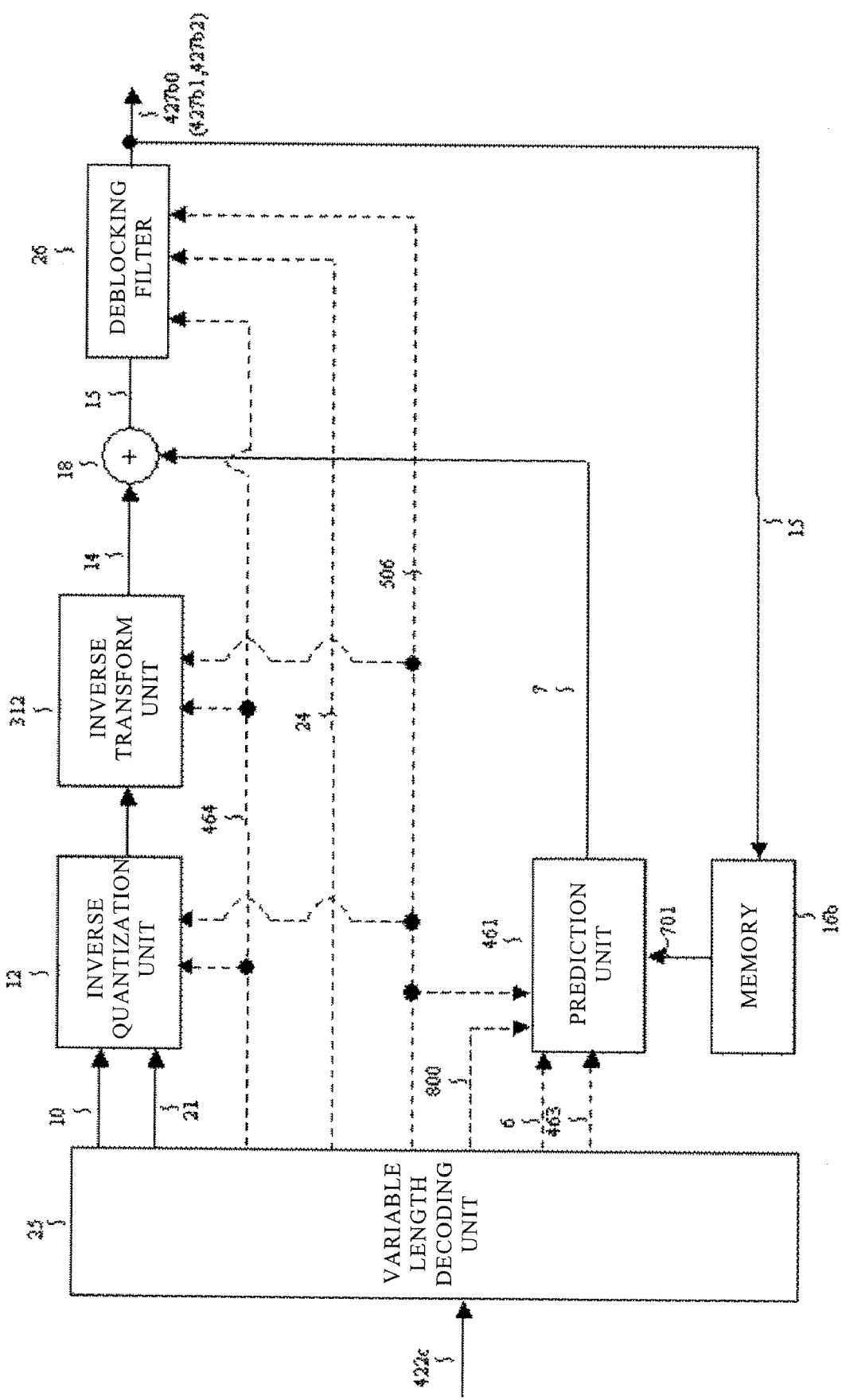
FIG. 98 is an explanatory view illustrating a schematic configuration of the decoding device in the seventeenth embodiment.

FIG. 98 illustrates the configuration of the decoding device (the picture decoding unit 603b0, 603b1, or 603b2) in the seventeenth embodiment. The decoding device in FIG. 98 differs from the picture decoding unit 603b0, 603b1, or 603b2 in FIG. 93 only in the operations of the variable length decoding unit 25 and the prediction unit 461. The variable length decoding unit 25 decodes the video stream 422b0, 422b1, or 422b2 illustrated in FIG. 97, extracts the virtual pixel accuracy indication information 800 contained in the picture level header from the video stream, and outputs the extracted virtual pixel accuracy indication information 800 to the prediction unit 461. When the value of the virtual pixel accuracy indication information 800 indicates the "motion vector detection at the ¼ pixel accuracy," the unit of the value of the motion vector contained in the prediction overheard information 463 is set to the ¼ pixel. Then, the prediction overhead information 463 is transmitted to the prediction unit 461. Based on the fact that the unit of the value of the motion vector contained in the prediction overhead information 463 is the ¼ pixel, the prediction unit 461 generates the predicted image while creating the samples at the ¼ pixel accuracy by the linear interpolation after the creation of the samples at the half-pixel accuracy based on the multi-tap filter as in the MPEG-4 or the AVC.

On the other hand, when the value of the virtual pixel accuracy indication information 800 indicates the "motion vector detection at the half-pixel accuracy," the unit of the value of the motion vector contained in the prediction overheard information 463 is set to the ½ pixel. Then, the prediction overhead information 463 is transmitted to the prediction unit 461. Based on the fact that the unit of the value of the motion vector contained in the prediction overhead information 463 is the half-pixel, the prediction unit 461 generates the predicted image while creating the samples at the half-pixel accuracy based on the multi-tap filter as in the MPEG-4 or the AVC or the samples at the half-pixel accuracy by the linear interpolation as in the MPEG-1 or the MPEG-2 described above. In a configuration in which the plurality of methods of creating the half-pixel sample can be selected, the virtual sample creating method indication information 811 in FIG. 97 is extracted from the bit stream in the variable length decoding unit 25 and is then transmitted to the prediction unit 461 so that the half-pixel sample is created by the same method as that in the encoding device.

According to the encoding device and the decoding device in the seventeenth embodiment described above, because, in order to efficiently encode the color video signal in the 4:4:4 format, for the independent motion compensation prediction for each color component, the accuracy of the virtual sample used for detecting the motion vector and creating the predicted image can be dynamically switched according to the property of the signal of each color component, it is possible to perform the encoding with the amount of codes of the motion vector, the ratio of which increases with respect to a total amount of codes in the low-bit rate encoding at a high compression ratio, being effectively suppressed. Further, by preparing a plurality of methods of creating the virtual sample, such as the types of interpolation filter used for creating the virtual sample and selectively switching the methods to create the virtual sample, the optimal motion compensation prediction process according to the property of the signal of each color component becomes possible. As a result, the encoding device which efficiently encodes the color video signal in the 4:4:4 format and the decoding device corresponding thereto can be provided.

In the seventeenth embodiment, the encoding device illustrated in FIG. 96 obtained by adding the virtual pixel accuracy indication information 800 to the encoding device illustrated in FIG. 88 in the sixteenth embodiment and the decoding device illustrated in FIG. 98 obtained by adding the virtual pixel accuracy indication information 800 to the decoding device illustrated in FIG. 93 in the sixteenth embodiment have been described. However, also by using the encoding device obtained by adding the virtual pixel accuracy indication information 800 to the encoding device according to other embodiments and the decoding device obtained by adding the virtual pixel accuracy indication information 800 to the decoding device according to the other embodiments, the similar effects can be obtained.

Eighteenth Embodiment

Another embodiment of the encoding device and the decoding device for performing the individual and independent encoding process for encoding and decoding one color component independently of the other color components in the above-mentioned embodiments will be described in the eighteenth embodiment. Herein, the encoding device and the decoding device in the sixteenth embodiment are taken as an example. In the individual and independent encoding process, the prediction overhead information 463 such as the encoding mode 6 and the motion vector, which cannot be irreversibly encoded in principle, is multiplexed in the bit stream for each color component. Therefore, in the case of the encoding at a high compression ratio with the increased rate of the amount of codes with respect to a total amount of codes, compression performance is impaired. Therefore, in the encoding device according to the eighteenth embodiment, information such as the encoding mode 6 or the prediction overhead information 463, which is obtained as a result of the encoding on the macroblock basis for a specific color component (for example, determined as the C0 component), is retained as reference information. When the macroblock present at the same position in the image space as that of the macroblock of the C0 component using the reference information is to be encoded in the picture encoding unit 503 for processing other color components, a selection can be made between the encoding procedure which uses the reference information and the encoding procedure which individually determines the encoding mode 6 and the prediction overhead information 463 for its own color component. A prediction information encoding indication flag indicating the selected procedure is multiplexed for each macroblock. With such a configuration, when the color components have a high correlation regarding the encoding mode 6 or the prediction overhead information 463, the amount of codes can be effectively reduced to enhance the compression efficiency.

When the encoding mode 6 and the prediction overhead information 463 are determined independently for its own color component for the encoding, the encoding/decoding process procedure same as that described in the sixteenth and seventeenth embodiments can be used. Moreover, also in the case where the encoding is performed by referring to the reference information, almost the same encoding process procedure as that described in the sixteenth and seventeenth embodiments can be used by merely skipping the multiplexing process of the encoding mode 6, the prediction overhead information 463, and the like in the bit stream although the encoding process for the other components is made to wait on the encoding side until the reference information is obtained. Also on the decoding side, the reference information is required to be first decoded. However, the same decoding process procedure as that described in the sixteenth and seventeenth embodiments can be used by merely performing the process of determining whether to use the reference information by decoding the prediction information encoding indication flag or the decoded information in its own macroblock.

Further, by determining whether or not the prediction information encoding indication flag is always multiplexed for each macroblock in the higher-order data layer (the slice, the picture, or the sequence) and multiplexing in the bit stream, it is only sufficient to multiplex the prediction information encoding indication flag as a code at the macroblock level only when needed, for example, only for the high compression. Accordingly, the encoding efficiency can be enhanced. Moreover, without limiting the reference information to information of a specific color component, the encoding and the decoding may be performed while selecting any of the color components to be used as a reference.

The configuration of the eighteenth embodiment is not limited to that of the sixteenth embodiment and is also applicable to all the encoding devices and the decoding devices which perform the individual and independent encoding process for encoding and decoding one color component independently of the other color components in the embodiments of the present application.

What is claimed is:

1. An image encoding device for receiving a color moving image signal composed of a plurality of color components as an input, dividing the color moving image signal into predetermined encoding unit areas for each of the plurality of color components, and selectively applying one of intra encoding and motion compensation prediction encoding to digitally compress the color moving image signal, comprising:

a block dividing unit for dividing the input color moving image signal into predetermined blocks to generate a signal of each of the encoding unit areas;

a predicted image generating unit for generating a predicted image for the signal of each of the encoding unit areas according to at least one prediction mode indicating a predicted image generating method and corresponding prediction overhead information;

a determining unit for determining a prediction mode used for encoding and corresponding prediction overhead information according to a prediction efficiency of the predicted image output from the predicted image generating unit;

a prediction error encoding unit for encoding a difference between the predicted image corresponding to the prediction mode determined by the determining unit and the input color moving image signal; and an encoding unit for variable length-coding the prediction mode, the corresponding prediction overhead information, and an output from the prediction error encoding unit, wherein:

the determining unit selects one of use of the prediction mode used for encoding and the corresponding prediction overhead information in an area to be encoded of another color component constituting the same screen at the same image position and use of its own prediction mode and corresponding prediction overhead information for the color component to determine the prediction mode used for encoding and the corresponding prediction overhead information; and the encoding unit multiplexes a prediction information encoding indication flag indicating means used for determining the prediction mode and the corresponding prediction overhead information in the bit stream for each of the encoding unit areas.

2. An image encoding method for receiving a color moving image signal composed of a plurality of color components as an input, dividing the color moving image signal into predetermined encoding unit areas for each of the plurality of color components, and selectively applying one of intra encoding and motion compensation prediction encoding to digitally compress the color moving image signal, comprising:

a block dividing step for dividing the input color moving image signal into predetermined blocks to generate a signal of each of the encoding unit areas;

a predicted image generating step for generating a predicted image for the signal of each of the encoding unit areas according to at least one prediction mode indicating a predicted image generating method and corresponding prediction overhead information;

a determining step for determining a prediction mode used for encoding and corresponding prediction overhead information according to a prediction efficiency of the predicted image output from the predicted image generating step;

a prediction error encoding step for encoding a difference between the predicted image corresponding to the prediction mode determined by the determining step and the input color moving image signal; and an encoding step for variable length-coding the prediction mode, the corresponding prediction overhead information, and an output from the prediction error encoding step, wherein:

the determining step selects one of use of the prediction mode used for encoding and the corresponding prediction overhead information in an area to be encoded of another color component constituting the same screen at the same image position and use of its own prediction mode and corresponding prediction overhead information for the color component to determine the prediction mode used for encoding and the corresponding prediction overhead information; and the encoding step multiplexes a prediction information encoding indication flag indicating means used for determining the prediction mode and the corresponding prediction overhead information in the bit stream for each of the encoding unit areas.

* * * * *